(12) United States Patent
Larreta

(10) Patent No.: US 8,157,392 B2
(45) Date of Patent: Apr. 17, 2012

(54) IMAGE-PRODUCING APPARATUS

(76) Inventor: Felix Rodriguez Larreta, Barcelona (ES)

( * ) Notice: Subject to any disclaimer, the term of this patent is extended or adjusted under 35 U.S.C. 154(b) by 115 days.

(21) Appl. No.: 12/599,158

(22) PCT Filed: May 8, 2008

(86) PCT No.: PCT/EP2008/055723
§ 371 (c)(1),
(2), (4) Date: Nov. 6, 2009

(87) PCT Pub. No.: WO2008/138875
PCT Pub. Date: Nov. 20, 2008

(65) Prior Publication Data
US 2010/0302643 A1 Dec. 2, 2010

(30) Foreign Application Priority Data
May 9, 2007 (GB) .................................. 0708942.8

(51) Int. Cl.
*G02B 27/08* (2006.01)
(52) U.S. Cl. ........................................... 359/616; 353/1
(58) Field of Classification Search .......... 359/616–617; 353/1
See application file for complete search history.

(56) References Cited

U.S. PATENT DOCUMENTS

| 4,475,126 | A | | 10/1984 | Akins | |
|---|---|---|---|---|---|
| 4,725,135 | A | * | 2/1988 | Browning | 353/1 |
| 6,062,698 | A | * | 5/2000 | Lykens | 359/616 |
| 6,089,722 | A | | 7/2000 | Doak | |
| 6,139,160 | A | * | 10/2000 | Frucht | 359/616 |
| 7,399,083 | B2 | * | 7/2008 | Bailey et al. | 359/616 |
| 2010/0238275 | A1 | * | 9/2010 | Otte et al. | 348/54 |

FOREIGN PATENT DOCUMENTS

FR 2 307 416 A 11/1976

OTHER PUBLICATIONS

Polyhedron Models for the Classroom by Magnus J Wenninger 1966 Reproduction can be found at: http://www.theweebsite.com/polyhedra/pmftc/pmftc0.html.*
International Search Report for International Application No. PCT/EP2008/055723, completed Oct. 8, 2008; 2 pages.

* cited by examiner

*Primary Examiner* — Christopher Mahoney
(74) *Attorney, Agent, or Firm* — Carter, DeLuca, Farrell & Schmidt, LLP

(57) ABSTRACT

An apparatus (3) for generating a three-dimensional kaleidoscopic image, comprising a screen (4) for the projection of images thereon, and a plurality of mirrors (31,32,33) surrounding the screen, wherein the screen is substantially shaped as a portion of a surface of a polyhedron or sphere with an icosahedral group symmetry of reflection, and the plurality of mirrors are aligned with planes extending through a projected centre of said polyhedron or sphere and intersecting each edge of the screen such that an image generated on the screen is reflected in the mirrors to produce an apparent three-dimensional image of said polyhedron or sphere.

20 Claims, 152 Drawing Sheets

IMAGE-PRODUCING APPARATUS

CROSS-REFERENCE TO RELATED APPLICATIONS

The present application is a 35 U.S.C §371 National Phase Filing claiming the benefit of and priority to International Application No. PCT/EP2008/055723, filed on May 8, 2008, which claims the benefit of and priority to British Patent Application No. 0708942.8, filed on May 9, 2007, the entire contents of each of which are incorporated herein by reference.

The present invention relates to an apparatus to display visual images, and more particularly, to an apparatus suitable for producing three-dimensional kaleidoscopic images, and a method for producing such images.

Kaleidoscopes are well-known devices, generally comprising a tube formed of reflective planar surfaces constructed at 60° to each other. One end includes a viewing window for a user to look down through the tube, and the other end includes a cavity containing coloured objects, the walls of the cavity being transparent or translucent to allow light to pass through the cavity into the tube. When the tube is rotated, light is reflected off the coloured objects and is reflected in the reflective planar surfaces of the tube walls to create an attractive repeated and symmetrical pattern.

In the example of the tubular kaleidoscope having walls at 60° to each other, the resulting images are repeating hexagonal patterns in which the one sixth of one of the hexagons is formed by the actual equilateral triangular portion of the end cavity through which the light is entering the kaleidoscope, and the remaining five equilateral triangular portions of the hexagonal pattern are formed by reflections of the triangular end cavity. An example of this type of generated pattern can be seen in FIG. 1. The central or 'original' triangular image, formed by the triangular window in the end cavity is shown at 1, and the other five reflected triangular images making up one hexagonal pattern are shown at 2.

The above-described form of kaleidoscope is a two-dimensional kaleidoscope, in that the resulting image appears in a single plane. Furthermore, such forms of kaleidoscopic devices are only able to be viewed by a single viewer at a time.

U.S. Pat. No. 4,475,126 discloses a visual image display apparatus comprising four reflective surfaces extending from a screen. The apparatus is capable of producing a crude image of a spherical or polyhedral shape by combining the screen with reflections formed in the reflective surfaces. However, the apparatus suffers the drawbacks that the illusionary image-shape produced is a simple tiled replication of the original screen, reflected in horizontal and vertical directions, giving a disjointed and discontinuous resulting image. Furthermore, the resulting image would appear different from differing viewing angles, and would not present a continuous, spatially coherent 3D image which a viewer could walk around, within a viewing range of the viewing opening of the device, and still see the same 3D image/figure, without sudden jumps of viewing or sudden changes, or an undisturbed perspective sense of the image provided. Furthermore, the apparatus disclosed in U.S. Pat. No. 4,475,126 is only capable of producing a limited number of shapes, and would not be able to create any apparent 3D images/figures of polyhedral shape.

A further disadvantage of the apparatus in U.S. Pat. No. 4,475,126 is that the illusion of a physically accurate overall image pattern around the virtual and original portions of the image of the virtual 3D image cannot be maintained at all times, as it will result in a number of discontinuities occurring between reflections and between reflections and the screen as the angle from which an observer views the apparatus is changed.

Additionally, due to the arrangement of the mirrors, the apparatus would only create an image wherein the reflections of the screen are arranged in rows and columns as they are reflected or rotated only about 180 degrees. This means that the repeated pattern is clearly shown and an observer of the apparatus will see the various abutments. Therefore, it does not create a true kaleidoscopic effect.

Further, there is no disclosure in U.S. Pat. No. 4,475,126 as to how an apparent 3D image having a seemingly continuous, seamless surface pattern, could be achieved.

It is therefore an object of the present invention to provide an apparatus and a method of using the same, which overcomes the above problems, and is capable of generating an illusion of a three-dimensional kaleidoscopic image which can be viewed by a plurality of viewers at the same time and from a range of viewing angles. It is also the object of the invention to provide an apparatus and method of using the same, which is capable of generating a the illusion of a spatially coherent three-dimensional image, which may be kaleidoscopic.

SUMMARY

Accordingly, the present invention provides an apparatus for generating a three-dimensional kaleidoscopic image, comprising a screen for the generation of images thereon, and a plurality of mirrors surrounding the screen, wherein the screen is substantially shaped as a portion of a surface of a sphere or polyhedron having icosahedral group symmetry, and the plurality of mirrors are aligned with planes extending through a projected centre of said polyhedron or sphere and intersecting each edge of the screen such that a source image generated on the screen is reflected in the mirrors to produce an apparent three-dimensional image of said polyhedron or sphere.

The screen may be substantially triangular and the apparatus comprise three mirrors or, alternatively, the screen may be substantially pentagonal and the apparatus comprise five mirrors.

In one embodiment, the polyhedron is an icosahedron and the apparent image is that of an icosahedron.

In another embodiment, the polyhedron is a dodecahedron and the apparent image is that of a dodecahedron.

Conveniently, the screen is curved as a portion of the surface of a sphere, and the apparent image is a sphere.

Alternatively, the polyhedron is a disdyakis triacontahedron, and the apparent image is that of a disdyakis triacontahedron.

Preferably, the screen is translucent and the image is projected on the screen by a rear projection unit located on an opposing side of the screen to the mirrors.

Alternatively, the screen may comprise an array of LEDs, or alternatively, an array of organic LEDs.

The apparatus may further comprise blanking portions intersecting between adjacent mirrors distal to the screen.

Advantageously, the blanking portions are non-reflective.

Preferably, the blanking portions are triangular.

The ends of the mirrors distal to the screen may define an opening in the apparatus such that the screen and mirrors are observable.

Preferably, a cover is mounted over the opening in the apparatus.

In one embodiment, the cover is translucent.

The present invention also provides a method of selecting the polyhedron or sphere of which an image is to be generated, selecting a defined portion of the polyhedron representing a fundamental domain, and rotating and reflecting said defined portion to form the screen composed of discrete portions thereof.

The present invention also provides a method of generating a source image to be displayed on a screen of an apparatus according to any preceding claim, comprising the steps of selecting a base image, cropping said base image into a defined shape representing a fundamental domain, and rotating and reflecting said cropped image to form the source image composed of discrete cropped images, wherein the shape of the screen defines the shape of the source image.

Preferably, the cropped fundamental domain image is triangular.

The method may further comprise the steps of forming an image substantially about a projected centre of the source image which does not necessarily correspond to the discrete fundamental domain, and selecting the size of the image so that the reflected substantially centre region of the source image is substantially undistorted in reflection.

The present invention provides another method comprising the steps of defining a fundamental domain within the base image, defining an enlarged triangle enclosing the fundamental domain, graduating the translucency of the base image from a projected centre of the fundamental domain, wherein the image is opaque, to the boundary of said enlarged triangle wherein the image is transparent, rotating and reflecting the primary fundamental domain to produce adjacent secondary fundamental domains such that the portions of image defined within the enlarged triangles defined by the secondary fundamental domains are superimposed on the portion of image defined within the primary fundamental domain to produce the cropped image.

The present invention also provides an apparatus for generating a three-dimensional kaleidoscopic image, comprising a screen for the formation of images thereon, and a plurality of mirrors surrounding the screen, wherein the screen is substantially shaped as a portion of a surface of a regular polyhedron or sphere, and the plurality of mirrors are aligned with planes extending through a projected centre of said regular polyhedron or sphere and intersecting each edge of the screen such that an image formed on the screen is reflected in the mirrors to produce an apparent three-dimensional image of said regular polyhedron or sphere.

The present invention preferably provides a method of image processing by which the fundamental domain processing includes, for example, lighting different points with different colours, fading colours along some axes, or any image alteration with refraction index, colour distribution, colour palette, within the fundamental domain processing rules described below, to produce a virtual solid, spatially coherent, polyhedron or sphere.

Preferred embodiments of the present invention will now be described, by way of example only, with reference to the accompanying drawings, in which:

DETAILED DESCRIPTION OF THE DRAWINGS

DETAILED DESCRIPTION OF EMBODIMENTS

Figure 1:
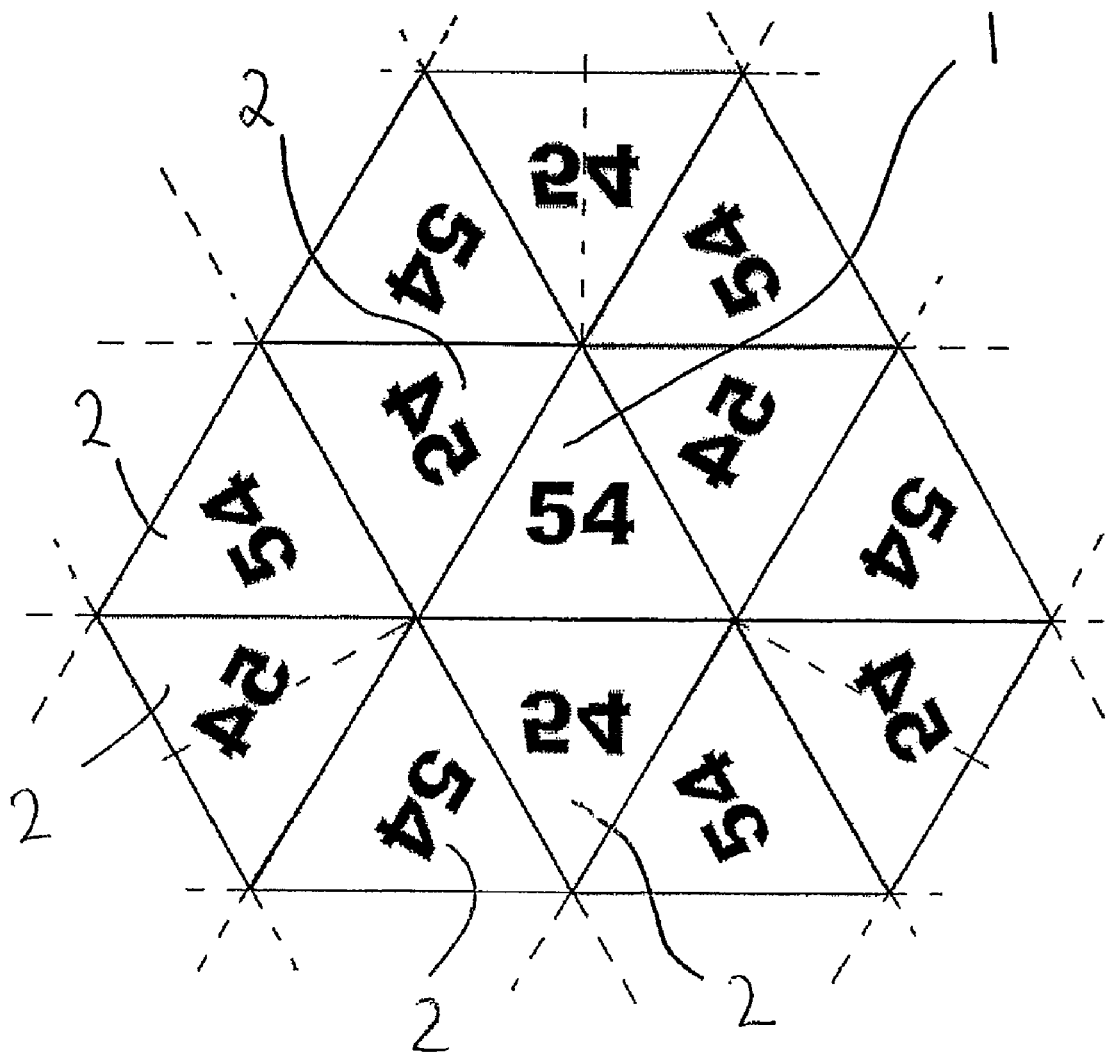
FIG. 1 is an example resultant image formed by a conventional tubular kaleidoscope.
Figure 2:
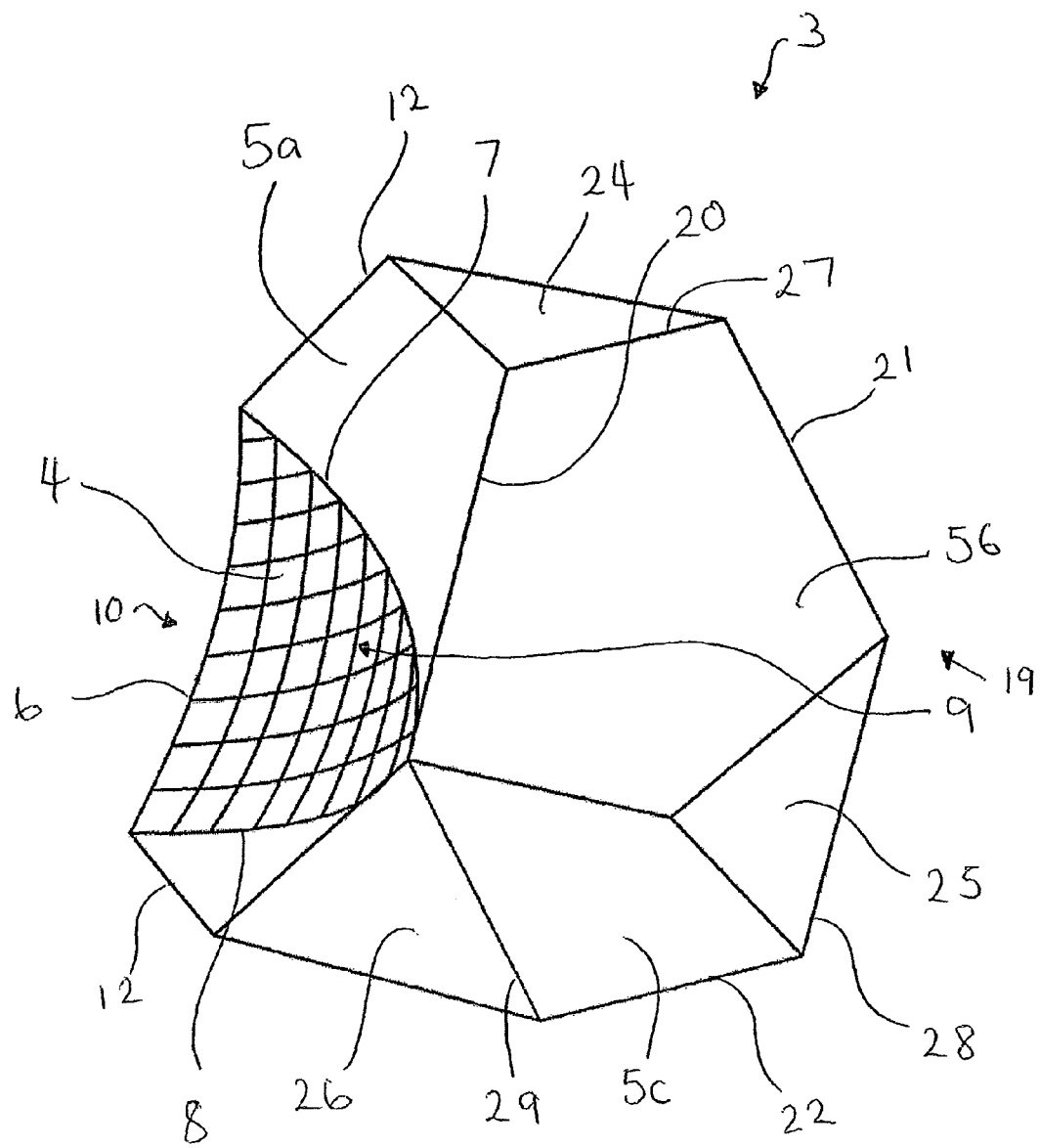
FIG. 2 is perspective view of an apparatus for generating an illusion of a three dimensional kaleidoscopic image according to an embodiment of the present invention.
Figure 3:
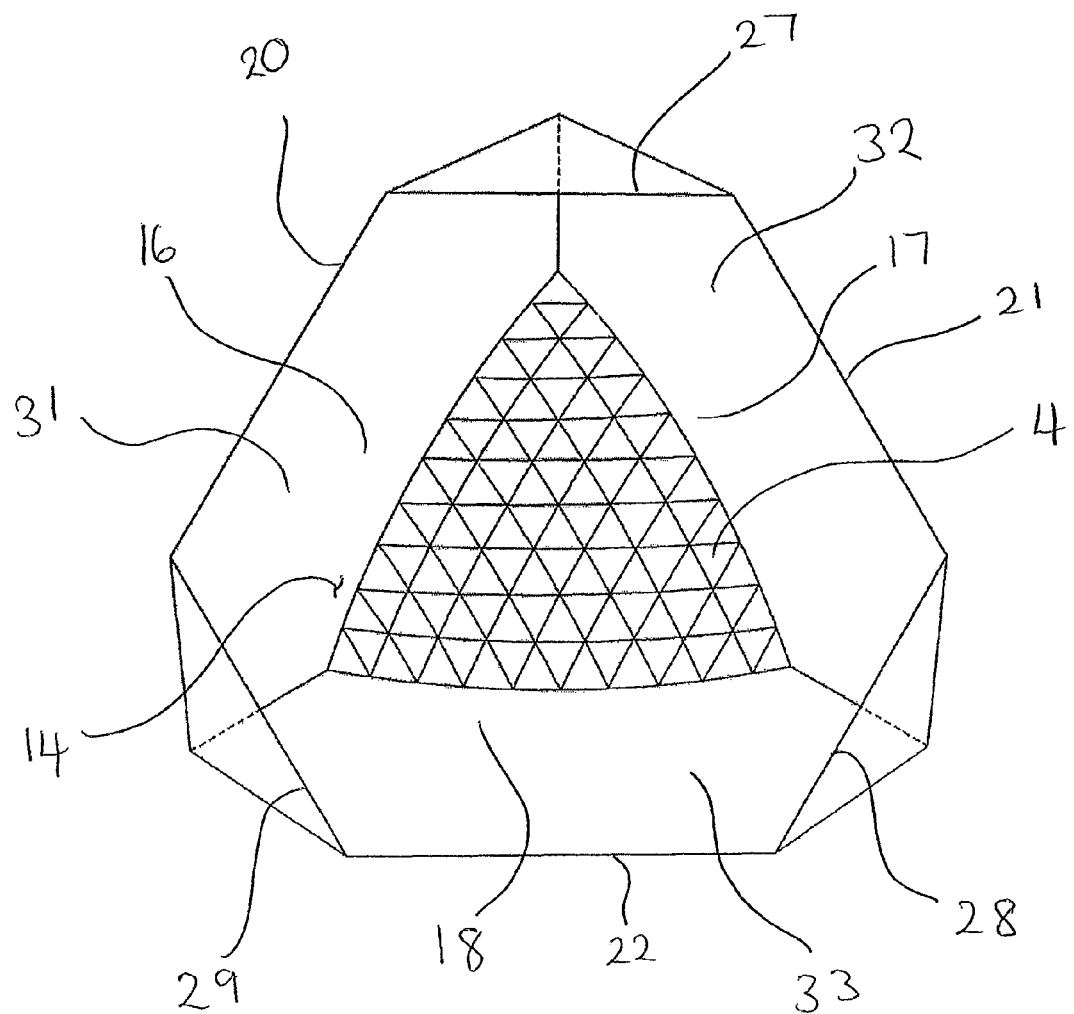
FIG. 3 is a front view of the apparatus shown in FIG. 2.
Figure 4:
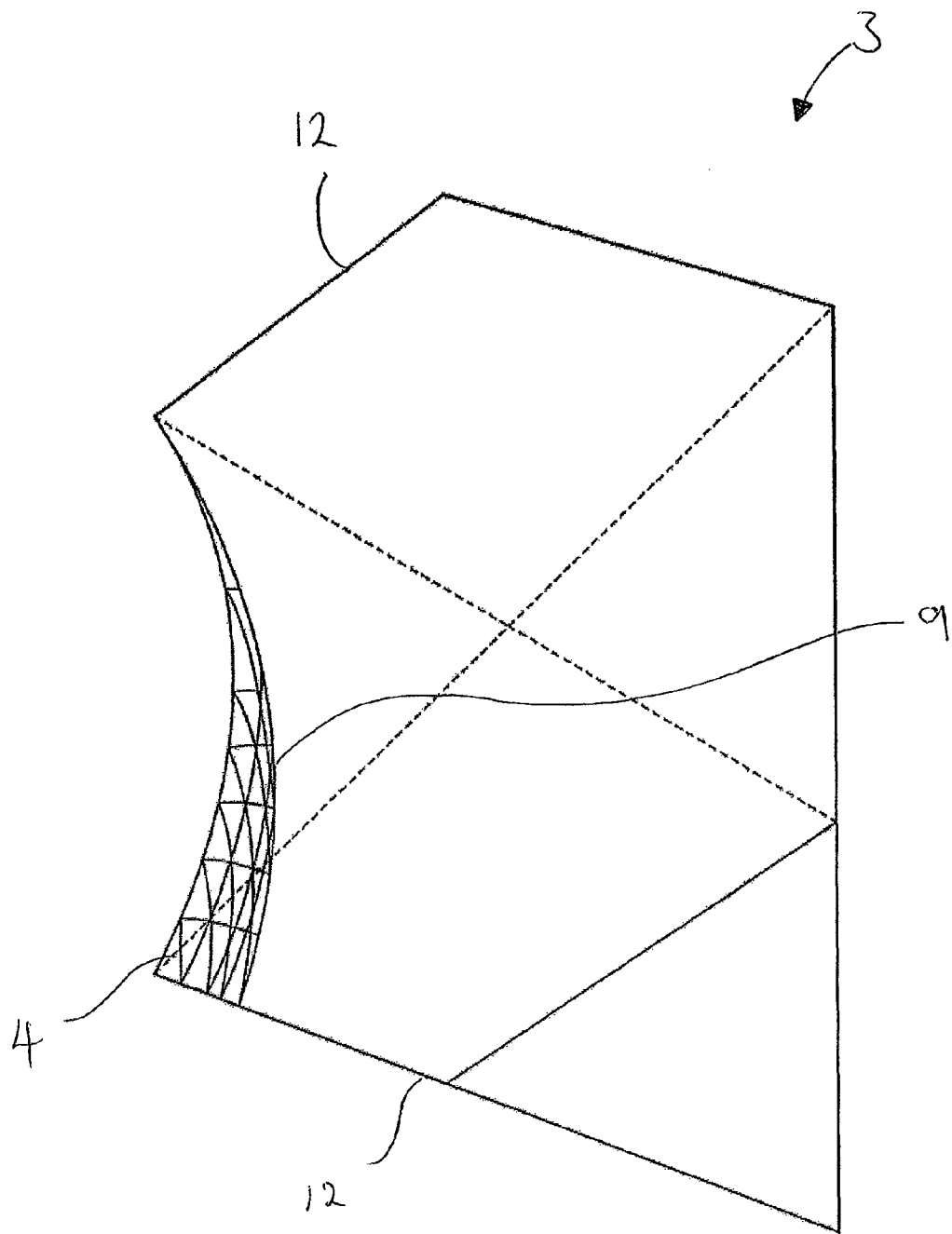
FIG. 4 is a side view of the apparatus shown in FIG. 2.
Figure 5:
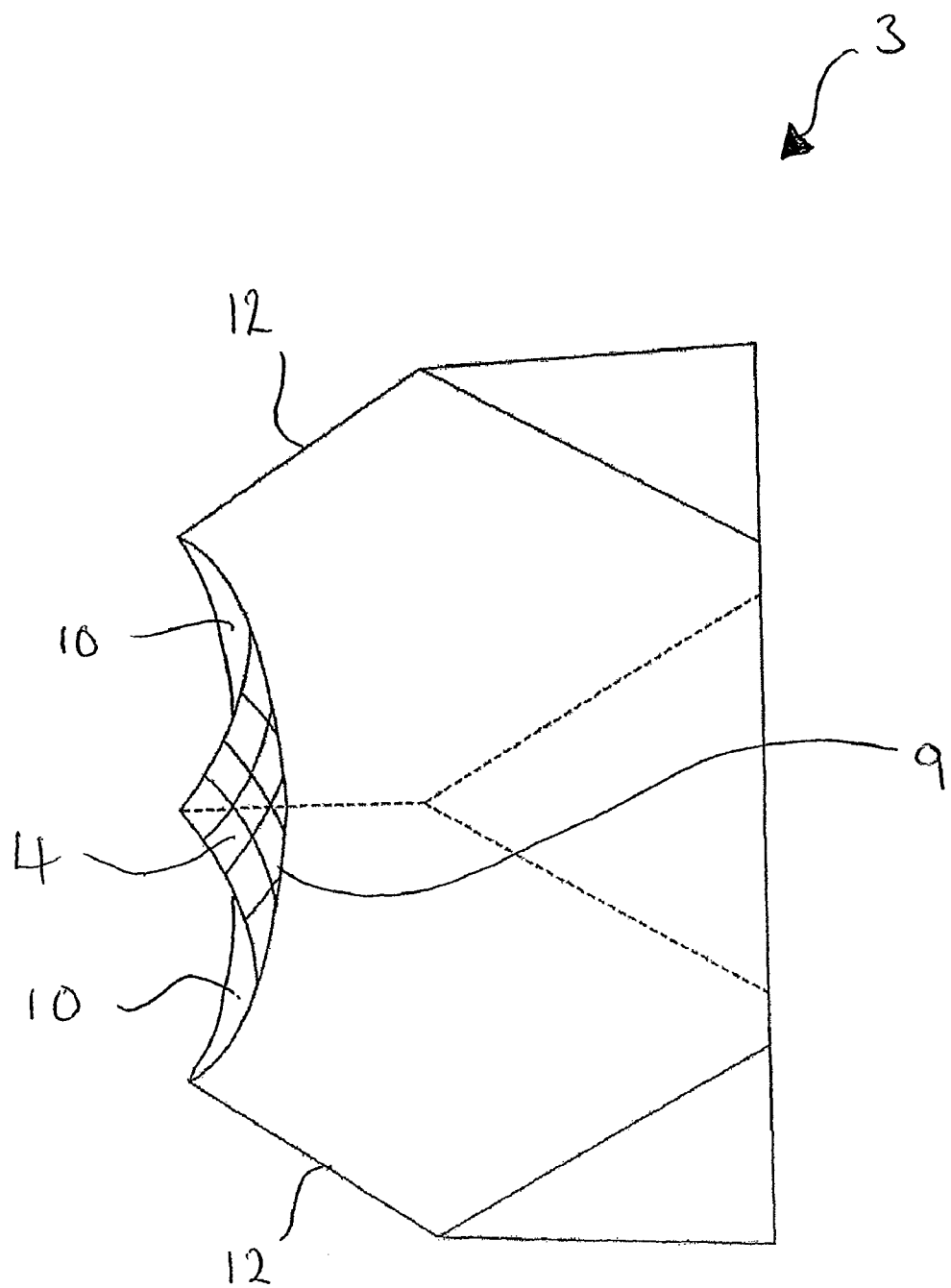
FIG. 5 is a plan view of the apparatus shown in FIG. 2.

Referring now to the drawings, there is shown in FIGS. 2 to 5, an apparatus 3 for generating an illusion of a three dimensional kaleidoscopic image according to an embodiment of the present invention. The apparatus 3 comprises a screen 4 with three panels 5a,5b,5c extending therefrom. The screen 4 is shown in this embodiment to be substantially triangular shaped with three peripheral edges 6,7,8 and a predetermined curvature, as most clearly shown in FIGS. 3 and 4, for reasons that will become apparent later. An image is formed on the screen 4, and encompasses an entire front viewing surface 9 thereof, extending to the peripheral edges 6,7,8 of the screen 4. Such an image is known as a source image.

The screen 4 is formed from a transparent or translucent material such that an image projected onto it from a rear surface 10 thereof is viewable on the front viewing surface 9 of the screen 4. The screen 4 is formed from a flexible material stretched over a frame into a desired shape or, alternatively, formed from a solid material, such as perspex which is moulded into a desired shape. The screen 4 may also be glass, polycarbonate, or the like, dependent on the desired effect. Although, the screen 4 is shown to be curved in FIGS. 2 to 5, the invention is not limited thereto, and the screen 4 may be a planar surface or may be formed in a plurality of many different shapes as will become apparent hereinafter.

The image is produced on the front viewing surface of the screen 4 by known means, for example, by an image projection unit (not shown). Such an image projection unit (not shown) is well known and therefore will not be described in any more detail herein. It will be understood that the image projection unit in one embodiment is a still image projector, or in another embodiment it is a moving-image video projector such that the image projected to be visible on the front viewing surface 9 changes.

A holder (not shown) and mounting brackets (not shown) extend from the apparatus 1 to mount an image projection unit (not shown) in a predetermined position such that it is orientated so that the lens of the image projection unit (not shown) is correctly aligned with the screen 4. This ensures that the image or images produced on the front viewing surface 9 of the screen 4 conform to the dimensions of the screen 4, such that the outer limits of the image correspond to the peripheral edges 6,7,8 of the screen 4 and such that the image is projected at a correct angle so that the image is not distorted.

The holder and mounting brackets (not shown) are also adjustable to allow, for example, the distance between the lens of the image projection unit (not shown) and the rear surface 10 of the screen to be altered to correctly adjust the size of the image on the front viewing surface 9 of the screen 4. The image projection unit (not shown) is mounted to the holder (not shown) by known means, for example, bolts.

It will be understood that the image projected onto the screen 4 by a rear projection means will be transposed to have the correct orientation when viewed on the front viewing surface 9. Further, dependent on the shape of the screen 4, the image is manipulated, for example, to correspond to a portion of the screen being angled, so that the image does not appear to be stretched or compressed.

In an alternative embodiment however, the screen 4 is opaque and has an image formed directly on the front viewing surface 9 thereof, or the front viewing surface 9 of the screen 4 may be an LCD screen (not shown) or the like such that the screen 4 itself is the image projection means. If the source image is formed directly on the screen 4, by means of, for example, a photograph, then in a further embodiment the image is replaceable by means of a frame in which it is fitted. In one alternative, a photograph (not shown) is positionable behind a transparent plate (not shown) formed to the same shape as the screen 4 or, in another alternative, the transparent plate (not shown) itself forms the screen and the photograph is positionable therebehind and held by means of clamps (not shown).

In alternative preferred embodiments, the screen may comprise an array of LEDs or an array of organic LEDs.

A rear edge 11 (refer to FIG. 19) of each panel 5a,5b,5c extends along a respective peripheral edge 6,7,8 of the screen and abuts thereagainst. Side edges 13, of each panel 5a,5b,5c communicate and are linked with respective side edges 13 on adjacent panels 5a,5b,5c to form an enclosed recess 14. The front surface 9 of the screen 4 forms a rear face of the recess 14 and the inner surfaces 16,17,18 of the panels 5a,5b,5c respectively form the sides of the recess 14 such that an opening 19 is formed about the front edges 20,21,22 of each panel 5a,5b,5c distal to the screen 4. Blanking portions 24,25, 26 are disposed relative to the opening 19 and intersect between adjacent panels 5a,5b,5c. The blanking portions 24,25,26 intersect adjacent panels 5a,5b,5c such that the size of each panel 5a,5b,5c is restrained and so the size of the apparatus 3 may be reduced. The opening 19 is therefore determined by the front edge 20,21,22 of each panel 5a,5b,5c respectively and front edges 27,28,29 of each blanking portion 24,25,26 respectively. In the embodiment shown in FIGS. 2-5, the resulting opening forms an irregular hexagonal shape.

Each panel 5a,5b,5c is a surface mirror with an reflective planar surface 31,32,33 formed on the inner surfaces 16,17, 18 thereof to reflect an image formed on the screen 4. The screen 4 and reflective planar surface 31,32,33 of each panel 5a,5b,5c are disposed such that an image produced on the front surface 9 of screen 4 and reflected in the reflective planar surfaces 31,32,33 generates an apparent illusion of a three-dimensional solid object as will become apparent hereinafter. The illusion of the solid object that may be generated is that of a polyhedron or a sphere.

It will therefore be understood that the inner surfaces 31,32,33 of the recess 14 are substantially reflective, with the exception of the screen 4 and the blanking portions 24, 25, 26, if present. The blanking portions 24,25,26 have non-reflective inner surfaces 34, such as matt black, so that they don't reflect the image produced on the outer surface 9 of the screen 4 or an image reflected in the reflective planar surfaces 31,32,33 of each panel 5a,5b,5c.

The reflective planar surfaces 31, 32, 33 of the panels 5a,5b,5c are preferably 'front surface' reflective or 'first surface' reflective mirrors. This means that the reflective portion of the surface is that of the innermost surface proximate the screen 4. This is in contrast to 'rear-surface' reflective surfaces, such as conventional domestic mirrors, in which the reflective coating is painted on the rear of a pane of glass, as this light has to pass through the thickness of the glass before it reaches the xeflecdve surface at which it is reflected back, and then passes back through the thickness of the glass before leaving the reflective material. The advantage of a front-surface reflective material is that it prevents any duality or duplication of the reflected image, cause by the image being reflected in both the front surface of the glass panel, and secondly in the reflective coating spaced from the surface of the glass by the distance of the thickness of the glass.

Each panel 5a,5b,5c extends at the same angle relative to the screen 4 and the determination of this angle will be described hereinafter. Although the screen 4 has three peripheral edges 6,7,8 in the above shown embodiment with three corresponding panels 5a,5b,5c, it will become apparent that the number of panels is not limited to three panels and is dependent on the shape of the screen, which itself is dependent on the desired illusion of a three-dimensional, preferably kaleidoscopic, shape to be produced.

It will be understood that the illusion of the three-dimensional image is produced by the source image formed on the screen 4 being reflected in each of the reflective planar surfaces 31,32,33 such that the image is rotated and translated to create an illusion of a continuous surface of adjoining multi-faceted duplicates and reversed duplicates of the source image formed on the screen 4.

The opening 19 represents the viewing window for the apparatus 3 such that an observer can view the screen 4 and the reflective planar surfaces 31,32,33 in which the source image formed on the screen 4 is reflected. It will be understood that the blanking portions 24,25,26 are not a necessity and the mirrors may extend outwardly to an apex. However, an advantage of the blanking portions 24,25,26 is that, dependent on their orientation relative to the reflective planar surfaces 31,32,33, they restrict the external light entering through the opening 19 and also restrict the size of the opening 19 such that they restrict the viewing angle, for reasons that will be explained below.

All the exemplary embodiments described herein relate to an apparatus suitable to provide an illusion of a three-dimensional kaleidoscopic image 3 with either three or five panels and a corresponding screen with either three or five peripheral edges to form a triangular or pentagonally shaped screen 4 respectively, against which the panels abut and on which a source image is formed, although it will be understood that the screen 4 itself may be curved or have a non planar shape for reasons that will become apparent hereafter.

Such an apparatus 3 with one of either three or five panels is configured to produce the illusion of either a polyhedral solid or a sphere. With such apparatus the generated illusion of a shape is limited to a sphere, or a specific geometrical group of polyhedrons, namely those with icosahedral group symmetry of reflection.

Figure 6:
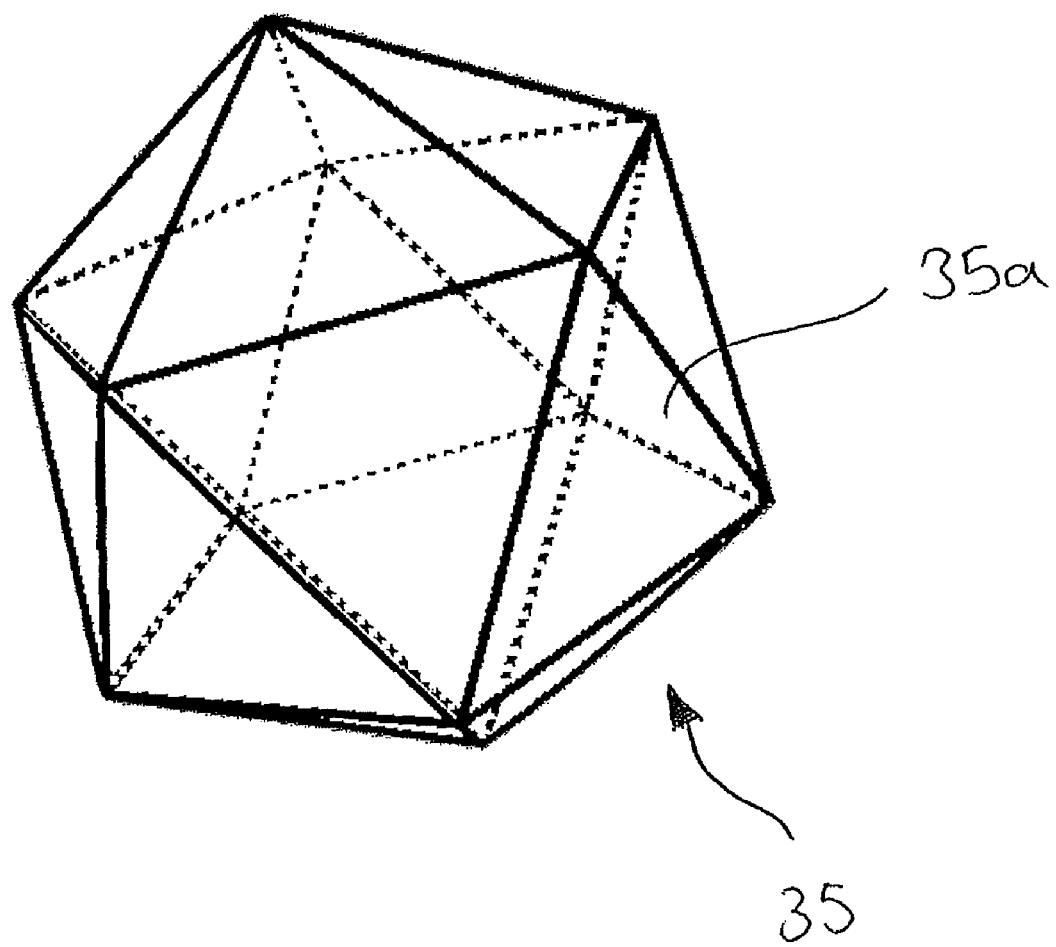
FIG. 6 is a perspective view of an icosahedron.
Figure 7A:
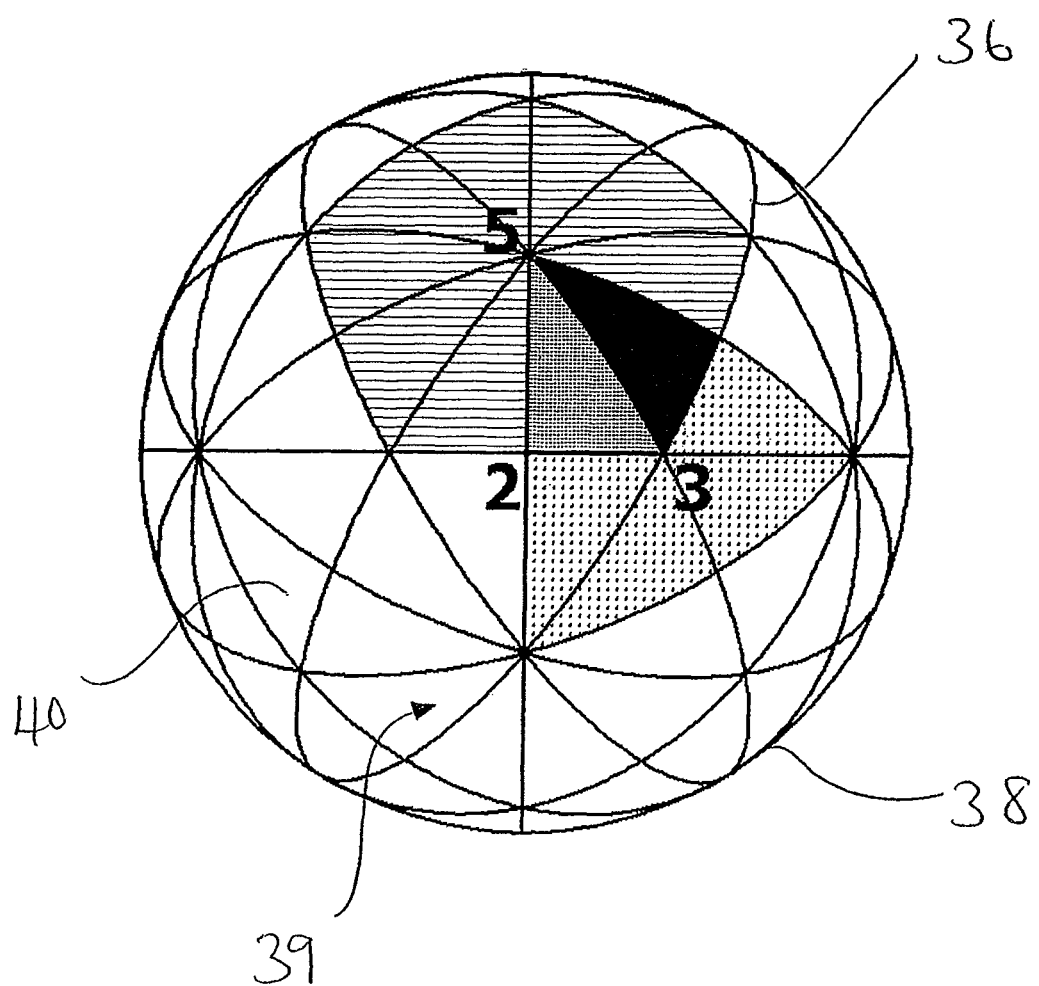
FIG. 7A is a view of all the planes of symmetry of icosahedral group symmetry transcribed onto the surface of a sphere.
Figure 7B:
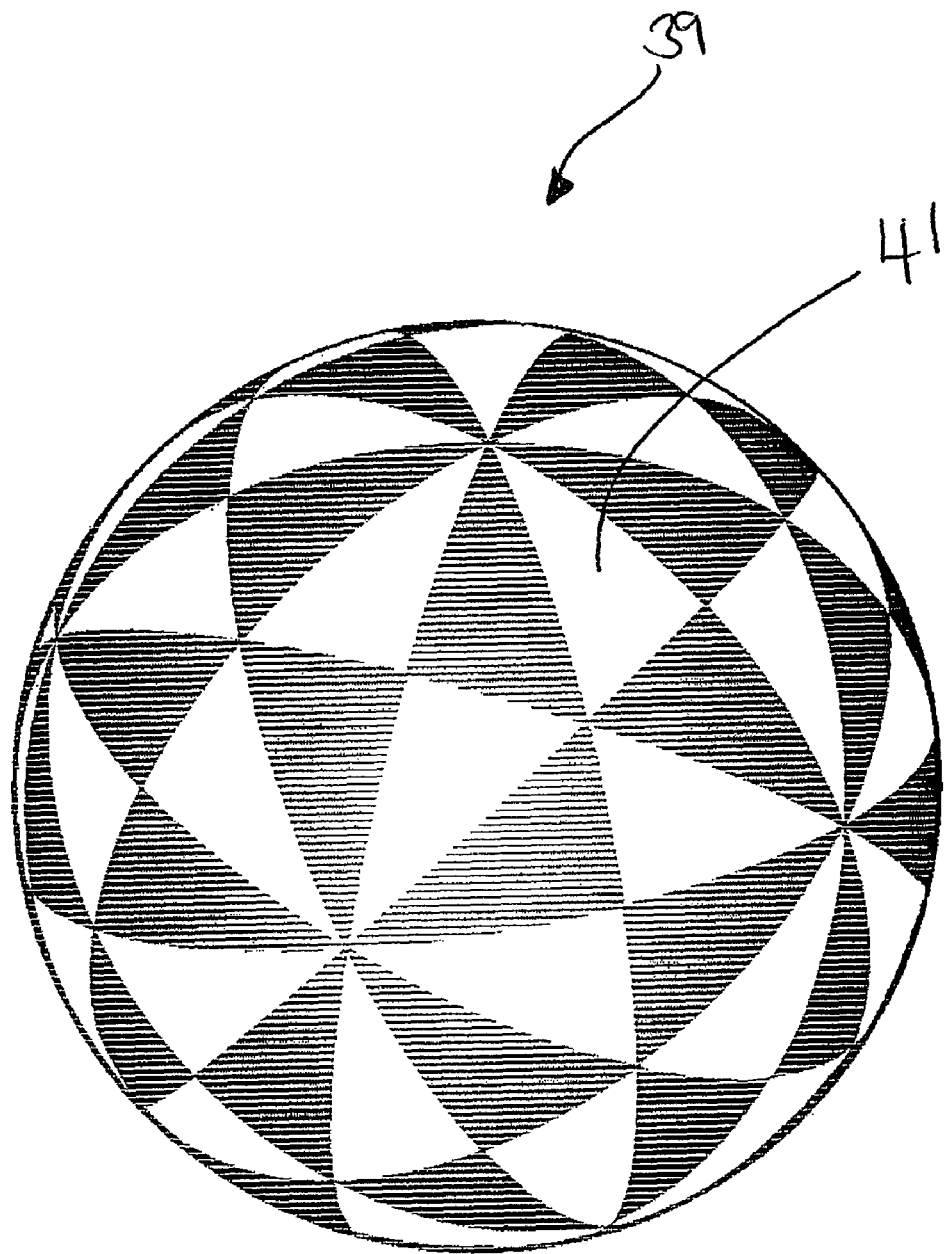
FIG. 7B is a another view of all the planes of symmetry of icosahedral, group symmetry transcribed onto the surface of a sphere.
Figure 8:
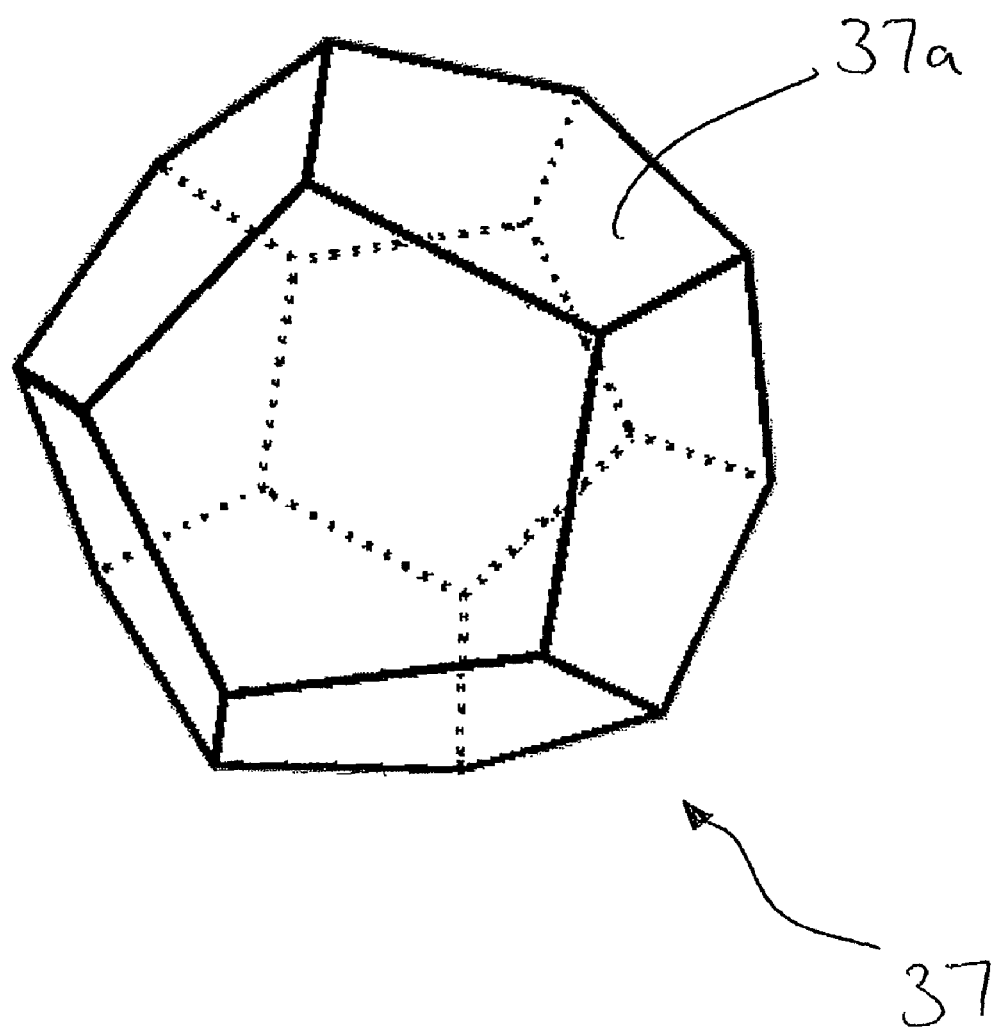
FIG. 8 is a perspective view of a dodecahedron.
Figure 9:
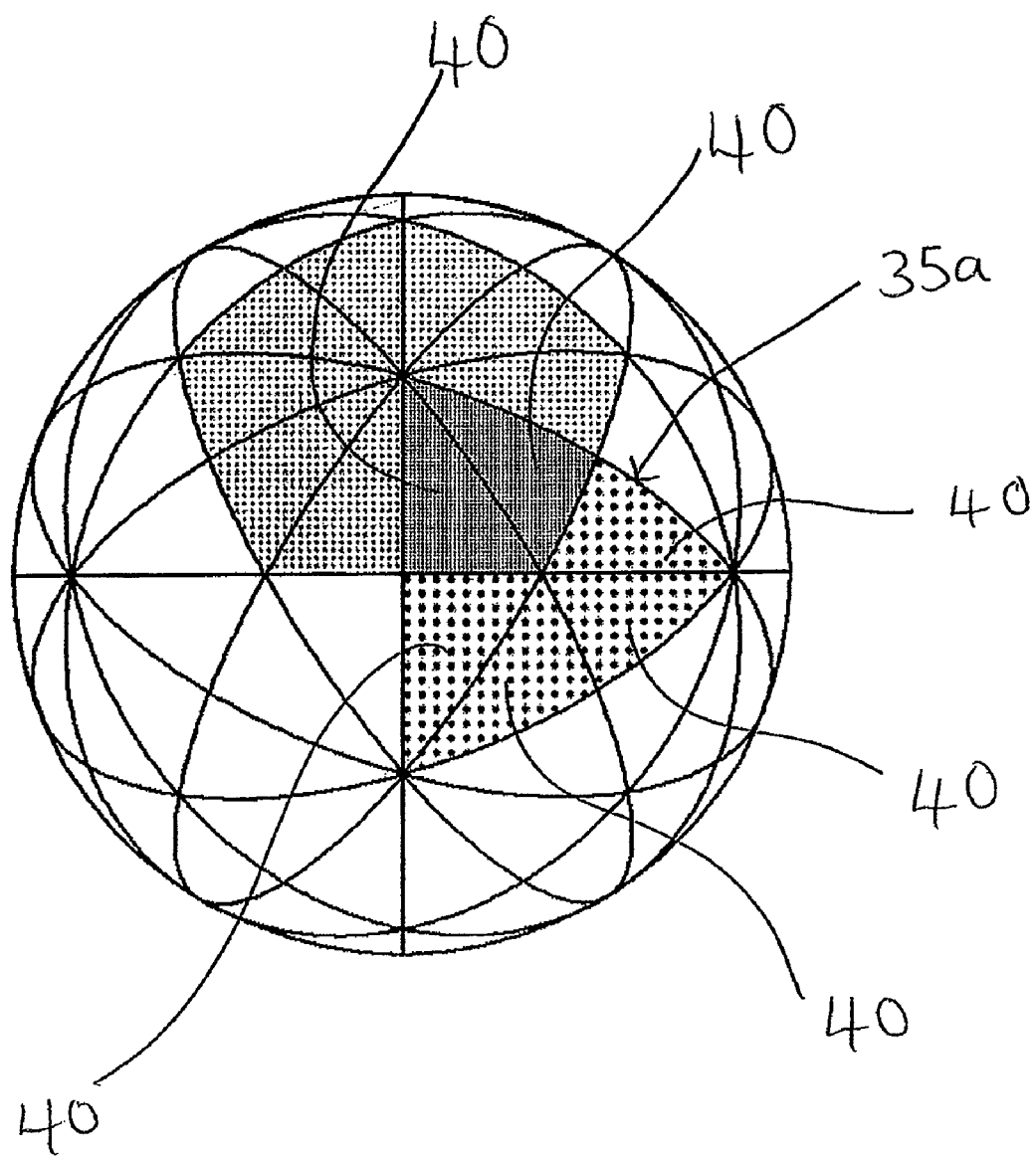
FIG. 9 is a view of all the planes of symmetry of icosahedral group symmetry transcribed onto the surface of a sphere showing a face of an icosahedron transcribed thereon.
Figure 10:
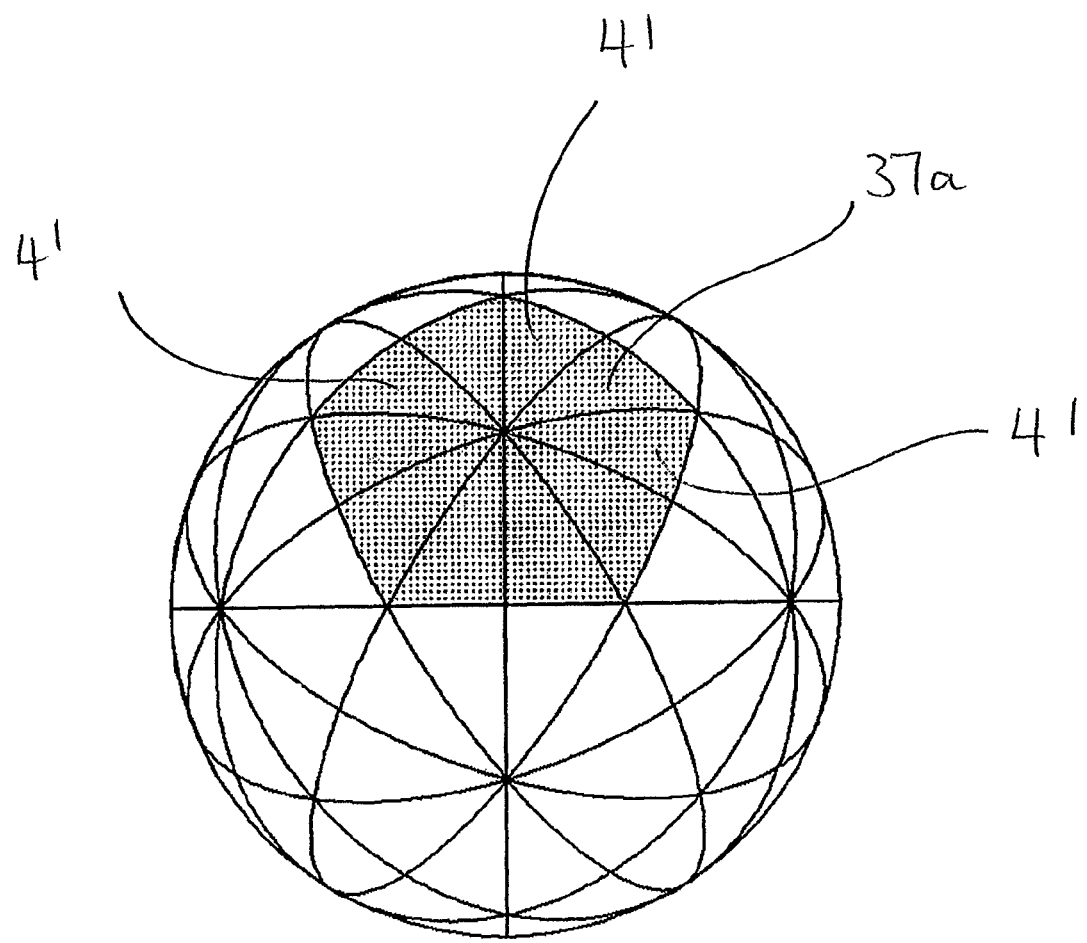
FIG. 10 is a view of all the planes of symmetry of icosahedral group symmetry transcribed onto the surface of a sphere showing a face of a dodecahedron transcribed thereon.

An icosahedral group symmetry of reflection corresponds to the planes of symmetry of an icosohedron. An icosohedron 35 is shown in FIG. 6, and is formed from twenty triangular faces 35a. The planes of symmetry are the imaginary planes passing through the centre of the object which reflect one side to exactly match the other side. An icosohedron has fifteen planes of symmetry, and they are shown in FIGS. 7A and 7B with each circle 36 representing a symmetry plane. Similarly a dodecahedron 37 (shown in FIG. 8) is formed from twelve pentagonal faces 37a and corresponds to the icosahedral group symmetry of reflection as it is the duel of a icosahedron 35, that is their faces and vertices are interchanged. Therefore, the dodecahedron 37 and icosahedron 35 exactly agree in their symmetry planes, with fifteen planes of symmetry apiece. Referring to FIGS. 9 and 10, one face of a icosahedron 35a and a dodecahedron 37a respectively are mapped onto the full icosahedral symmetry group, such that the highlighted area represents a single planar face thereof.

Figure 11A:
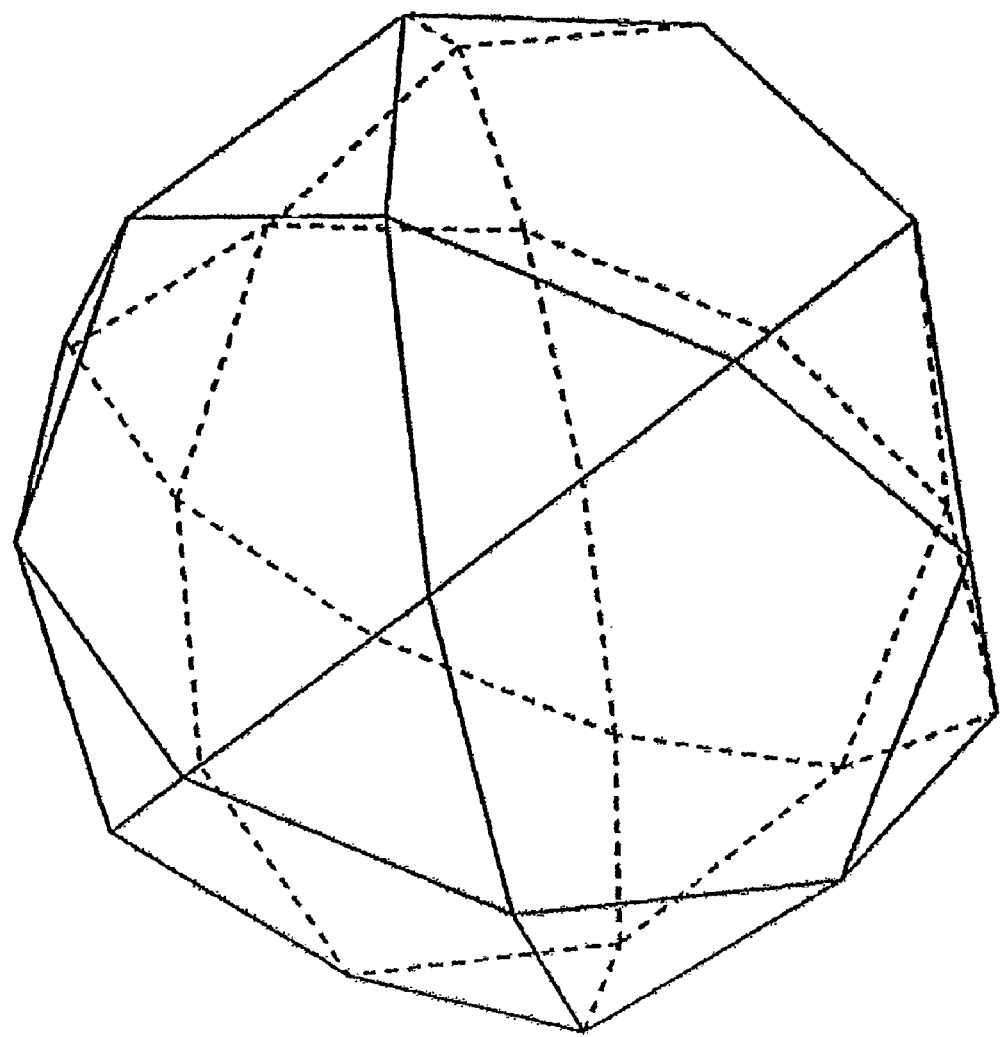
FIG. 11A is a perspective view of a polyhedron having icosahedral group symmetry.
Figure 11B:
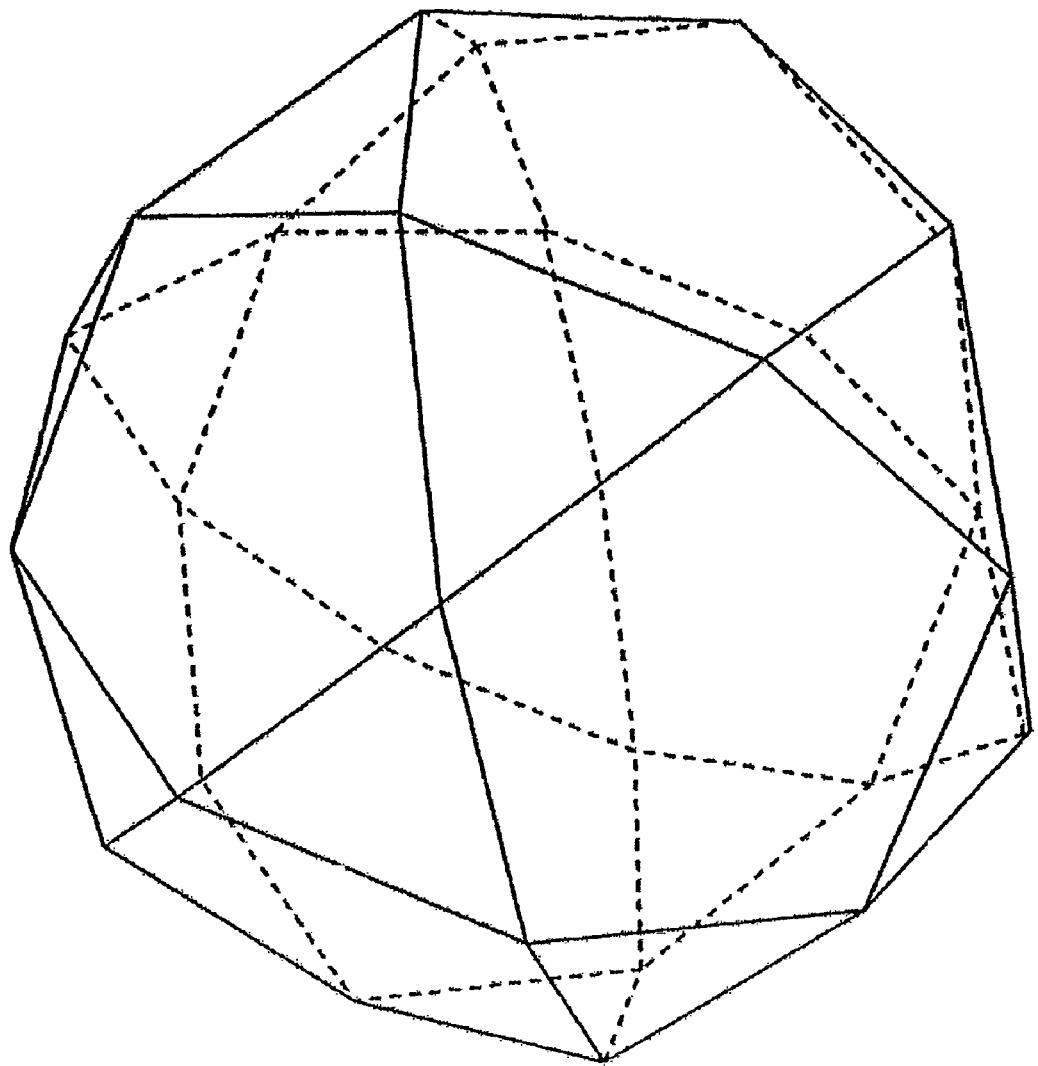
FIG. 11B is a perspective view of another polyhedron having icosahedral group symmetry.
Figure 11C:
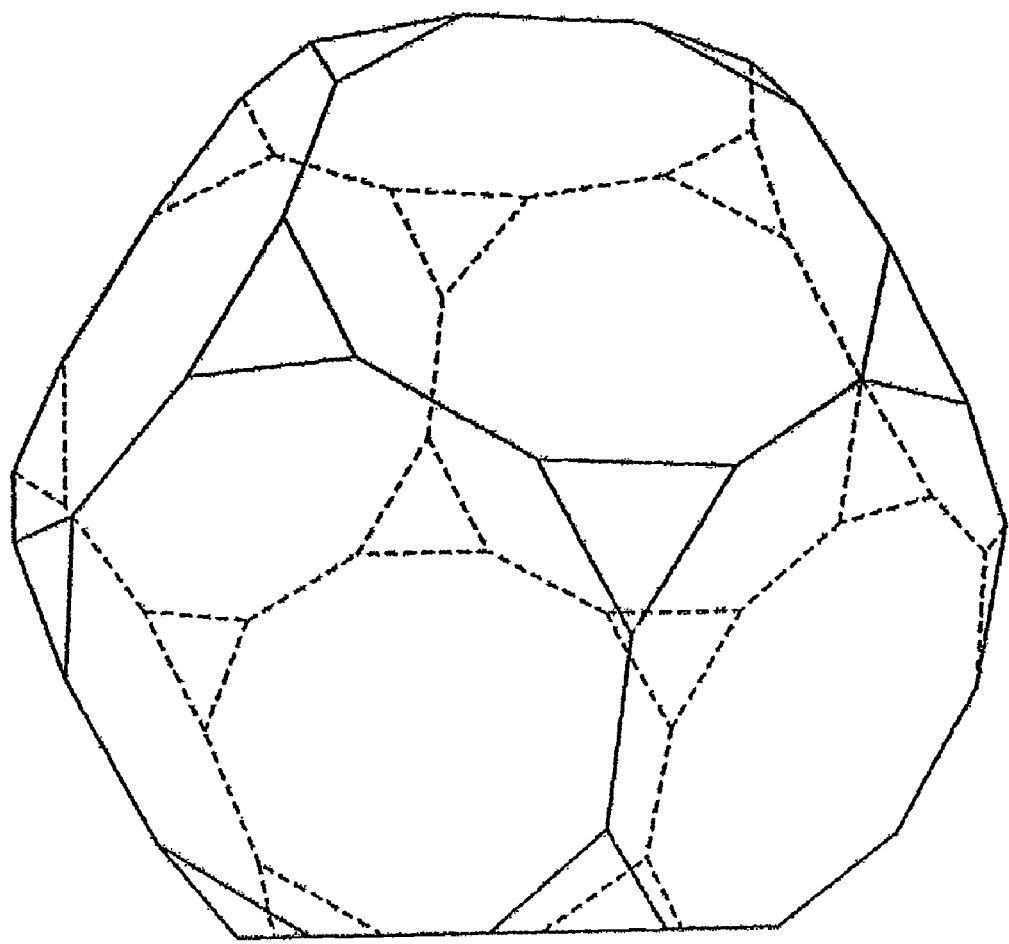
FIG. 11C is a perspective view of another polyhedron having icosahedral group symmetry.
Figure 11D:
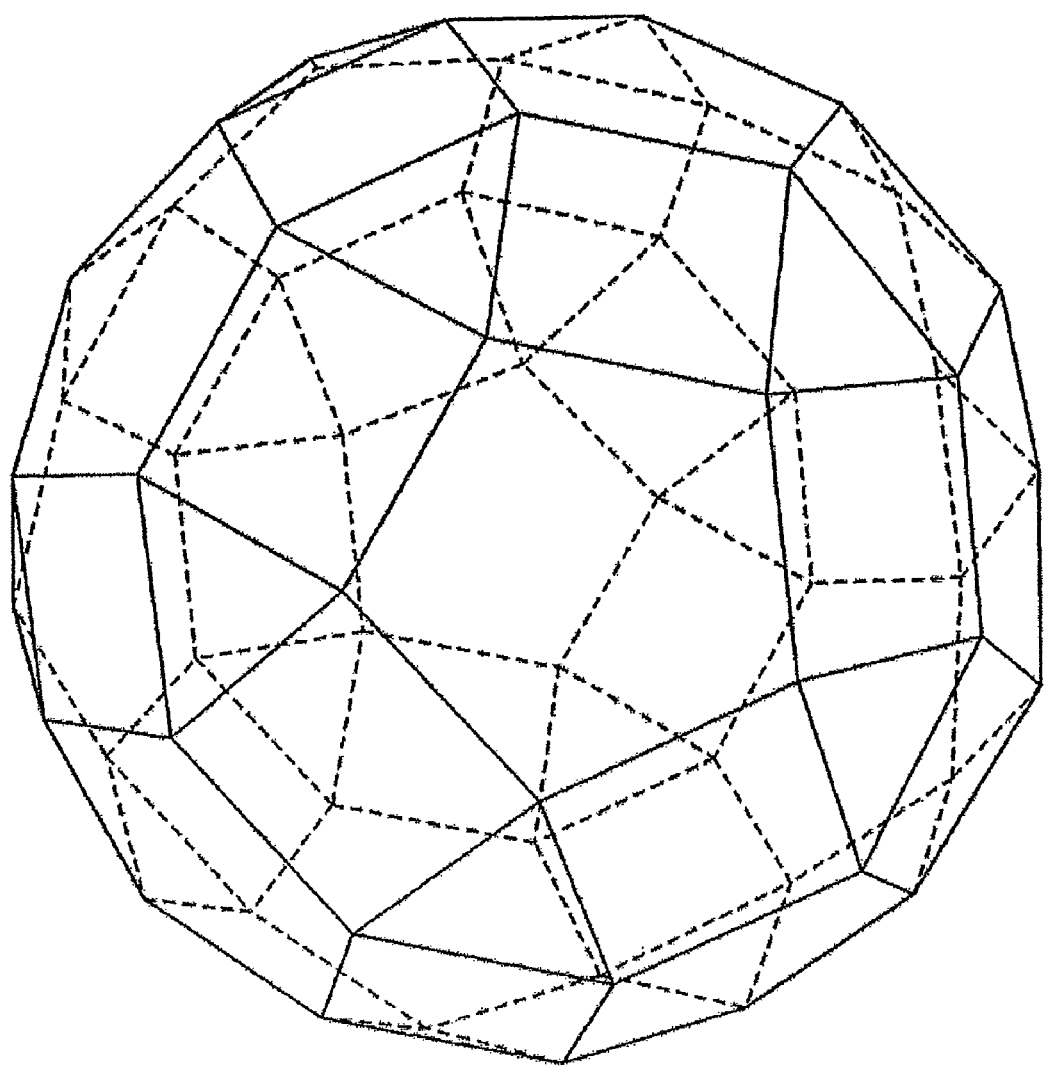
FIG. 11D is a perspective view of another polyhedron having icosahedral group symmetry.
Figure 11E:
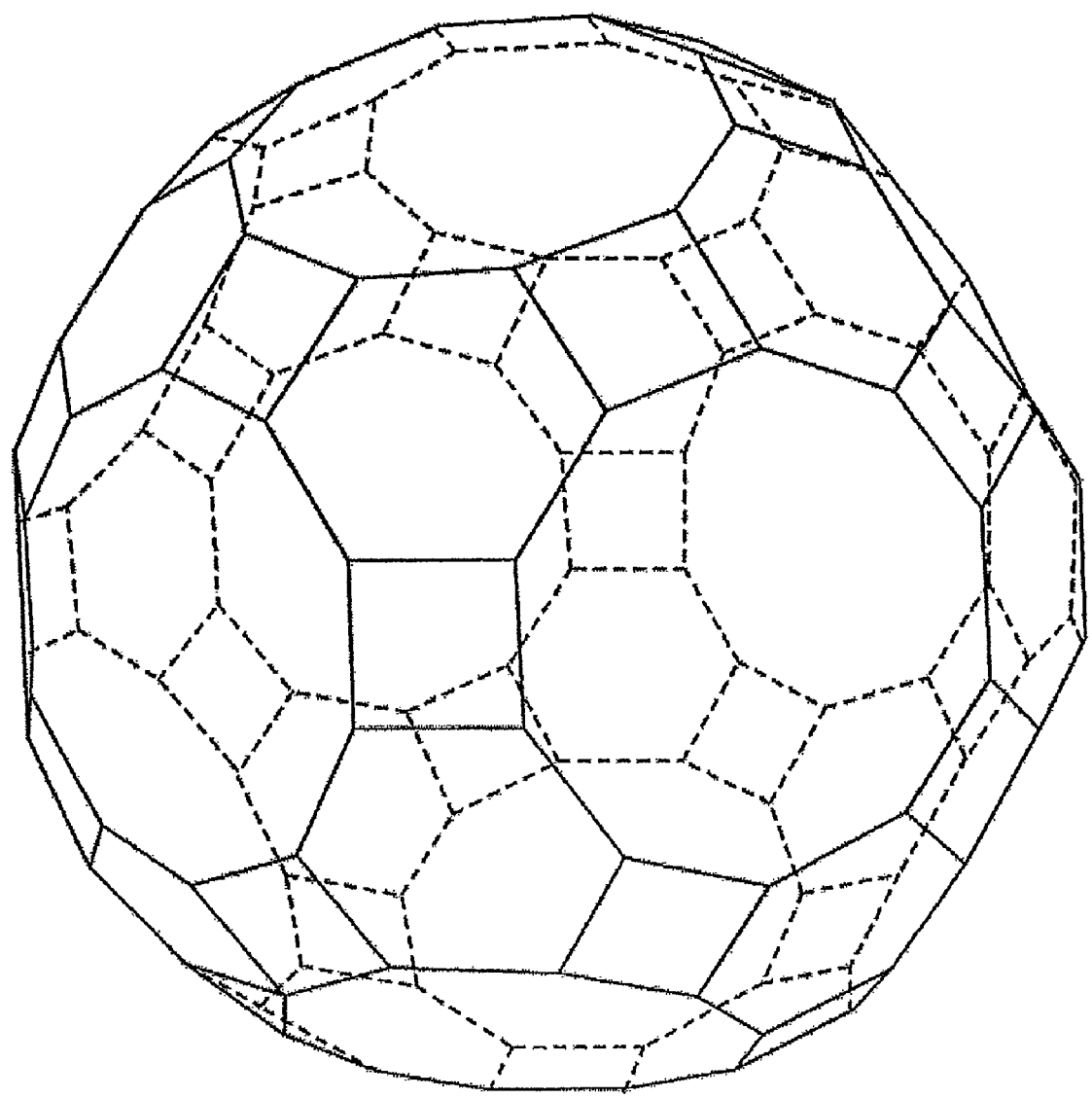
FIG. 11E is a perspective view of another polyhedron having icosahedral group symmetry.
Figure 11F:
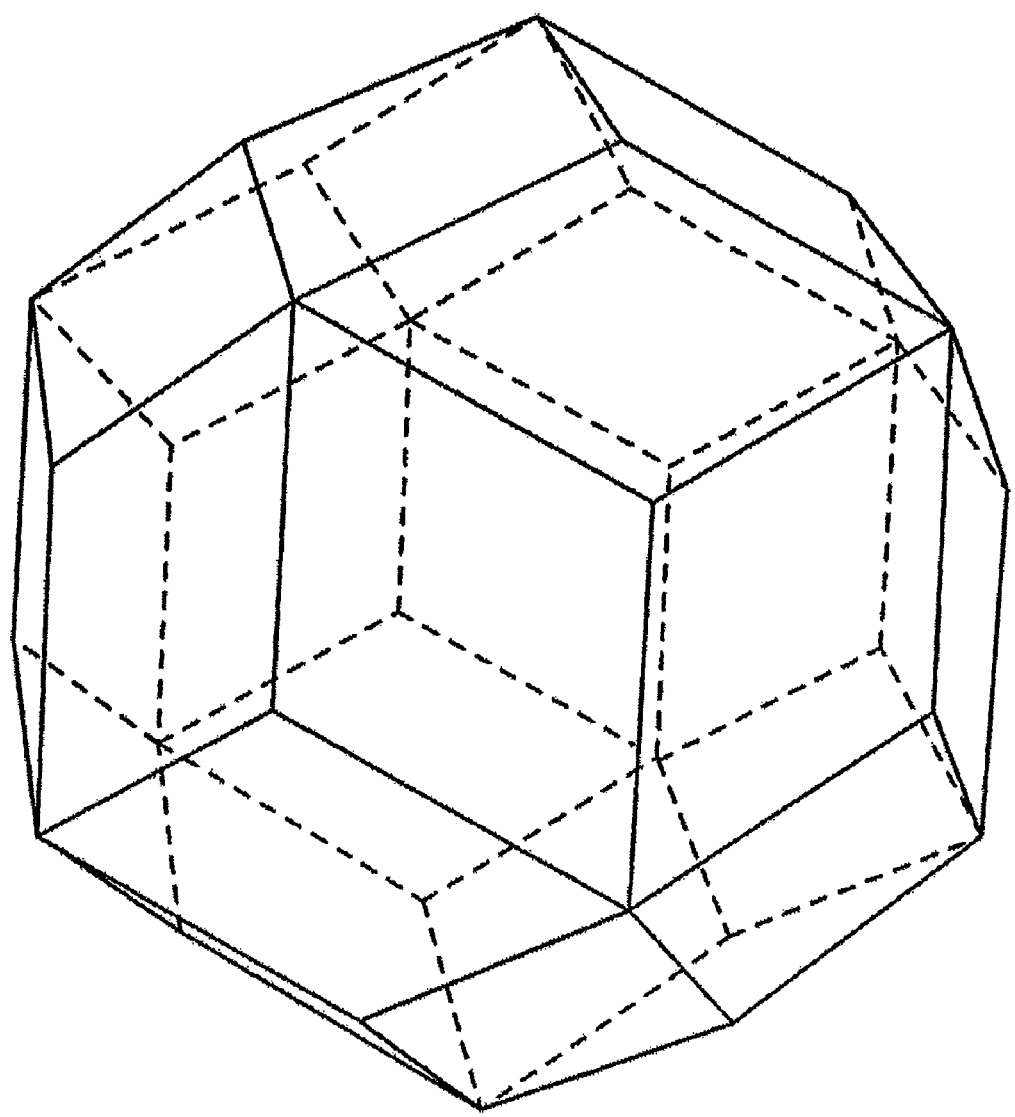
FIG. 11F is a perspective view of another polyhedron having icosahedral group symmetry.
Figure 11G:
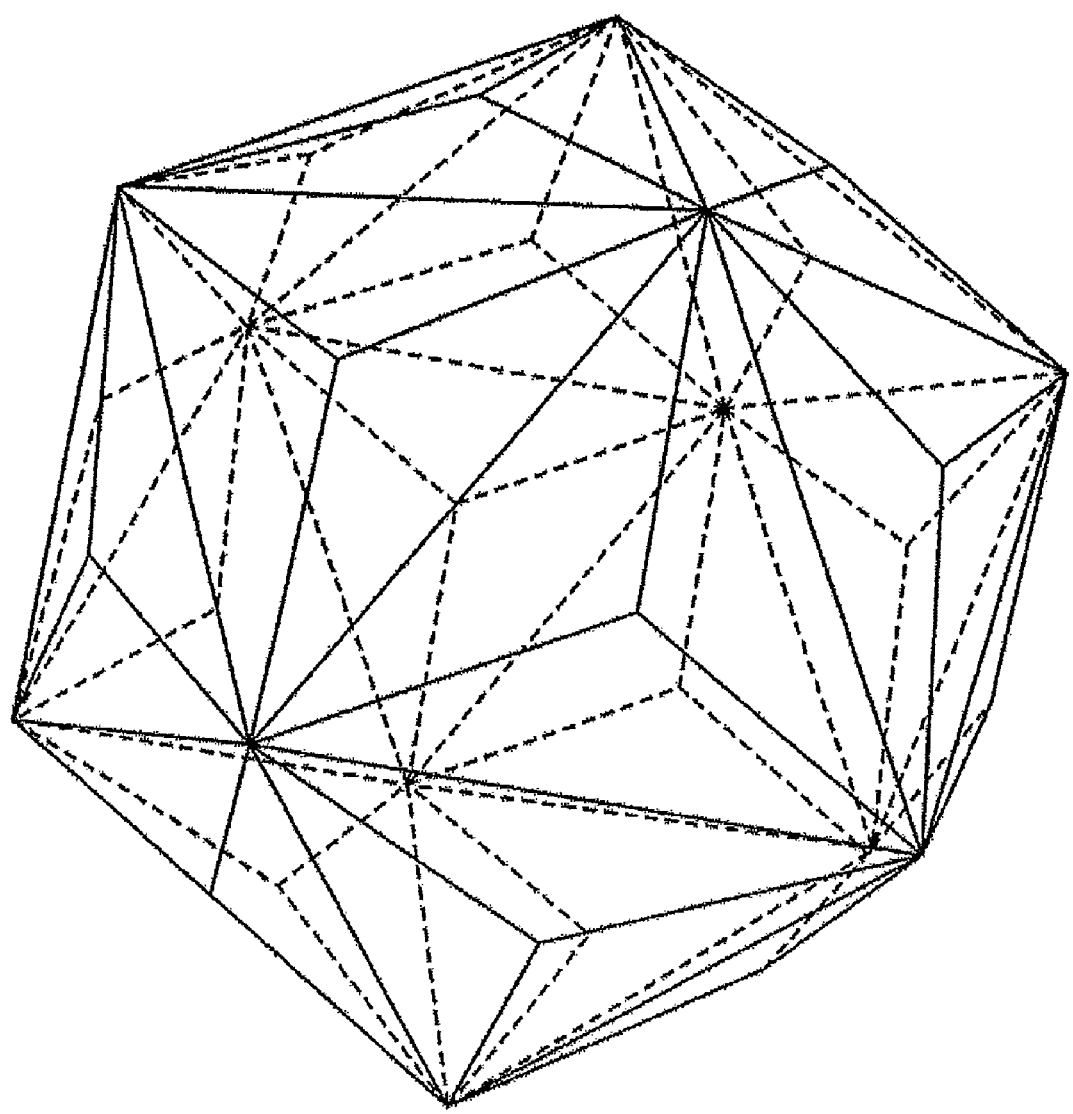
FIG. 11G is a perspective view of another polyhedron having icosahedral group symmetry.
Figure 11H:
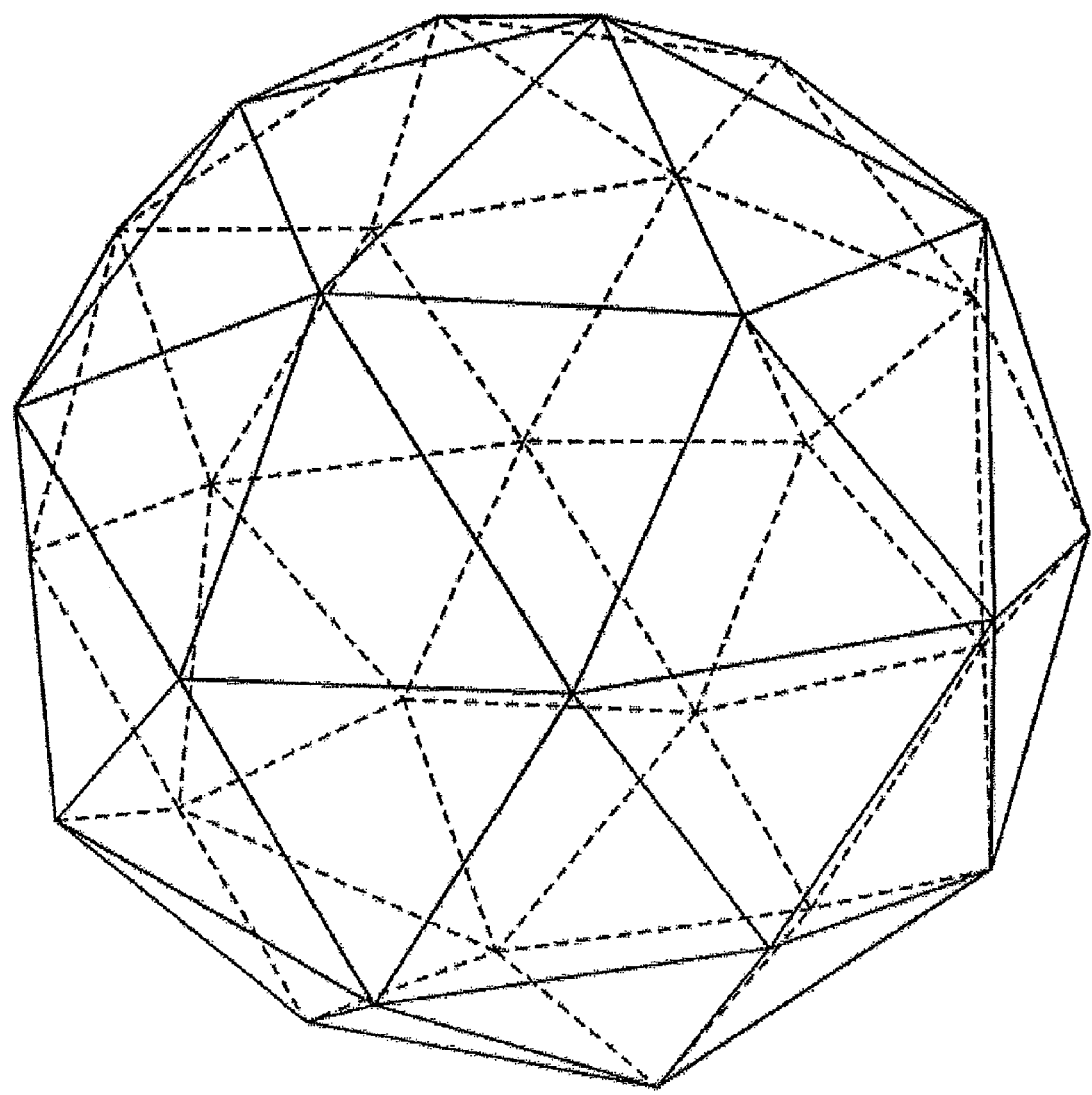
FIG. 11H is a perspective view of another polyhedron having icosahedral group symmetry.
Figure 11I:
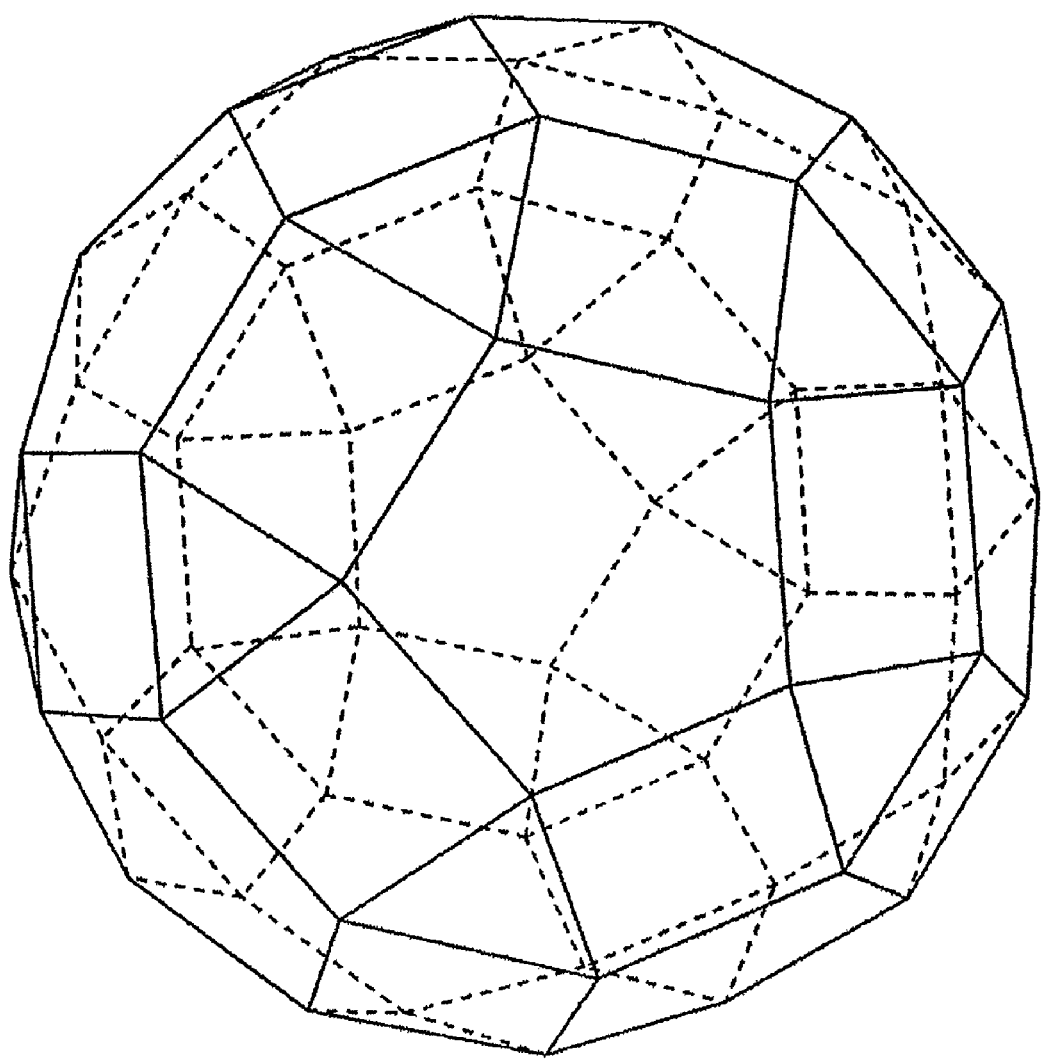
FIG. 11I is a perspective view of another polyhedron having icosahedral group symmetry.
Figure 11J:
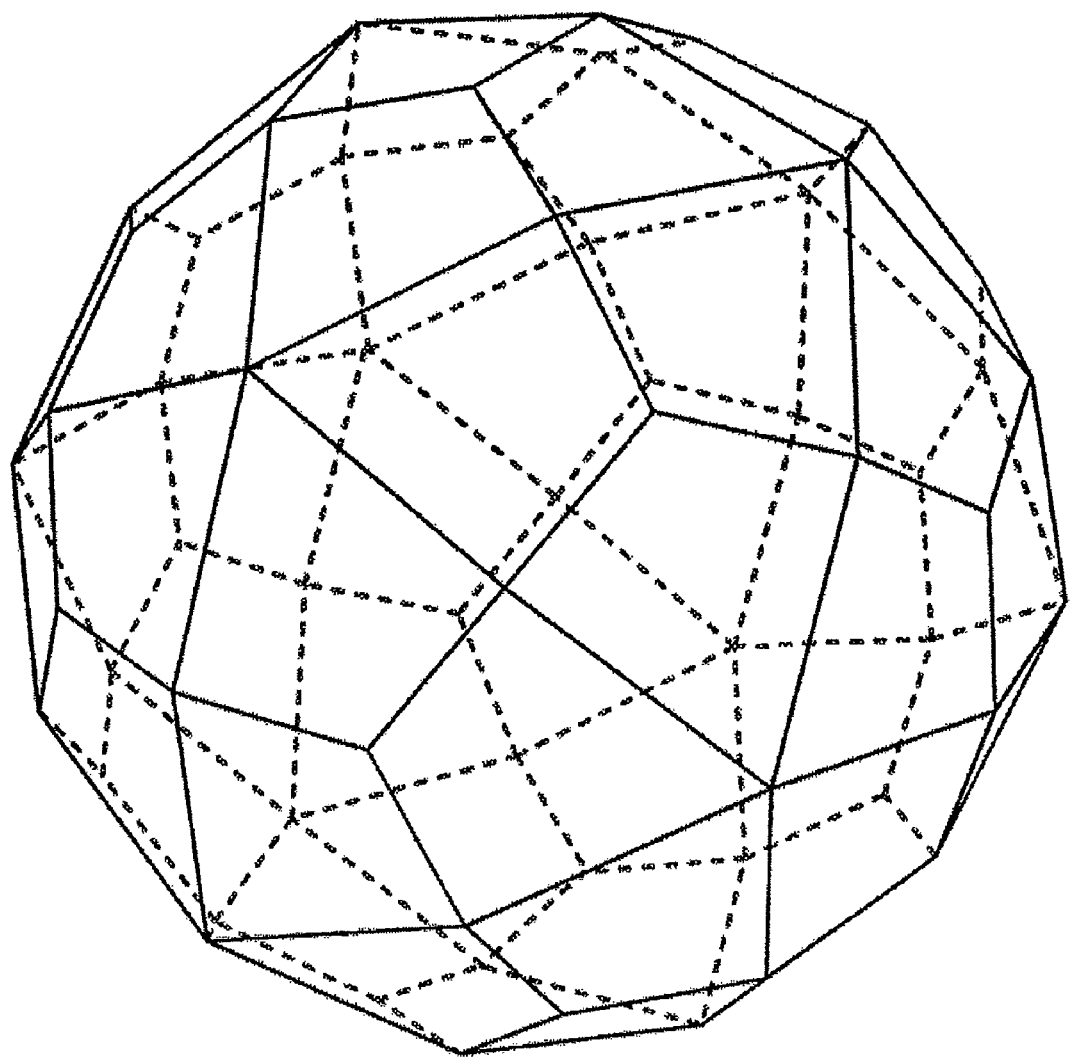
FIG. 11J is a perspective view of another polyhedron having icosahedral group symmetry.
Figure 11K:
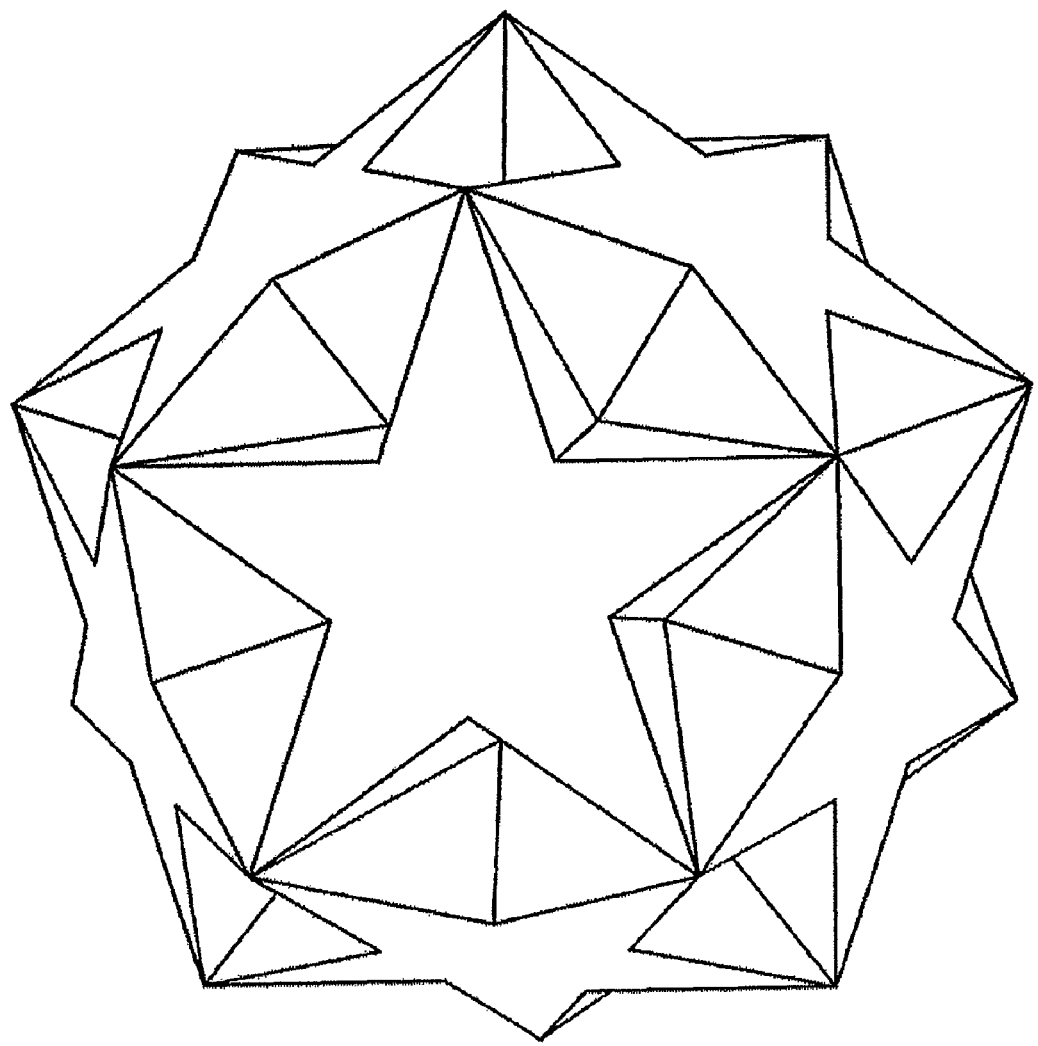
FIG. 11K is a perspective view of another polyhedron having icosahedral group symmetry.
Figure 11L:
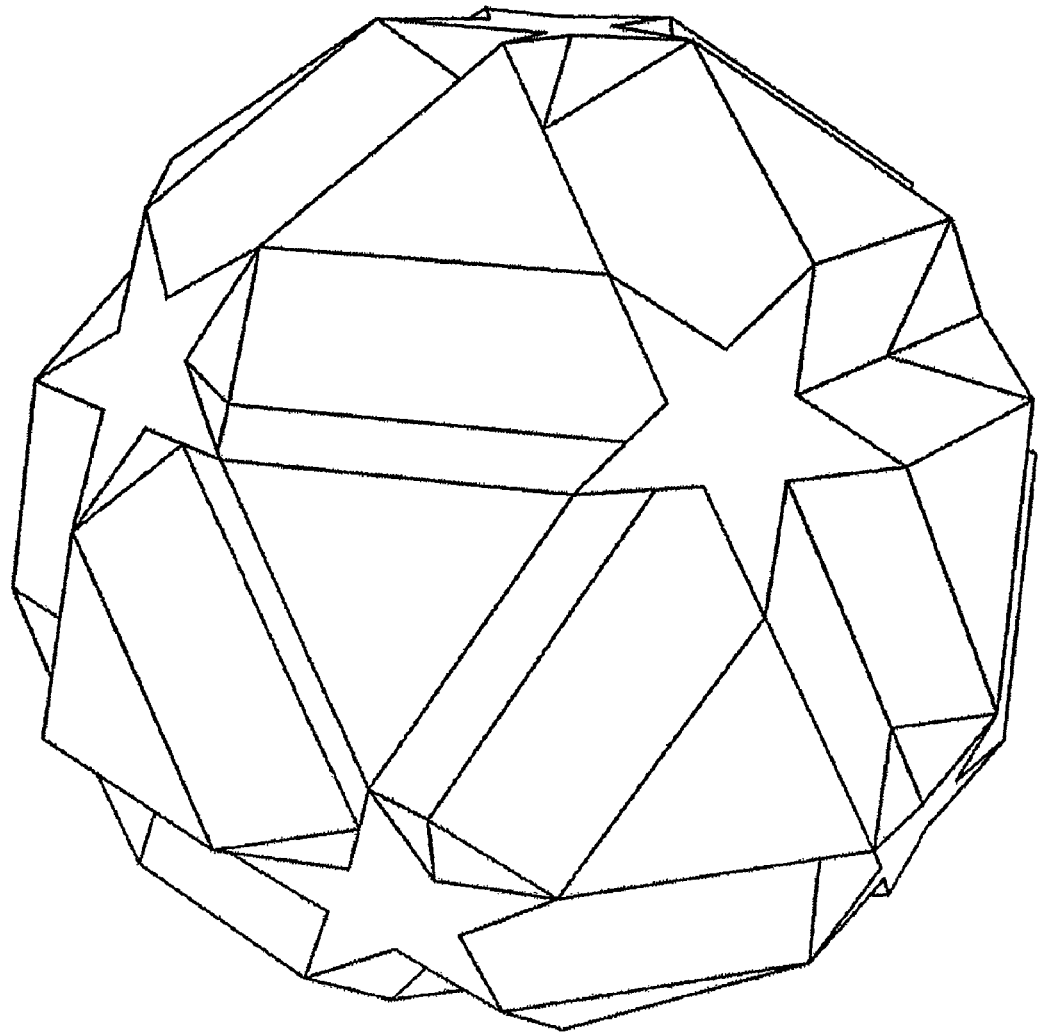
FIG. 11L is a perspective view of another polyhedron having icosahedral group symmetry.
Figure 11M:
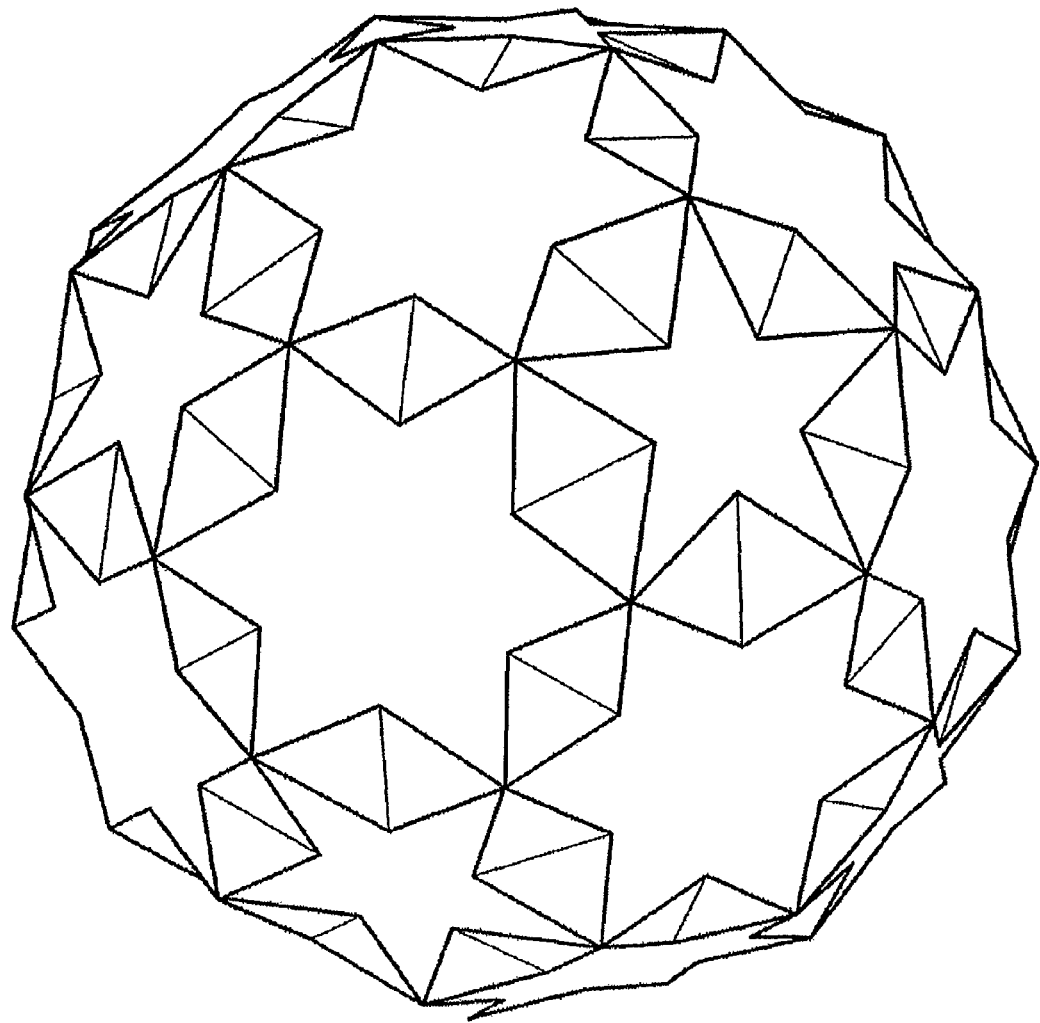
FIG. 11M is a perspective view of another polyhedron having icosahedral group symmetry.
Figure 11N:
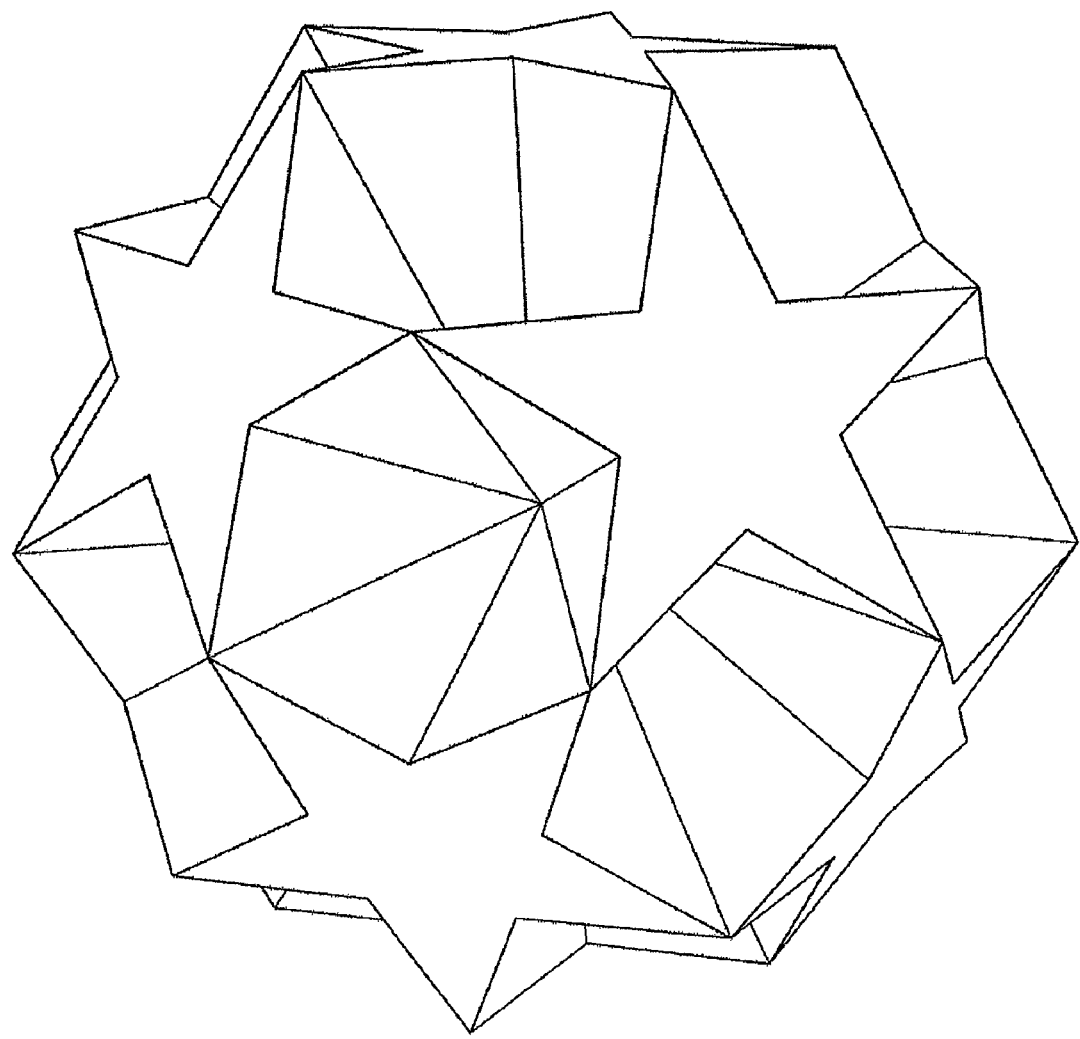
FIG. 11N is a perspective view of another polyhedron having icosahedral group symmetry.
Figure 11P:
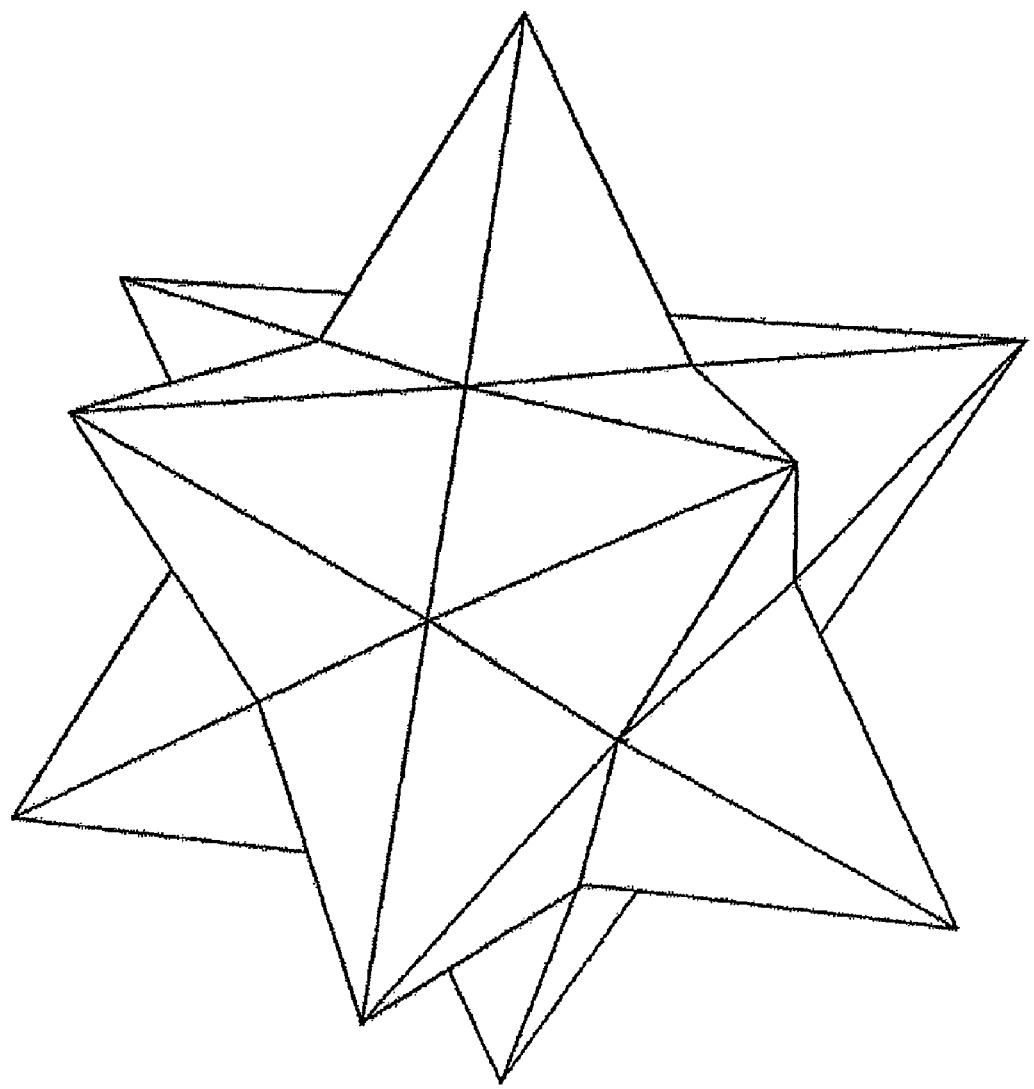
FIG. 11P is a perspective view of another polyhedron having icosahedral group symmetry.

The dodecahedron 35 and icosahedron 37 represent the two platonic solids, defined as regular polyhedra with all faces of the same type, which are defined by the full icosahedral symmetry group. A number of alternative polyhedra are also defined by icosahedral group symmetry and are shown in FIGS. 11A to 11P, an illusionary 3D image of all of which may be produced by the apparatus of the present invention. Polyhedra which correspond to a full icosahedral group symmetry define the illusions of the shapes that may be produced by an apparatus according to the above exemplary embodiments, as well as producing the illusion of a sphere. Such polyhedra include Archimedian solids, Catalan solids and Keplar-Poinsot solids.

The planes of symmetry shown in FIGS. 7A and 7B, wherein each circle represents a is symmetry plane, divide the surface 38 of the projected sphere 39 into one hundred and twenty separate triangles 40, known as Moebius triangles. The symmetry axes are located where the planes intersect. It will be understood that each triangle 40 is curved to fit the surface of the projected sphere 39 such that they can be used to tile said sphere 39.

A fundamental domain of a symmetry group is a portion of the object, which is as small as possible, which if repeated and based on the symmetry of the object determines the whole object. For example, each Moebius triangle 40 of the icosahedral group symmetry shown in FIGS. 7A and 7B represents a fundamental domain 41 transcribed onto the surface of a sphere. In FIG. 9, one face 35a of an icosahedron is shown to be defined by six fundamental domains 41. Similarly, in FIG. 10, one pentagonal face 37a of a dodecahedron is shown to be defined by ten fundamental domains 41.

Figure 12:
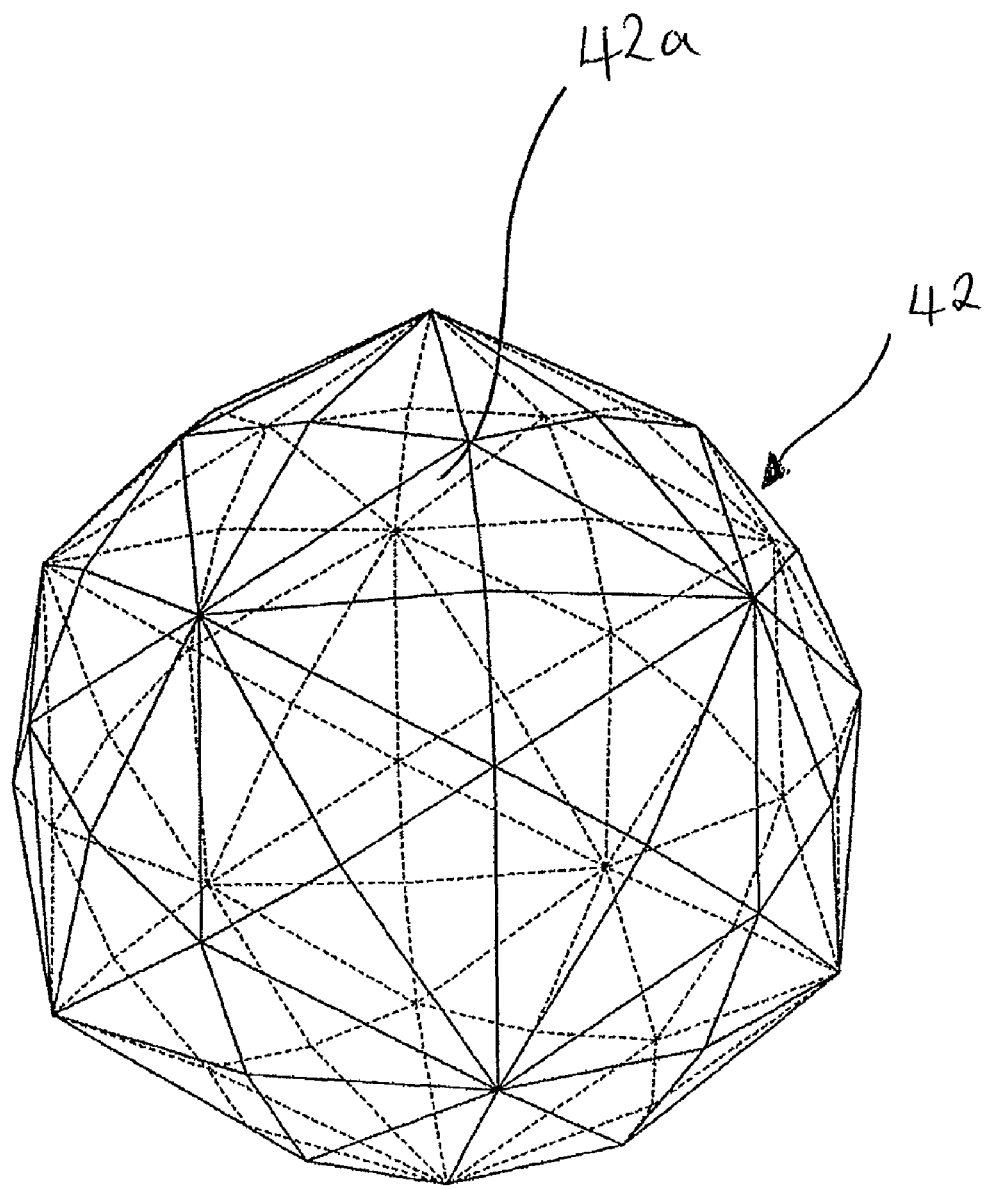
FIG. 12 is a perspective view of a disdyakis triacontahedron.

It will be understood that any polyhedra with icosahedral group symmetry is divisible into one hundred and twenty fundamental domains 41. To produce other polyhedra with the same group symmetry involves adjusting the orientation and shape of the fundamental domain 41, for example, by flattening a selected subset of faces, i.e. the six triangles 40 shown in FIG. 9 to form a equilateral triangular shaped face 35a, to combine each subset into one face, or replacing each face with a curved surface to form a sphere. In particular, FIG. 12 shows a disdyakis triacontahedron 42, with one hundred and twenty faces, wherein one full face 42a of this polyhedron represents the fundamental domain of that specific polyhedron.

The arrangement and orientation of the panels 5a,5b,5c and their reflective surfaces 31,32,33 with respect to the screen 4 and each other in order to generate the illusion of a polyhedron or sphere with icosahedral group symmetry of reflection will now be described with reference to FIGS. 13 to 17. In this exemplary embodiment, the apparatus 3 is formed to produce the illusion of a three-dimensional kaleidoscopic image of a sphere.

Figure 13:
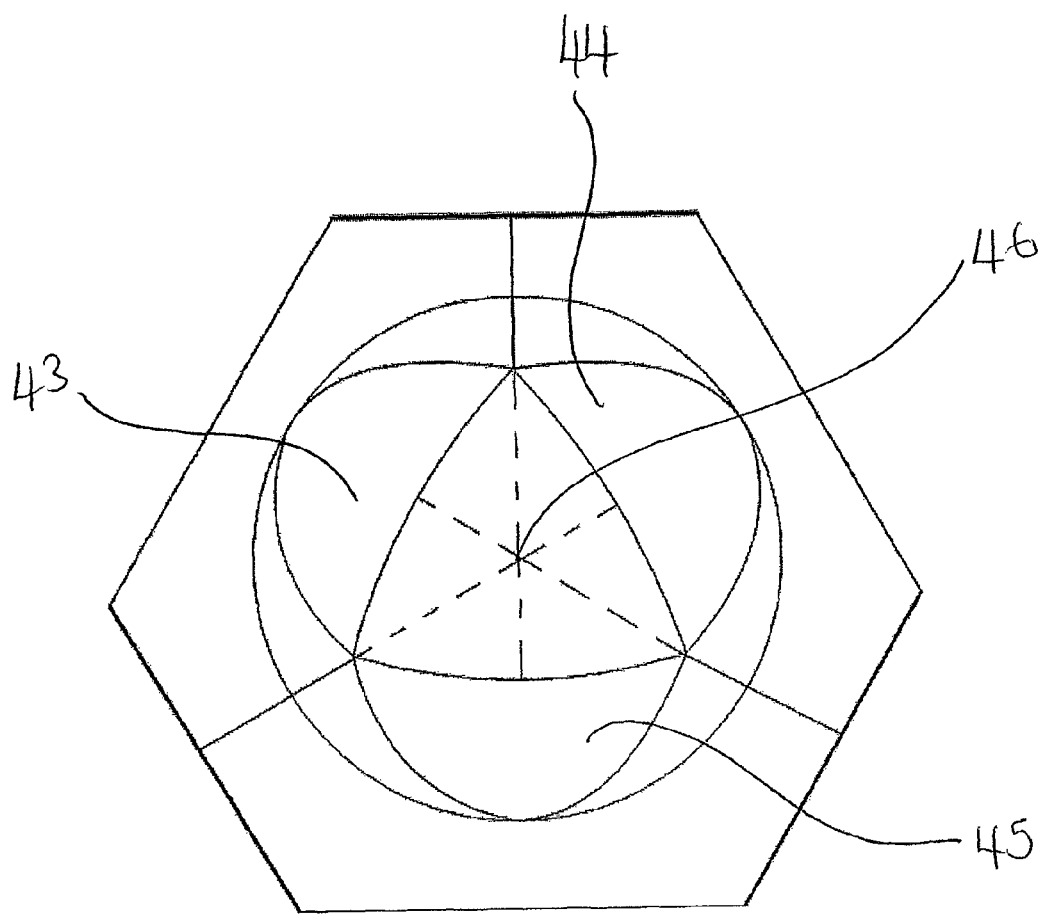
FIG. 13 is a front perspective view of an apparatus for generating an illusion of a three dimensional kaleidoscopic image according to an embodiment of the present invention.
Figure 14:
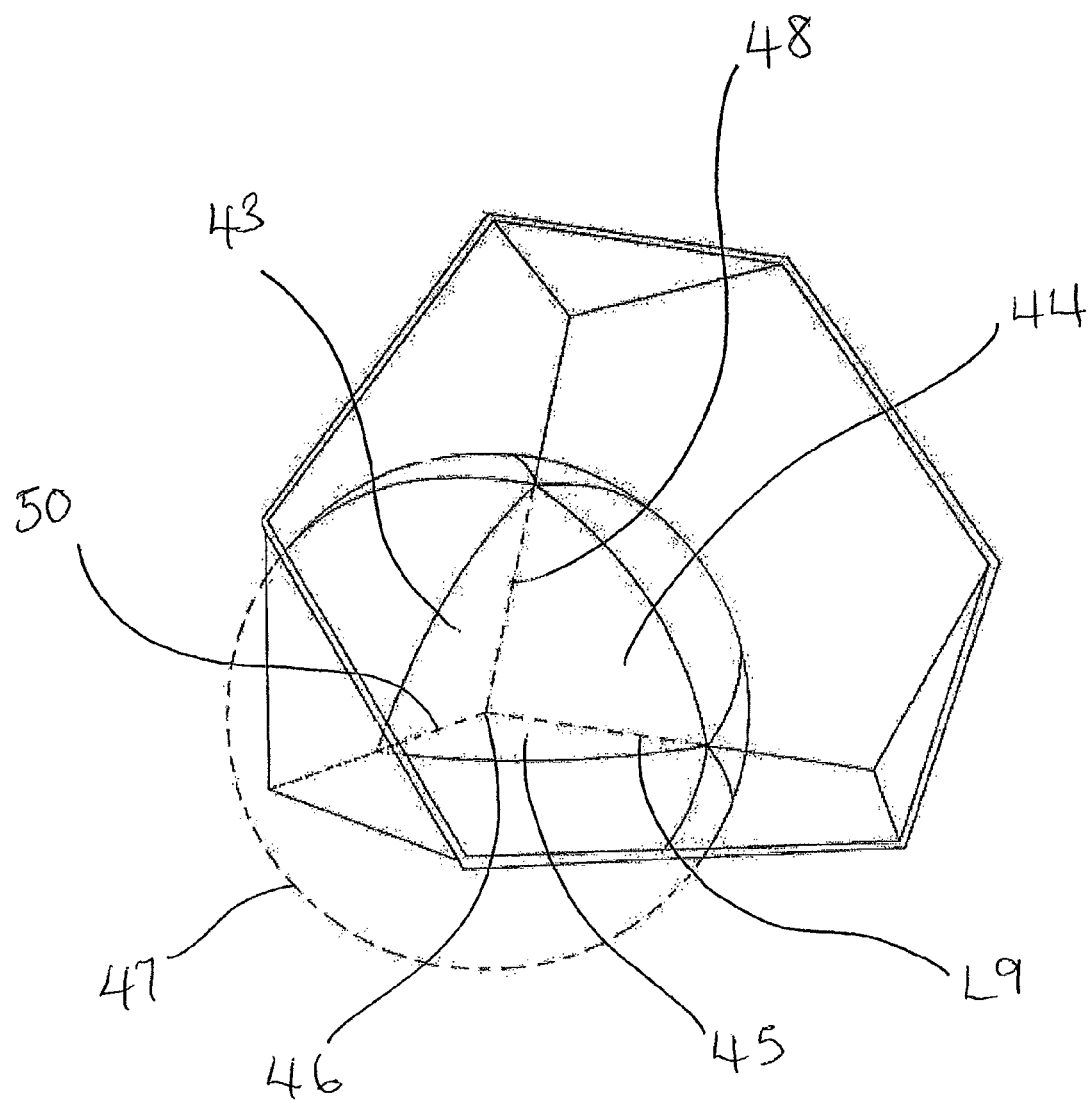
FIG. 14 is a perspective view of the apparatus shown in FIG. 13 showing a projected sphere and planes of symmetry.
Figure 15:
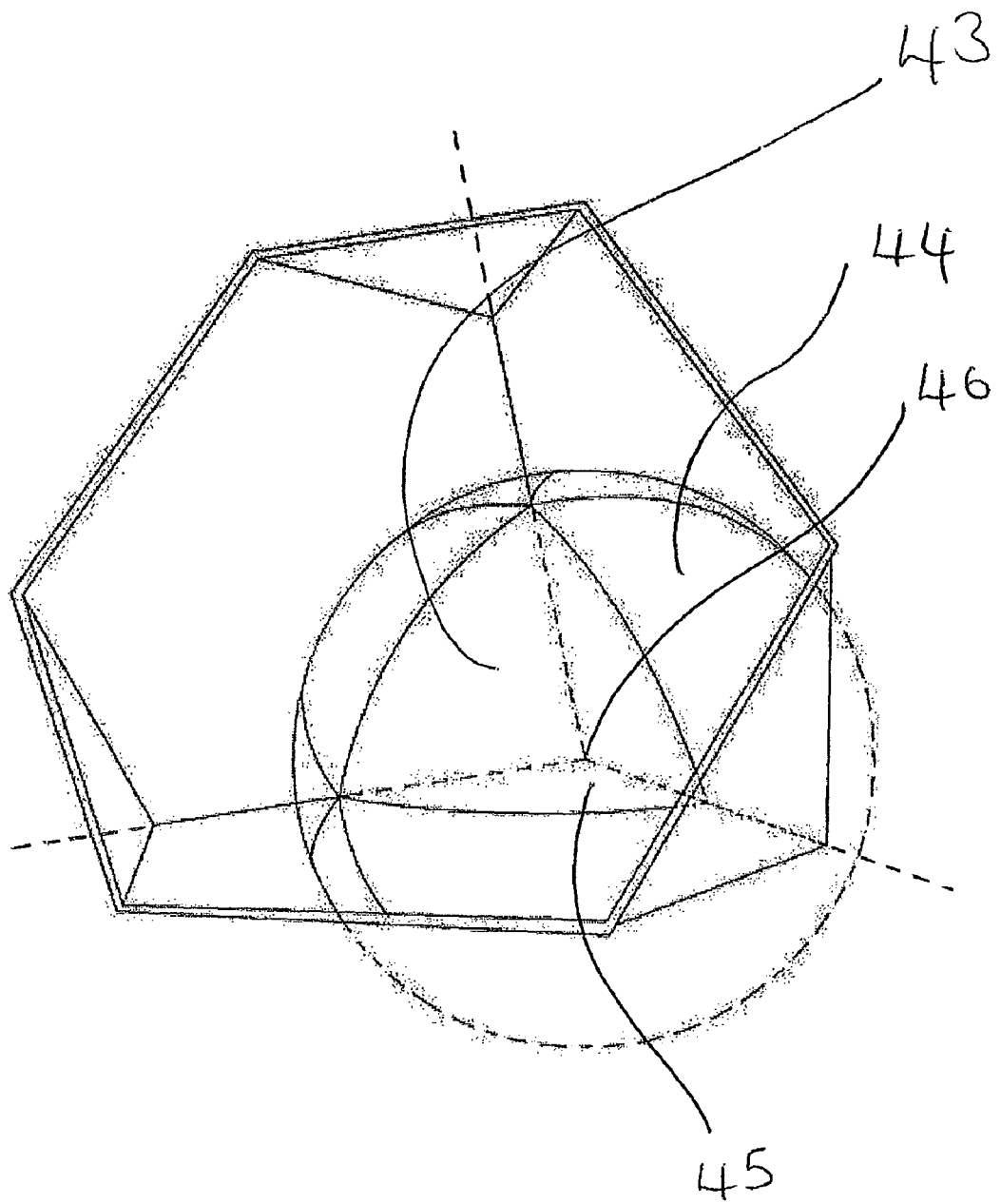
FIG. 15 is another perspective view of the apparatus shown in FIG. 13 showing a projected sphere and planes of symmetry.

The screen 4 is curved to form a portion of the projected sphere of which a virtual image is to be produced and is formed from the equivalent of six triangles representing fundamental domains to form the equivalent of a face of an icosahedron exploded onto a surface of a sphere, as is shown in FIG. 13. In this embodiment the panels 5a,5b,5c are orientated with respect to the screen 4 such that they are formed along planes of symmetry 43,44,45 which intersect along the peripheral edges 6,7,8 of the screen, and extend through the projected centre 46 of the projected sphere 47. This means that each panel 5a,5b,5c is aligned along one of the planes of symmetry according to icosahedral group symmetry. This is most clearly shown in FIGS. 14 and 15, wherein the projected sphere 47 is shown extending beyond the apparatus 3 and the intersects 48,49,50 of the panels 5a,5b,5c with each other are projected to show how they intersect with the projected centre 46 of the sphere 47.

Figure 16:
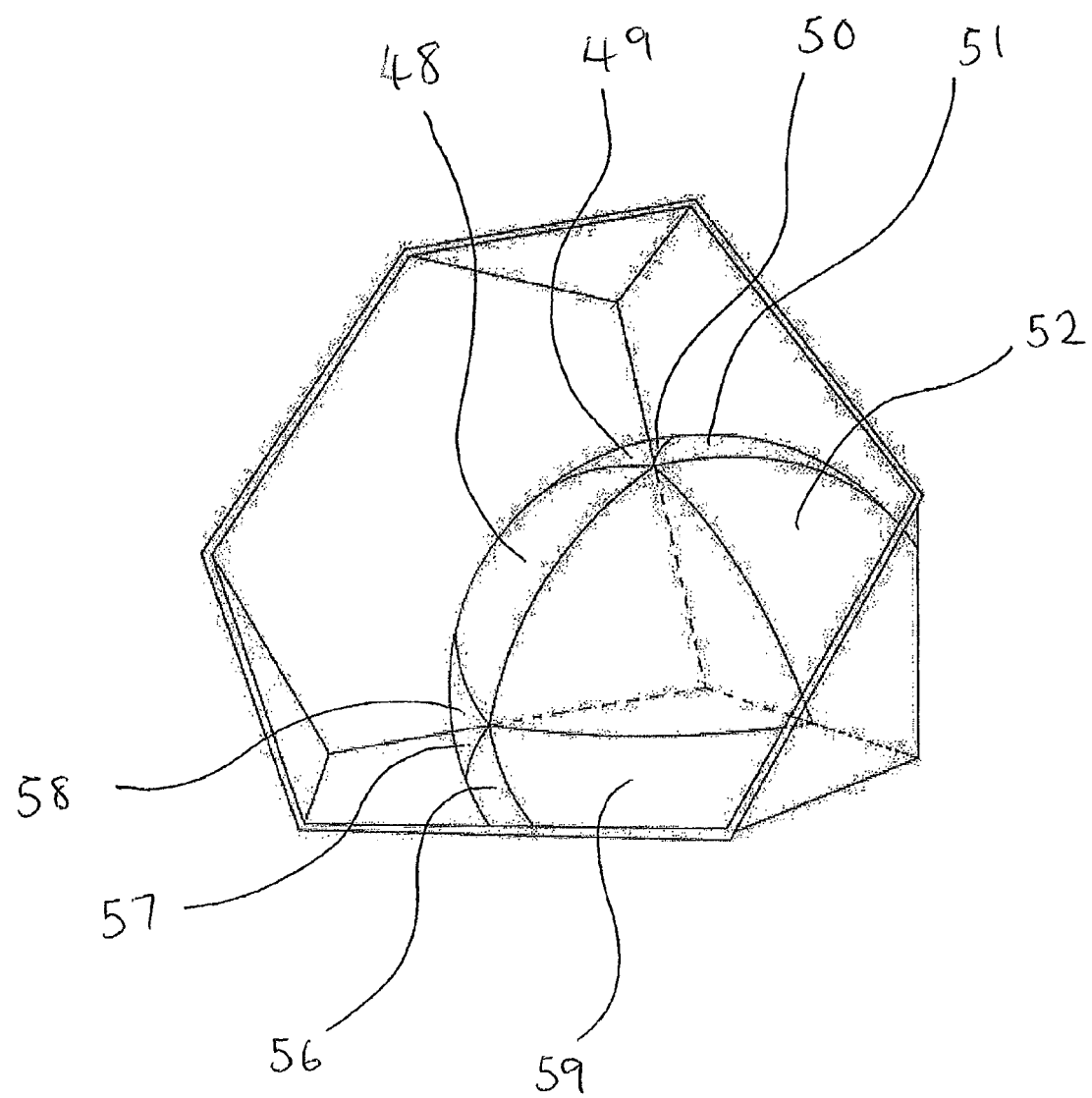
FIG. 16 is another perspective view of the apparatus shown in FIG. 13.
Figure 17:
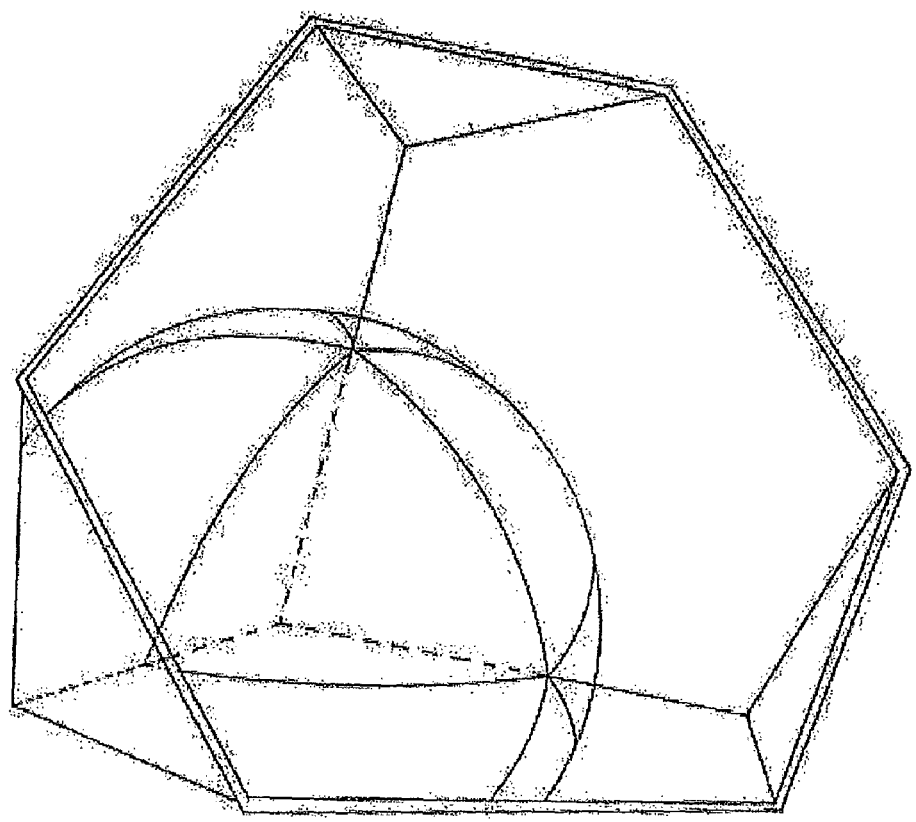
FIG. 17 is another perspective view of the apparatus shown in FIG. 13.

It will be understood that the orientation of each of the panels 5a,5b,5c along symmetry planes of the icosohedral group symmetry such that a projected plane of each panel 5a,5b,5c intersects with a projected centre 46 of the projected sphere 47 and an respective peripheral edge 6,7,8 of the screen 4, enables the apparatus 3 to produce the illusion of the desired object of which the screen 4 forms a number of discrete fundamental domains. The screen has symmetry of reflection along the planes that pass through the centre of the virtual polyhedron or sphere 46, the centre of the screen 4 and each peripheral edge of the screen 4. Although an apparatus to produce an illusion of a sphere is shown in this embodiment it will be apparent that this may be applied to any polyhedra with icosoheral group symmetry. Referring further to FIGS. 16 and 17 the reflections 48 to 59 of the screen 4 in the reflective surfaces 31,32,33 are shown such that a virtual sphere is formed.

Figure 18:
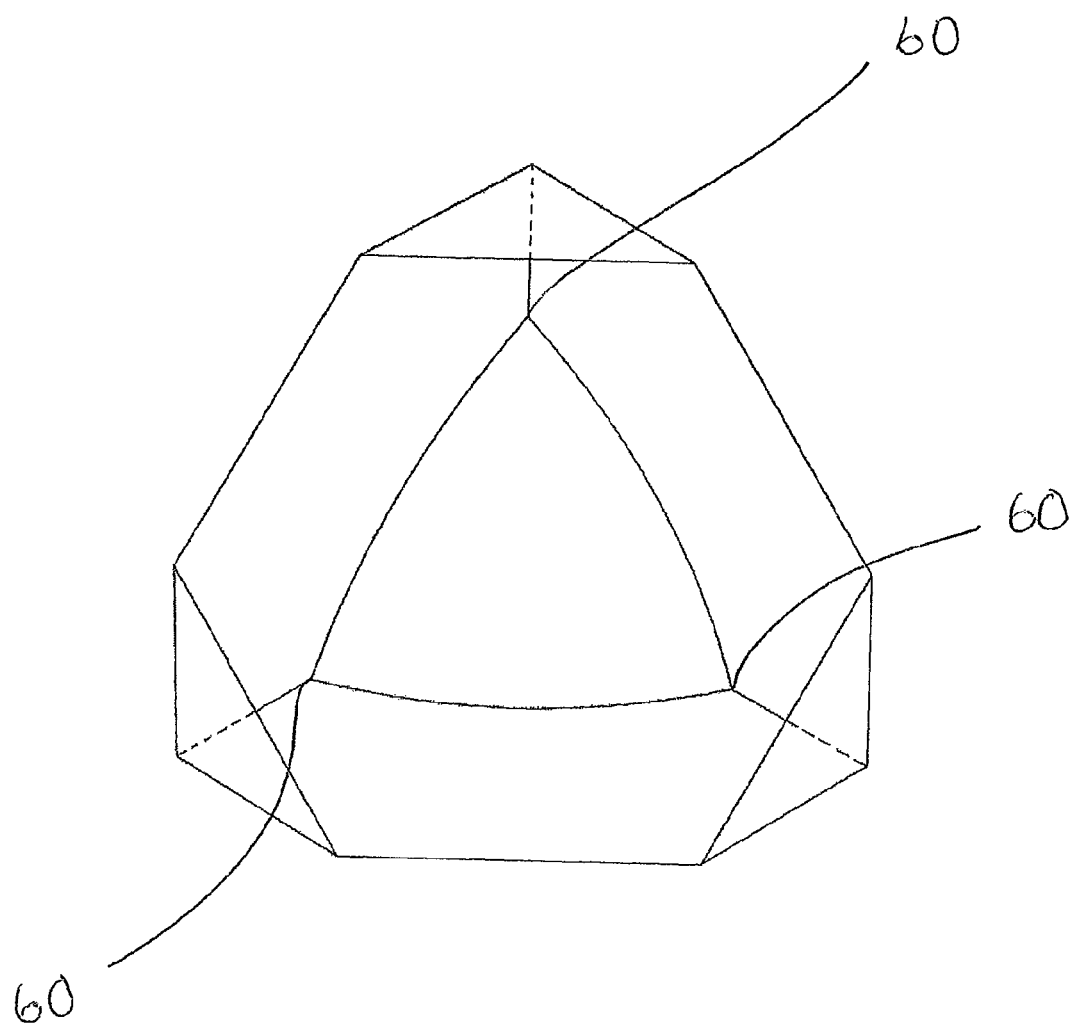
FIG. 18 is a another front perspective view of the apparatus shown in FIG. 13.

In order for the apparatus 3 to produce the virtual image of a sphere it is necessary for the panels 6,7,8 to intersect perpendicular to the edge of the screen 4. As the screen 4 forms an equivalent portion of the surface of the virtual image of the sphere to be produced, then this will always be the case. It will further be understood that the converging angle 60 of the panels 6,7,8 to produce a sphere using three mirrors is 72 degrees as shown in FIG. 18.

It will be understood that the reflective surfaces 31,32,33 extend beyond the radius of the image of the virtual sphere to be formed or the sphere in which the virtual polyhedron to be formed is inscribed such that the entire virtual image may be formed within the boundaries of the apparatus.

Figure 19:
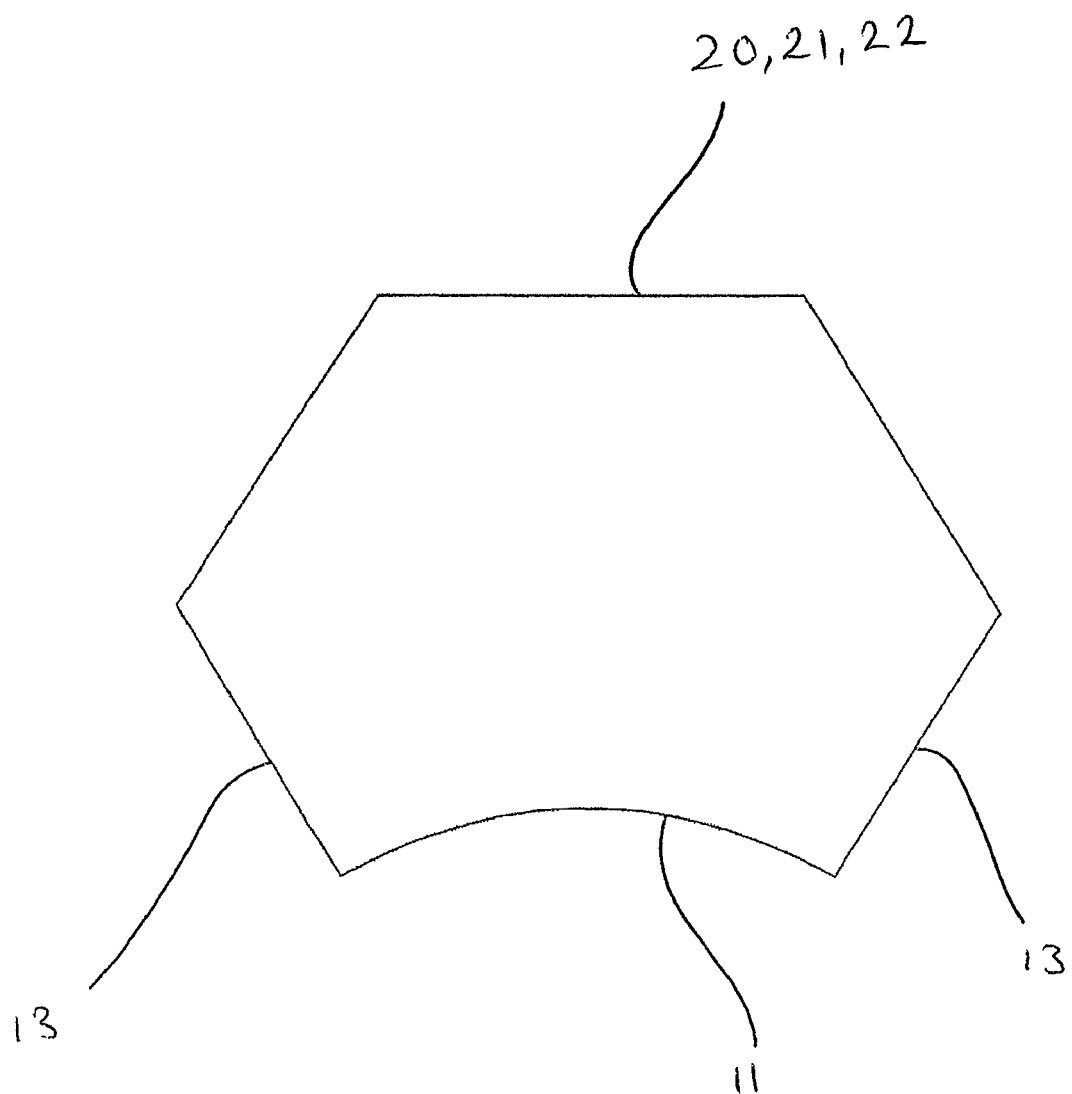
FIG. 19 is a plan view of a panel of the apparatus shown in FIG. 13.

One of the panels 6,7,8 to form a virtual image of a sphere is shown in FIG. 19. However, the panels 6,7,8 are not limited to this shape and it will be understood that the shape may vary depending on the shape of the screen 4, the size and orientation of the blanking portions 24,25,26 and the number of panels 6,7,8.

Figure 20:
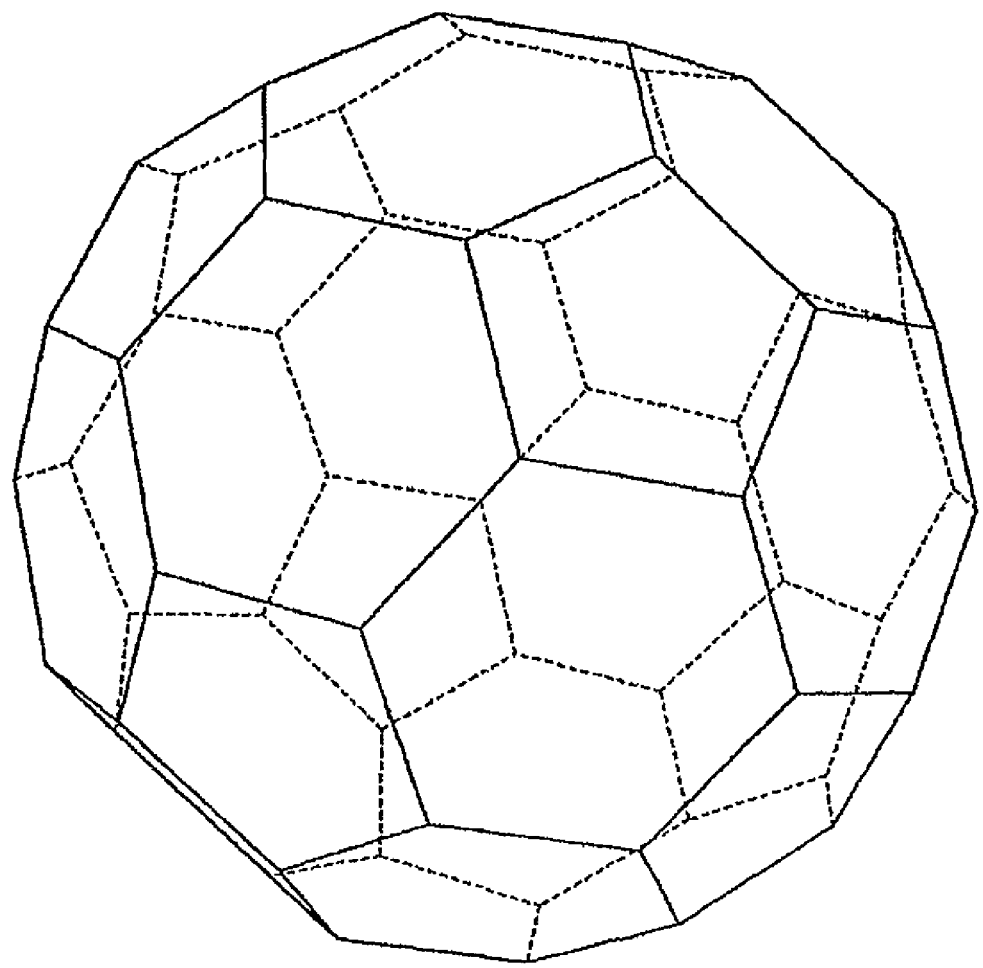
FIG. 20 is a perspective view of a truncated icosahedron.
Figure 21:
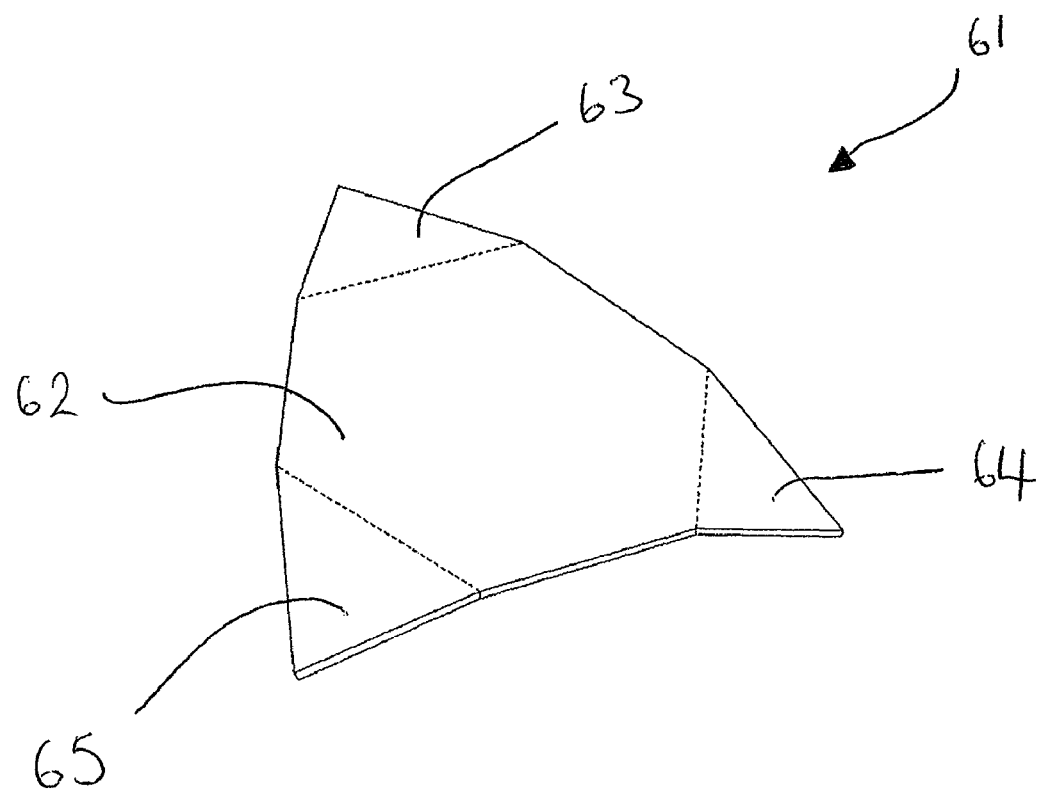
FIG. 21 is a perspective view of a screen of an apparatus for generating an illusion of a three dimensional kaleidoscopic image according to another embodiment of the present invention.
Figure 22:
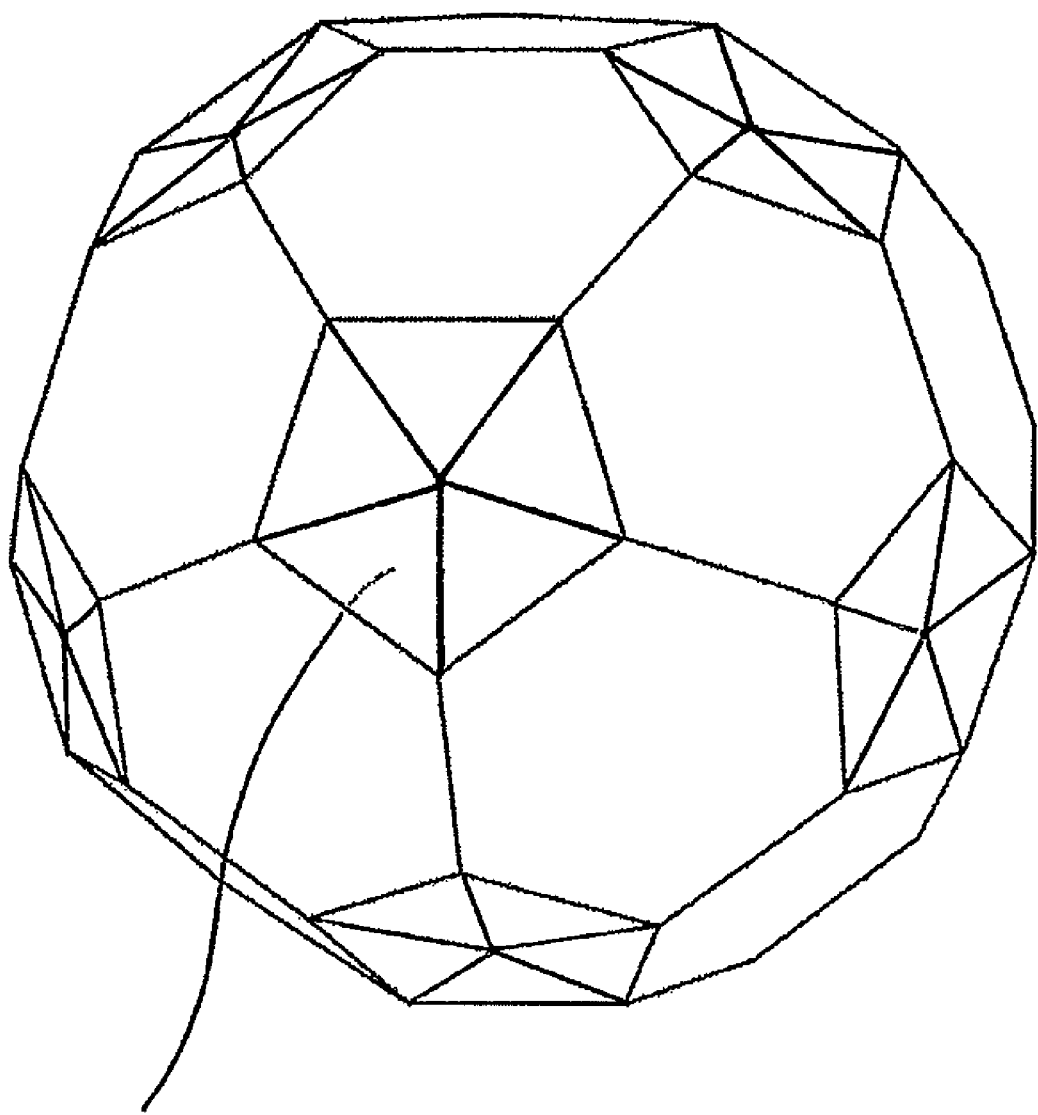
FIG. 22 is a perspective view of a truncated icosahedron showing the shape of the screen shown in FIG. 21 transcribed on the surface thereof.
Figure 23:
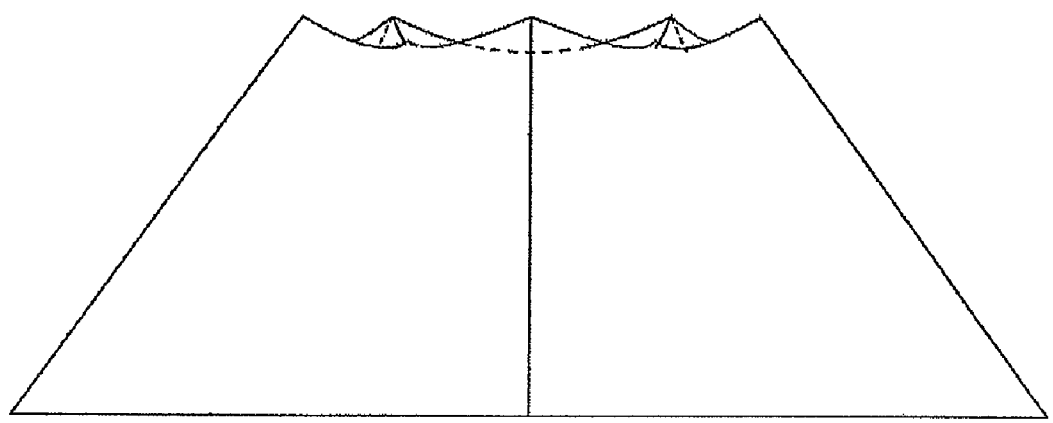
FIG. 23 is a plan view of an apparatus for generating an illusion of a three dimensional kaleidoscopic image according to yet another embodiment of the present invention.
Figure 24:
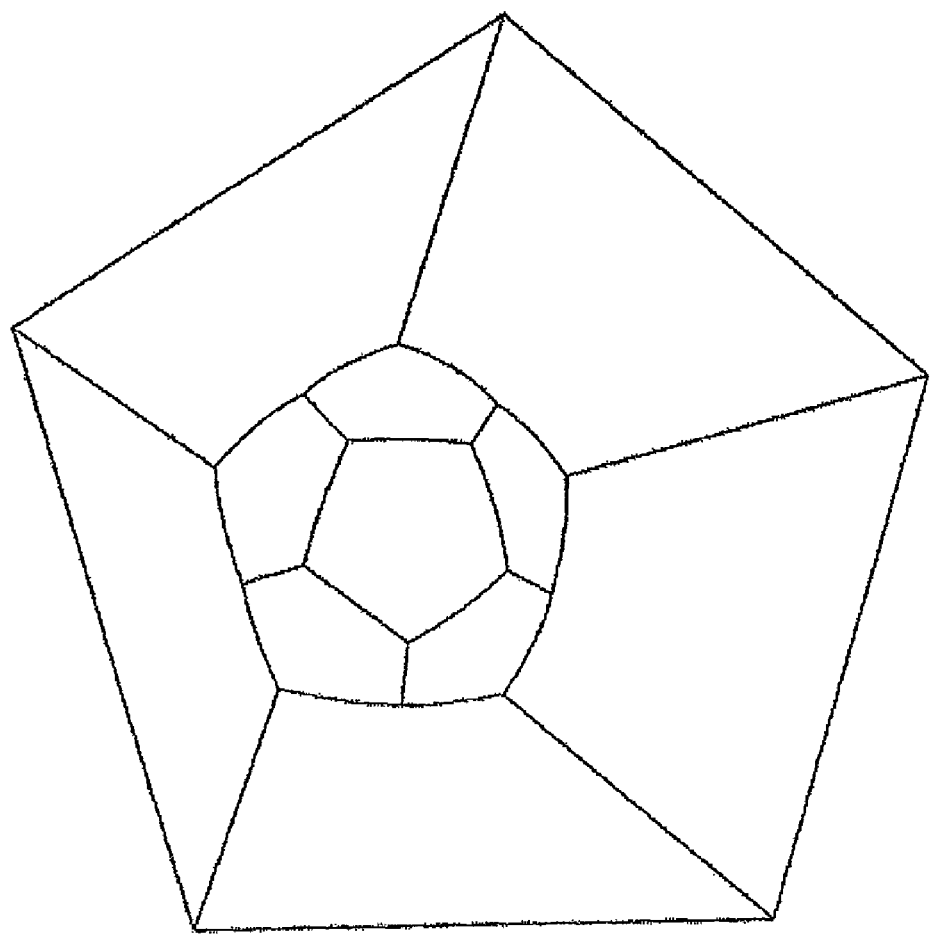
FIG. 24 is a perspective view of the apparatus shown in FIG. 23.
Figure 25:
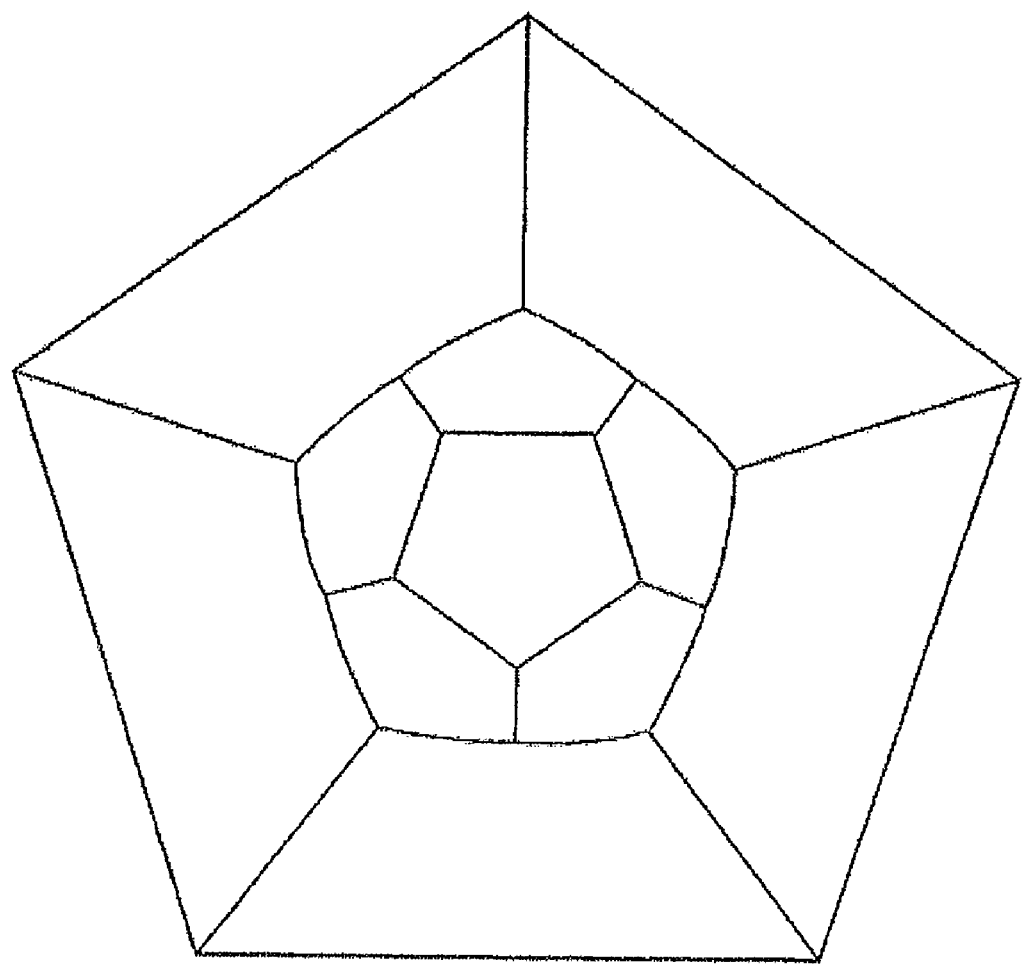
FIG. 25 is a front view of the apparatus shown in FIG. 23.
Figure 26:
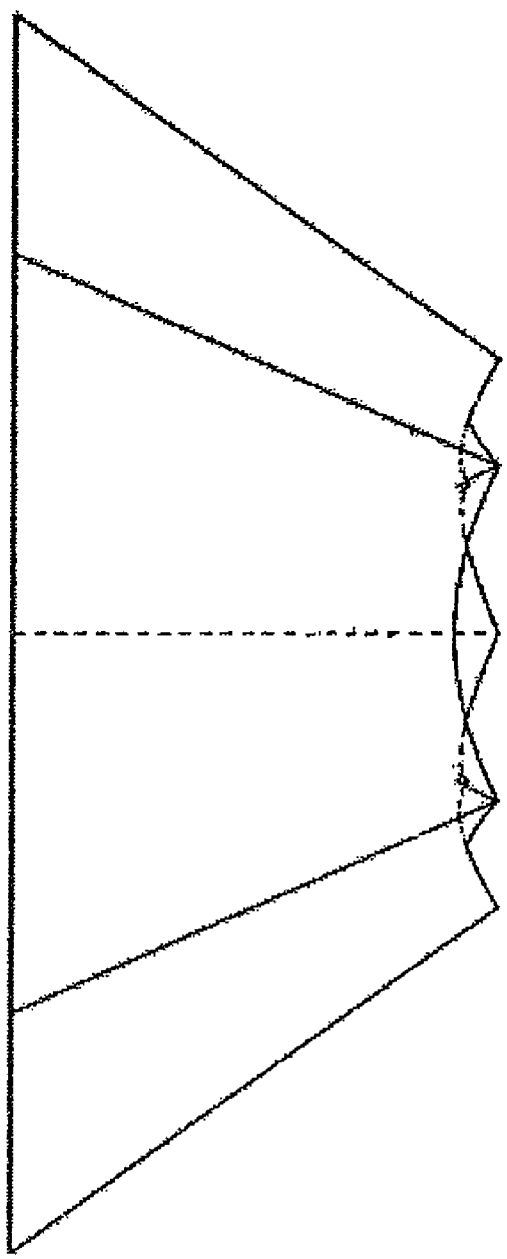
FIG. 26 is a side view of the apparatus shown in FIG. 23.

In FIGS. 20 to 22 a screen 61 to generate the illusion of an alternative polyhedron with icosahedral group symmetry is shown. This polyhedron is shown in FIG. 20 and is a truncated icosahedron or more commonly known as a "football shape". To render the illusion of an image corresponding to this polyhedral shape in the plurality of reflective surfaces 31,32, 33 the screen 61 is composed of an equilateral triangle with a fold formed proximate to each vertex to create a hexagonal face 62 with triangular faces 63,64,65 extending therefrom. The triangular faces 63,64,65 create the replications needed to render the virtual pentagonal face 66 in the reflective surfaces 31,32,33, as shown in FIG. 22. The corners therefore teach the edge of the panels perpendicularly, for example in this embodiment at 72°, forming the illusion of planar pentagons centered on the corners of this screen. These values are flexible if we wanted to generate the illusion of a 'football shape', such that the planes are curved and the ideal truncated icosahedron model approaches the shape of a sphere.

Figure 27:
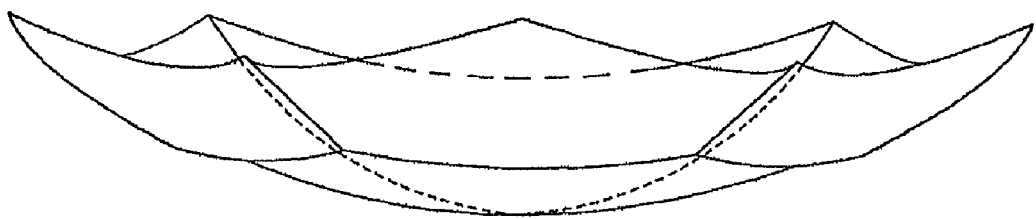
FIG. 27 is a side view of a screen of the apparatus shown in FIG. 23.
Figure 28:
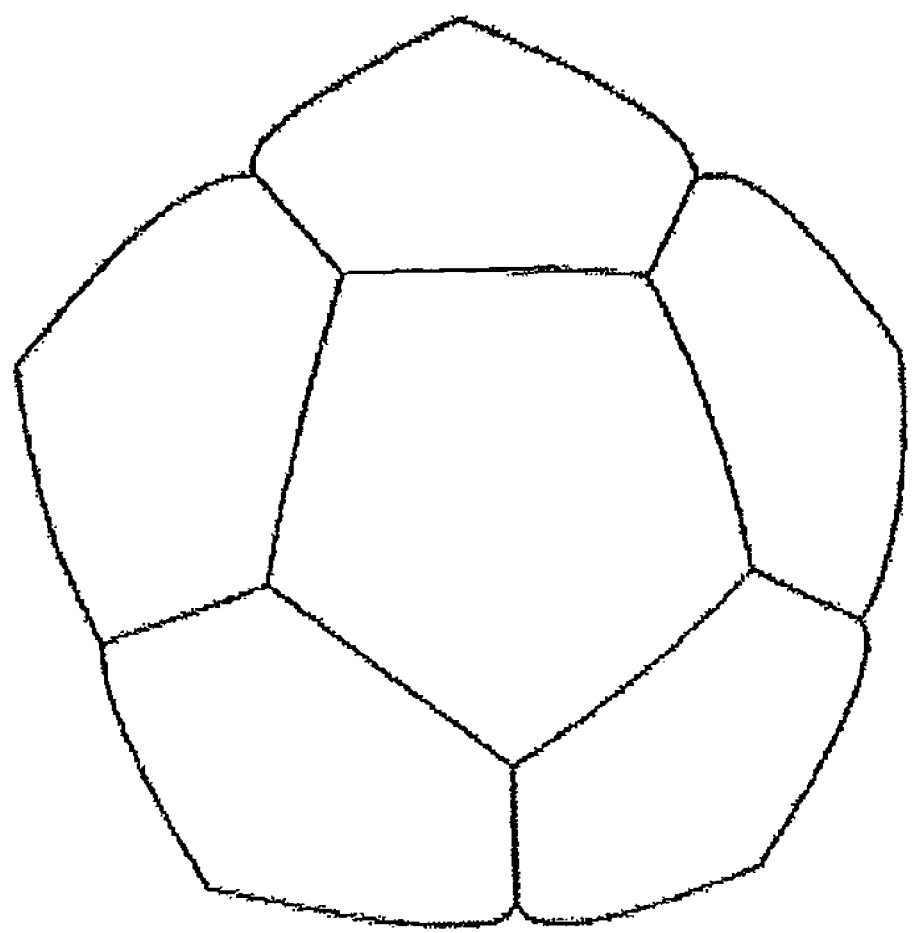
FIG. 28 is a perspective view of the screen shown in FIG. 27.
Figure 29:
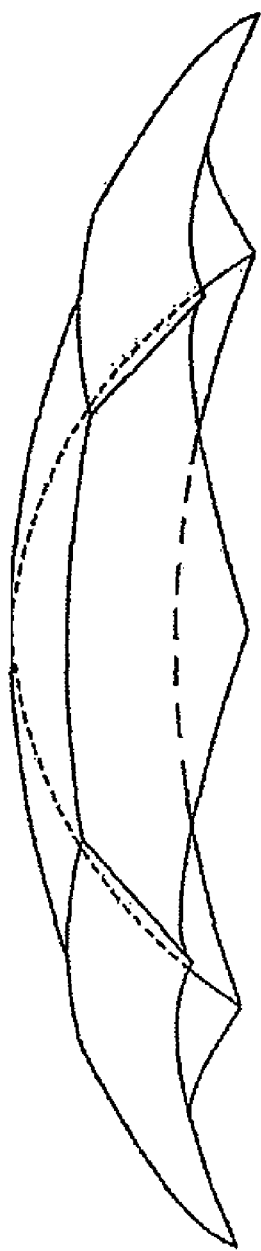
FIG. 29 is another side view of the screen shown in FIG. 27.
Figure 30:
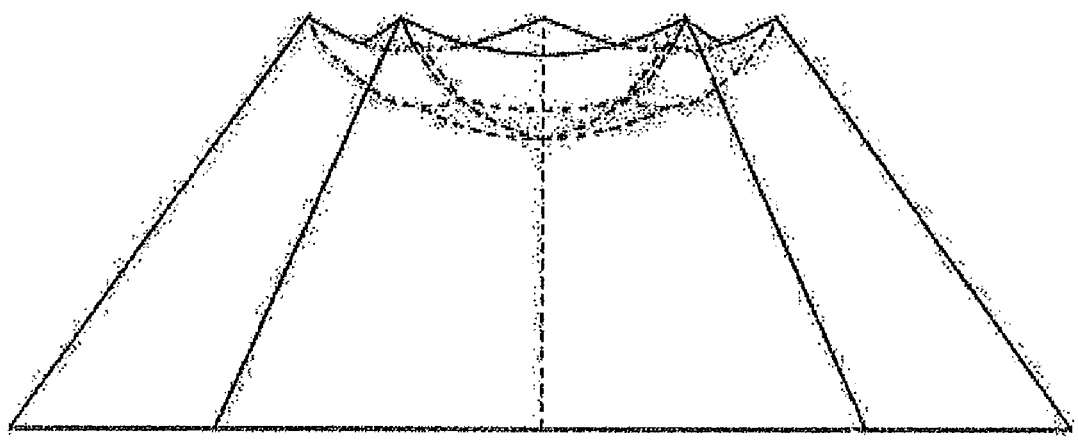
FIG. 30 is another plan view of the apparatus shown in FIG. 23.
Figure 31:
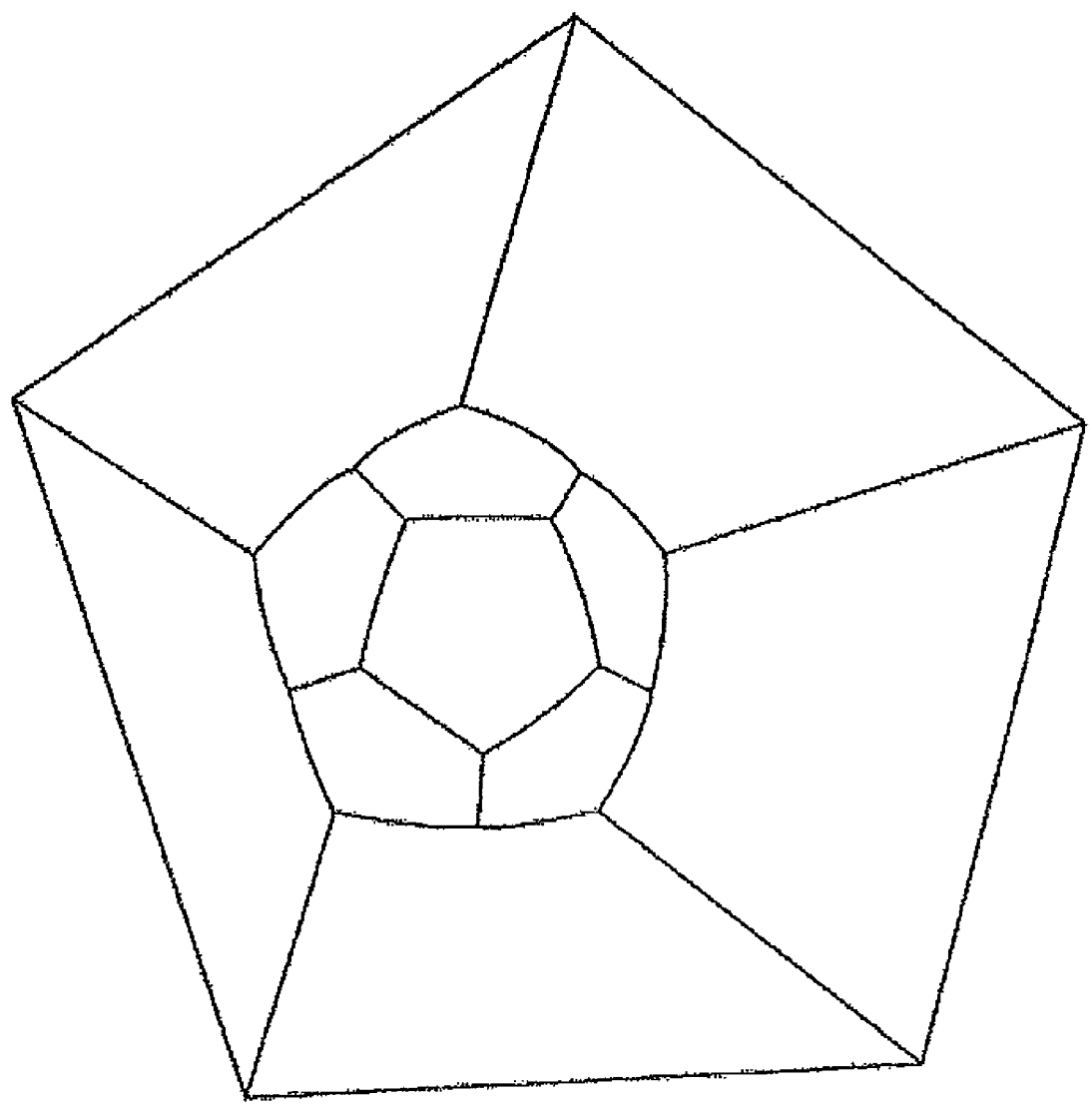
FIG. 31 is another perspective view of the apparatus shown in FIG. 23.
Figure 32:
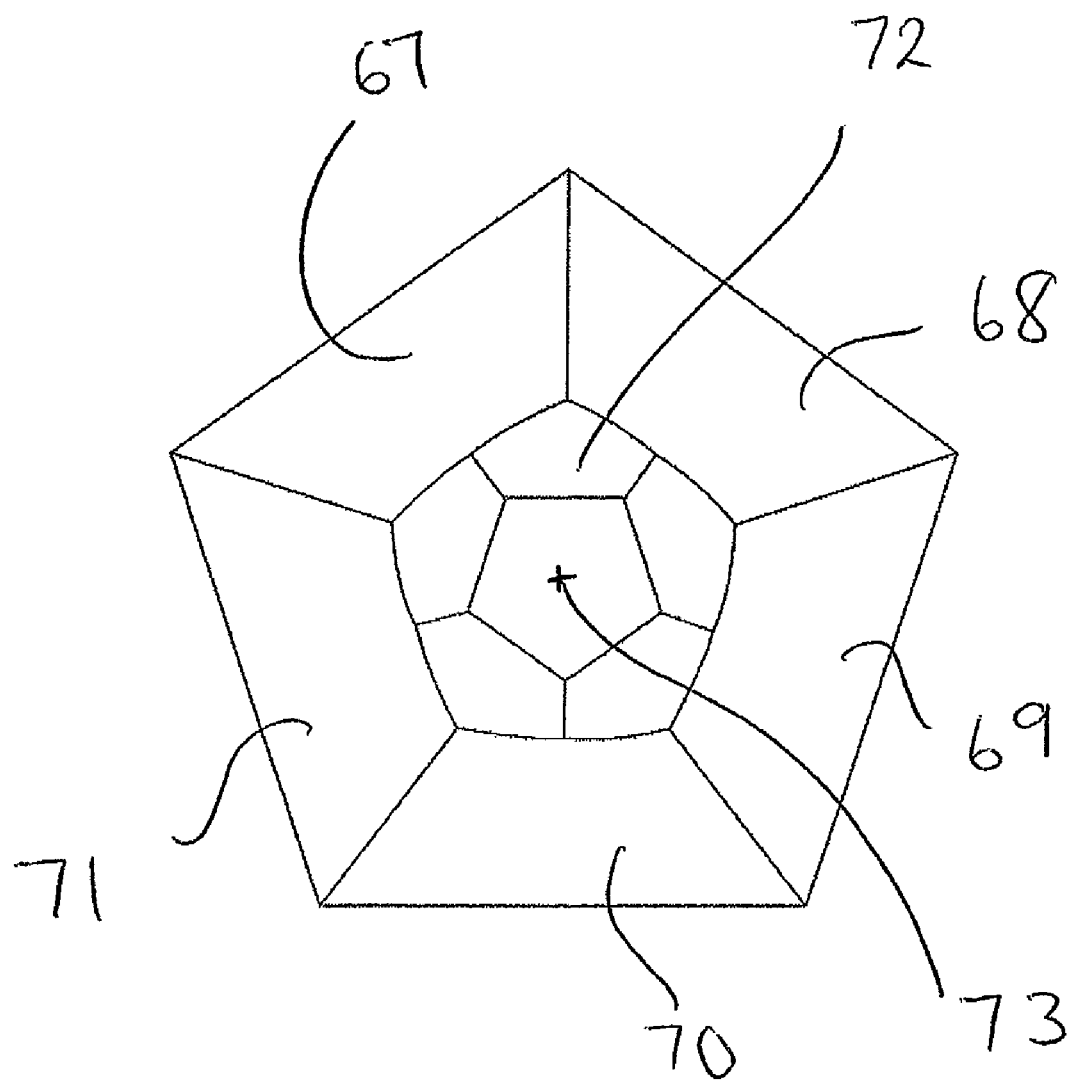
FIG. 32 is another front view of the apparatus shown in FIG. 23.
Figure 33:
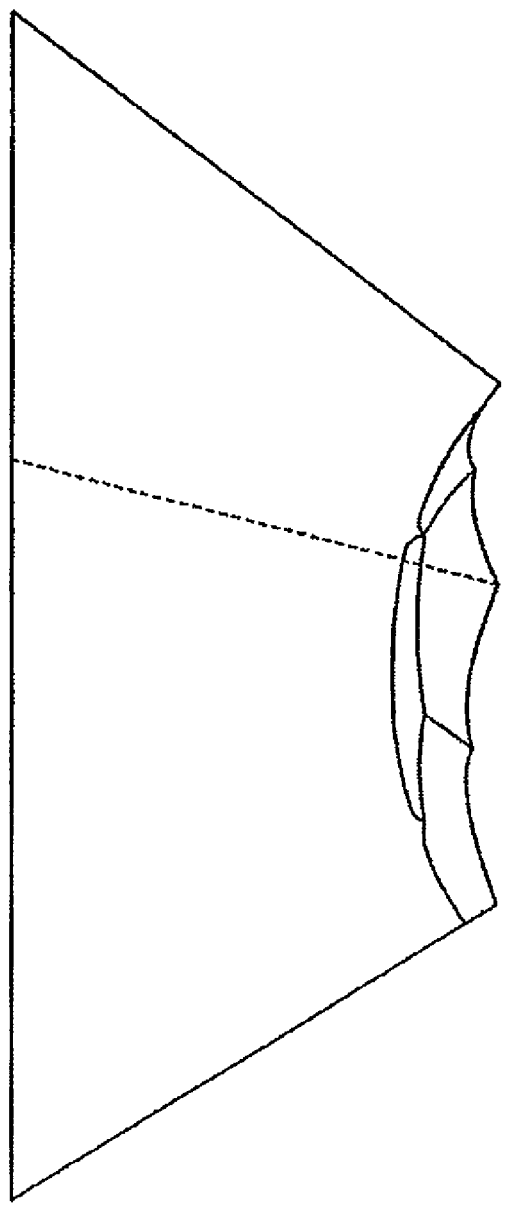
FIG. 33 is another side view of the apparatus shown in FIG. 23.
Figure 34:
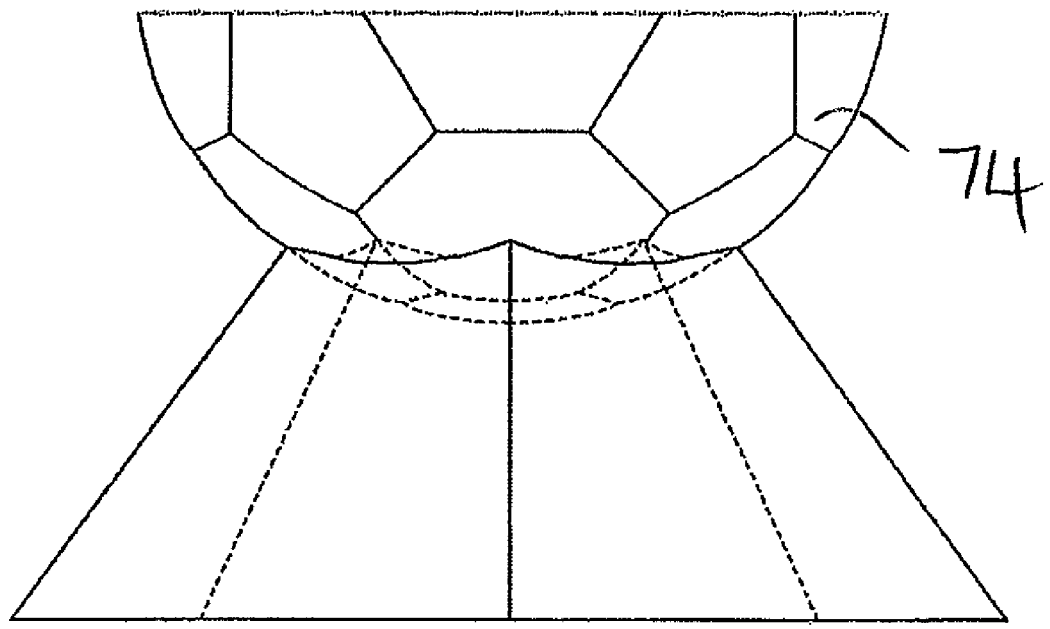
FIG. 34 is a plan view of the apparatus shown in FIG. 23 showing the relationship between a projected shape to be generated and the apparatus.
Figure 35:
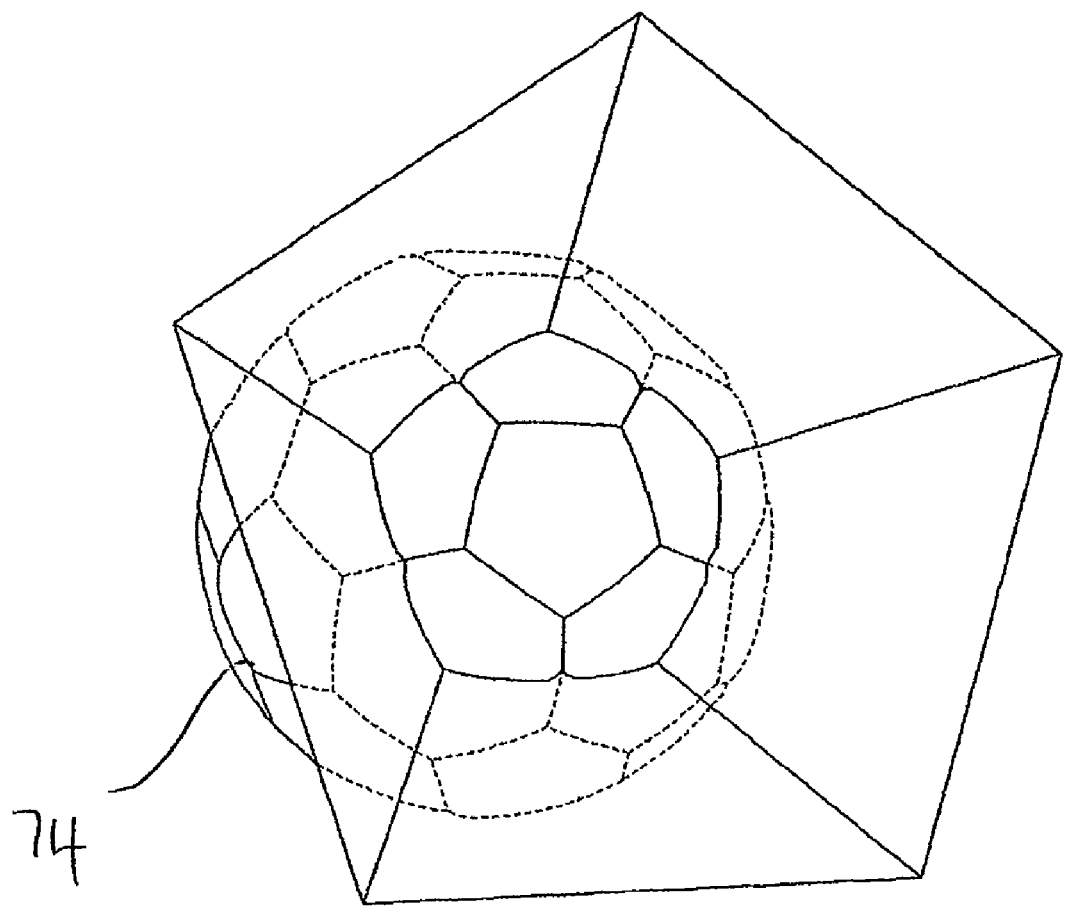
FIG. 35 is a perspective view of the apparatus shown in FIG. 23 showing the relationship between a projected shape to be generated and the apparatus.
Figure 36:
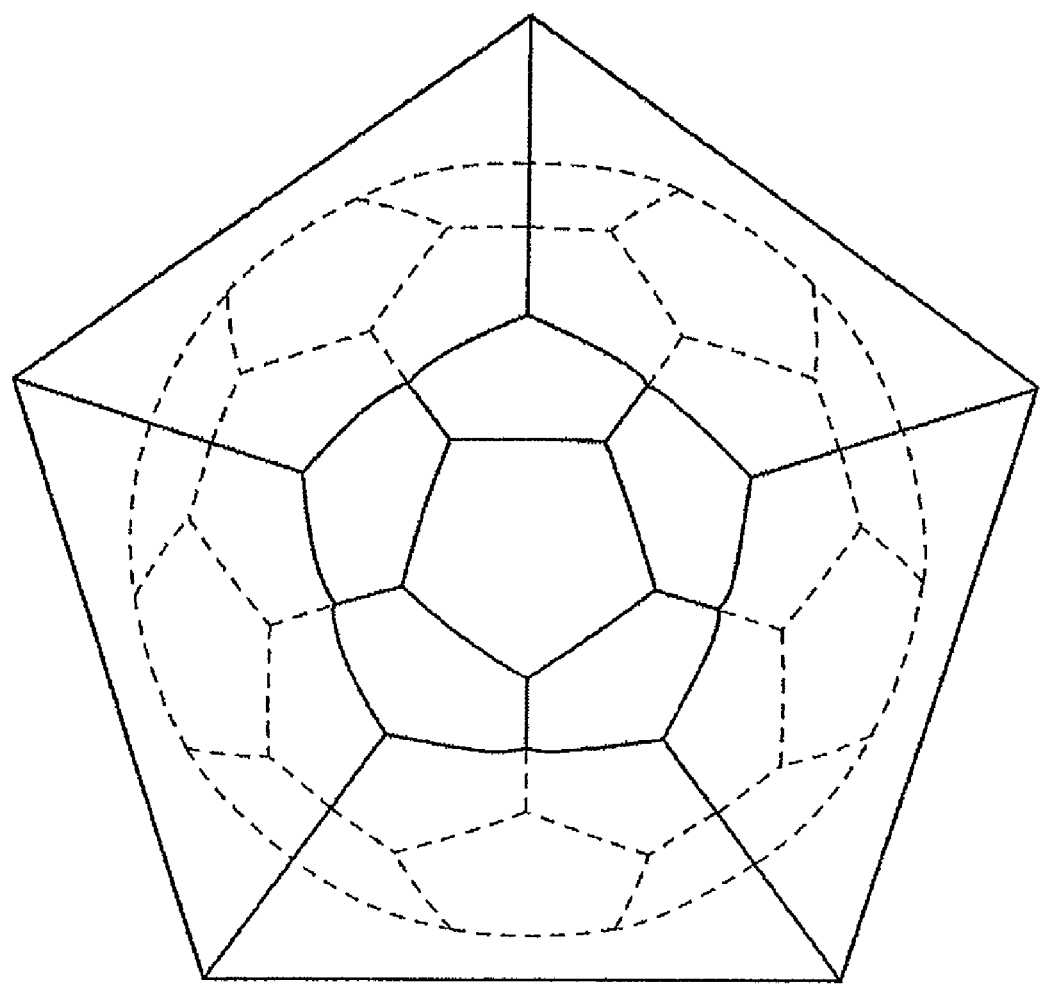
FIG. 36 is a front view of the apparatus shown in FIG. 23 showing the relationship between a projected shape to be generated and the apparatus.
Figure 37:
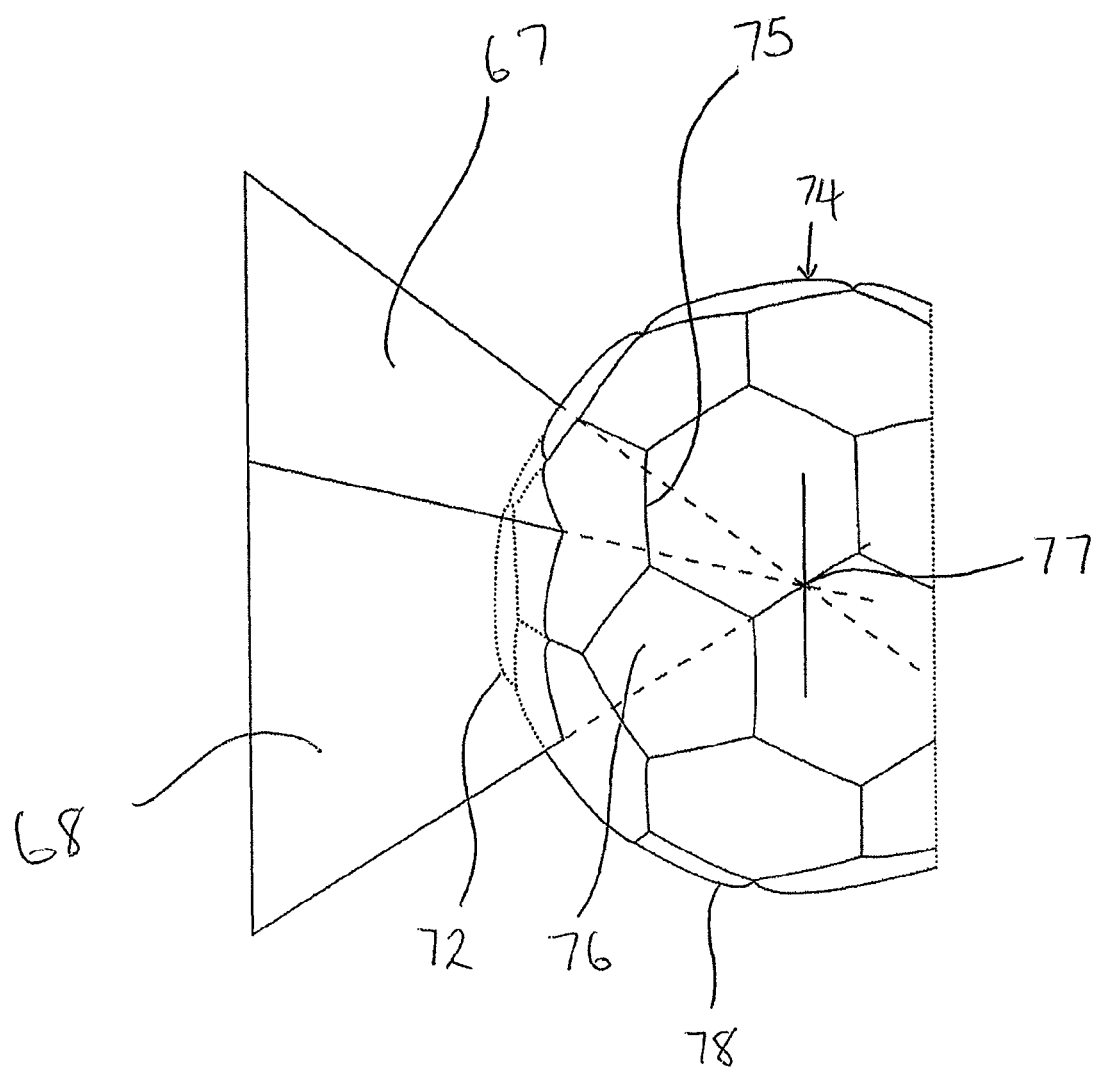
FIG. 37 is a side view of the apparatus shown in FIG. 23 showing the relationship between a projected shape to be generated and the apparatus.
Figure 38:
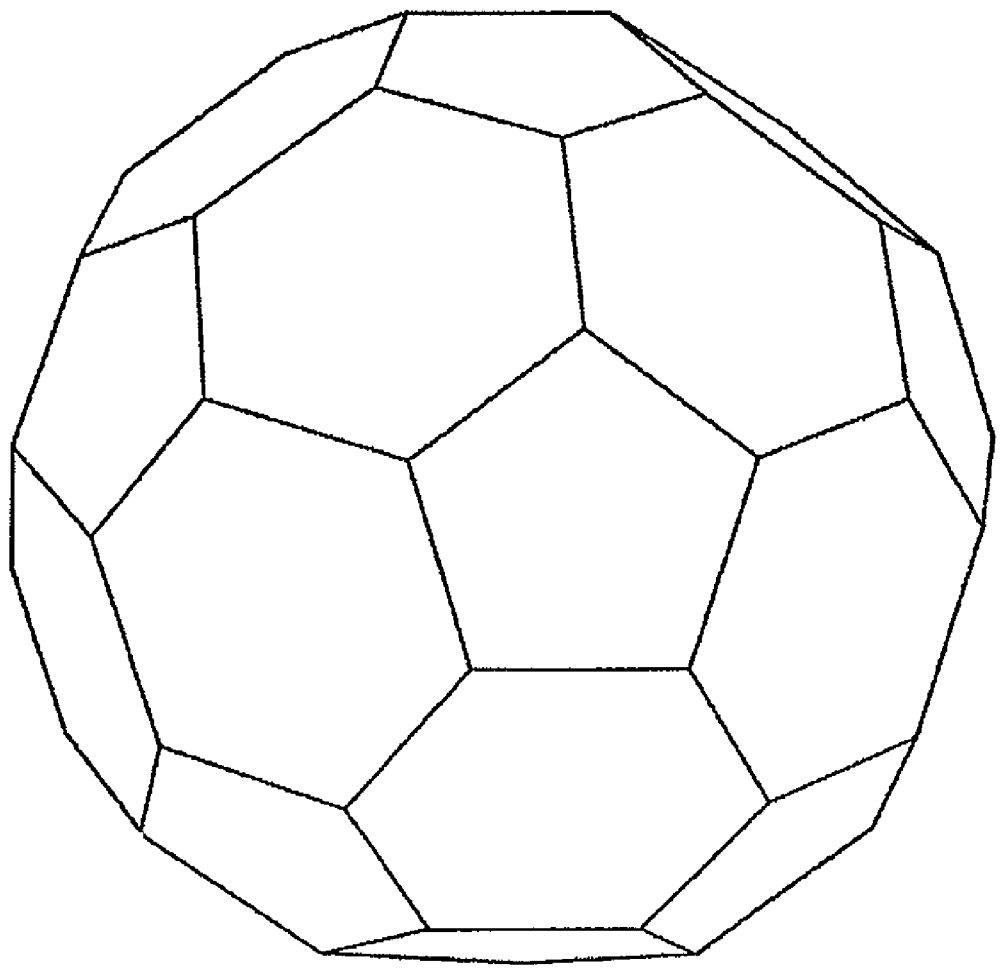
FIG. 38 is a perspective view of a sphere in the form of a football.
Figure 39:
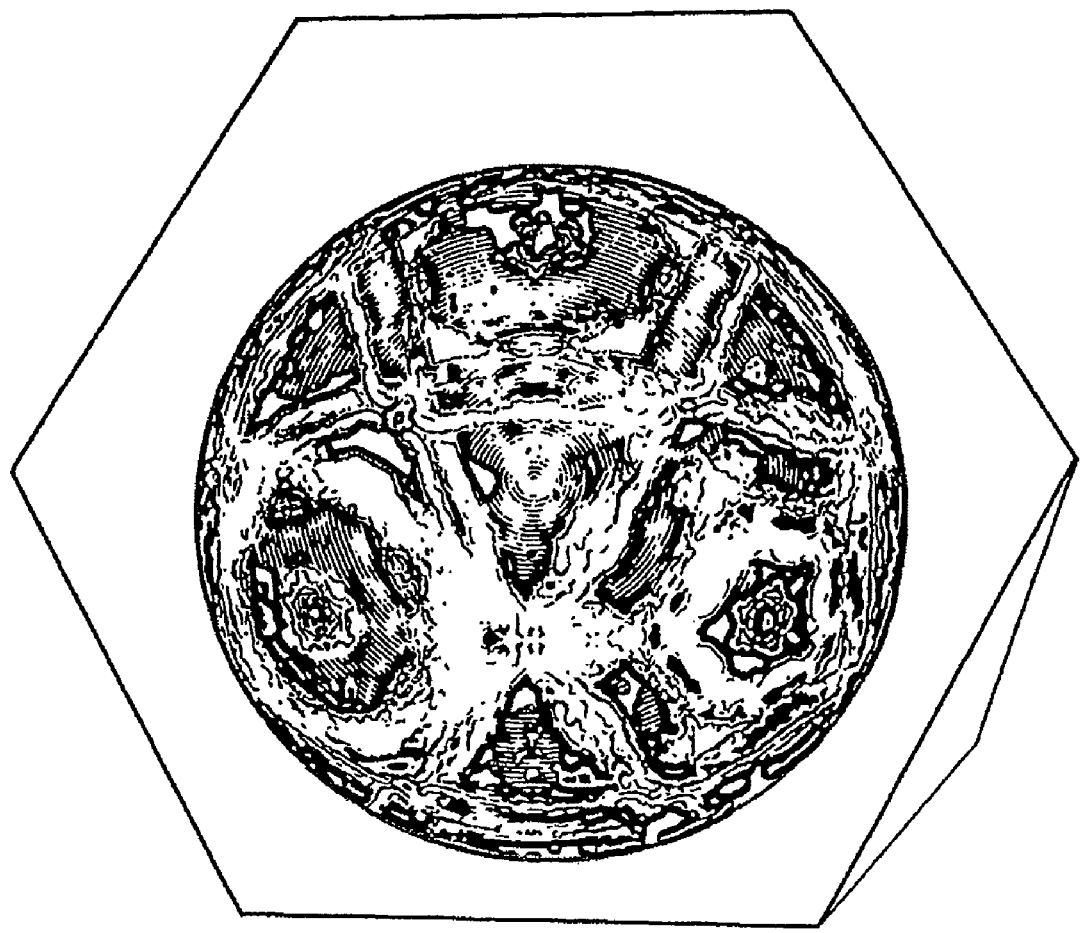
FIG. 39 is perspective view of an apparatus for generating an illusion of a three dimensional kaleidoscopic image according to a further embodiment of the present invention.
Figure 40:
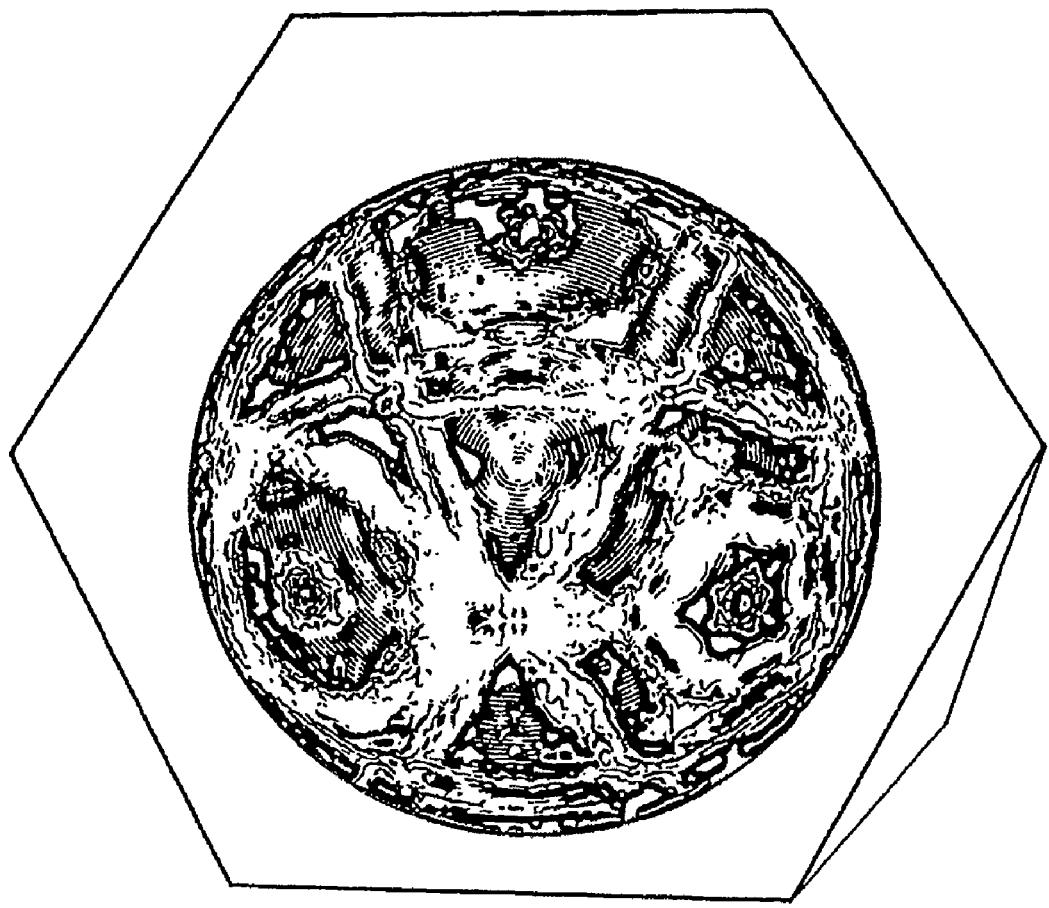
FIG. 40 is a further perspective view of the apparatus shown in FIG. 39.
Figure 41:
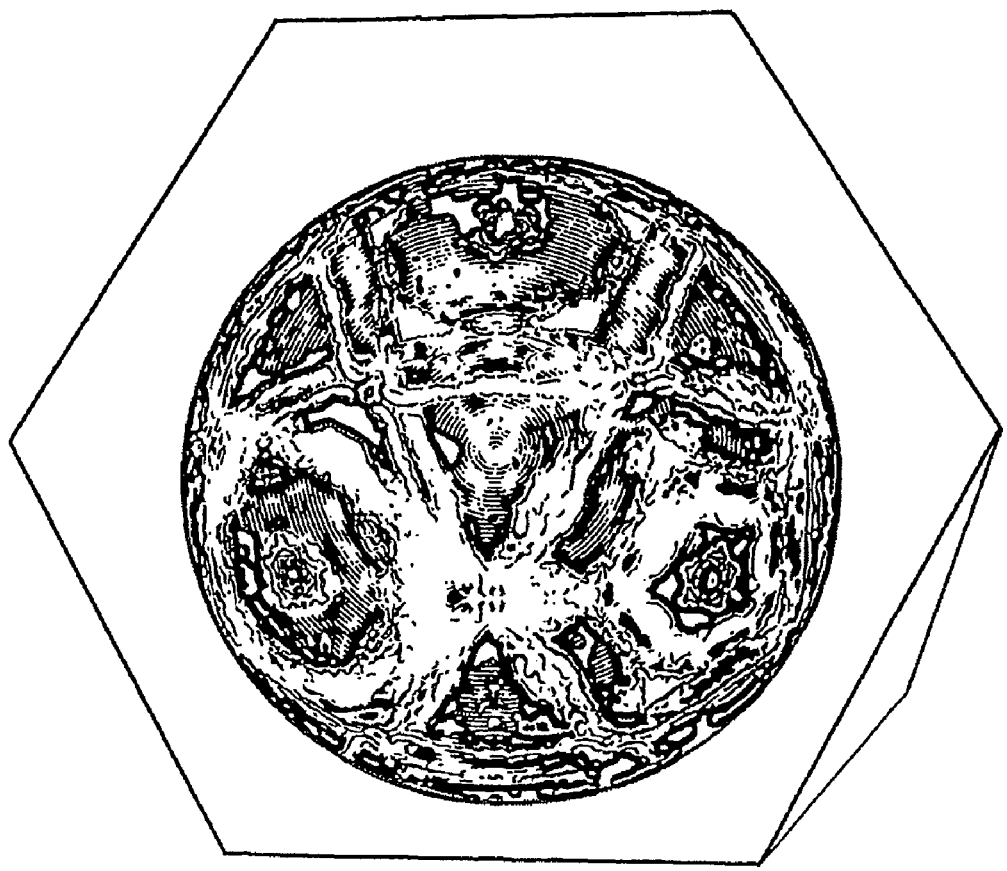
FIG. 41 is a further perspective view of the apparatus shown in FIG. 39.
Figure 42:
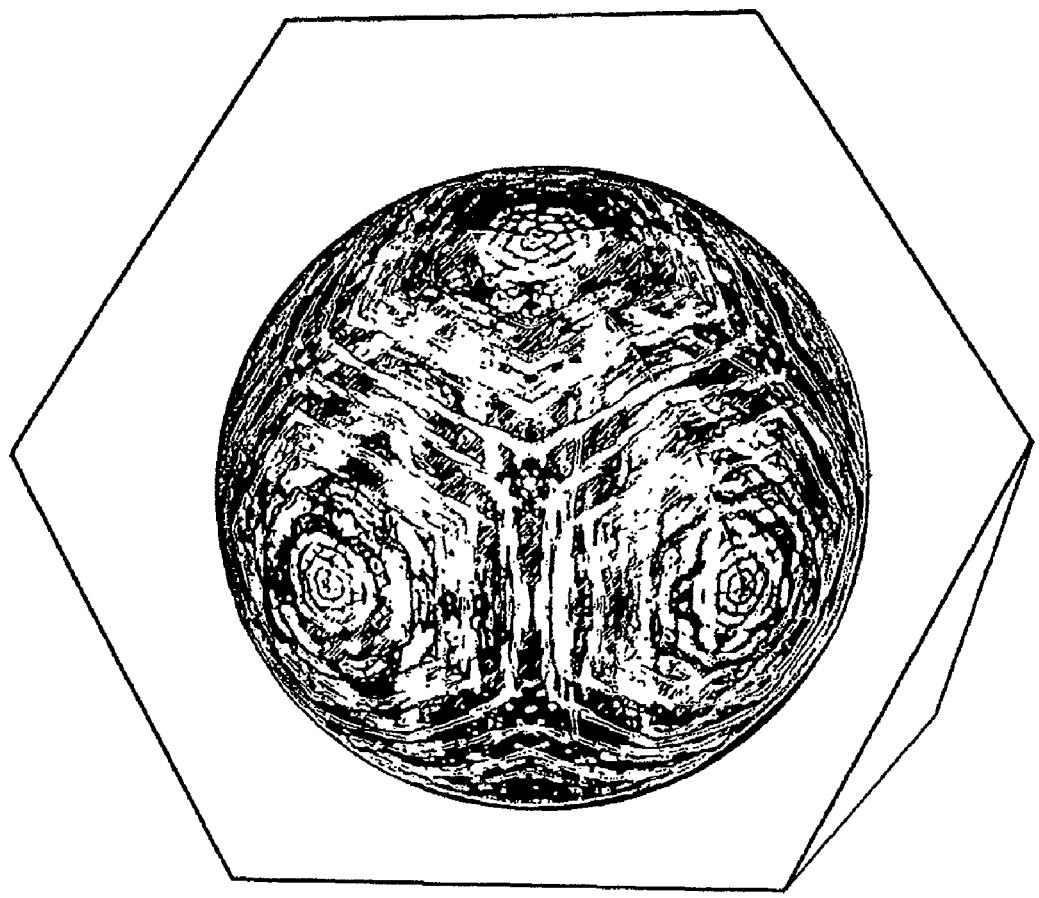
FIG. 42 is a further perspective view of the apparatus shown in FIG. 39.
Figure 43:
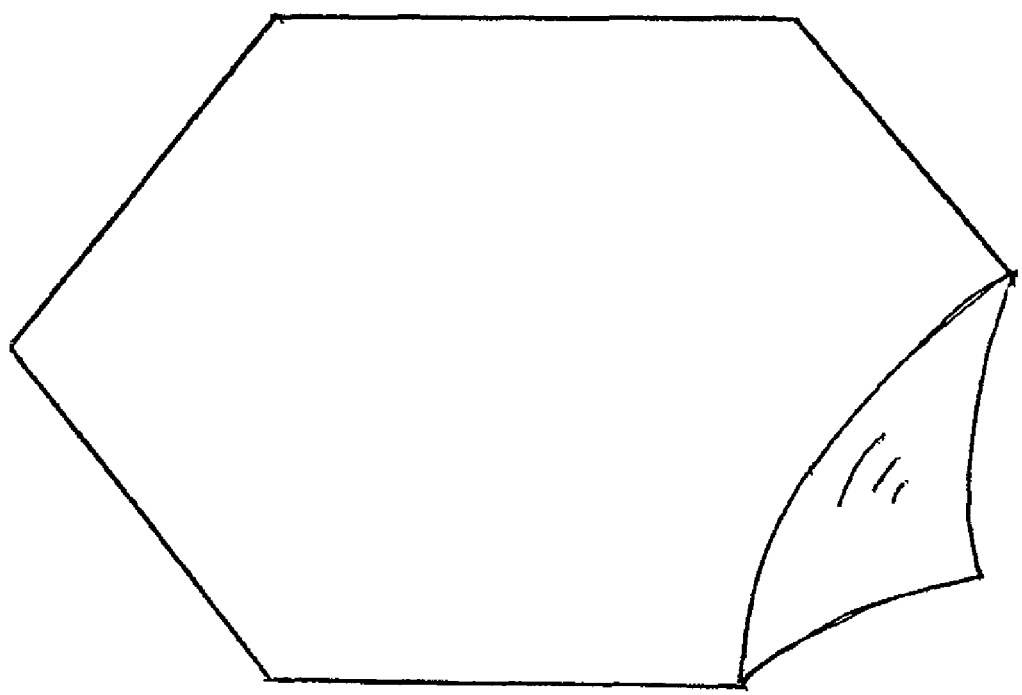
FIG. 43 is a side view of the apparatus shown in FIG. 39.
Figure 44:
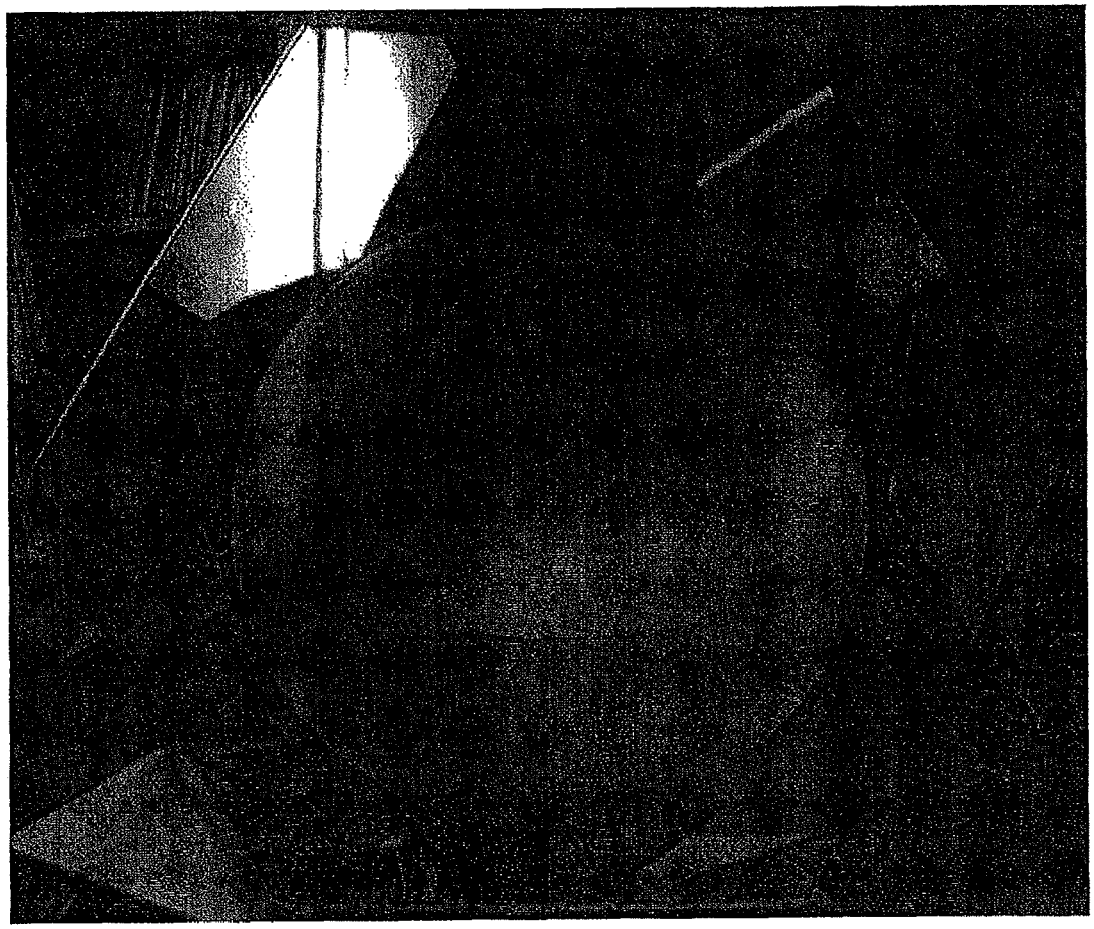
FIG. 44 is a further perspective view of the apparatus shown in FIG. 39.
Figure 45:
FIG. 45 is a further perspective view of the apparatus shown in FIG. 39.
Figure 46:
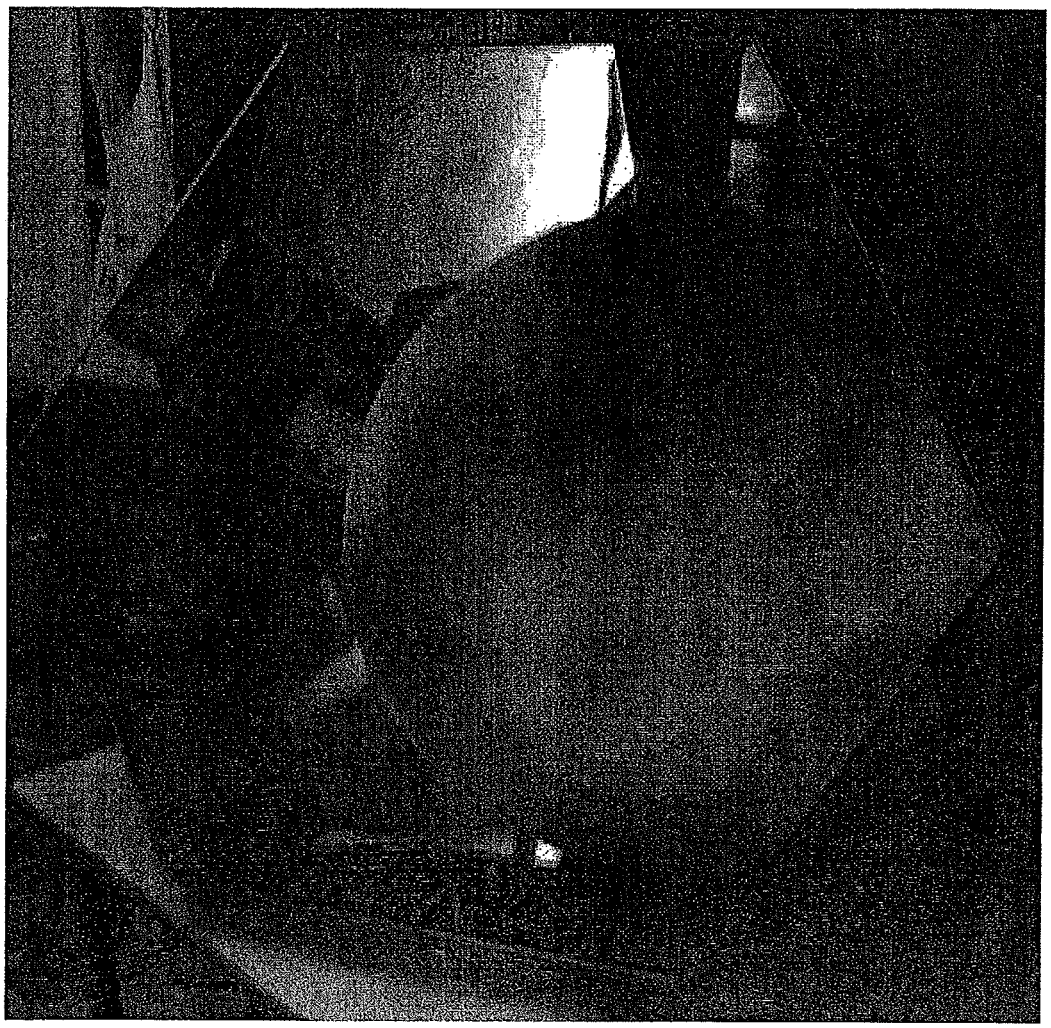
FIG. 46 is a further perspective view of the apparatus shown in FIG. 39.

FIGS. 23 to 37 show a further exemplary embodiment of the apparatus to generate the illusion of a complex polyhedron in the form of a football as shown in FIG. 38. In this embodiment the apparatus comprises five panels 67,68,69, 70,71 and a screen 72 with a pentagonal outline, wherein the screen 72 is curved as discussed above (refer to FIGS. 27 to 29). As the apparatus corresponds to that of a pentagonal portion of icosahedral group symmetry formed from a number of discrete fundamental domains, the edges of the screen are aligned along planes of symmetry which represent a dodecahron expanded onto a sphere (refer to FIG. 10). Therefore the screen 72 is divided into ten fundamental domains, with an axis of symmetry thereof being formed at the projected centre 73.

It is shown that the screen 72 has recesses formed therein to represent the joins on a football. These recesses have to correspond to a method of producing a source image as will be explained hereinafter.

Referring to FIGS. 34 to 37, a virtual projected shape of a football 74 is shown relative to the apparatus 3 to demonstrate the relationship between the virtual shape and the positioning of the apparatus components. In particular, referring to FIG. 37 the planes 75,76 of the panels 67,68 are shown to extend to a projected centre 77 of the virtual projected shape of a football 74, and the screen 72 is shown to correspond to a portion of the surface 78 of the projected shape of the football 74.

Although, in the illustrated embodiments, only a limited number of polyhedral shapes are shown to be possible to be created using the apparatus of the invention, it will be understood that many different virtual images of polyherdral shapes are possible. It will therefore be understood that with a screen formed as described above with a triangular or pentaganol screen which corresponds with the planes of symmetry and a discrete number of fundamental domains that the overall apparent image generated as seen combining the "original" and "reflected" portions, wherein the image of the screen is reflected and rotated by the reflective surfaces arranged along symmetry planes of the desired polyhedral shape image to be produced, that the shape will appear to remain constant for every viewing angle, that is, an observer may view the 3D illusionary shaped object created by the apparatus from a range of angles, and still see the same illusionary shape.

Further, it will be clear that only two sets of apparatus are actually required to make any polyhedral with icosahedral group symmetry, one with five reflective surfaces and one with three reflective surfaces, such that the outer edges of the screen are either substantially uniformly pentagonal or triangular. However, the planes of the reflective surfaces pass along a plane of symmetry of icosahedal group symmetry, such that the planes do not intersect any fundamental domain, and pass through a projected centre of the virtual polyhedral shape to be produced.

Further figures of an apparatus according to the present invention are shown in FIGS. 39 to 46.

Figure 47:
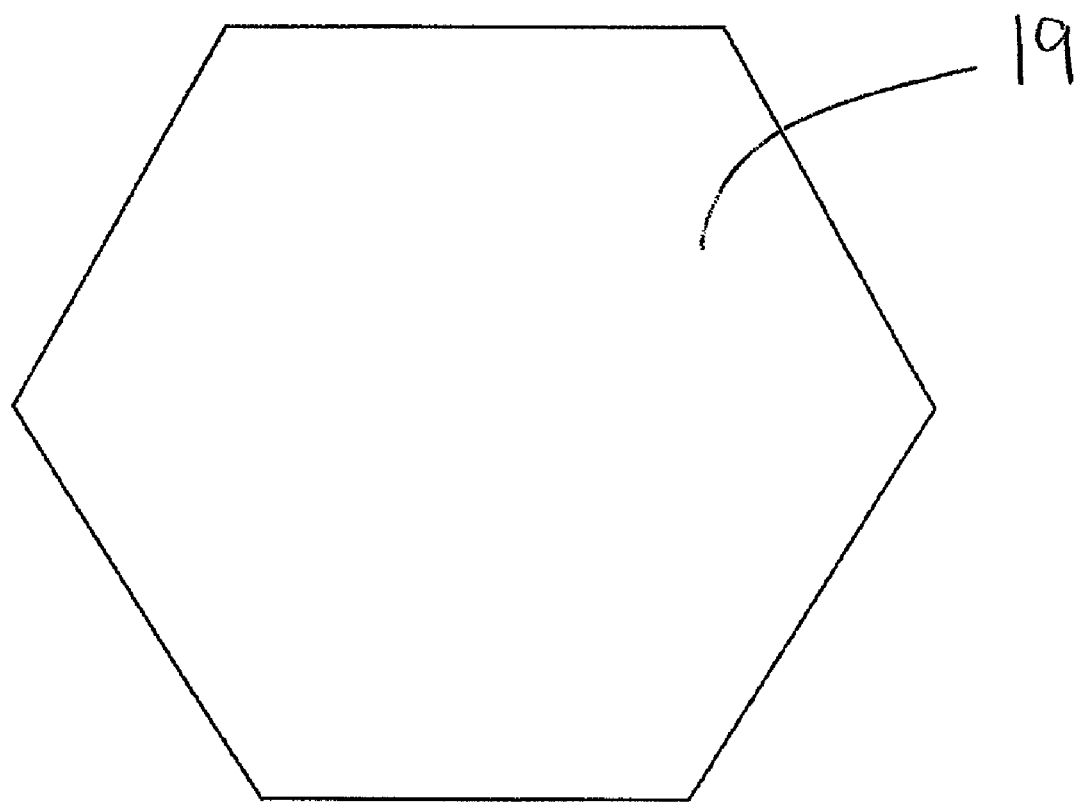
FIG. 47 is a front view of an opening of a screen of the apparatus shown in FIG. 2.
Figure 48:
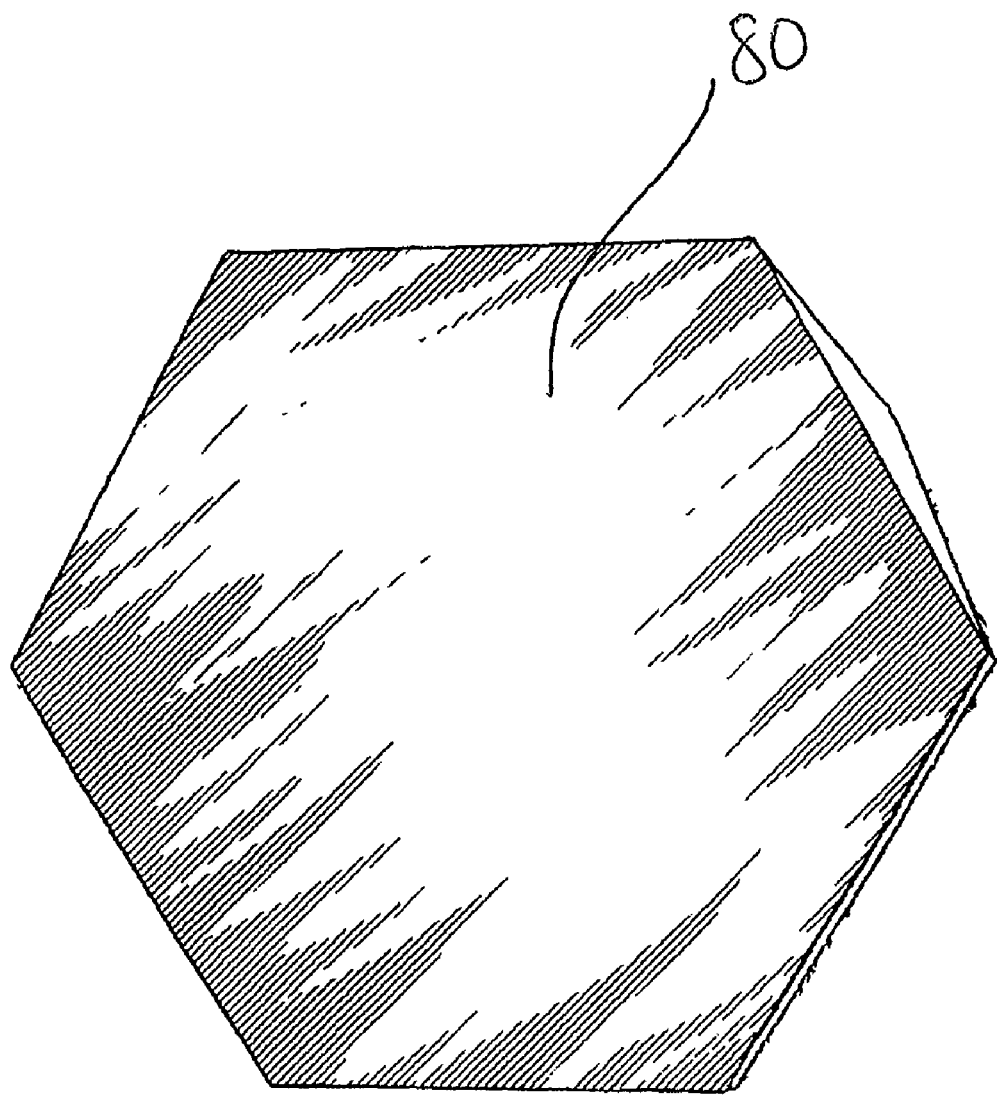
FIG. 48 is a further front view of the apparatus shown in FIG. 2 showing a cover to enclose the opening shown in FIG. 47.
Figure 49:
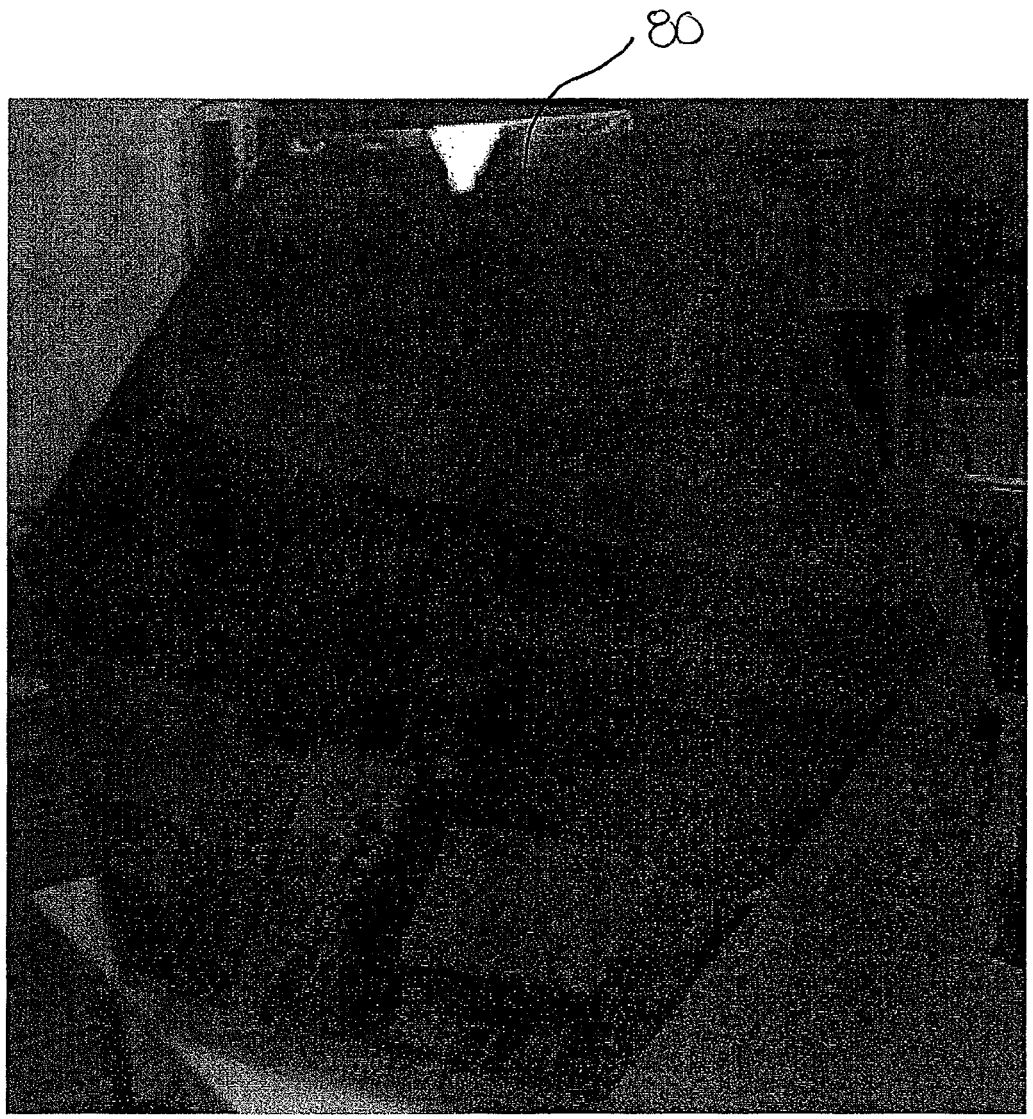
FIG. 49 is a perspective view of the apparatus shown in FIG. 2 with the cover shown in FIG. 48 enclosing the opening.

Referring to FIG. 47, the front opening 19 of the apparatus 3 is shown. The front opening 19 of the apparatus is shown as covered by a cover 80 (refer to FIG. 48) which extends over the opening 19 and is mounted to the apparatus by known means, such as clips. The cover 80 is formed from a transparent or translucent material, such as a fine mesh or a plastic film. In one alternative, the cover 80 is mounted to a frame which is subsequently releasably affixed to the apparatus. Such a cover is an optional but preferable feature of the invention.

The cover 80 may be formed from a polarising material or, alternatively, is formed from a coloured film, such as grey, to be a coloured filter. The cover 80 allows the produced illusion of a three-dimensional kaleidoscopic image to be viewed therethrough, due to the level of opacity of the cover 80 and the luminescence of the screen, and the mirrors/reflective surfaces are hidden/disguised such that it is difficult to see that a portion of the illusion is formed from reflective surfaces. This enhances the illusion that the reflected 3D kaleidoscopic image produced is actually a solid object behind the cover, and so the illusion is virtually indistinguishable from a real polyhedral shape with a symmetrical image. Further, the cover 80 is formed to prevent the formation of specular reflections from external light sources on the reflective planar surfaces 31,32,33 of the panels 5a,5b,5c. The cover 80 is also removable such that it may be replaced or excluded as desired.

Although the opening 19 is shown to be hexagonal in the above embodiments, it will be understood that the opening 19 may alternatively form an equilateral triangular, spherical, oval, or the like, shape.

Each component of the apparatus 3 is either releasably connected or hinged to its adjacent components such that the apparatus is foldable to allow it to be compacted for transport. The mounting of the screen 4 and the panels 5a,5b,5c with respect to each other ensure the stability of the apparatus 3 when it is constructed and ensure that the panels 5a,5b,5c and screen 4 are positioned in the correct orientation with respect to each other. The apparatus is therefore portable such that it may be placed in a bag or specific carrying device and carried as luggage.

An advantage of this invention is that, because of the angle at which the panels 5a,5b,5c extend from the screen 4, the viewing range is large.

In a further embodiment, an expanded apparatus (not shown) to provide a virtual three dimensional kaleidoscopic image is formed by combining a plurality of the apparatus 3 described above. Such an apparatus is formed by one apparatus 3 section forming one portion of the expanded apparatus and being abutted against an identical apparatus placed adjacent thereto, such that one panel forms an inner panel between the two apparatus and acts as a reflective surface for both and the screens are placed adjacent to each other.

Figure 50:
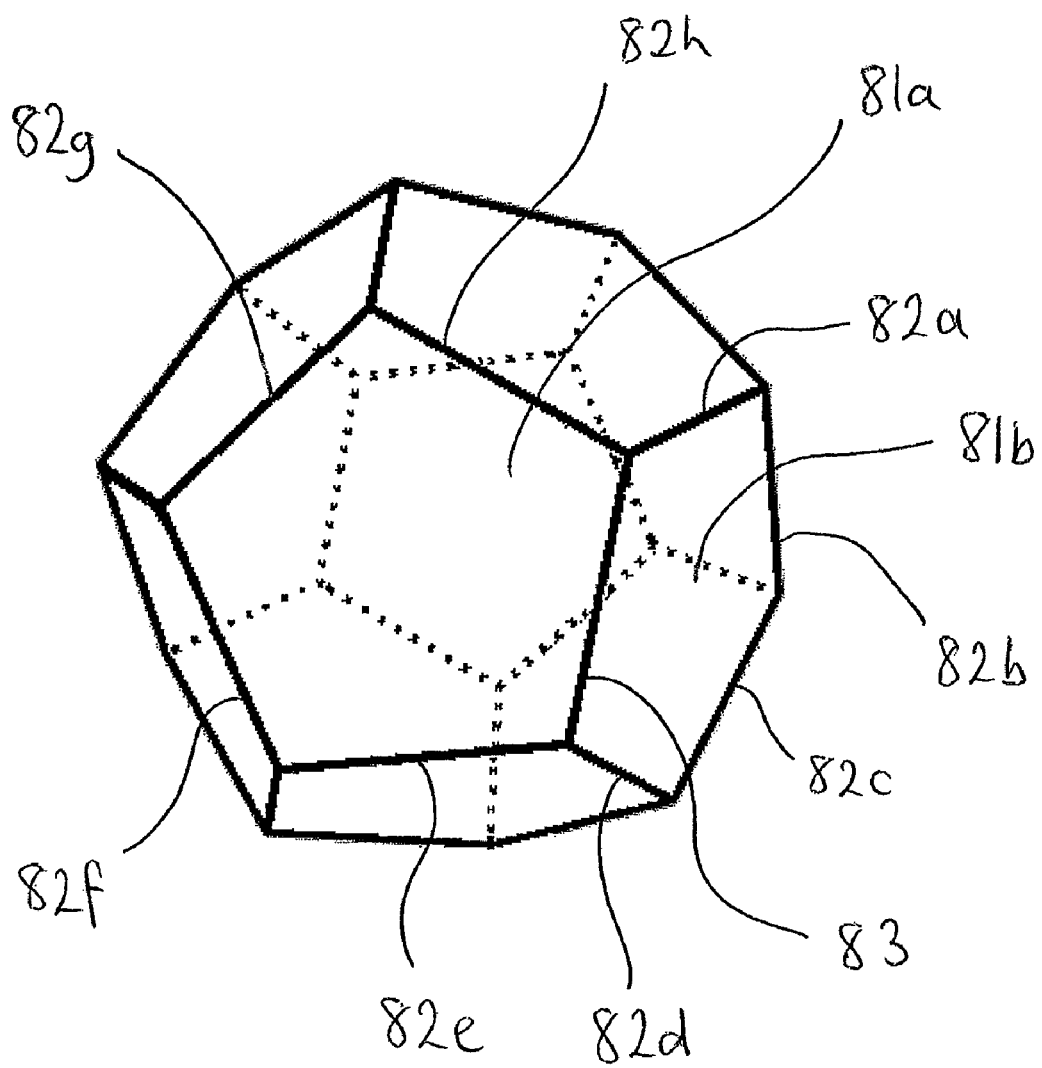
FIG. 50 is representative view of an apparatus for generating an illusion of a three dimensional kaleidoscopic image according to a further embodiment of the present invention showing the edges of combined screens.

Referring to FIG. 50, screens formed by the faces 81a,81b have outer panels extending from the edges 82a to 82h formed therearound with reflective surfaces on just the inner surfaces thereof, and an inner panel extending from the edge 83 with reflective surfaces on both surfaces thereof.

Figure 51:
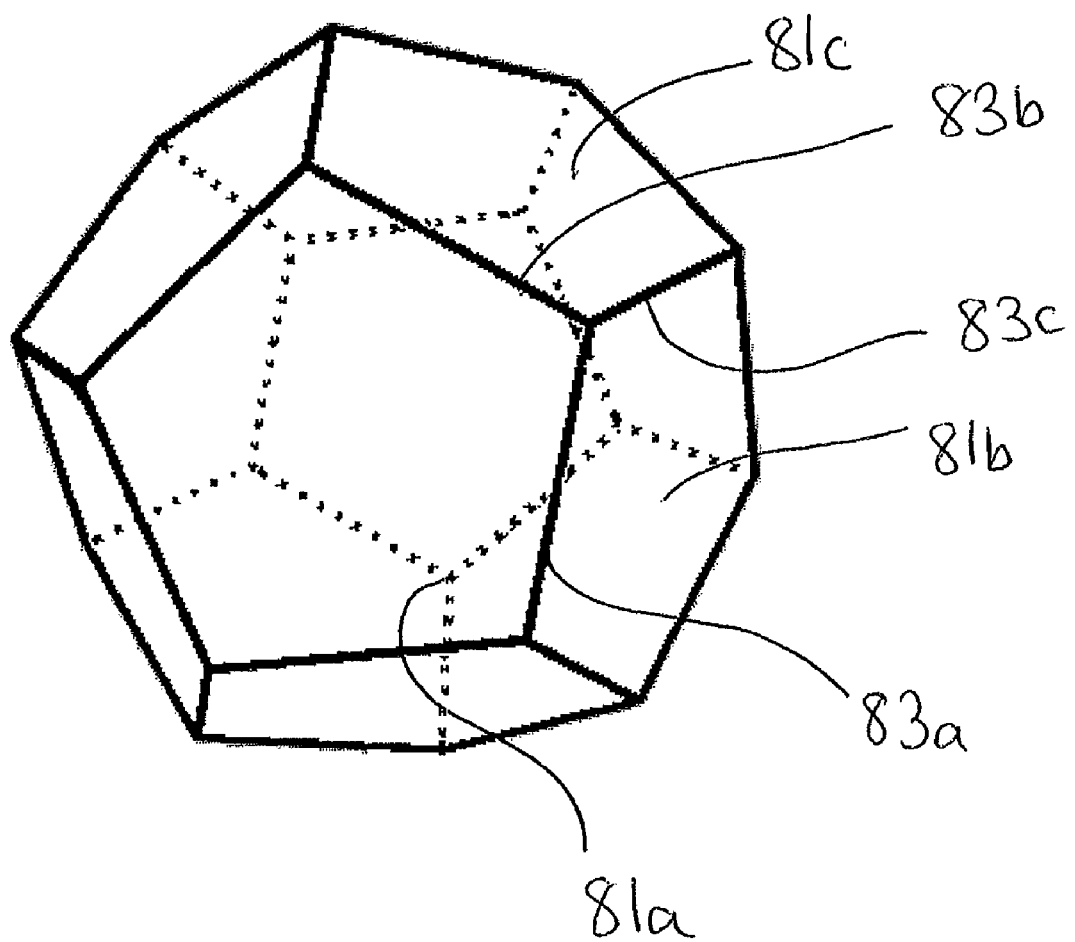
FIG. 51 is another representative view of an apparatus for generating an illusion of a three dimensional kaleidoscopic image according to a further embodiment of the present invention showing the edges of combined screens.

It will be understood that the apparatus is not limited to two screens, for example, in FIG. 51, three screens formed by the faces 81a,81b,81c may be placed adjacent to each other with three panels interacting therebetween extending from edges 83a,83b,83c with reflective surfaces on both surfaces thereof.

A method of producing a source image for projection on an apparatus according to the embodiments discussed above will now be described with reference to FIGS. 52 to 65.

If the screen is a planar surface or curved corresponding to the first embodiment described above with a plain image, i.e. no image formed thereon, then the virtual image of the sphere produced by the screen 4 and the reflective surfaces 31,32,33 will have a constant appearance irrespective of the angle from which it is observed through the opening 19.

Figure 52:
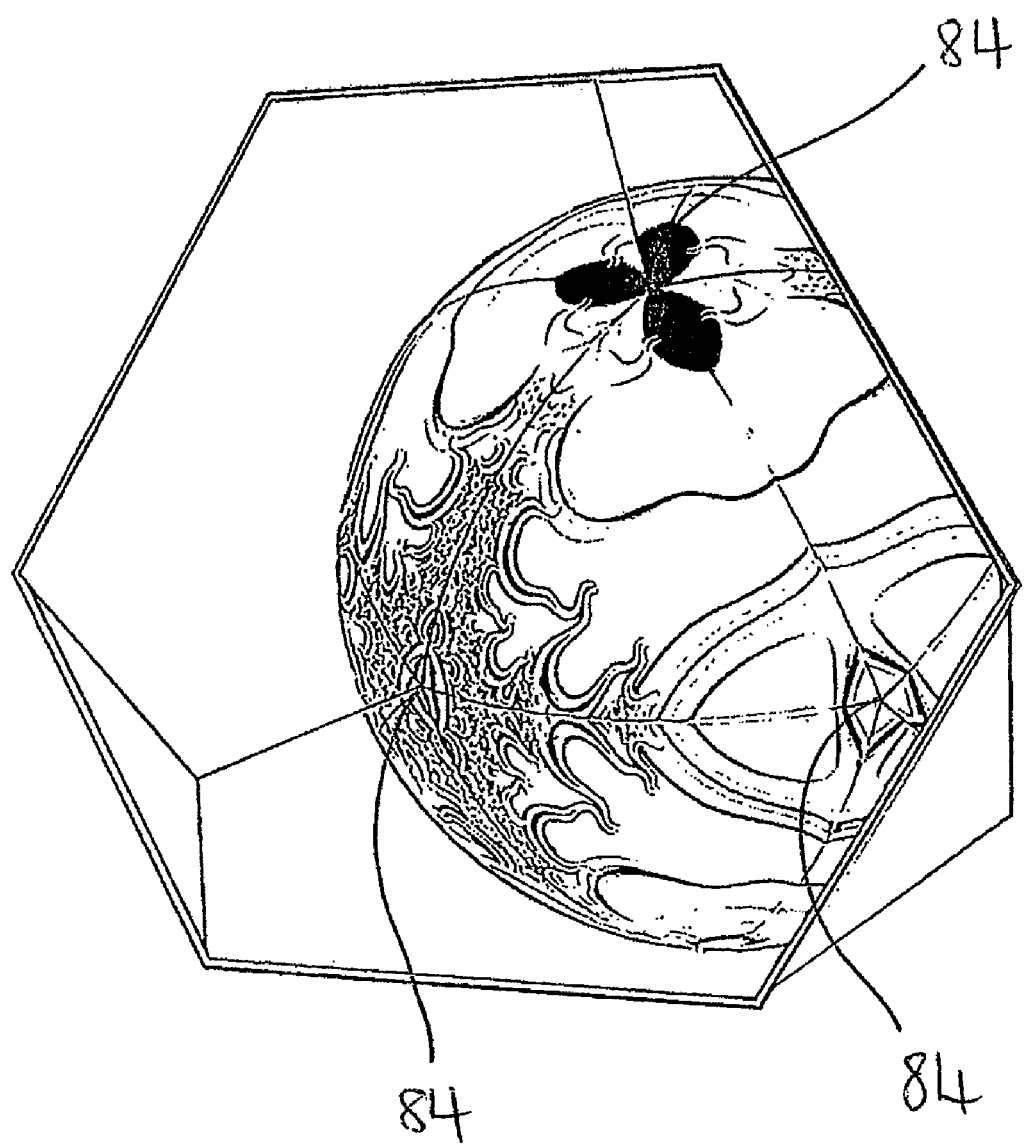
FIG. 52 is a perspective view of the apparatus shown in FIG. 2 showing discontinuities of an illusion of a three dimensional kaleidoscopic image.
Figure 53:
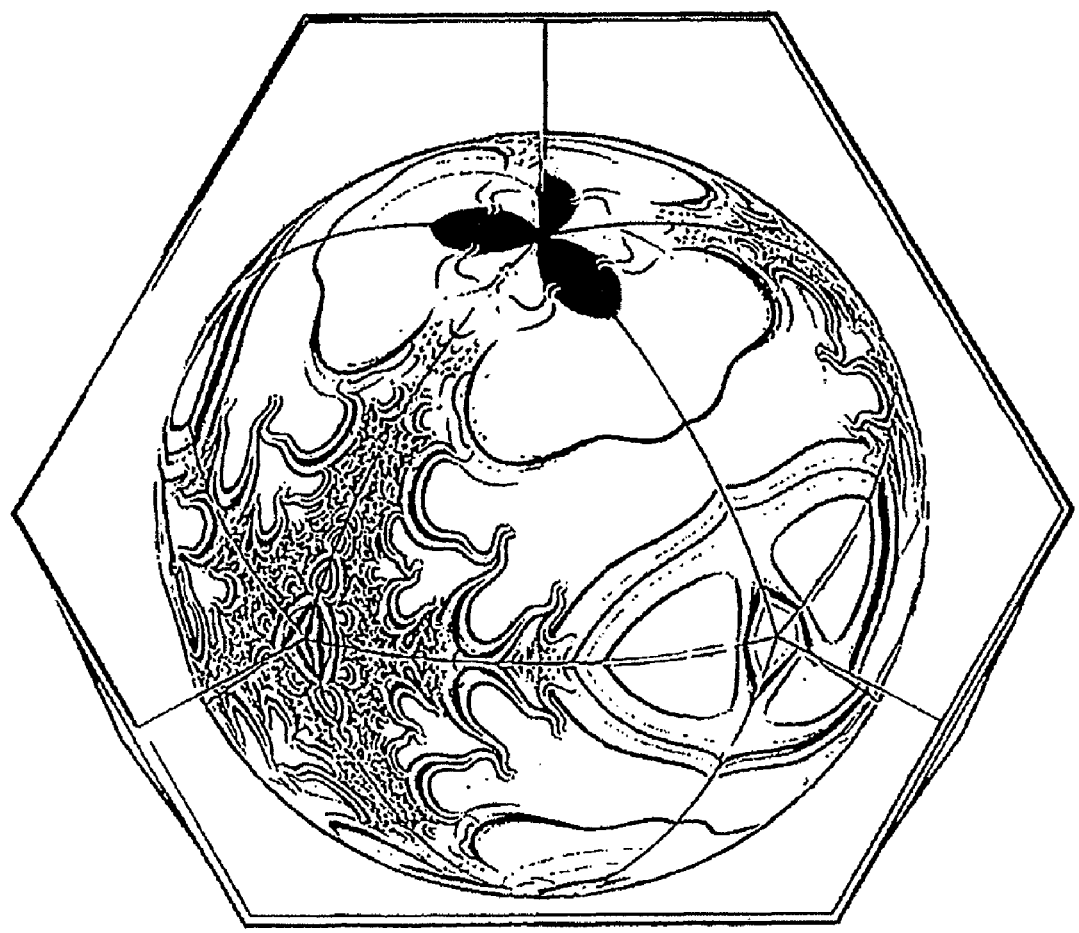
FIG. 53 is a further perspective view of the apparatus shown in FIG. 2 showing discontinuities of an illusion of a three dimensional kaleidoscopic image.
Figure 54:
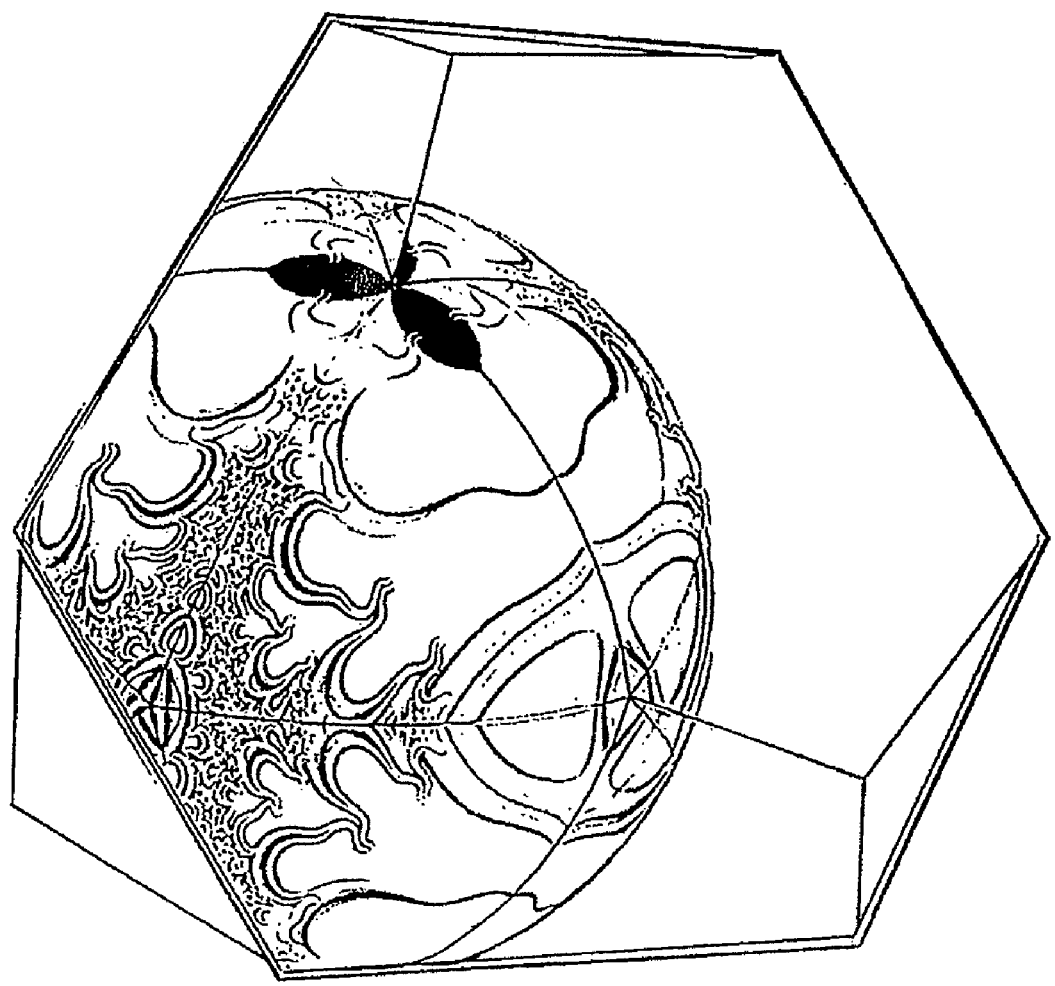
FIG. 54 is a further perspective view of the apparatus shown in FIG. 2 showing discontinuities of an illusion of a three dimensional kaleidoscopic image.

However, if an image is formed on the screen 4 then the appearance of the virtual three-dimensional kaleidoscopic shape produced by the apparatus will vary dependent on the source image formed on the screen and the angle at which the screen is viewed from. This is shown in FIGS. 52 to 54. As the viewing position through the opening changes in FIGS. 52 to 54 it is seen that the virtual image of the sphere alters, in particular, proximate to vertices 84.

It is therefore desirable to arrange a source image formed on the screen such that the source image is formed so that appearance of the illusion of a three-dimensional kaleidoscopic image produced by the apparatus remains constant irrespective of the viewing angle through the opening. Also, it is desirable such a source image is formed so as to produce the effect of a seamless, continuous surface pattern, without any obvious discontinuities or other optical errors or discrepancies which would make it obvious that the finished illusion was obviously artificial. Therefore there is a method of generating a source image such that the source image, when reflected and rotated by the mirrors, remains constant no matter what angle the image is viewed at, and creates a continuous illusionary surface pattern.

Figure 55:
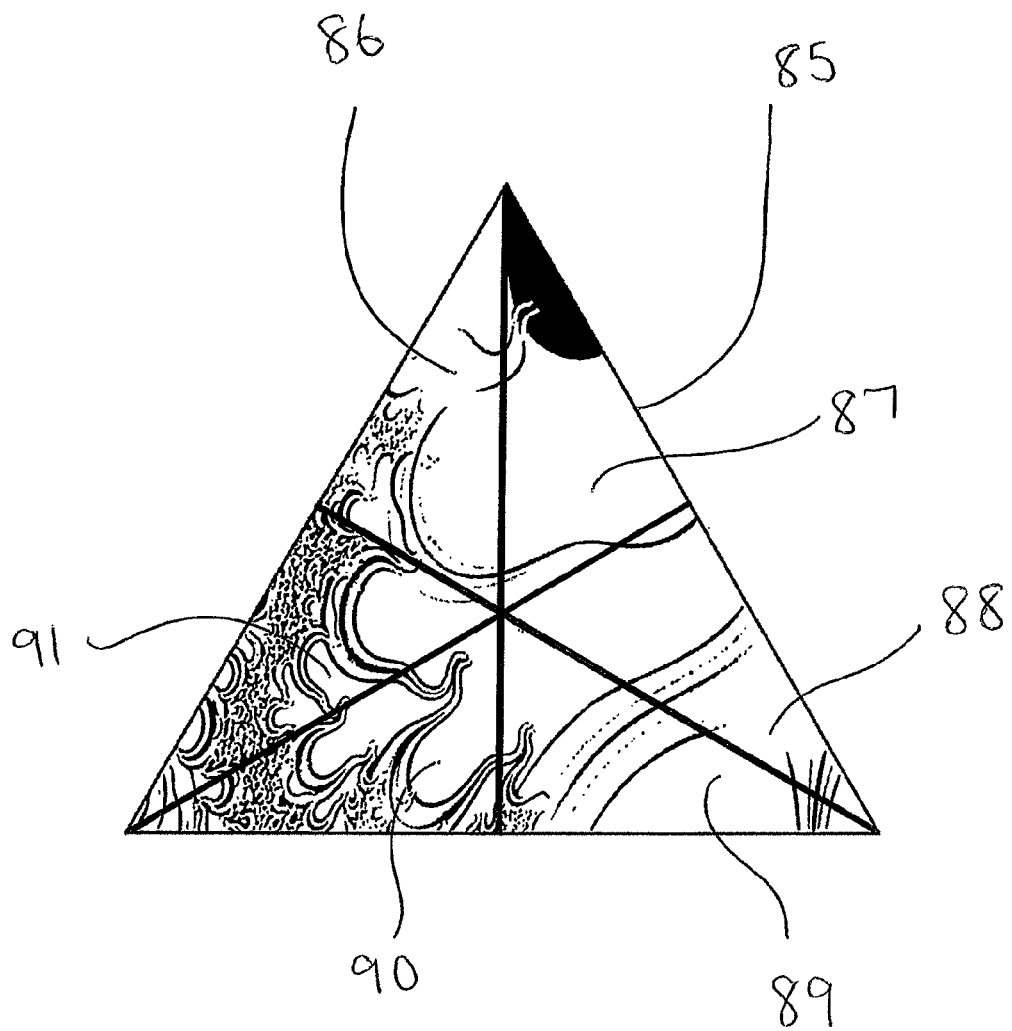
FIG. 55 is a view of a source image with each fundamental domain containing a different image.

The source image 85 utilised to produce the virtual sphere in FIGS. 52 to 54 is shown in FIG. 55. When the source image is divided into the fundamental domains 86,87,88,89,90,91 of an object with icosahedral group symmetry, as described above, each fundamental domain represents a different image.

Figure 56:
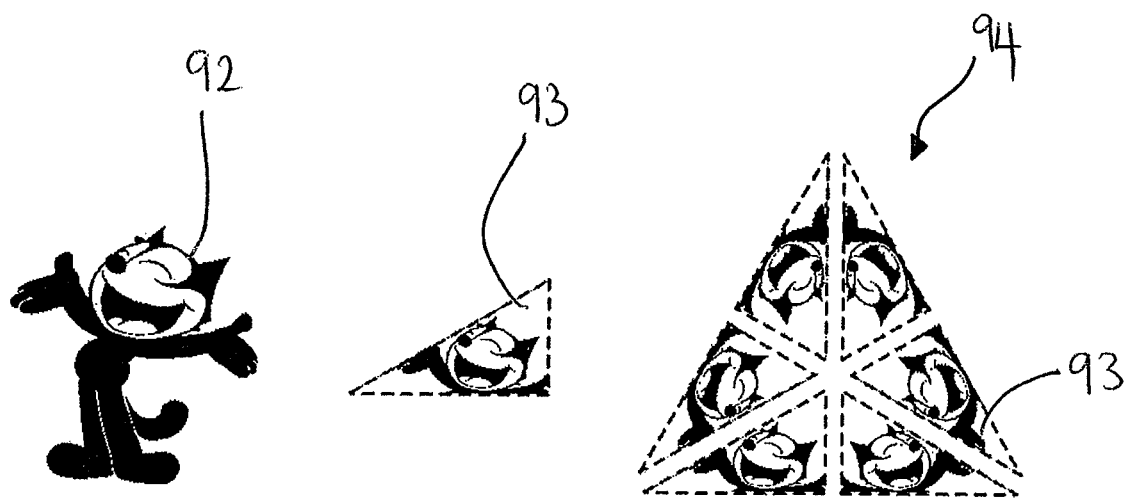
FIG. 56 is a view of the method of forming a source image.

Referring to FIG. 56, an image 92 to be produced on the virtual shape, in this case a sphere, is selected and reduced to form a modified image 93 which corresponds to the shape of the fundamental domain. Subsequently, this image is applied to the source image 94 and is rotated and reflected to correspond to the number of fundamental domains making up the source image 94. This source image can then be projected on the screen 4 of the apparatus 3 to recreate the illusion of a solid invariant object. The advantage of this is that without this method the object would not appear to be solid as the pattern or viewed object would alter dependent on the viewing angle. Without using this method, a pattern on the screen would not match up over the illusionary object surface and would instantly reveal that the illusion is created by mirrors reflecting a single source image, and the illusion of a solid 3D object would not be achieved.

Figure 57:
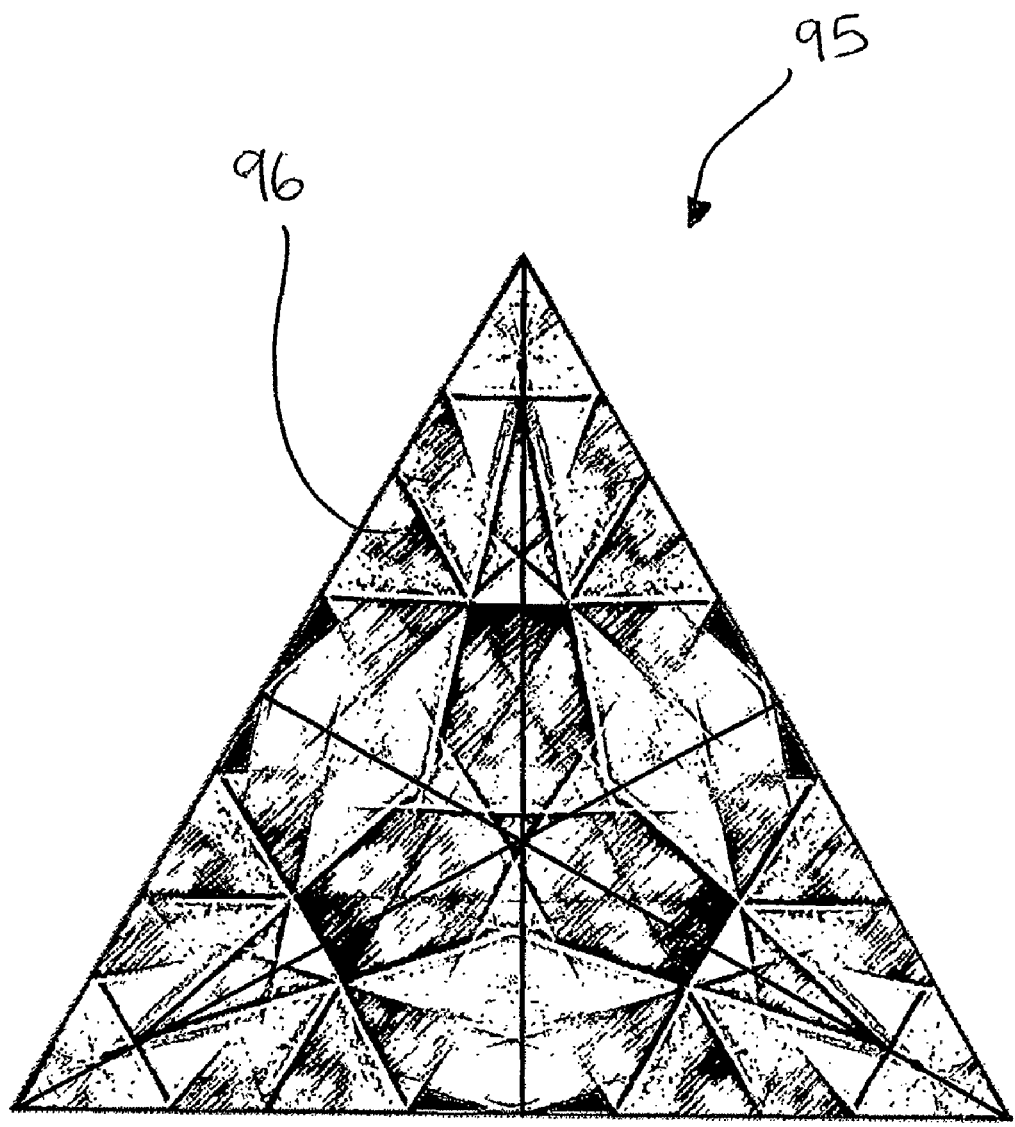
FIG. 57 is a view of a source image.
Figure 58:
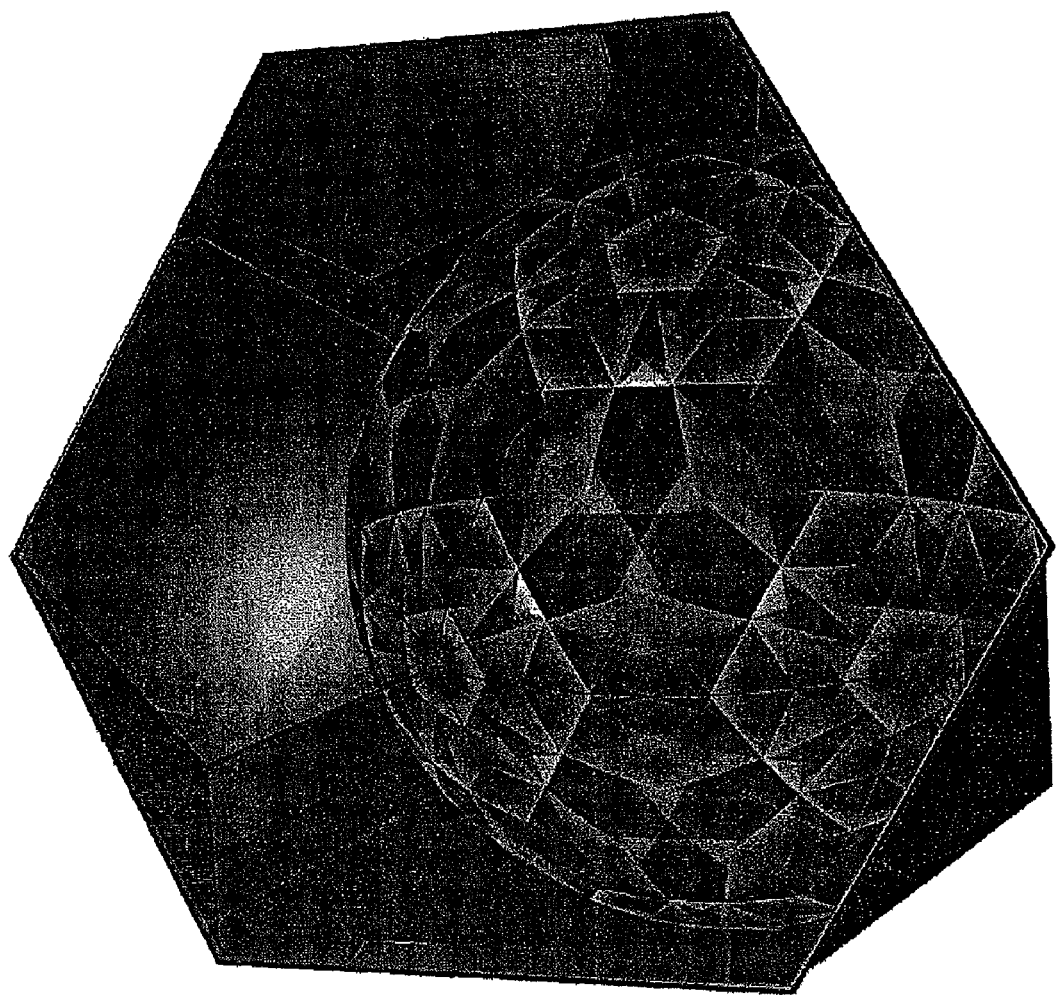
FIG. 58 is a perspective view of the apparatus shown in FIG. 2 with the source image of FIG. 57 projected thereon.
Figure 59:
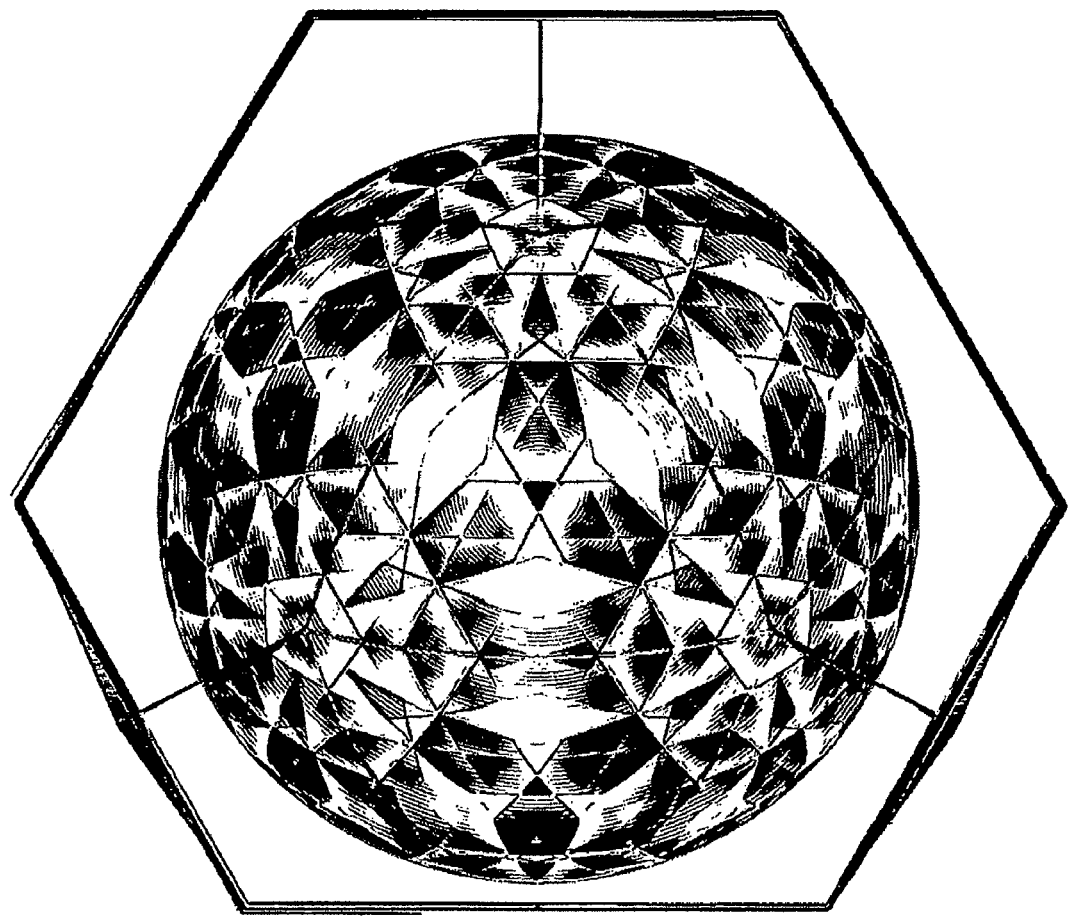
FIG. 59 is another perspective view of the apparatus shown in FIG. 2 with the source image of FIG. 57 projected thereon.
Figure 60:
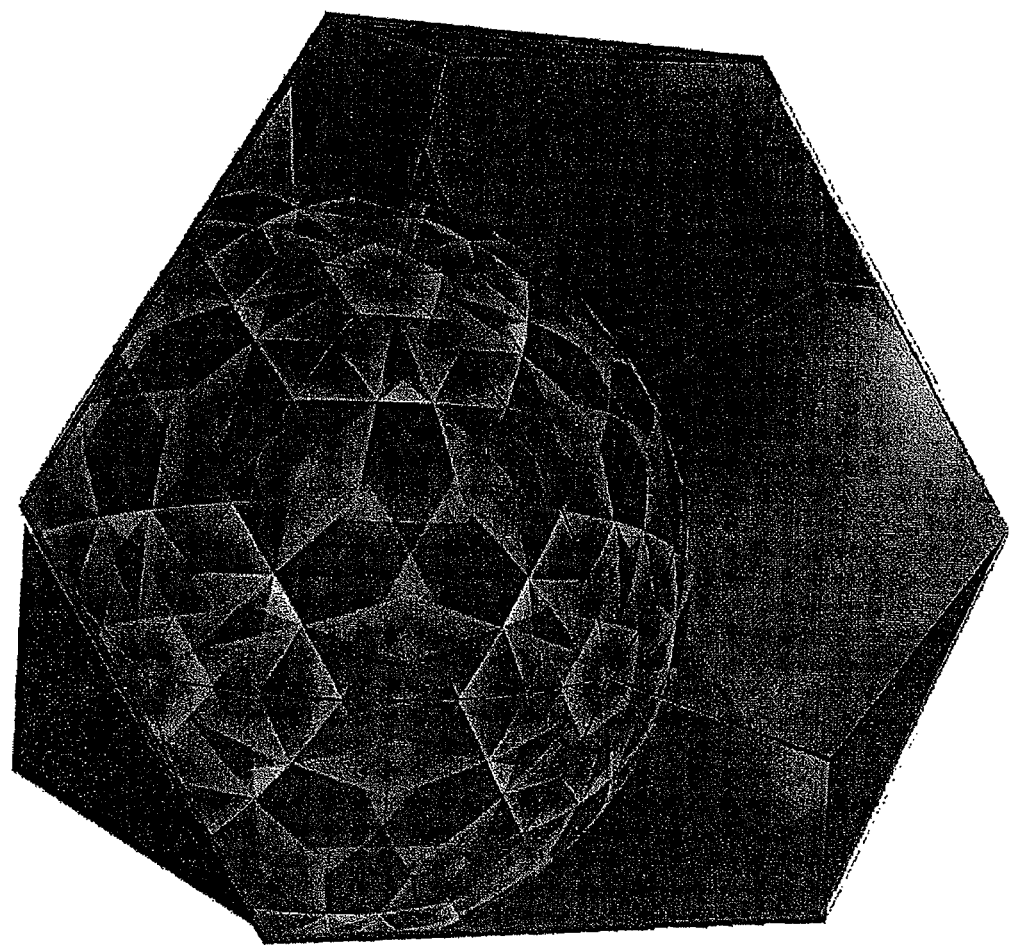
FIG. 60 is another perspective view of the apparatus shown in FIG. 2 with the source image of FIG. 57 projected thereon.

A source image 95 created by the above method is shown in FIG. 57. It will be seen that each separate portion of the source image 95 is a rotation or reflection of the same fundamental domain 96. Referring to FIGS. 58 to 60, the appearance of the virtual sphere remains constant irrespective of the viewing angle of an observer through the opening 19, and the surface pattern is a continuous, seamless image having no abrupt pattern change or discontinuity which would give away the screen/mirror intersection or spoil the illusion of a continuous solid surface.

Figure 61:
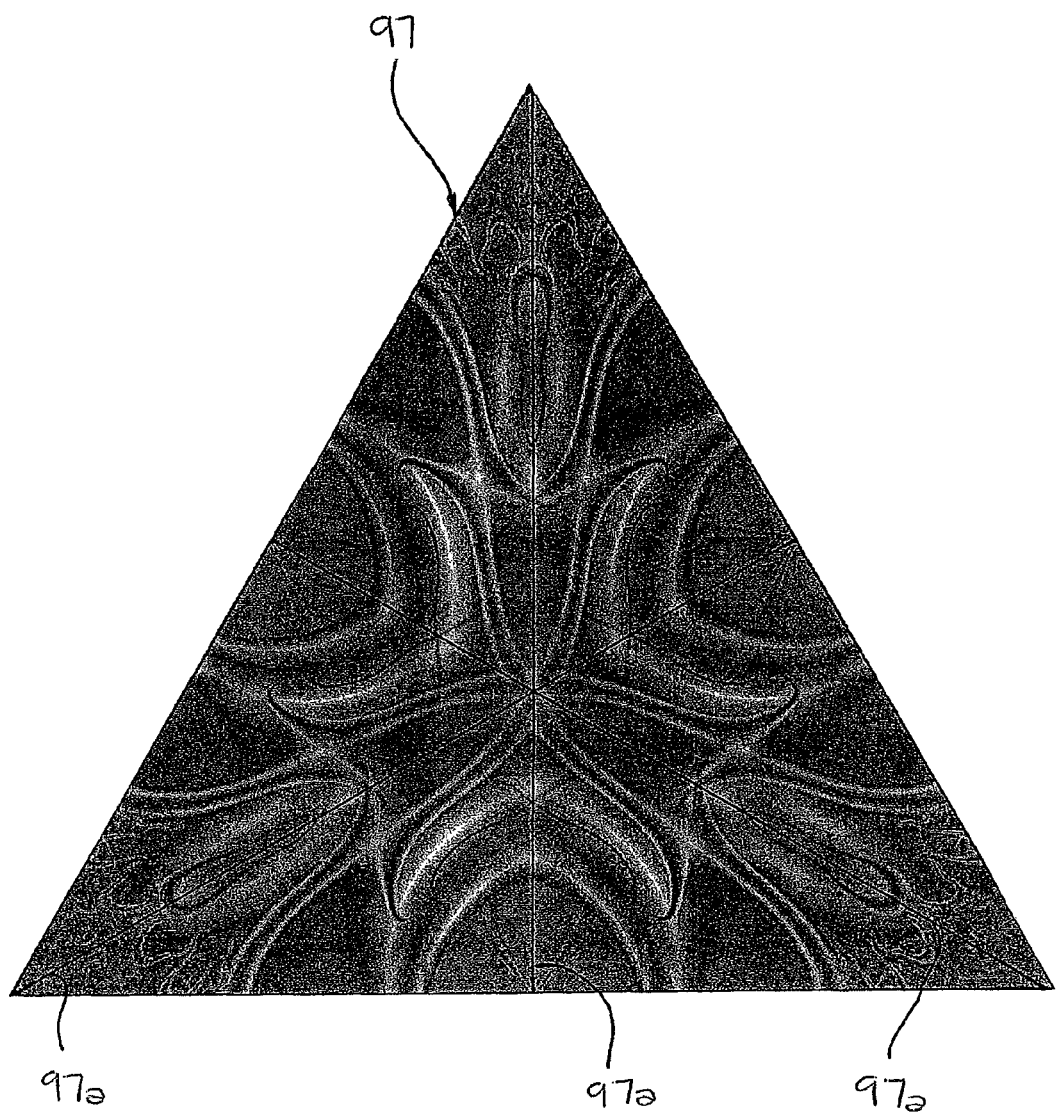
FIG. 61 is a view of another source image.
Figure 62:
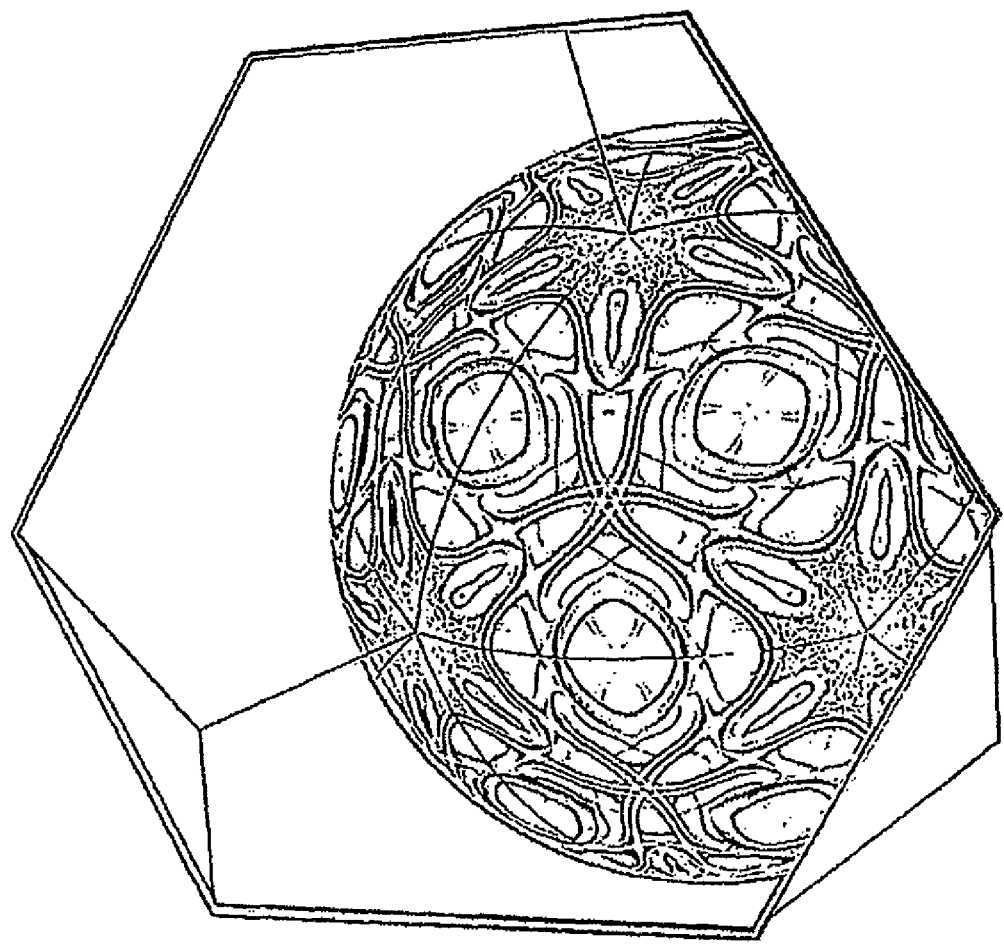
FIG. 62 is a perspective view of the apparatus shown in FIG. 2 with the source image of FIG. 61 projected thereon.
Figure 63:
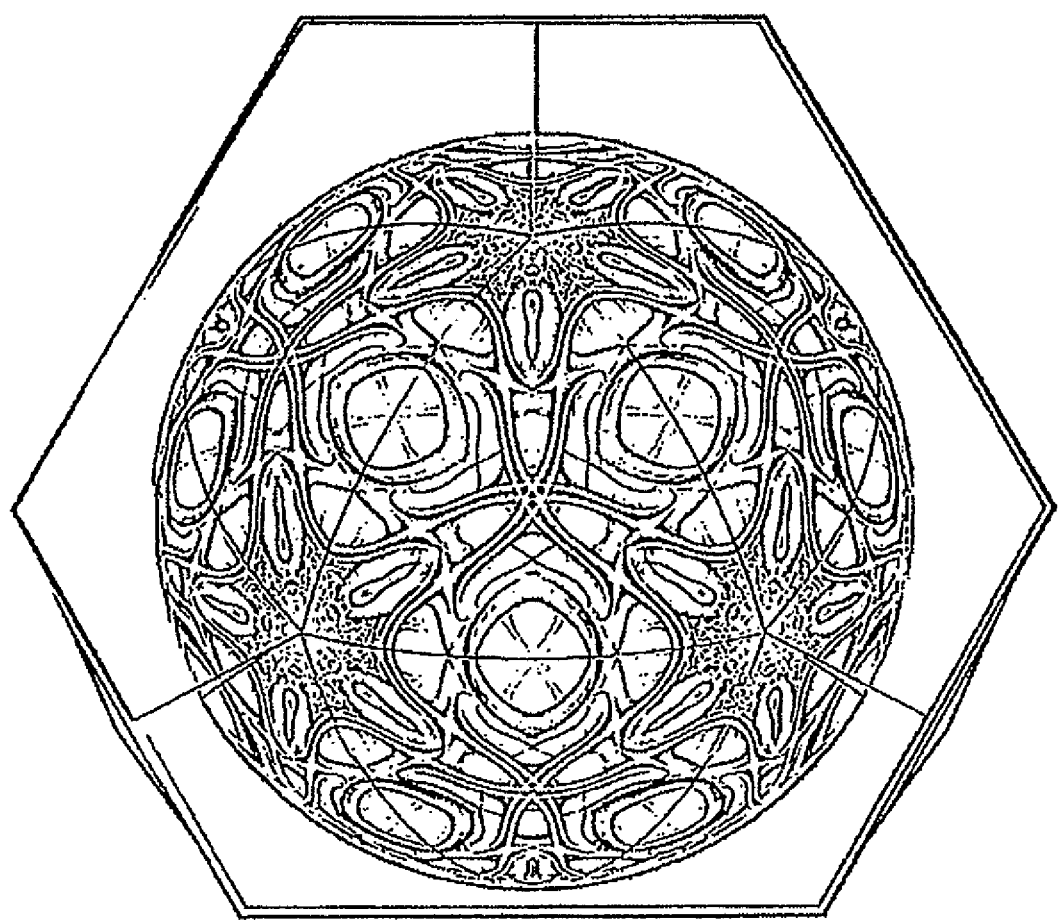
FIG. 63 is another perspective view of the apparatus shown in FIG. 2 with the source image of FIG. 61 projected thereon.
Figure 64:
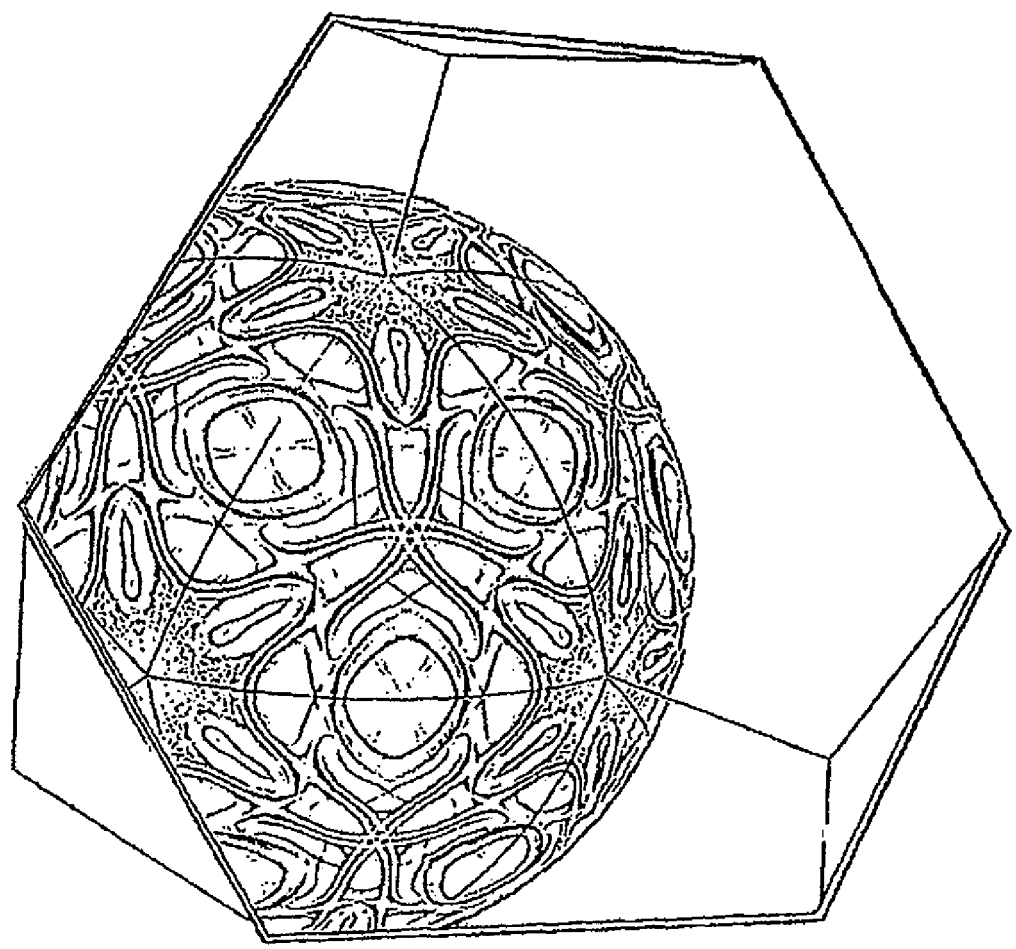
FIG. 64 is another perspective view of the apparatus shown in FIG. 2 with the source image of FIG. 61 projected thereon.

Another source image 97 created by the above method is shown in FIG. 61, and the appearance of the virtual sphere produced by the apparatus when the source image 97 is projected thereon is shown in FIGS. 62 to 64. Again, it can be seen that the source image 97 is symmetrical about the lines 97a extending from each vertex to the mid-point of the opposite side of the triangular screen, corresponding to the lines of icosahedral symmetry when the triangular screen is superimposed on the illusionary virtual spherical object to be created.

As described above, the fundamental domain method has to be obeyed for the shape of the screen as well as for any pattern or source image displayed on the screen. Therefore, the rule of repeating the fundamental domain within the source image is also applied to the shape of the screen. As long as the rule of repeating the fundamental domain is applied then the screen can have any curvature, meet with any other fundamental domain at any angle or even exhibit any gradient of optical properties.

It will therefore be understood that with a source image derived from a fundamental domain wherein the image contained by the fundamental domain has been rotated and reflected to generate a source image for projection on the screen, the overall apparent image generated as seen combining the "original" and "reflected" portions will appear to remain constant for every viewing angle. Further, the symmetrical pattern will not alter as the viewing angle is changed and will appear to remain constant. Indeed, even if the viewer was stationary, if the source image is not created following the above-described fundamental domain method, the apparent surface pattern of the illusionary 3D object would not appear to match up and would have abrupt changes in surface image/pattern, thereby making it impossible to achieve the illusion of a solid 3D object and making it obvious that the illusion was merely a set of reflections of a source image.

Therefore, the combination of the apparatus together with the selection of the fundamental domain and the generated source image formed therefrom allows the illusion of a three dimensional kaleidoscopic image of a polyhedron or sphere to be viewed by many observers simultaneously, from different angles, and each viewer would see the same shape, image and pattern formed thereon, regardless of the viewing angle.

The advantage of using such a method of creating a source image is that the illusion of a physically accurate, continuous and seamless image pattern over the entire virtual and original portions of the image of the virtual polyhedron is maintained at all times, with out any discontinuities. Lines of the image approaching the edge of the source image approach the edge at a perpendicular angle to the edge.

Figure 65:
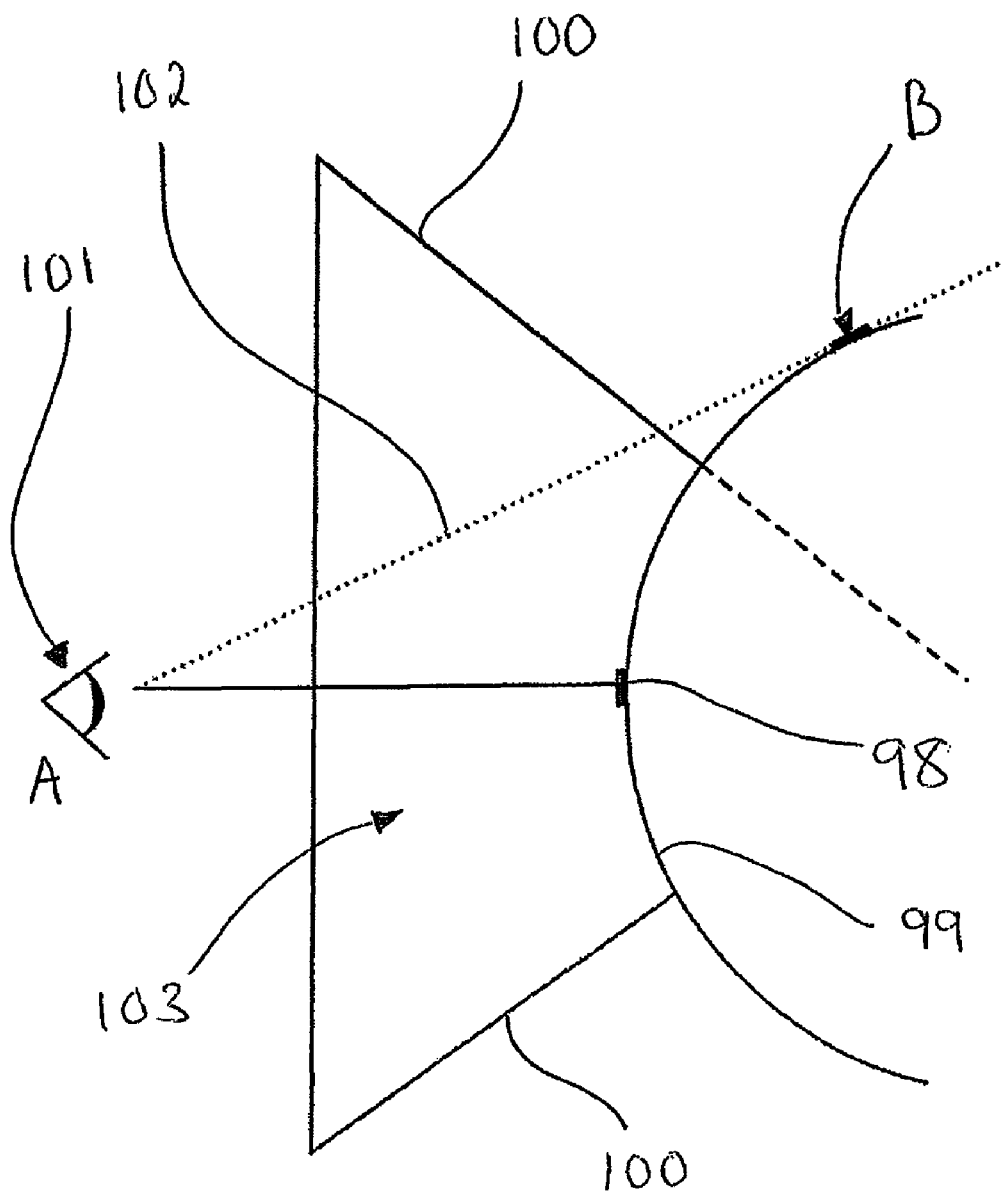
FIG. 65 is a cross sectional side view of the apparatus shown in FIG. 2 showing a perceived reflection in a mirror.

Another exemplary embodiment is shown with reference to FIG. 65. This exemplary embodiment is substantially the same as the first embodiment described above, however in this embodiment a logo, image or alternative pattern or text 98 is formed on a screen 99 relative to the apparent centre of the source image formed on the screen 99. Due to the alignment of reflective surfaces 100 relative to the screen 99, there is formed a central region in which the screen which, when reflected in the reflective surfaces 98, is not distorted as much as the rest of the screen near the edges thereof, or is not distorted at all. When an observer 101 views the image from a position A, they can see the logo etc. formed on the screen 99. When the image is reflected, that apparent reflection of the portion of the screen containing the logo would be produced at position B, and would be distorted very little. This allows a certain degree of freedom from the rules of fundamental domain screen compositing described above, and so allows certain non-symmetrical images to be placed there and which may be repeated in reflections without spoiling the overall illusion of a continuous solid object. Such examples of this are shown in FIGS. 126-130.

Due to a different portion of the screen 99 being reflected in the reflective surface 100 dependent on the point of view of the observer 101 relative to a viewing opening 103 of the apparatus 3, then in a further embodiment the viewing boundaries are limited. In one embodiment the cover (not shown) contains an opaque region around the outer regions of the cover relative to the reflective surfaces 100 such that the viewable points of any possible observers are defined to retain the above effect. Alternatively, the viewing angles may be limited by adequately positioning, rotating and scaling the optical device inside a particular space.

Such a portion of the screen may be used to write some text, display a brand name and logo, or place any image without compromising the overall constancy of the final illusion of a three-dimensional kaleidoscopic image.

A further advantage of the apparatus and method of generating a source image to be generated on the screen, particularly through the generation of an apparent polyhedral object is that the projected image is not simply a reflection of the source image along a horizontal and vertical alignment but it is rotated and reflected about a number of angles to generate a more kaleidoscopic effect, wherein each reflection and rotation has a different alignment relative to an adjacent one such that it is more difficult to recognise them as mere copies and reflections of the central screen, thereby enhancing the effect of a continuous, seamless surface pattern on the resulting apparent 3D image, and not simply being a series of vertical and horizontal tiling of the same image.

Figure 66:
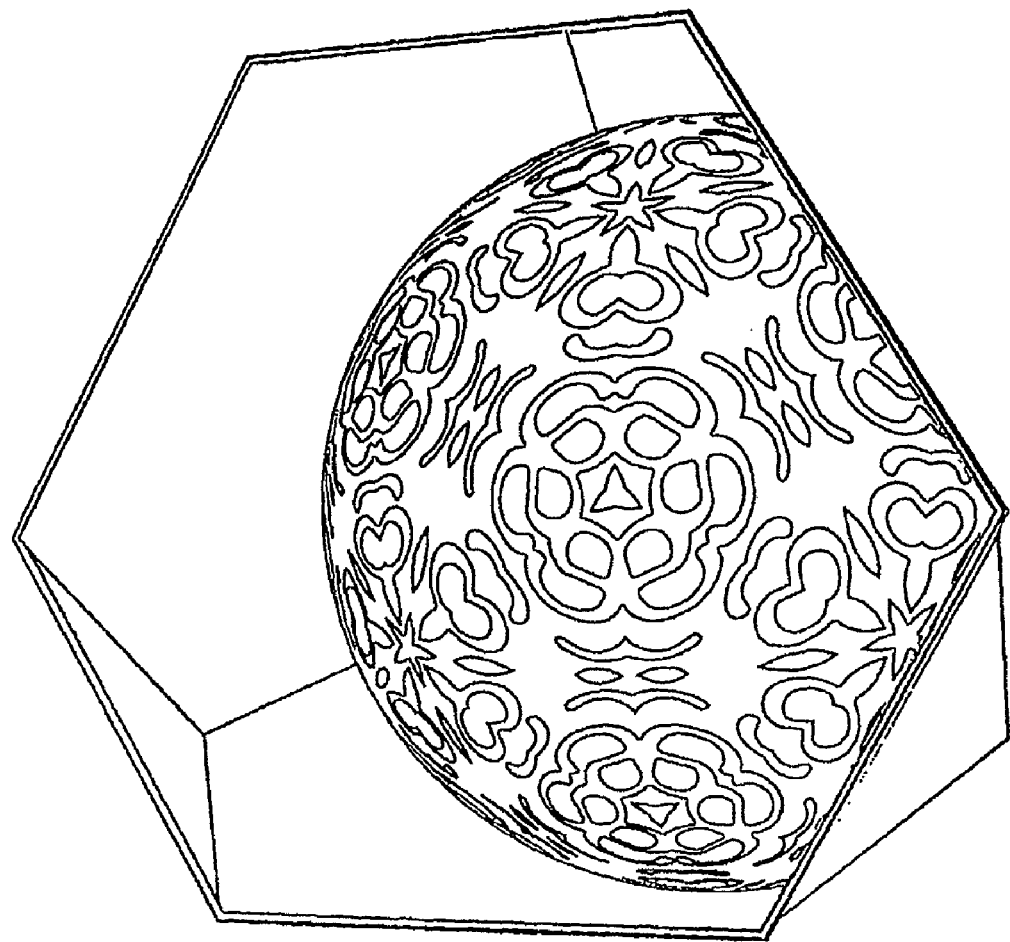
FIG. 66 is a perspective view of the apparatus shown in FIG. 2 showing an illusion of a three dimensional kaleidoscopic image using a source image of FIG. 69.

A method of producing a source image for projection on an apparatus according to the embodiments to minimise the sight of joints between the image formed on the screen and the reflected image in a reflective surface will now be described with reference to FIGS. 66 to 125.

Figure 67:
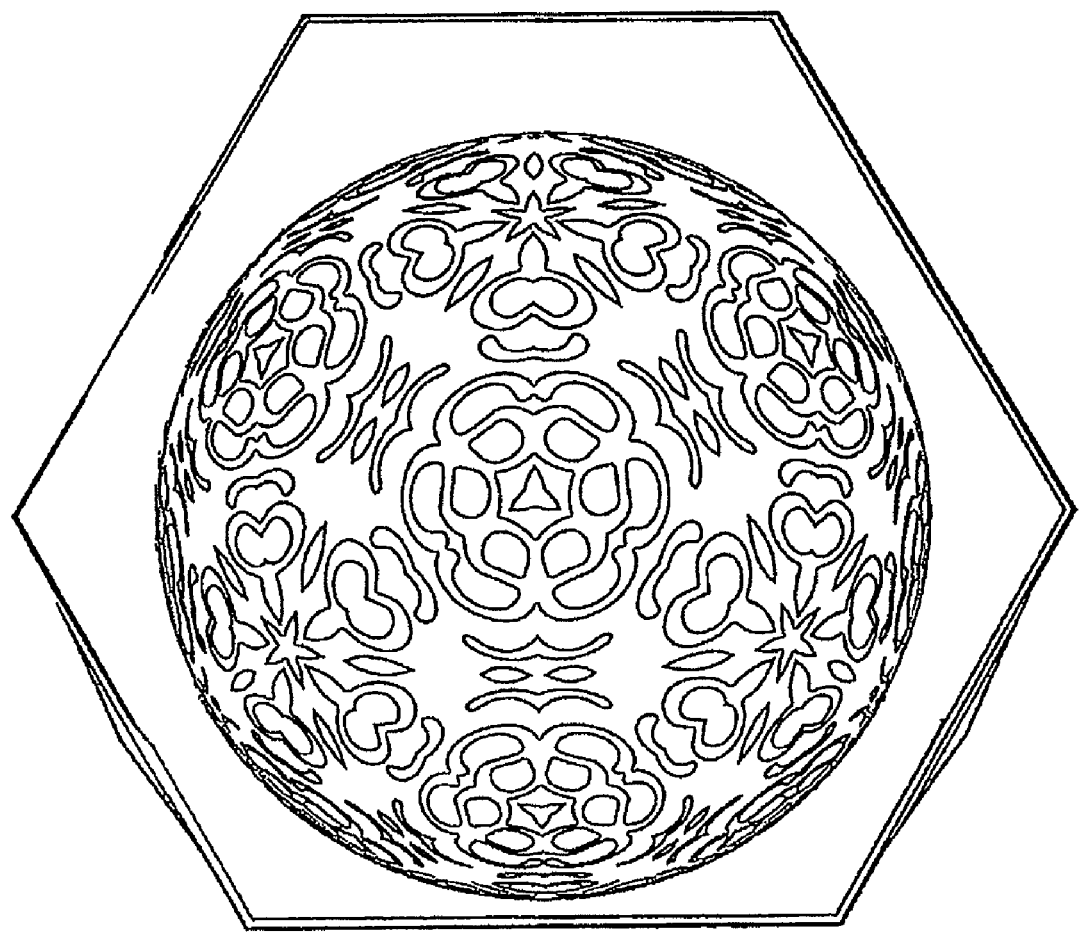
FIG. 67 is another perspective view of the apparatus shown in FIG. 2 showing an illusion of a three dimensional kaleidoscopic image using a source image of FIG. 69.
Figure 68:
FIG. 68 is another perspective view of the apparatus shown in FIG. 2 showing an illusion of a three dimensional kaleidoscopic image using a source image of FIG. 69.
Figure 69:
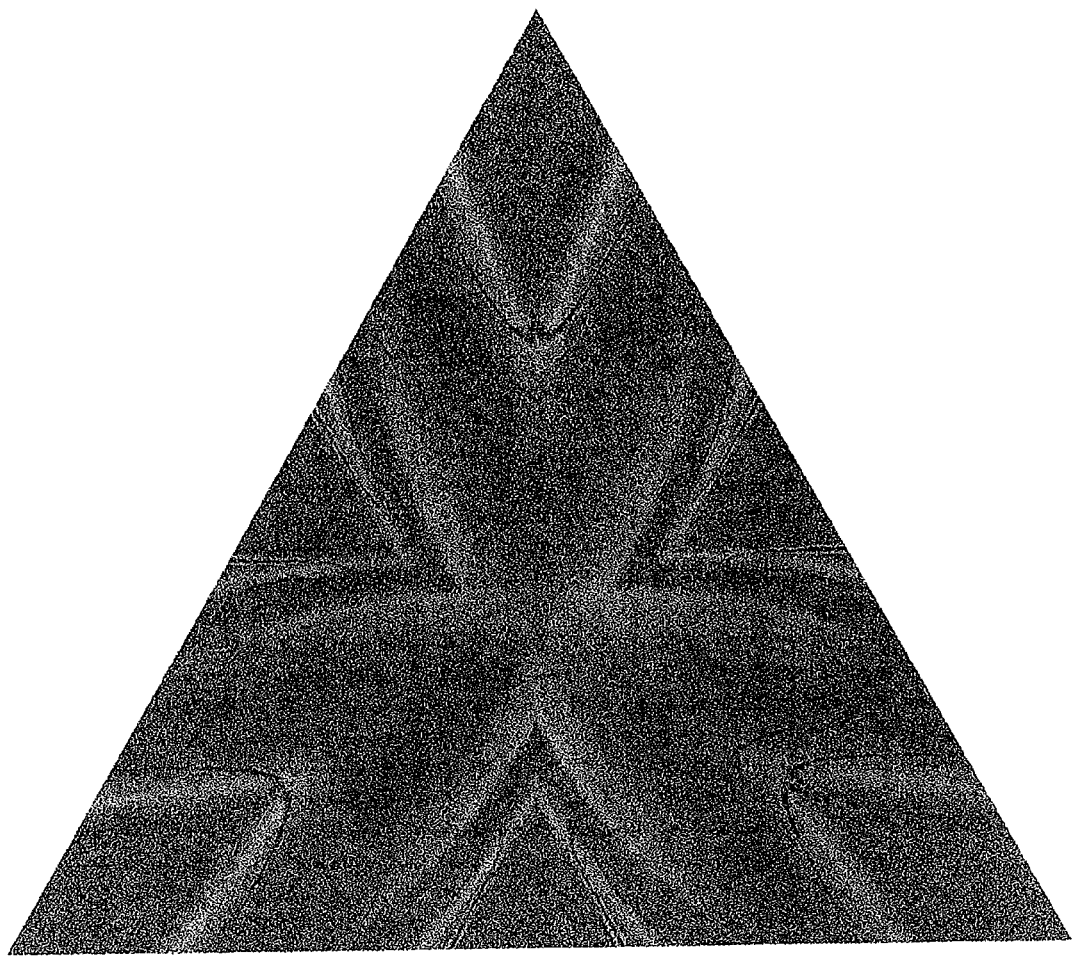
FIG. 69 is a view of the source image of FIGS. 66-68.

In a position in which a discrete fundamental domain is a transposed or rotated one placed to form part of the source image and in a position in which a discrete fundamental domain forming part of the source image is aligned along an edge of the screen when projected thereon and reflected by a reflective surface it is clear where they meet as the joints are visible. It is therefore desirable to have a means to merge or combine such images which have been rotated and reflected so as to mask any visible joints such that the virtual image produced appears to be continuous without any joint lines. FIGS. 66 to 68 show an example of a virtual sphere produced by the apparatus wherein joints between adjacent fundamental domains are clearly shown. The source image 106 relating to the virtual sphere shown in FIGS. 66 to 68 is shown in FIG. 69.

Such a joint is obvious when there is an abrupt change in the angle of a line curve or any shape at a boundary of a fundamental domain. This results in a shape discontinuity that clearly reveals the location of the reflective planes of symmetry.

The method provides a means of blending a shape smoothly with their adjacent mirrored neighbour, to generate an image that has a continuous or gradual change of form when it intercepts a reflective surface or the limits of the fundamental domain at a non-perpendicular or tangent angle.

Figure 70:
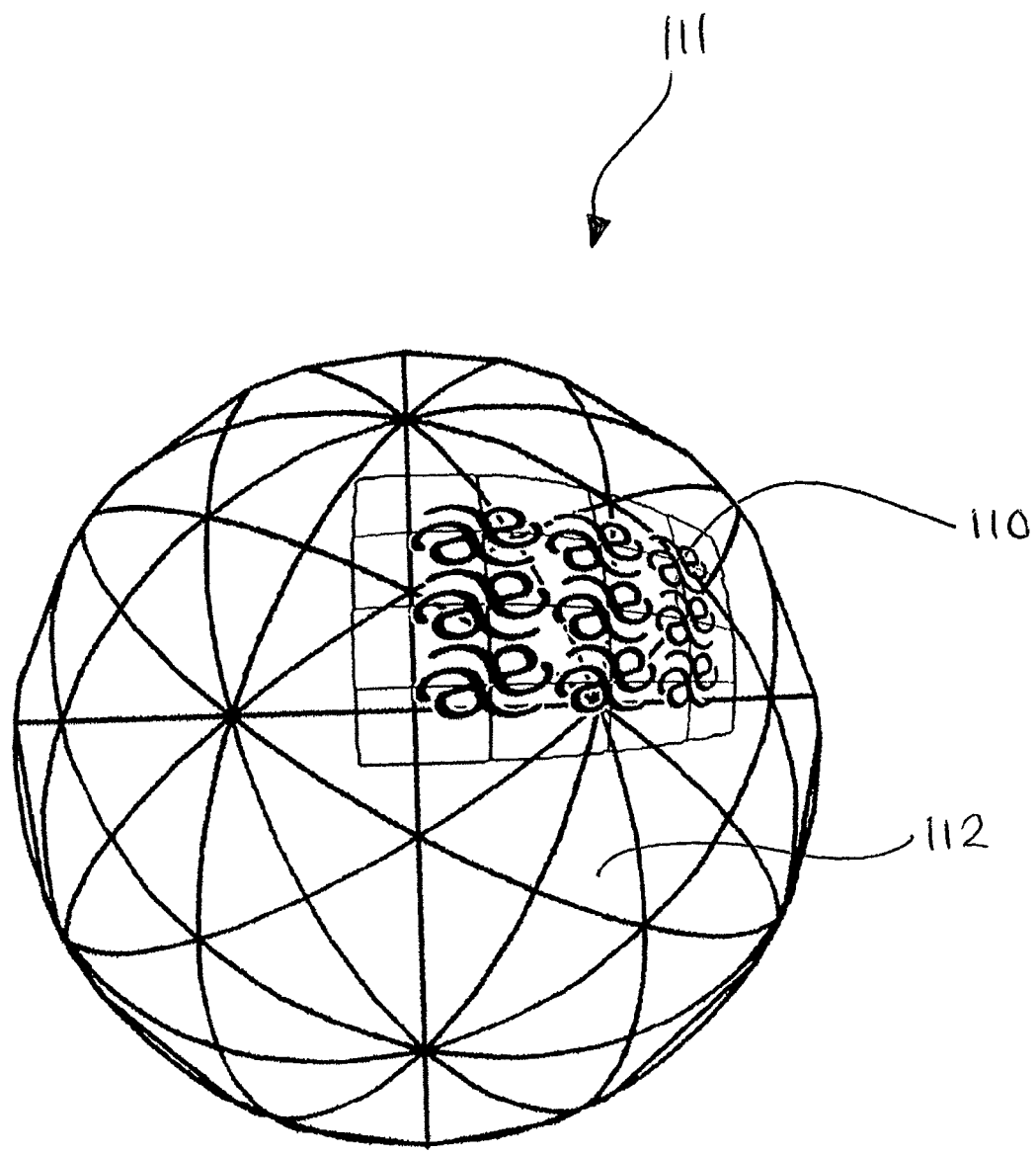
FIG. 70 is an image transcribed into a sphere and the icosahedral group symmetry lines.
Figure 71:
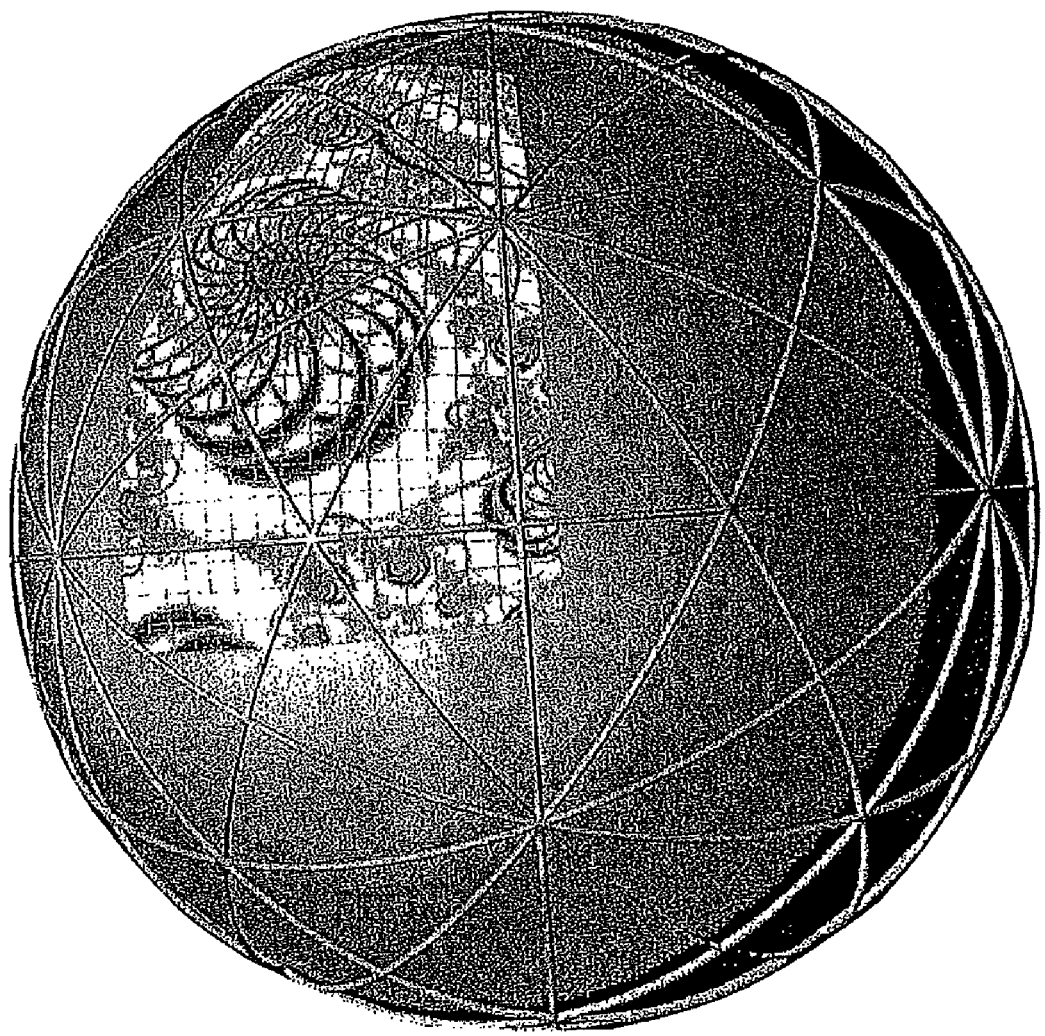
FIG. 71 is another image transcribed into a sphere and the icosahedral group symmetry lines.
Figure 72:
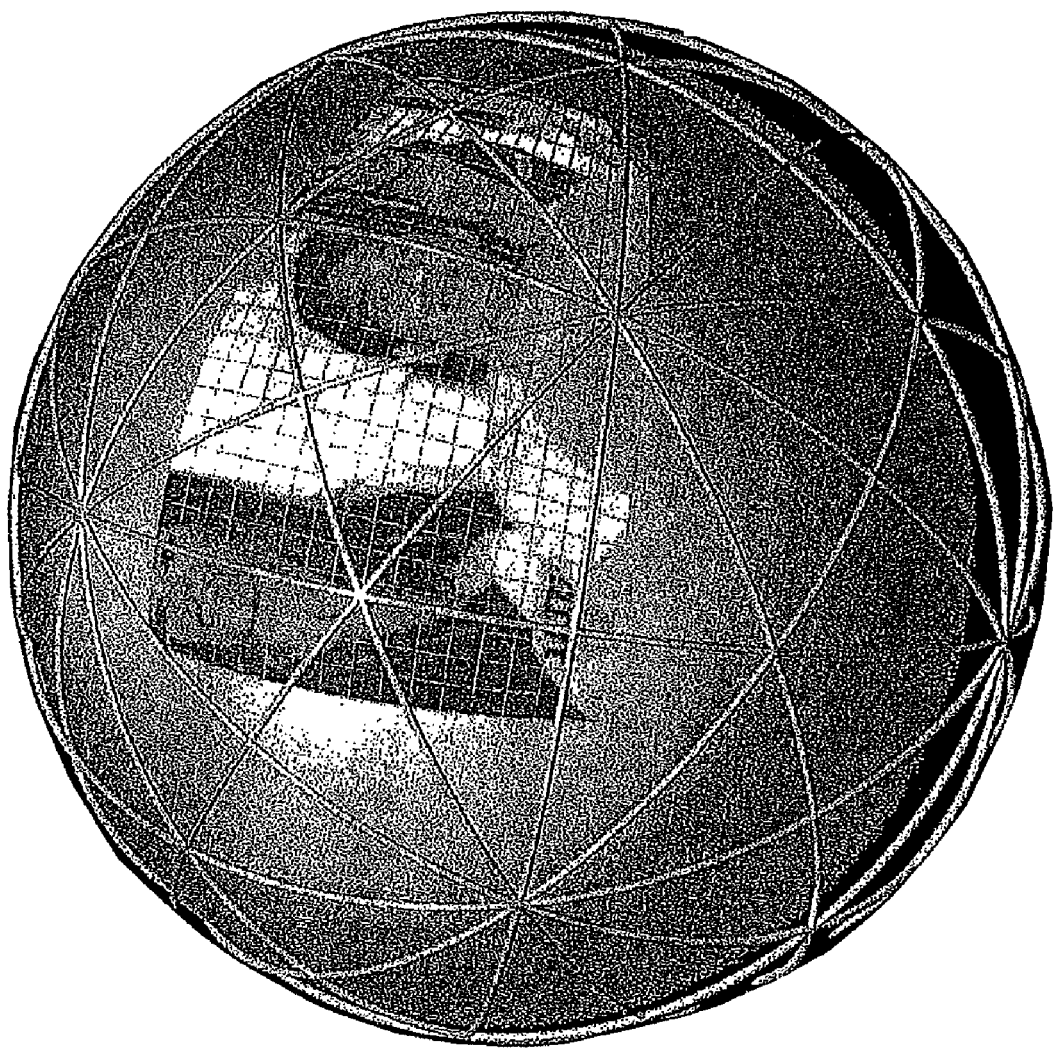
FIG. 72 is another image transcribed into a sphere and the icosahedral group symmetry lines.

Operation of the method to blend a shape smoothly with their adjacent mirrored neighbour will now be described. The embodiment relates to a method to produce an illusion of a sphere in the above described apparatus, although it will be understood that the method may be conducted with respect to any other shape with icosahedral group symmetry. FIGS. 70 to 72 show an image 110 transcribed onto a surface of a sphere 111 and the planes of symmetry for icosahedral group symmetry mapped thereon to show the Moebius triangles, which each represent a discrete fundamental domain 112 as discussed above.

Figure 73:
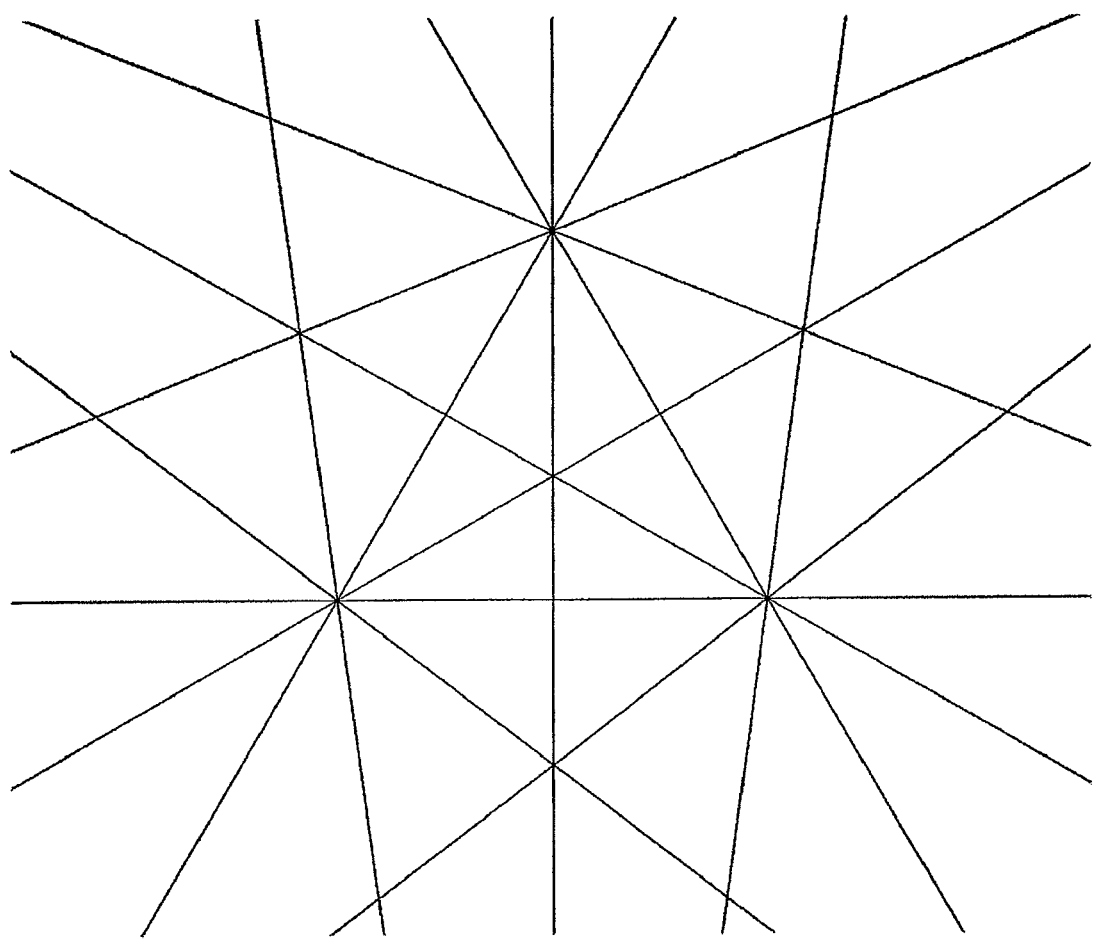
FIG. 73 shows an icosahedral group projected from the centre of a polyhedron onto the inside face of a virtual sphere.
Figure 74:
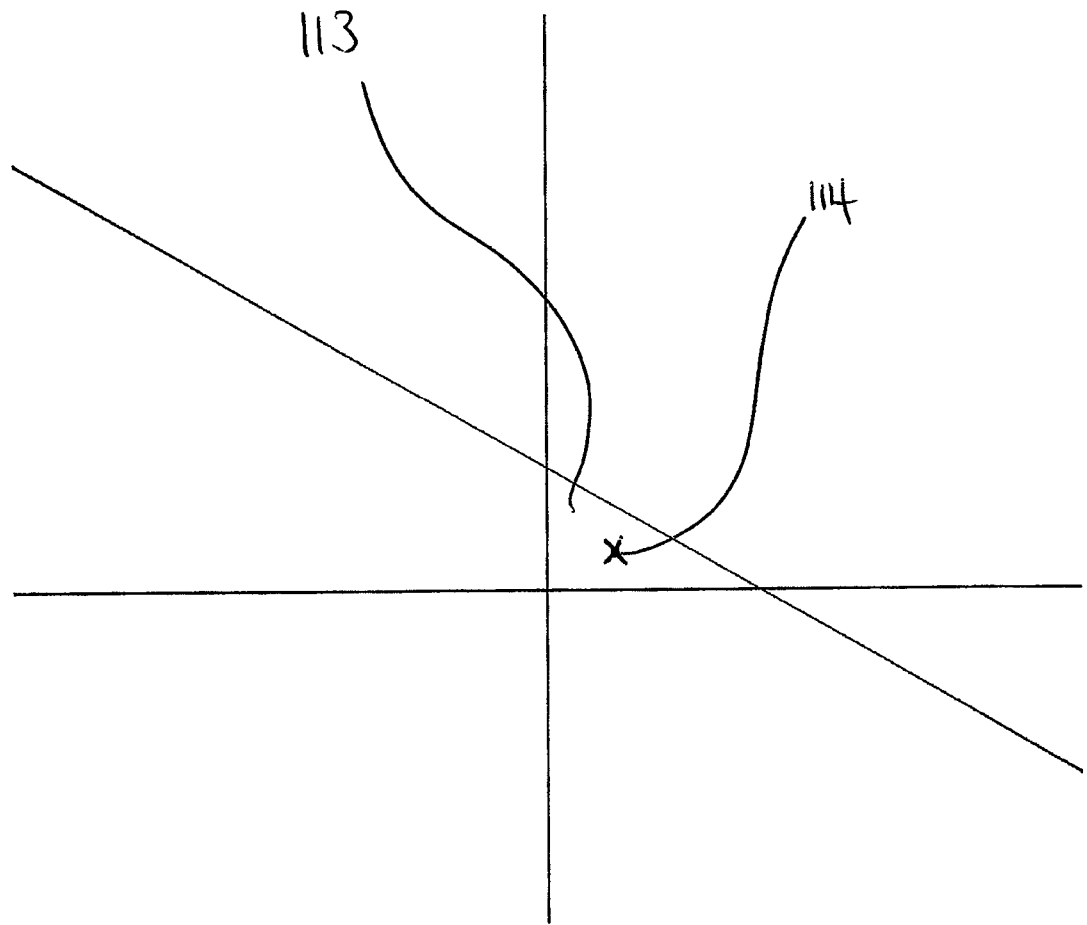
FIG. 74 shows a single fundamental domain of FIG. 73.

FIG. 73 shows an illustration of the icosahedral group projected from the centre of the polyhedron onto the inside faces of a virtual sphere so that the fundamental domain contours are shown as straight lines, with a single fundamental domain 113 shown in FIG. 74.

Figure 75:
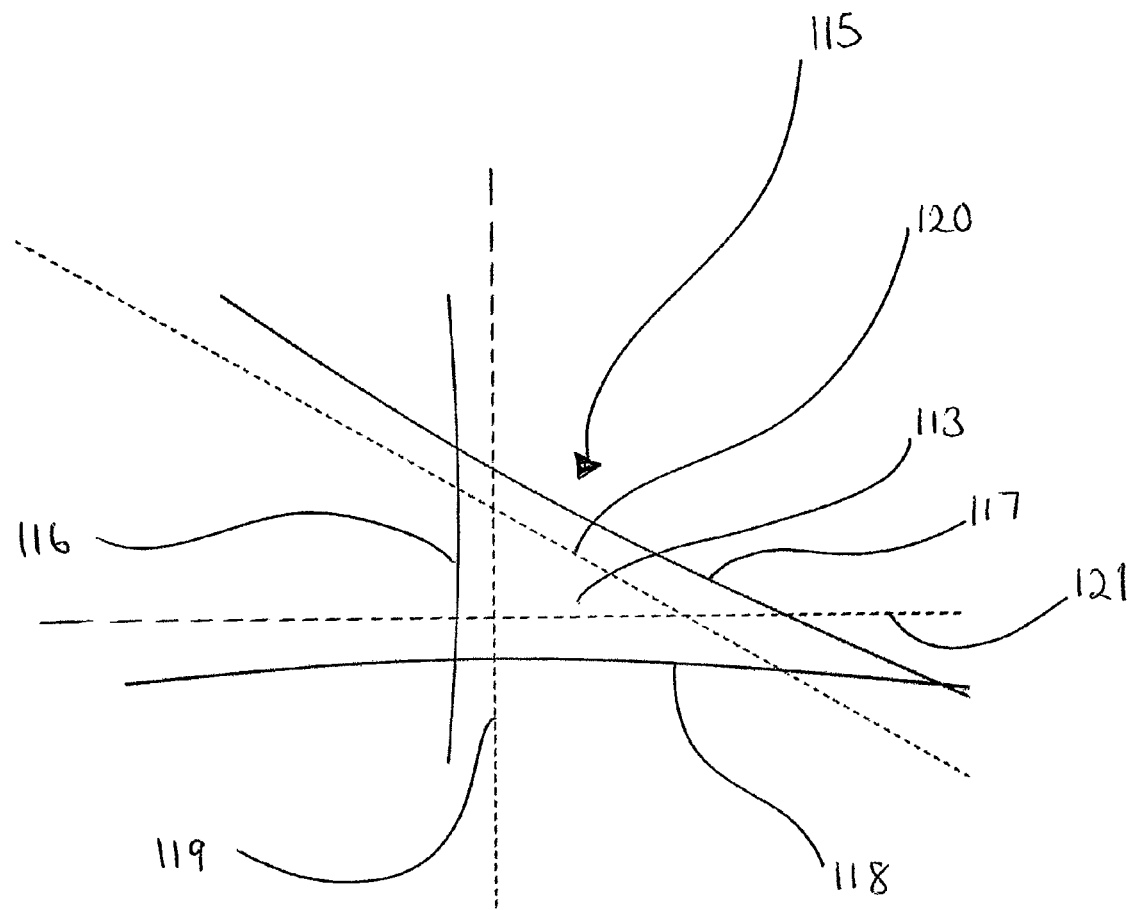
FIG. 75 shows an enlarged triangle relative to the fundamental domain triangle of FIG. 74.
Figure 78:
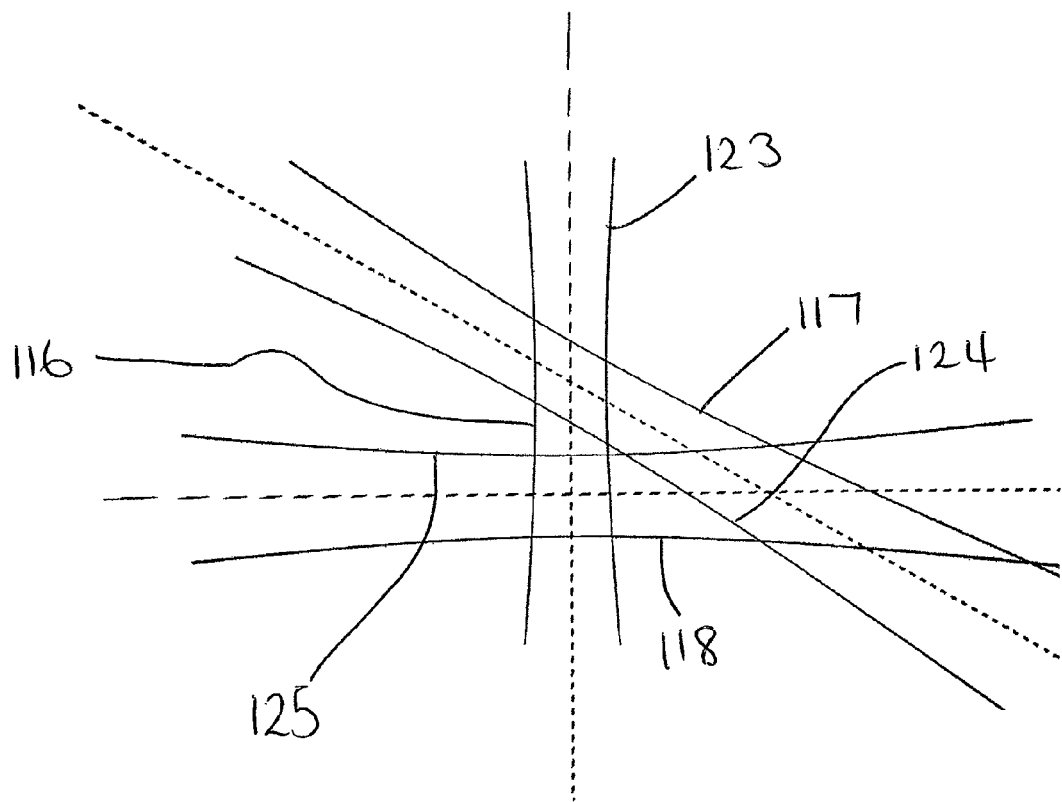
FIG. 78 shows the inner margin superimposed onto FIG. 75.

A projected centre 114 of the single fundamental domain is determined by bisecting each vertex angle of the triangle representing the fundamental domain 113. This defines the point at which the perpendicular distance from each side is equal. An enlarged triangle 115, representing an outer margin, is then formed such that the sides 116,117,118 of the enlarged triangle 115 are spaced from the sides 119,120,121 of the triangle representing the fundamental domain 113 by this perpendicular distance. An illustration of the enlarged triangle 115 relative to the triangle representing the fundamental domain 113 is shown in FIG. 75. As the sides 116, 117,118 of the enlarged triangle 115 are parallel to the sides 119,120,121 of the triangle representing the fundamental domain 113 they are shown as curved due to the projection shown in FIG. 73. Although in this embodiment the perpendicular distance is defined by the projected centre 114, it will be understood by a skilled person that the invention is not limited thereto and that the projected centre represents the maximum distance and that an inner margin 123,124,125 may be defined which is symmetrical to lines 116,117,118 of the enlarged triangle 115 about the sides 119,120,121 of the triangle representing the fundamental domain 113. The perpendicular distance of the inner margin to the sides of the triangle may therefore range from almost touching the sides 119,120,121 of the triangle representing the fundamental domain to the projected centre 114 (refer to FIG. 78).

Figure 76:
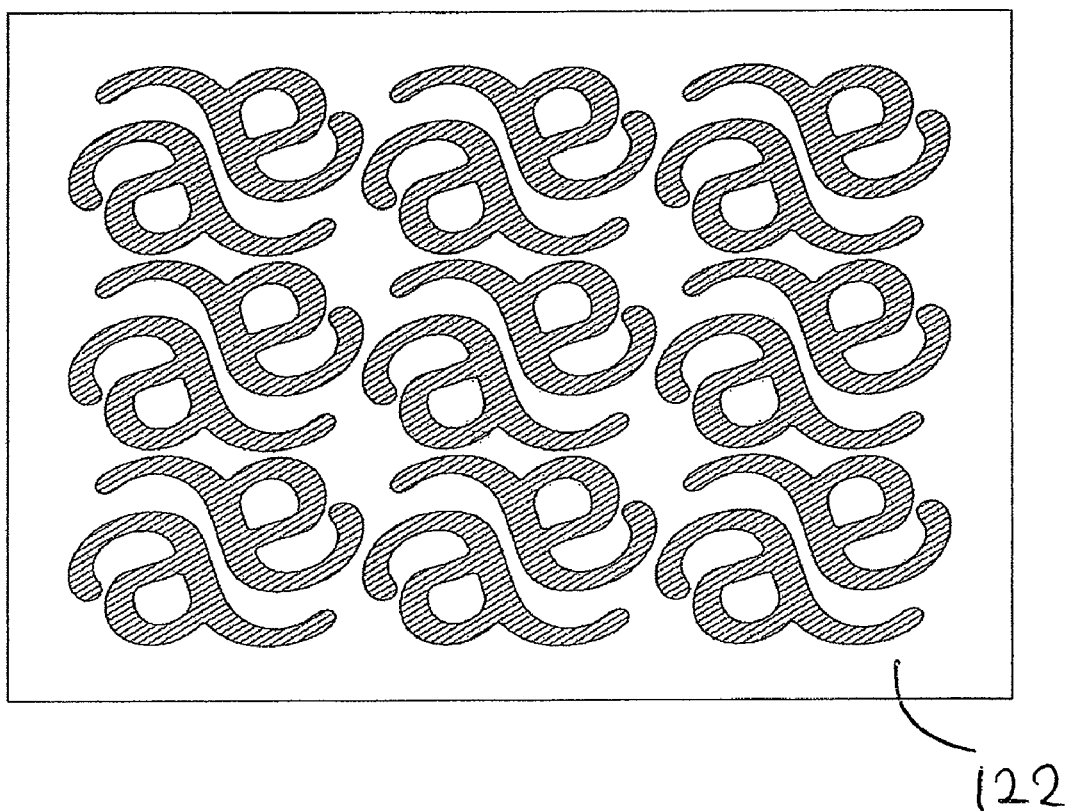
FIG. 76 is a proposed image to be mapped onto an enlarged triangle of FIG. 75.
Figure 77:
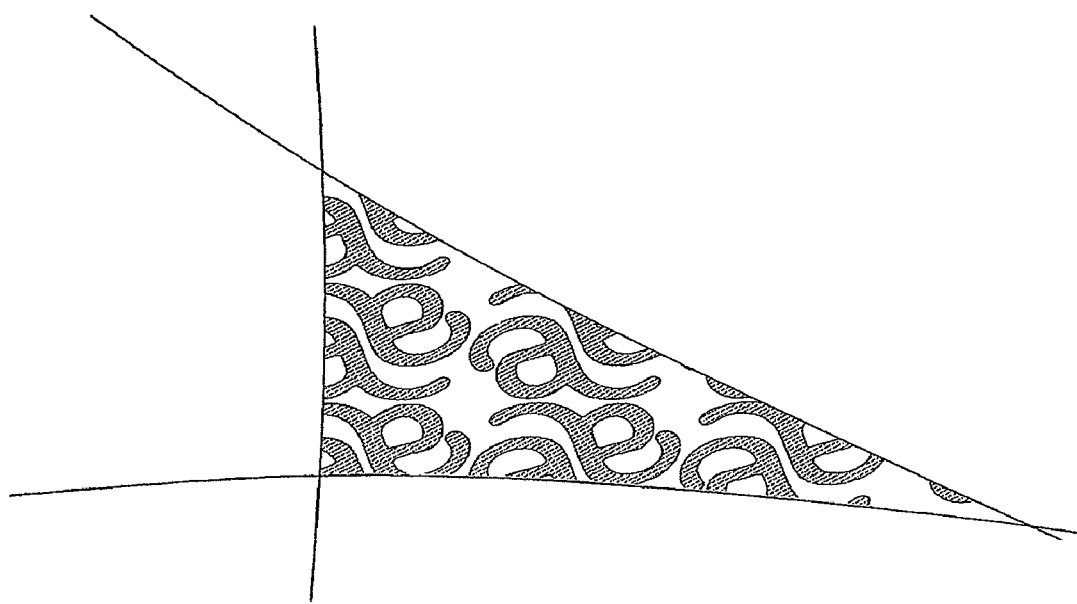
FIG. 77 shows the image of FIG. 76 mapped onto the enlarged triangle of FIG. 75.
Figure 79:
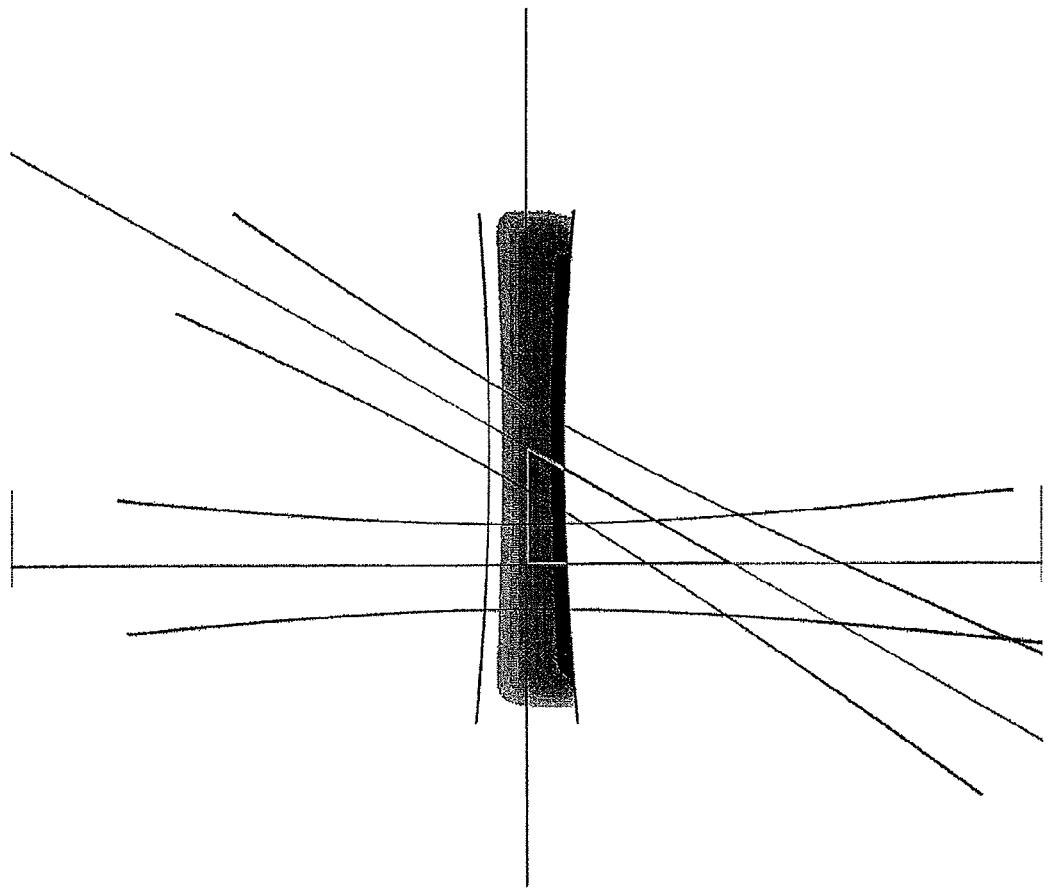
FIGS. 79-81 show the lines of graduated translucency of an image along the lines of the triangles of FIG. 78.
Figure 80:
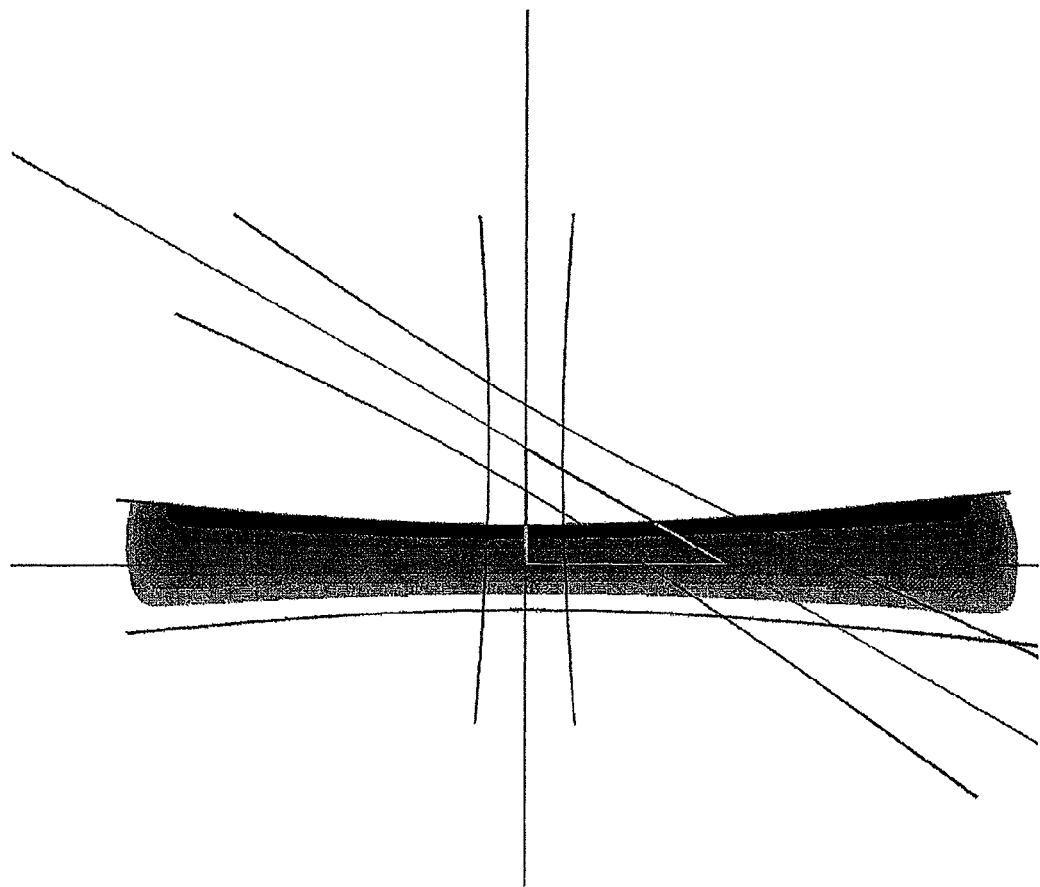
Figure 81:
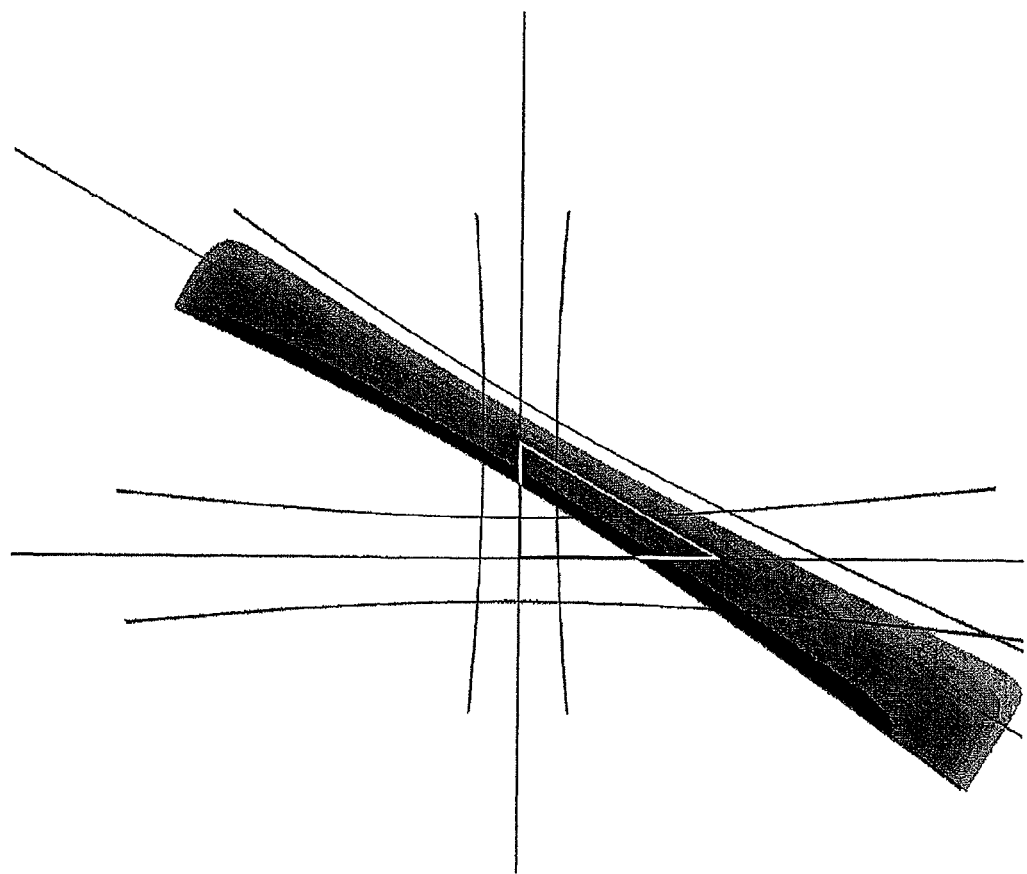
Figure 82:
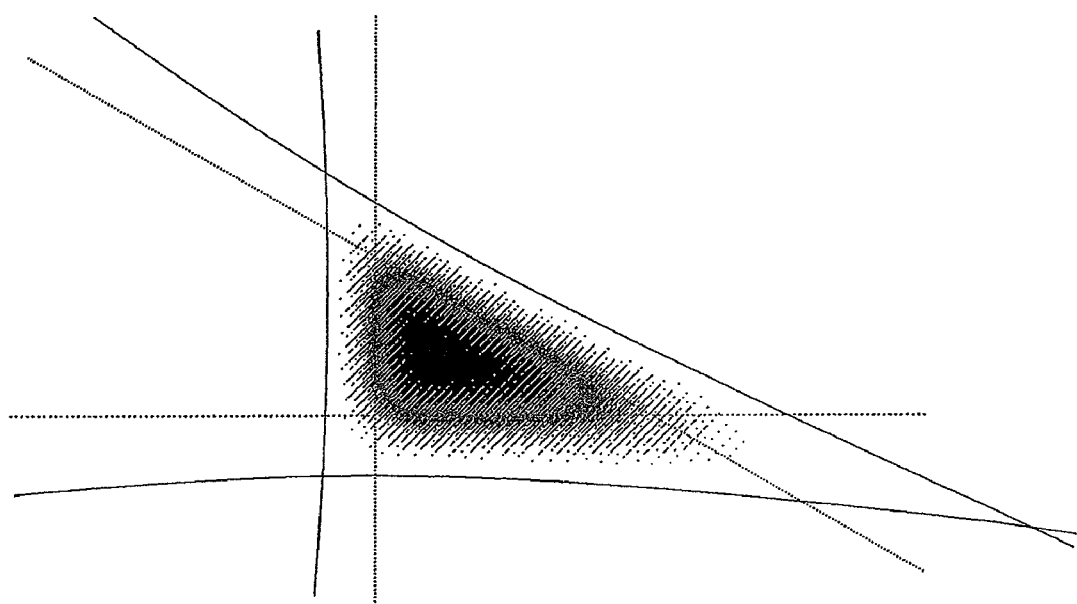
FIGS. 82 and 83 show the overall graduated translucency of an image of FIGS. 79-81.
Figure 83:
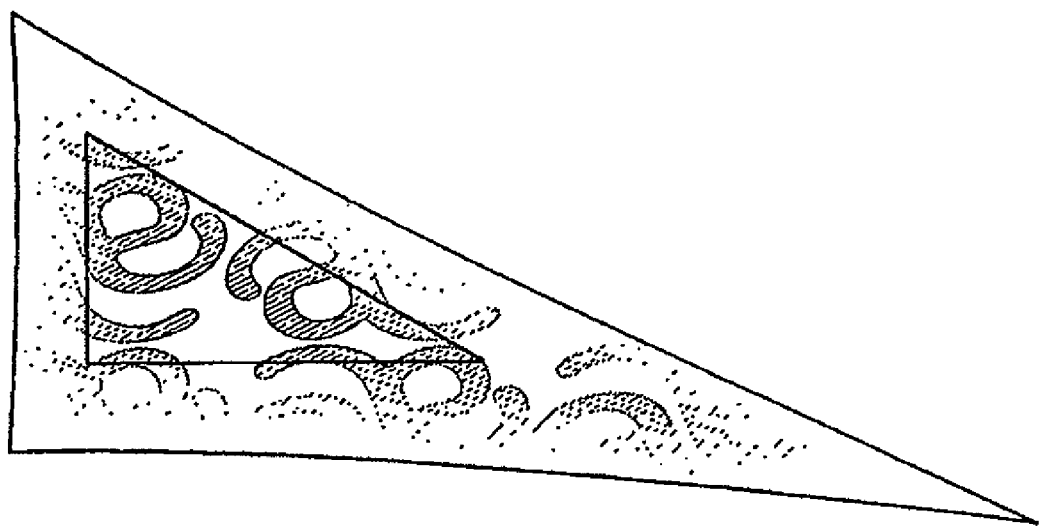

A proposed image 122, (an example of such an image is shown in FIG. 76), is then mapped on the enlarged triangle or outer margin 115 and triangle representing the fundamental domain 113 defined thereon (refer to FIG. 77). An inner margin is then formed by lines 123,124,125 which are symmetrical to the lines 116,117,118 of the enlarged triangle 115 about the sides 119,120,121 of the triangle representing the fundamental domain 113 (refer to FIG. 78). The translucency of the image 122 is then graduated between the inner margin represented by lines 123,124,125 and the outer margin represented by the enlarged triangle 115, as shown in FIGS. 79 to 81. The translucency of the image 122 is graduated between fully opaque relative to the inner margin and fully transparent relative to the outer margin, as shown in FIGS. 82 and 83.

The transparency gradient is determined by a function which, when composed with the other gradients does not distort the angle at which any line in the fundamental domain meets with the limits.

The translucency of the image at any given point, or each independent stripe, is calculated by:

$$A = \frac{1 + \cos(d)}{2}$$

Figure 84:
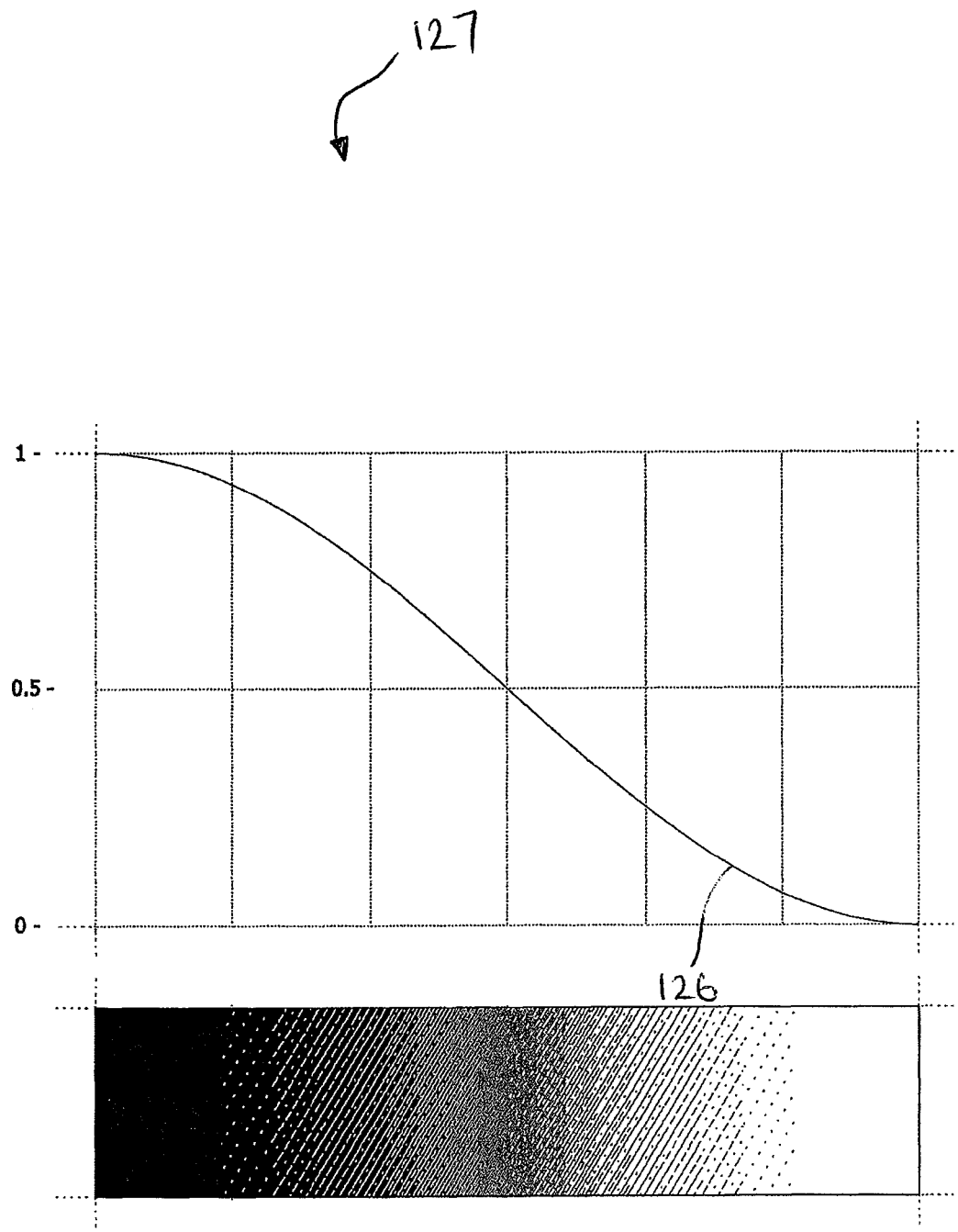
FIG. 84 is a graph showing the translucency gradient function of the image of FIGS. 82 and 83.

Wherein, 'A' is the translucency, 'd' is the distance from the centre of the image or each inner margin outwards, scaled to appear as 0 degrees in the centre or inner margin, 90 degrees at the inner triangle limit or edge of the fundamental domain and 180 degrees at the outer triangle limit. This is shown in FIG. 84, wherein a plot 126 of the above formula is shown and an illustration of the translucency 127 wherein opaque is illustrated as white and transparent as black. Further, 'd' is defined perpendicular to the inner margin.

Figure 85:
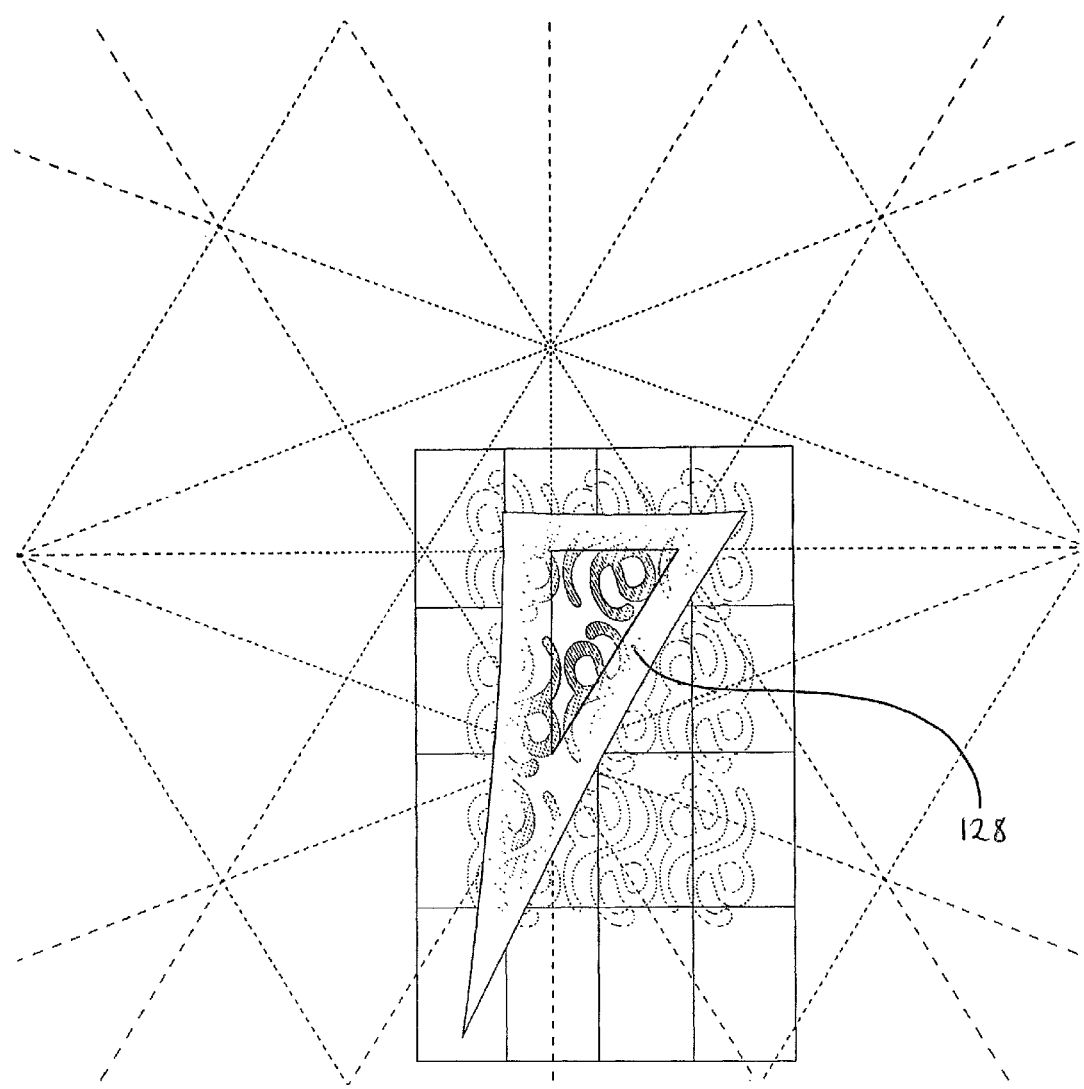
FIG. 85-98 show the transposed and rotated graduated image forming further fundamental domains.
Figure 86:
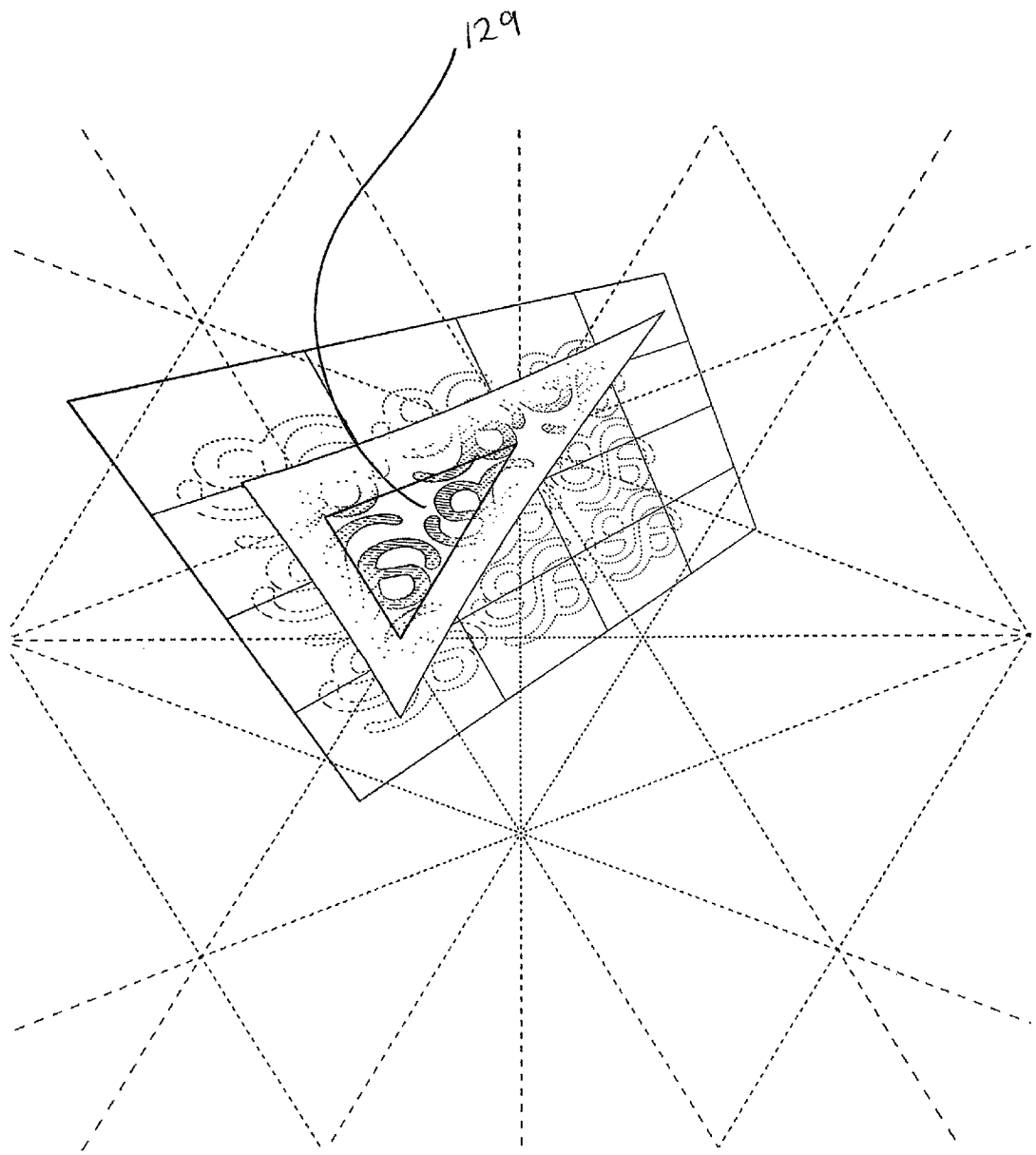
Figure 87:
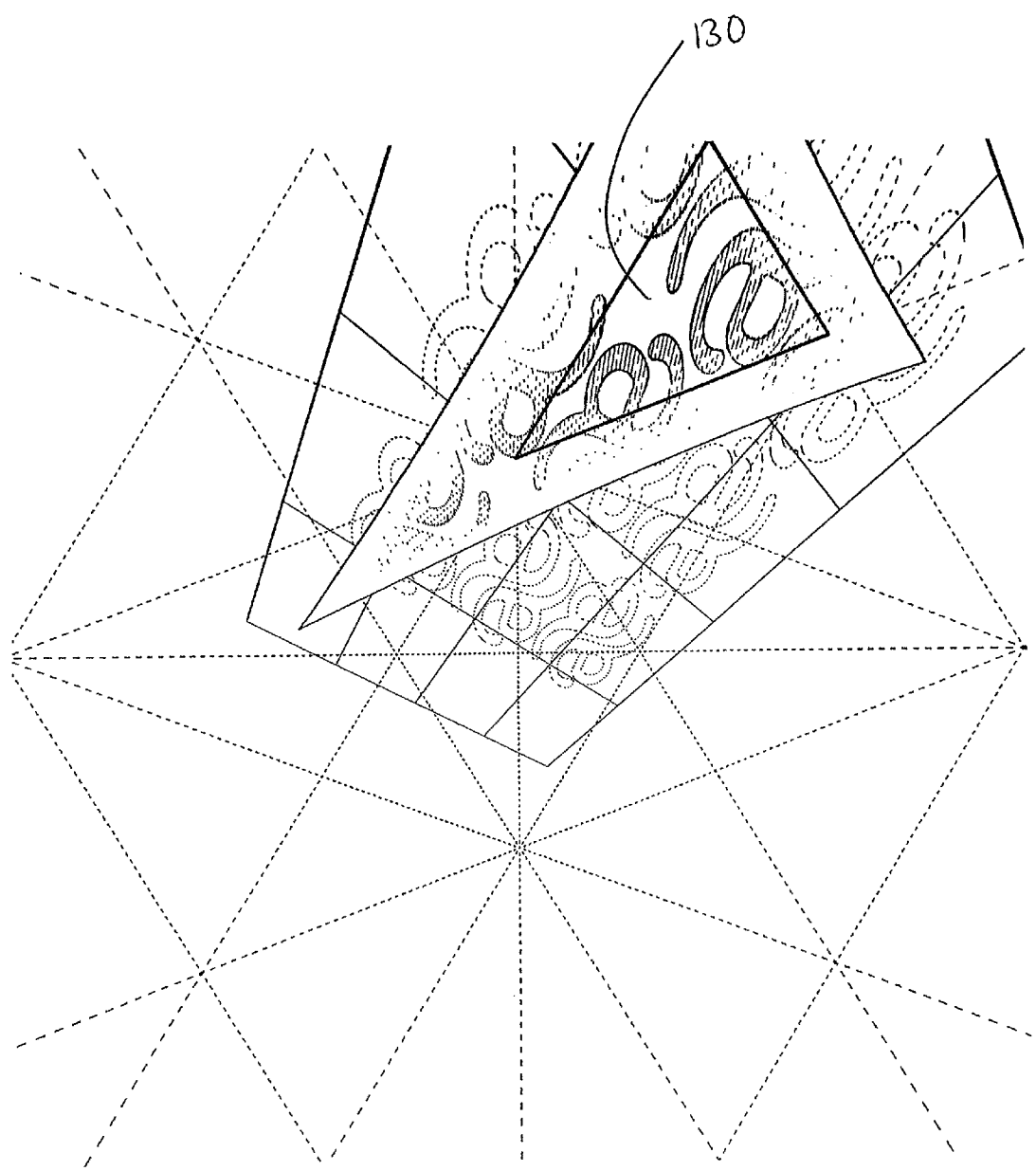
Figure 88:
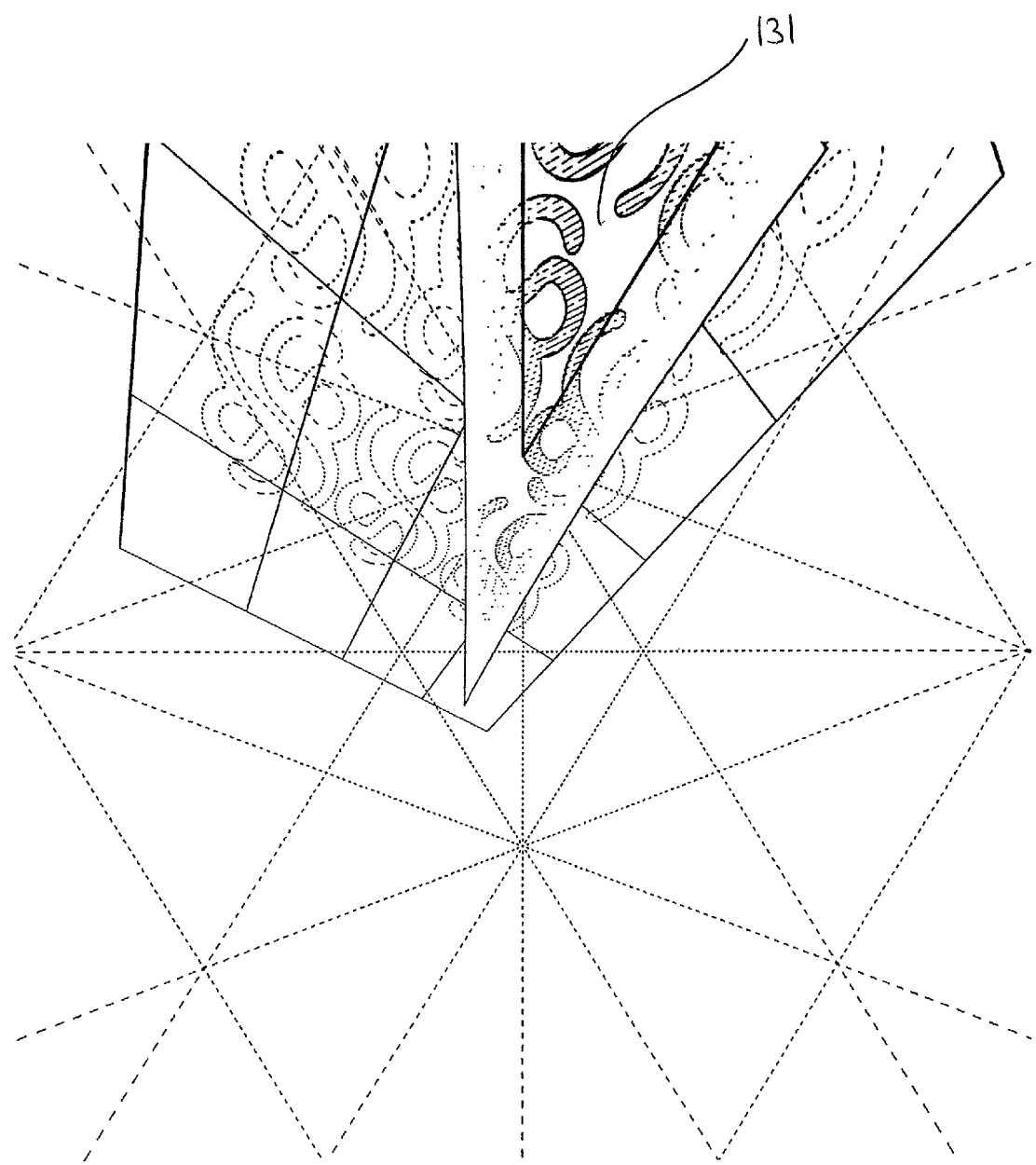
Figure 89:
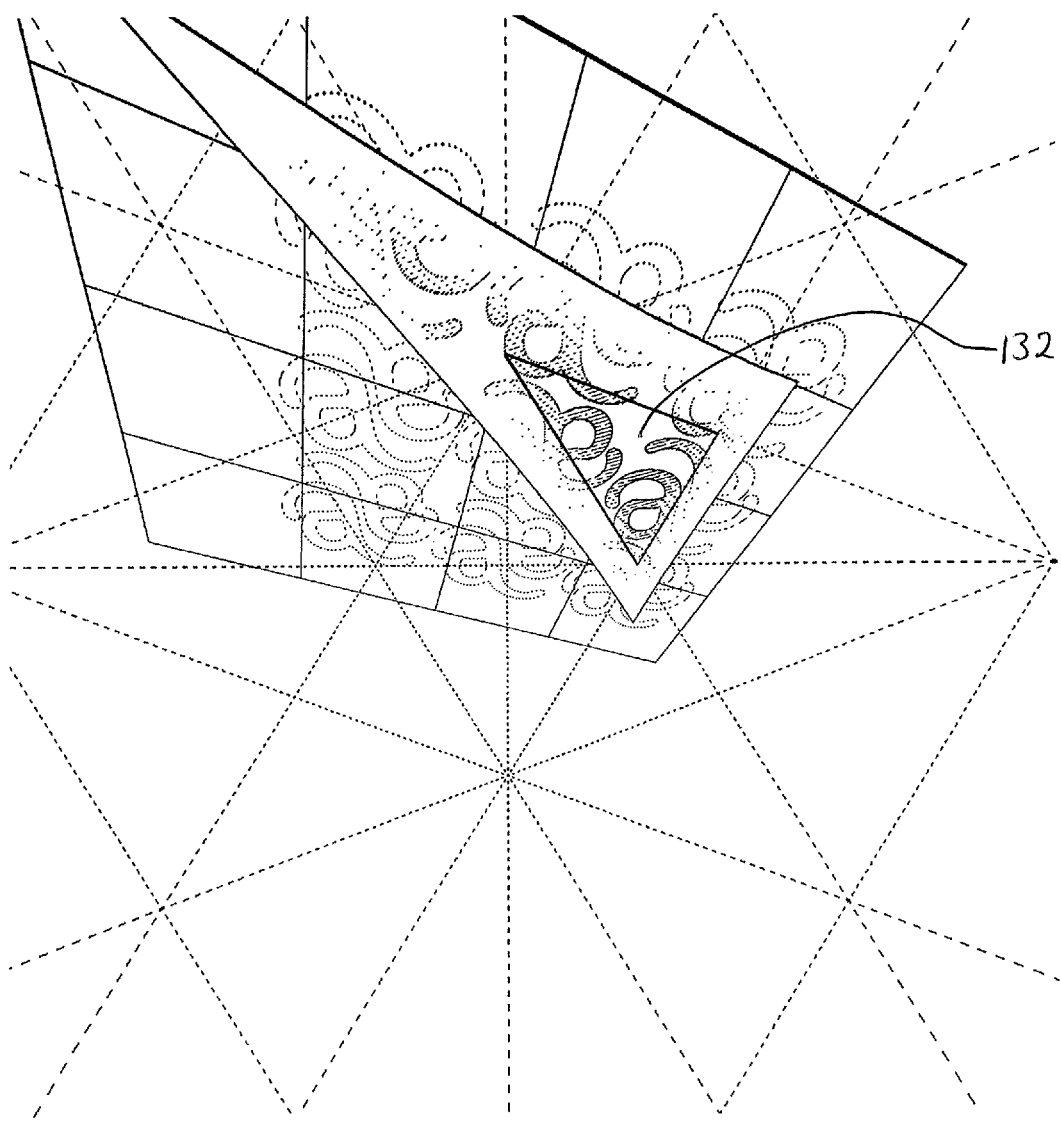
Figure 90:
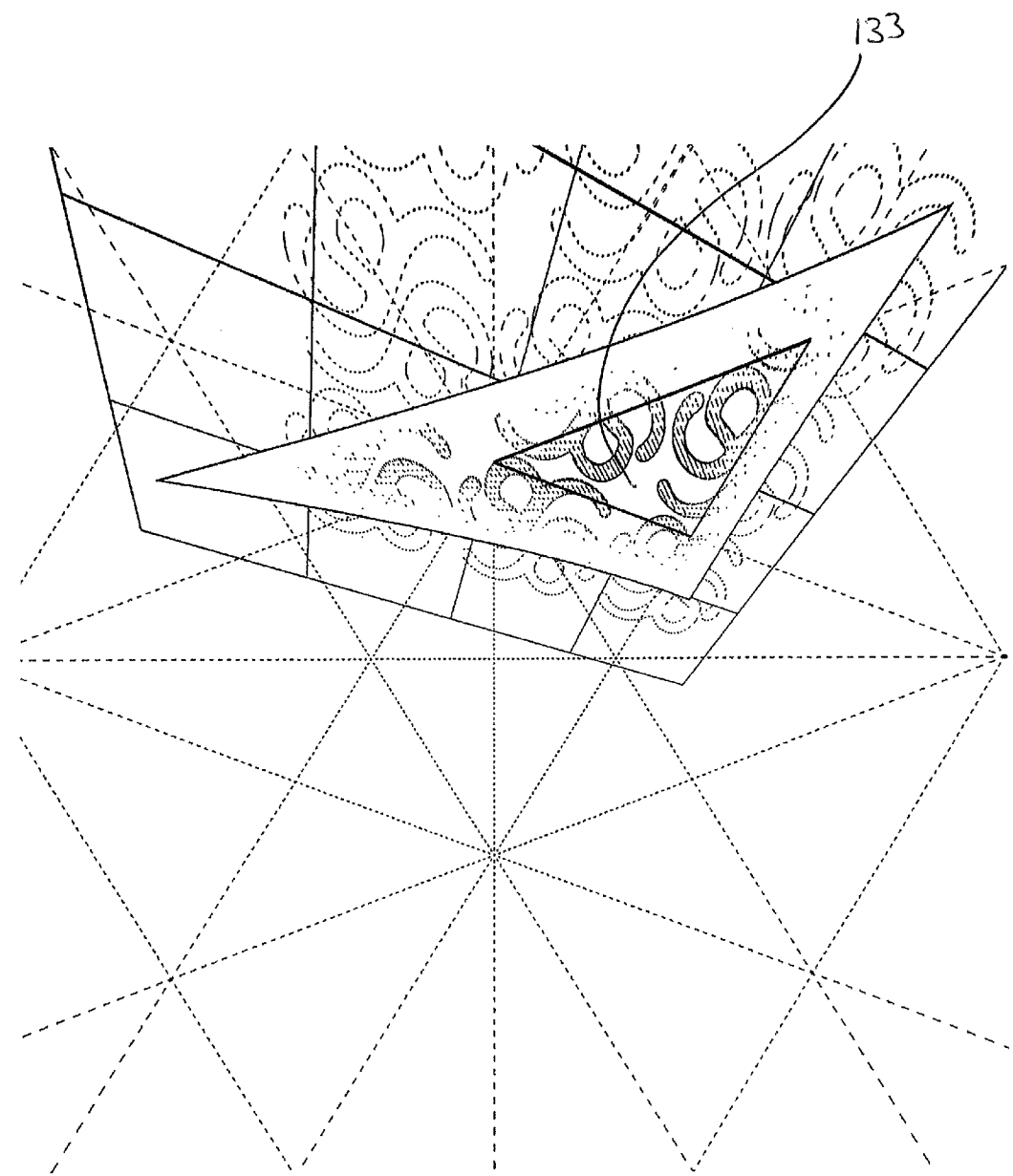
Figure 91:
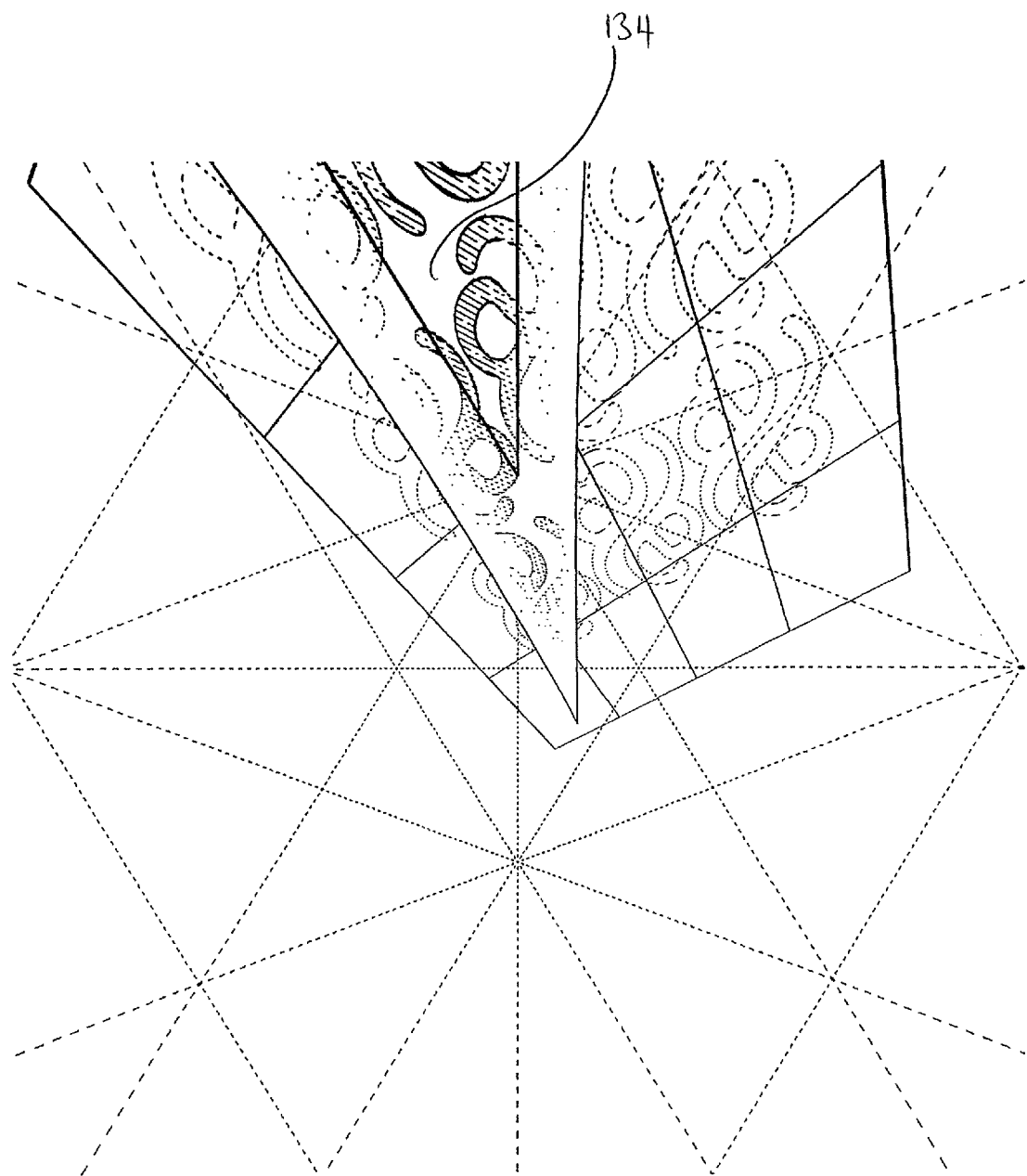
Figure 92:
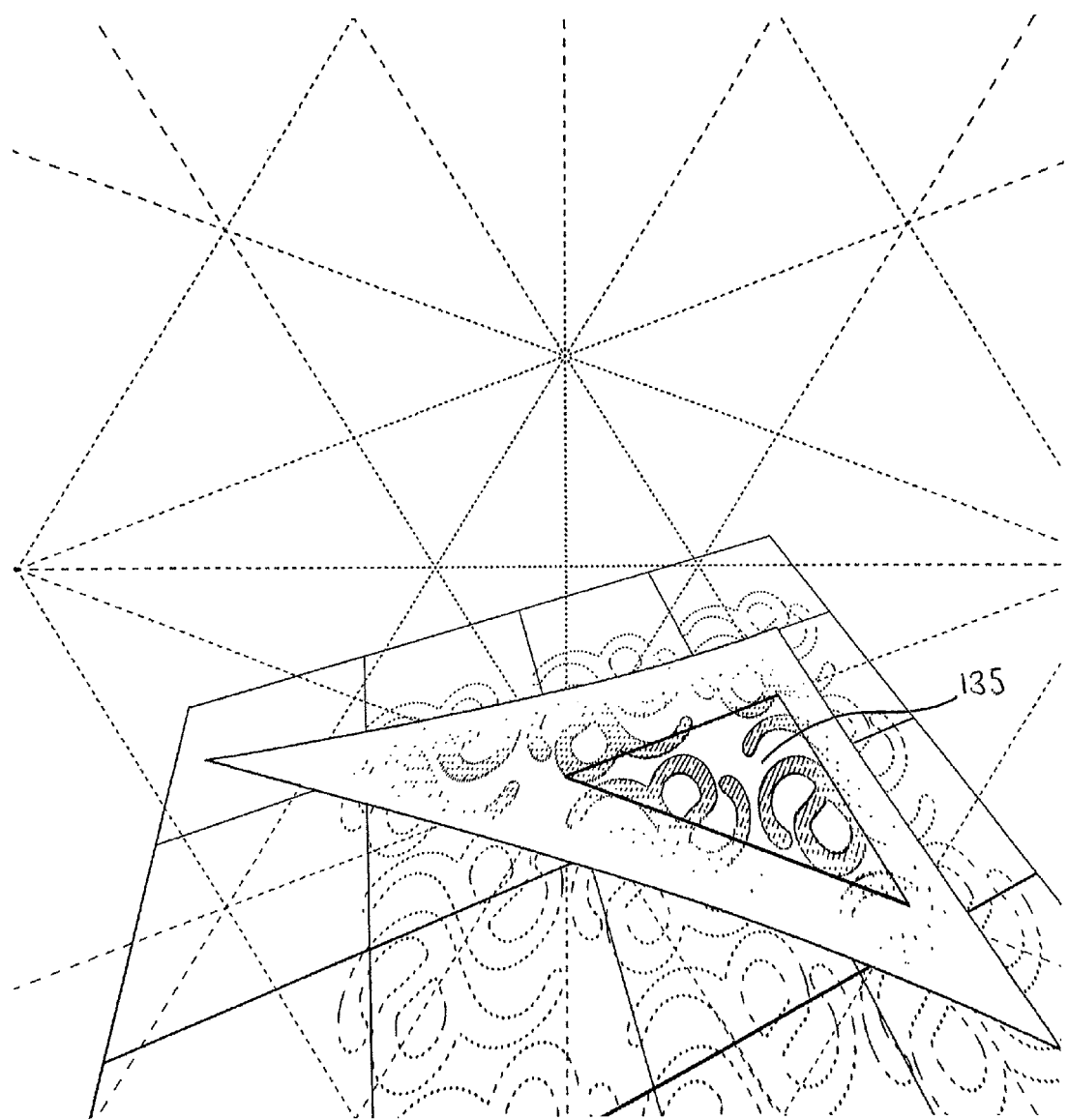
Figure 93:
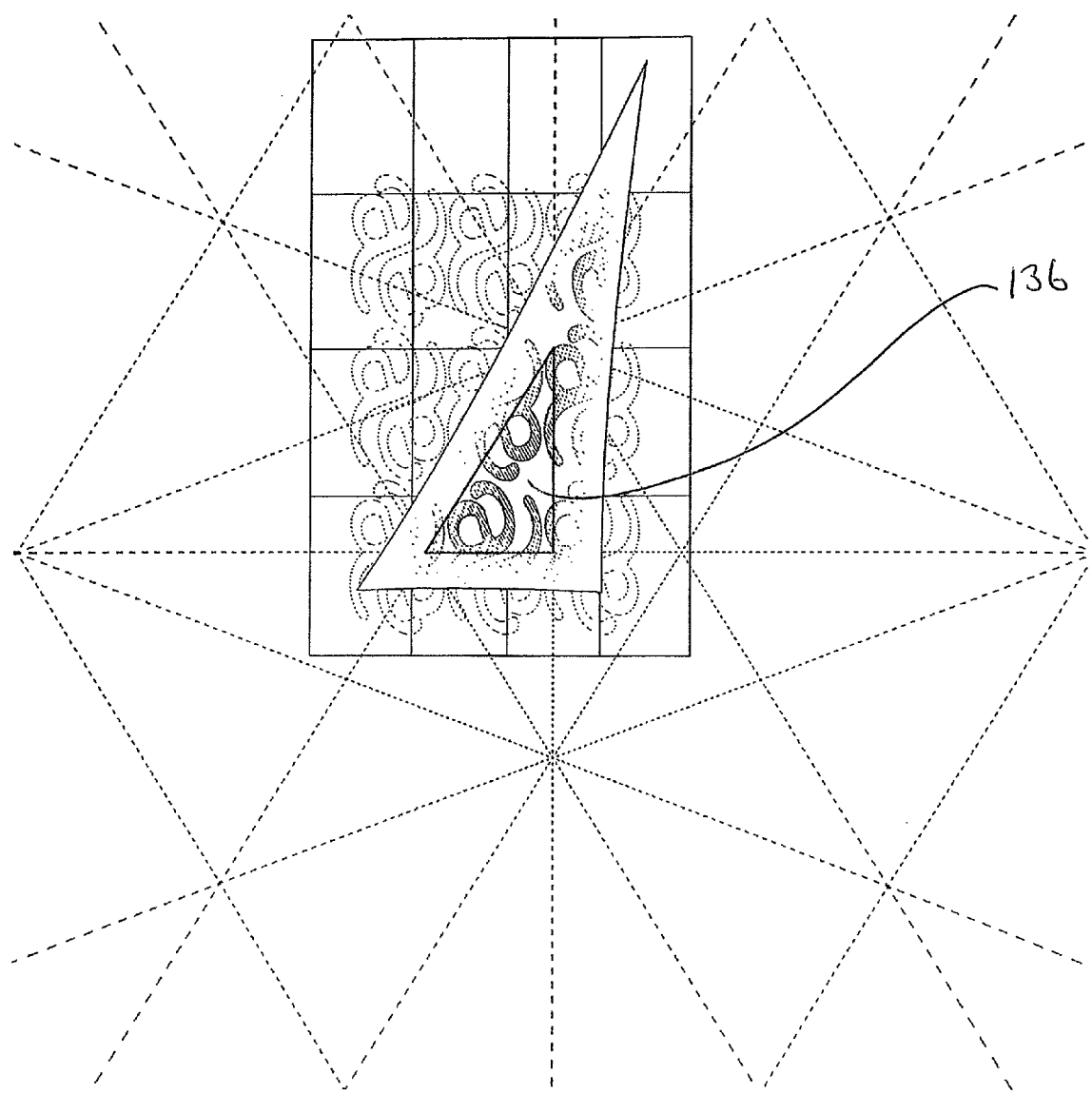
Figure 94:
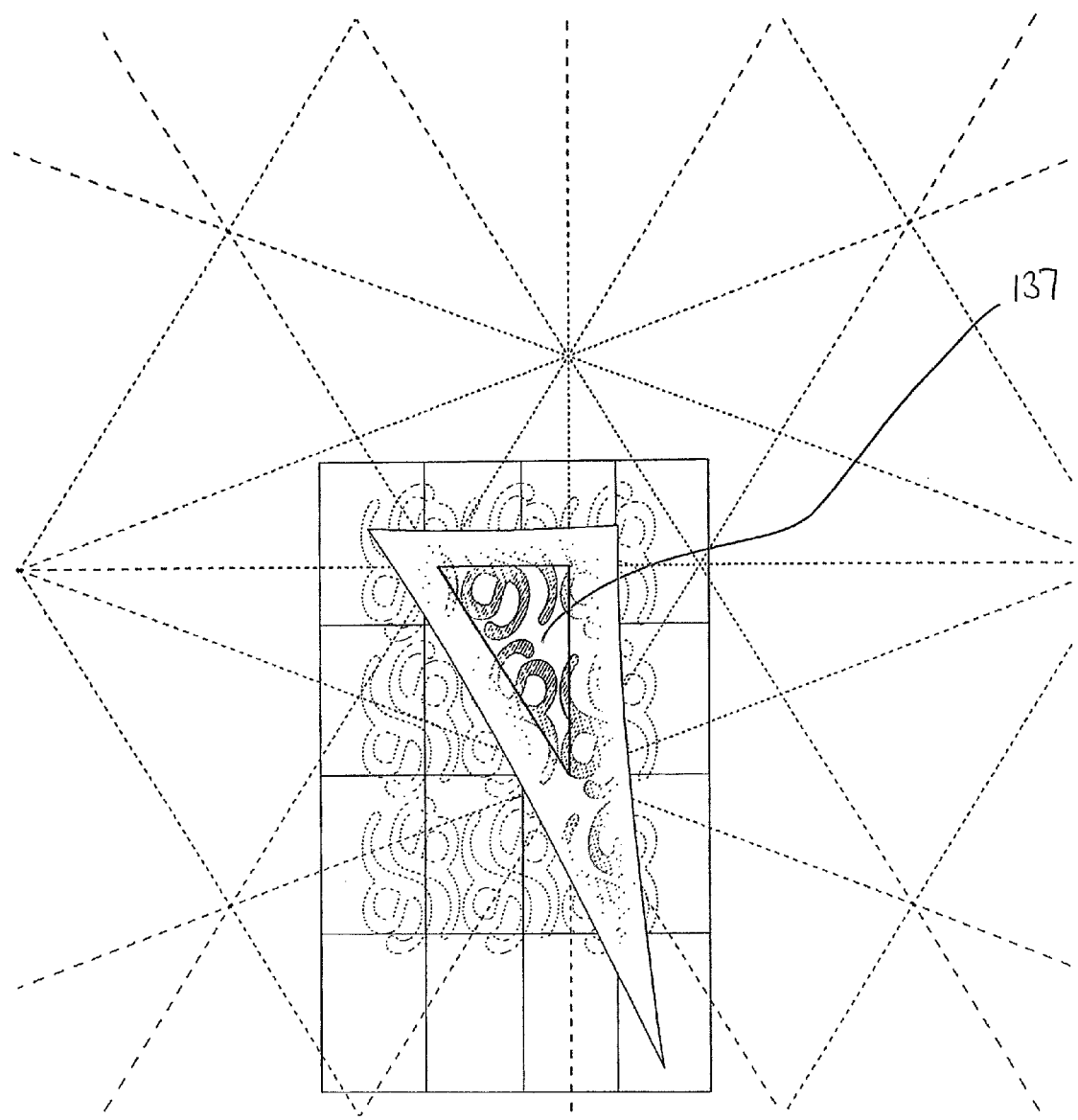
Figure 95:
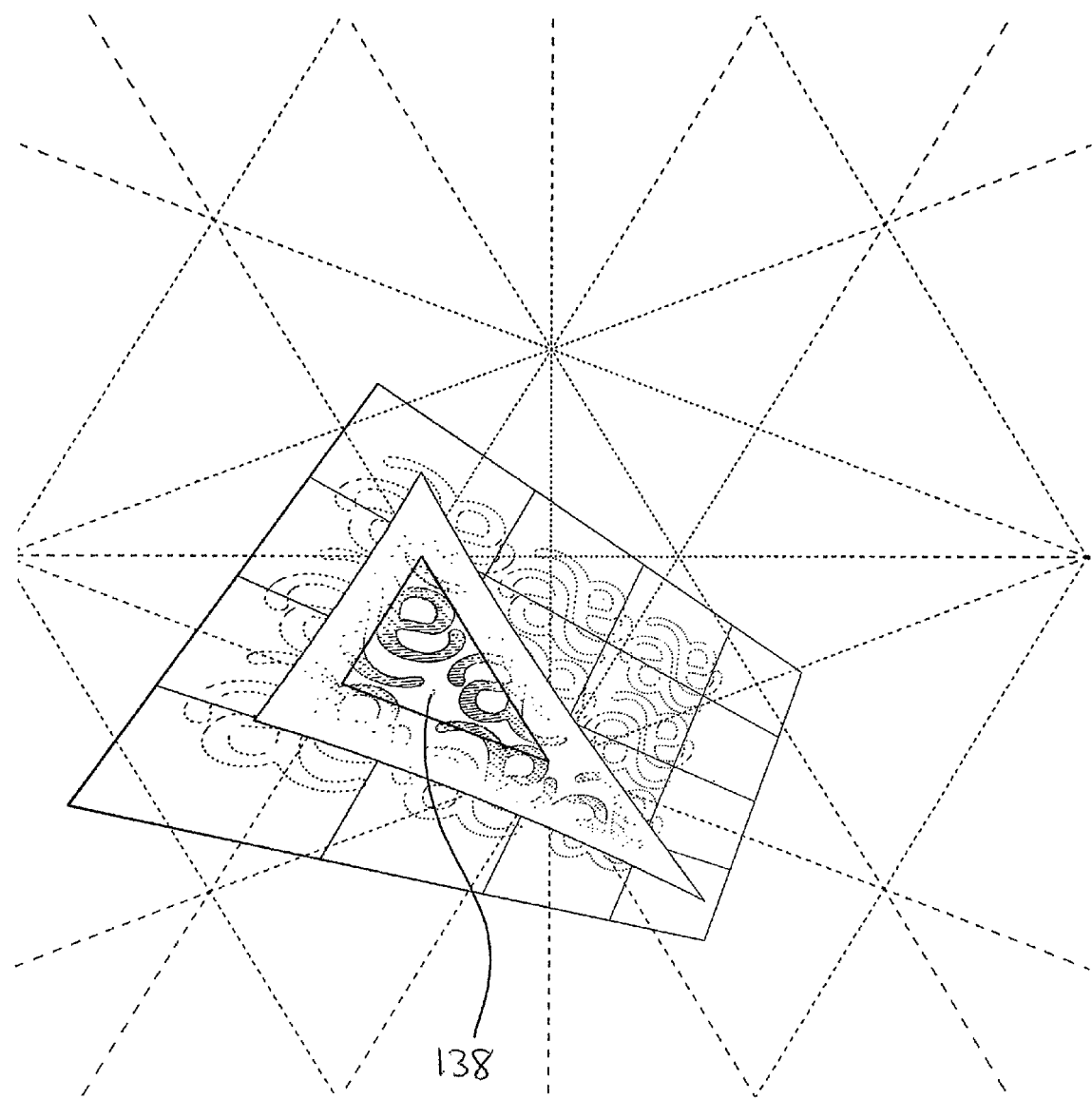
Figure 96:
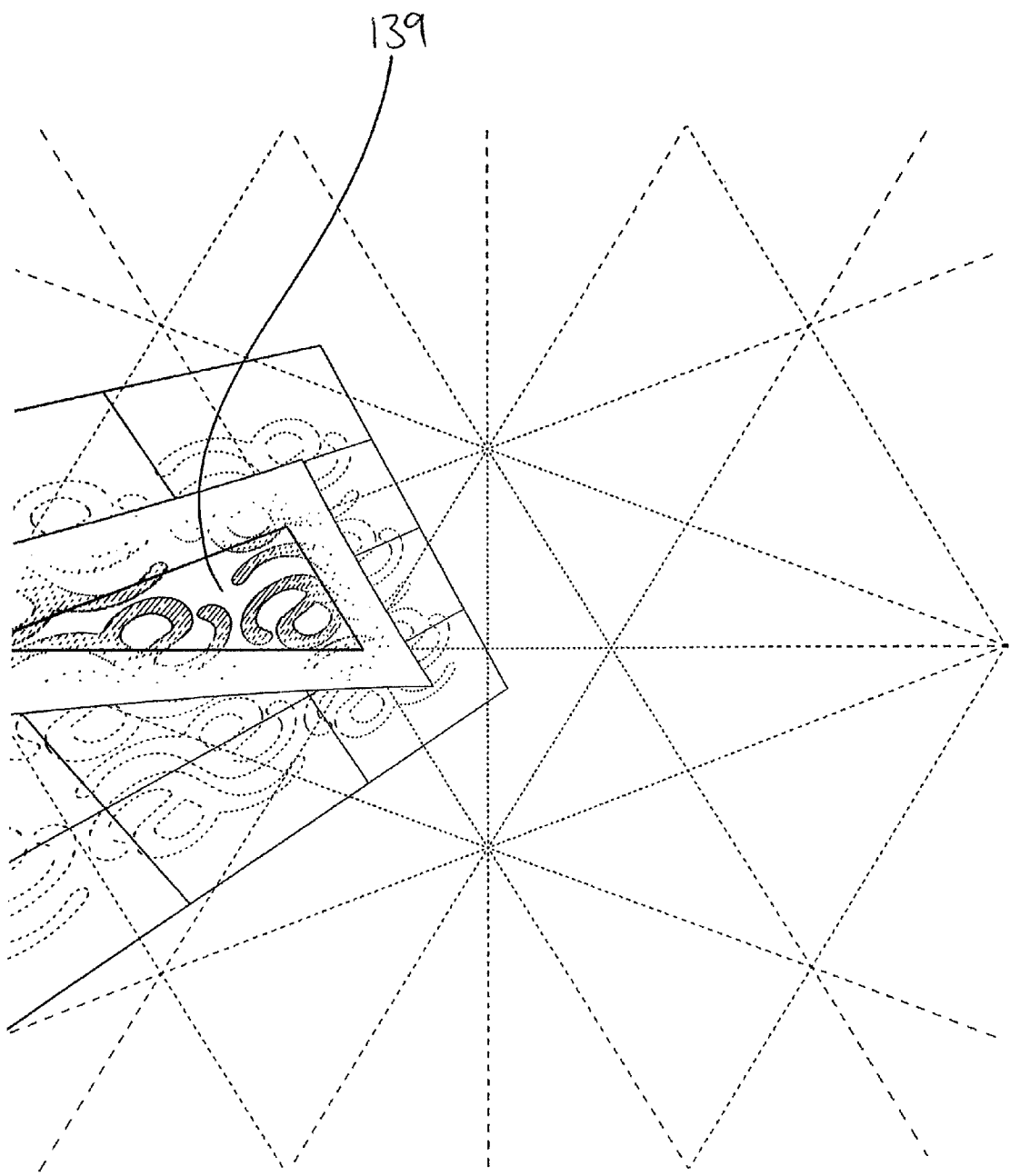
Figure 97:
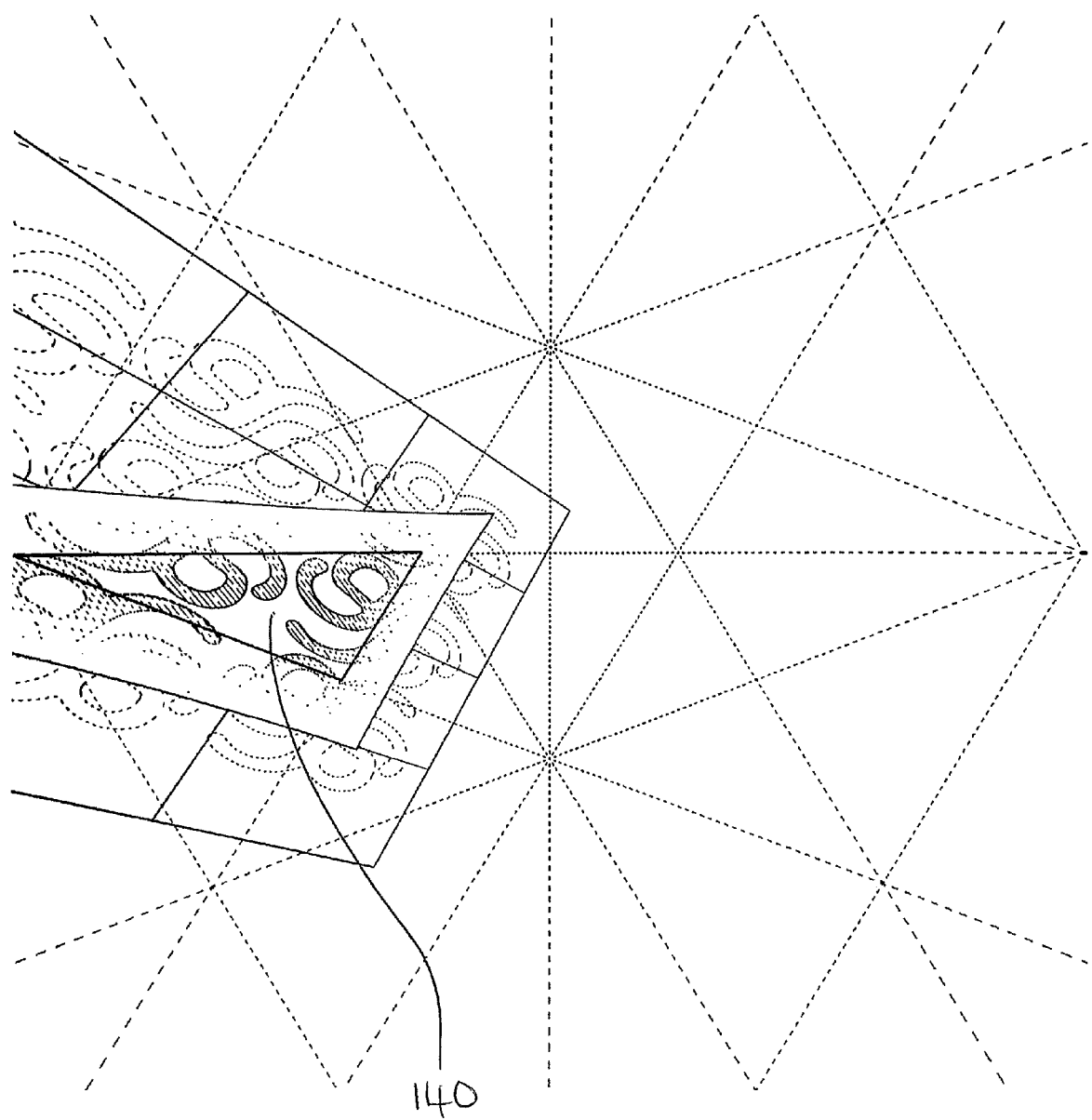
Figure 98:
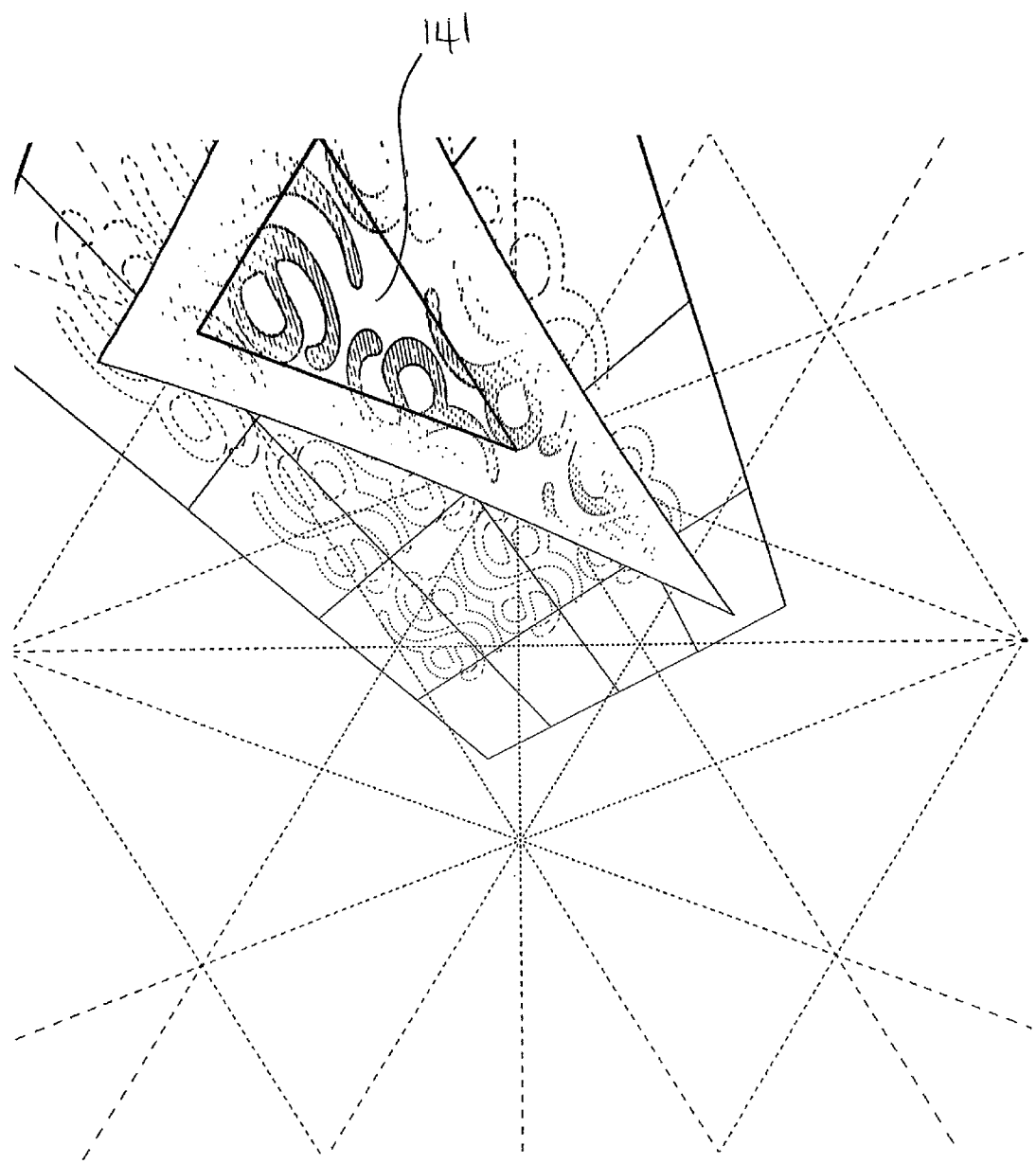
Figure 99:
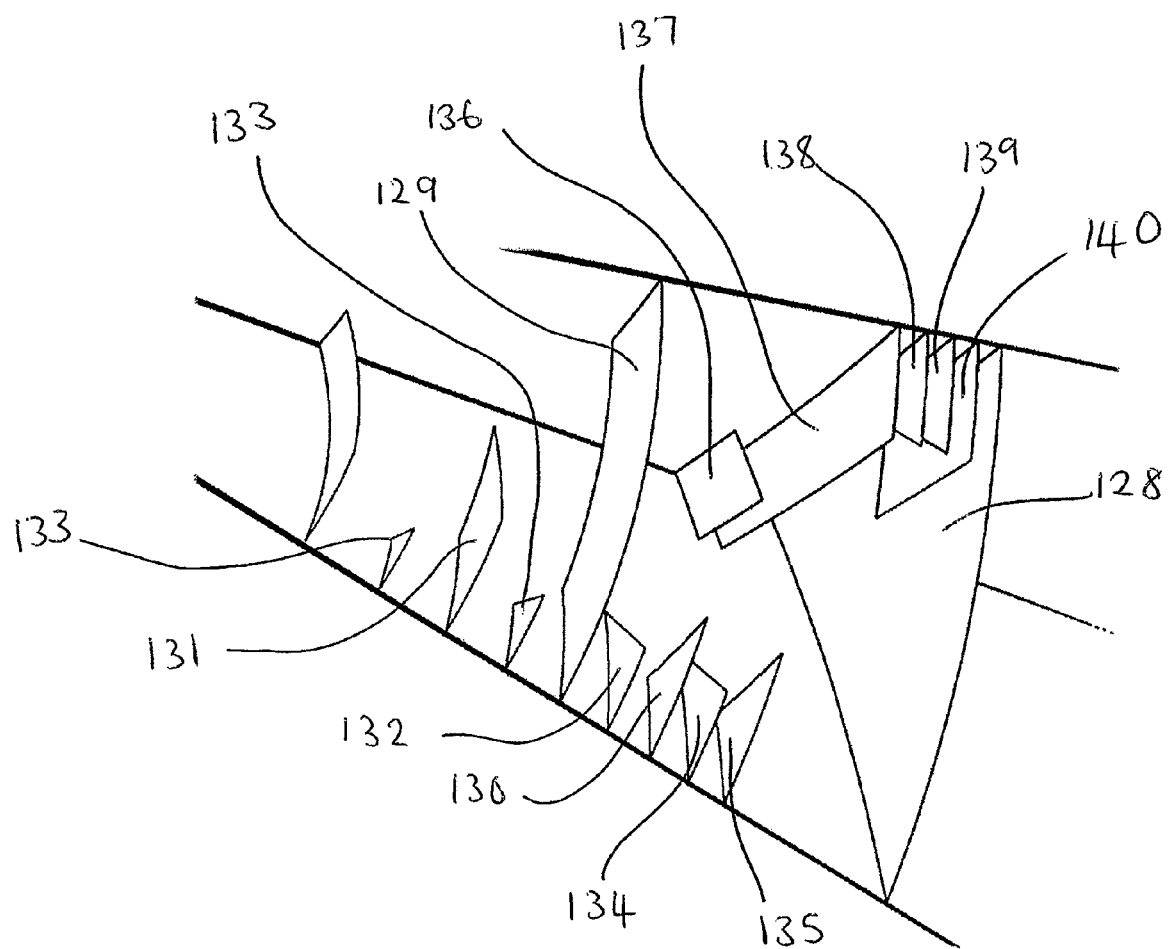
FIGS. 99 and 100 show superimposed layers of the primary and secondary fundamental domains.
Figure 100:
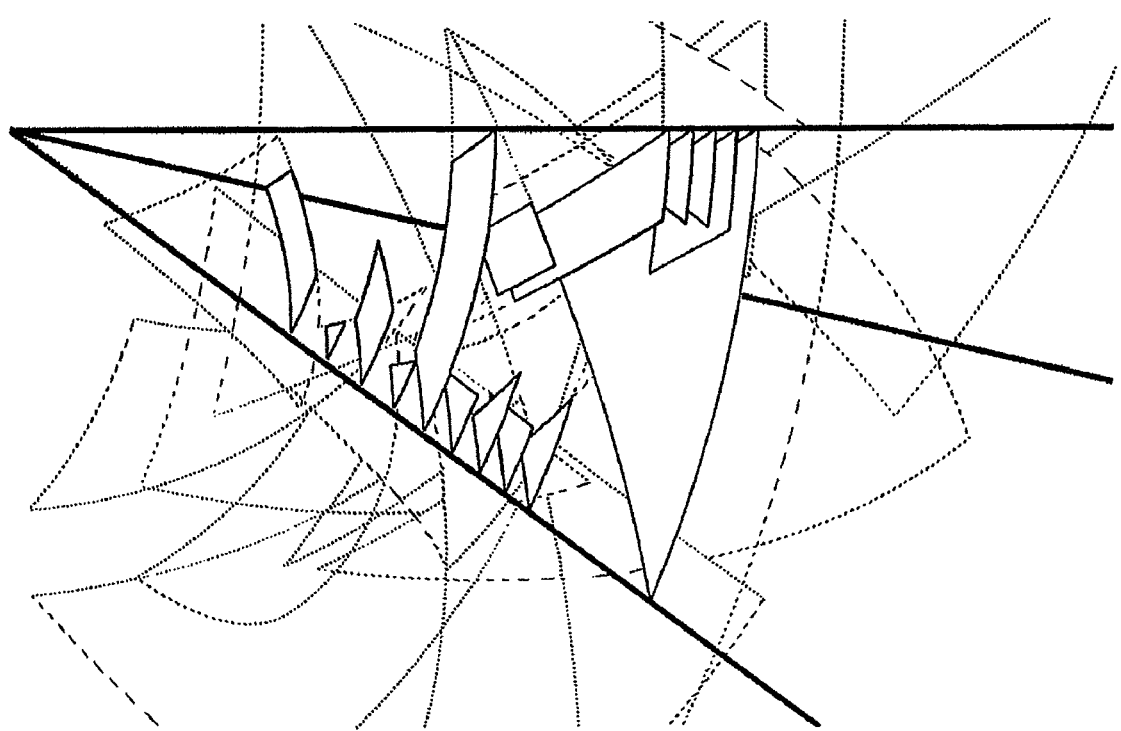
Figure 101:
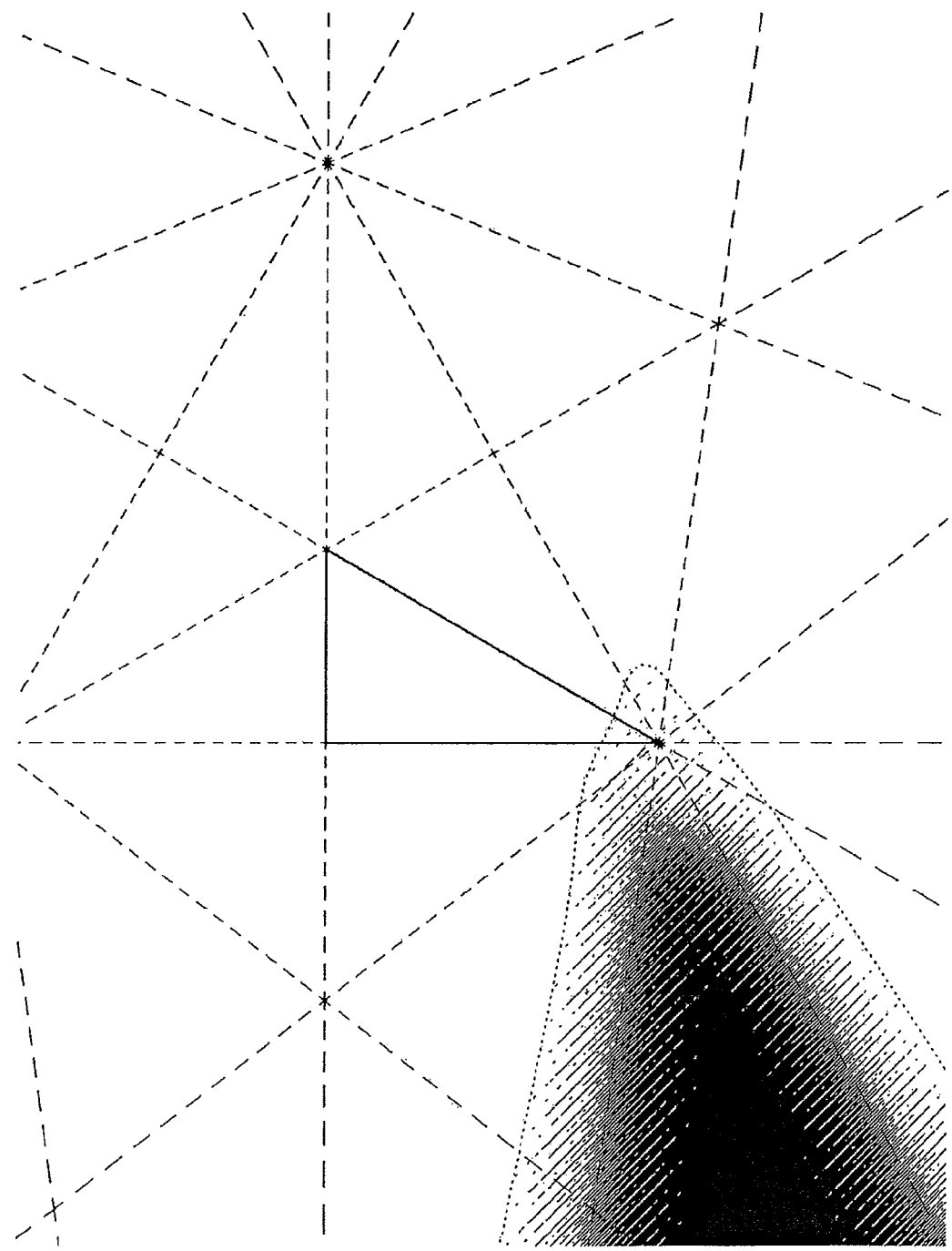
FIGS. 101-114 show the effect of alpha-blending on the secondary fundamental domains of FIG. 85-98.
Figure 102:
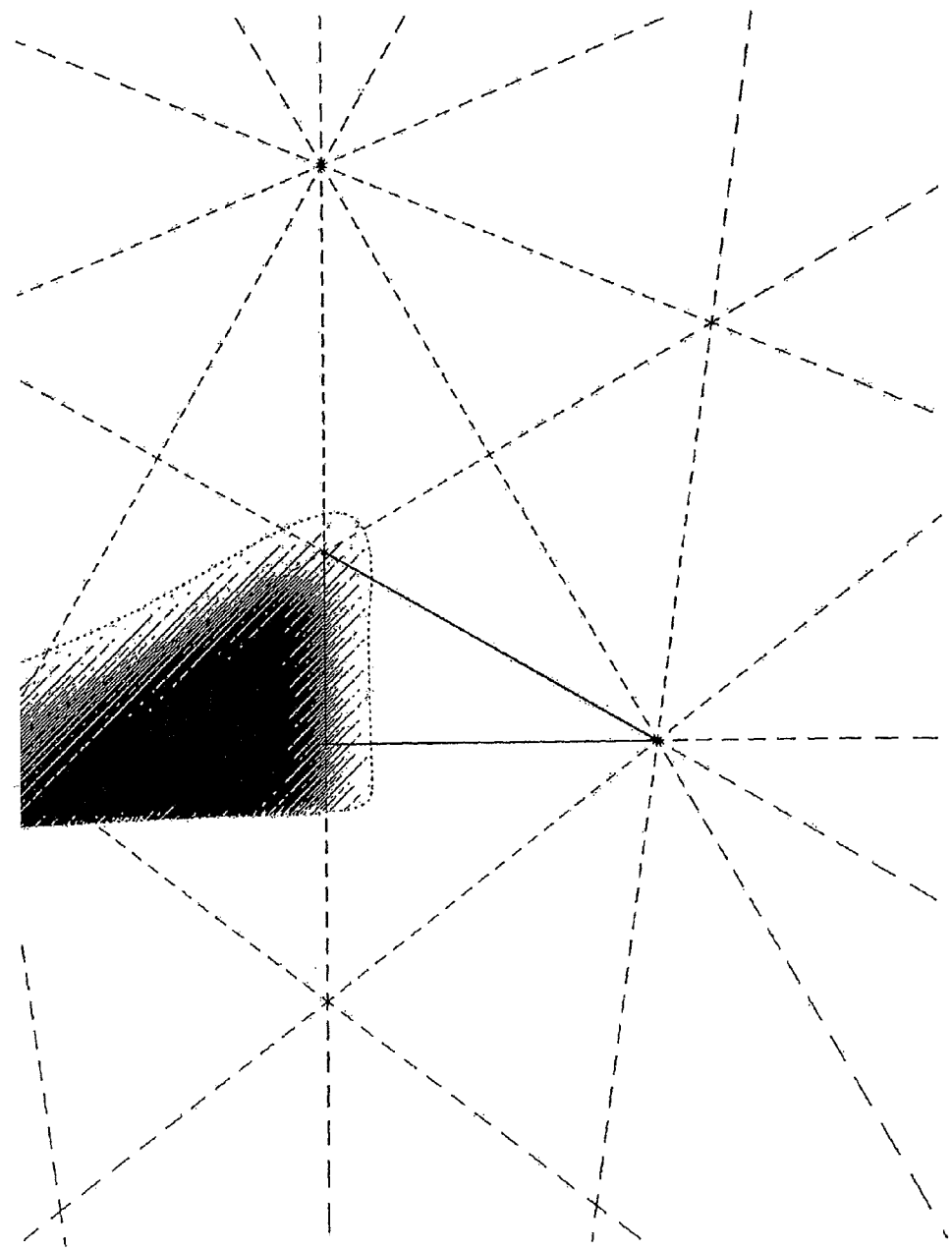
Figure 103:
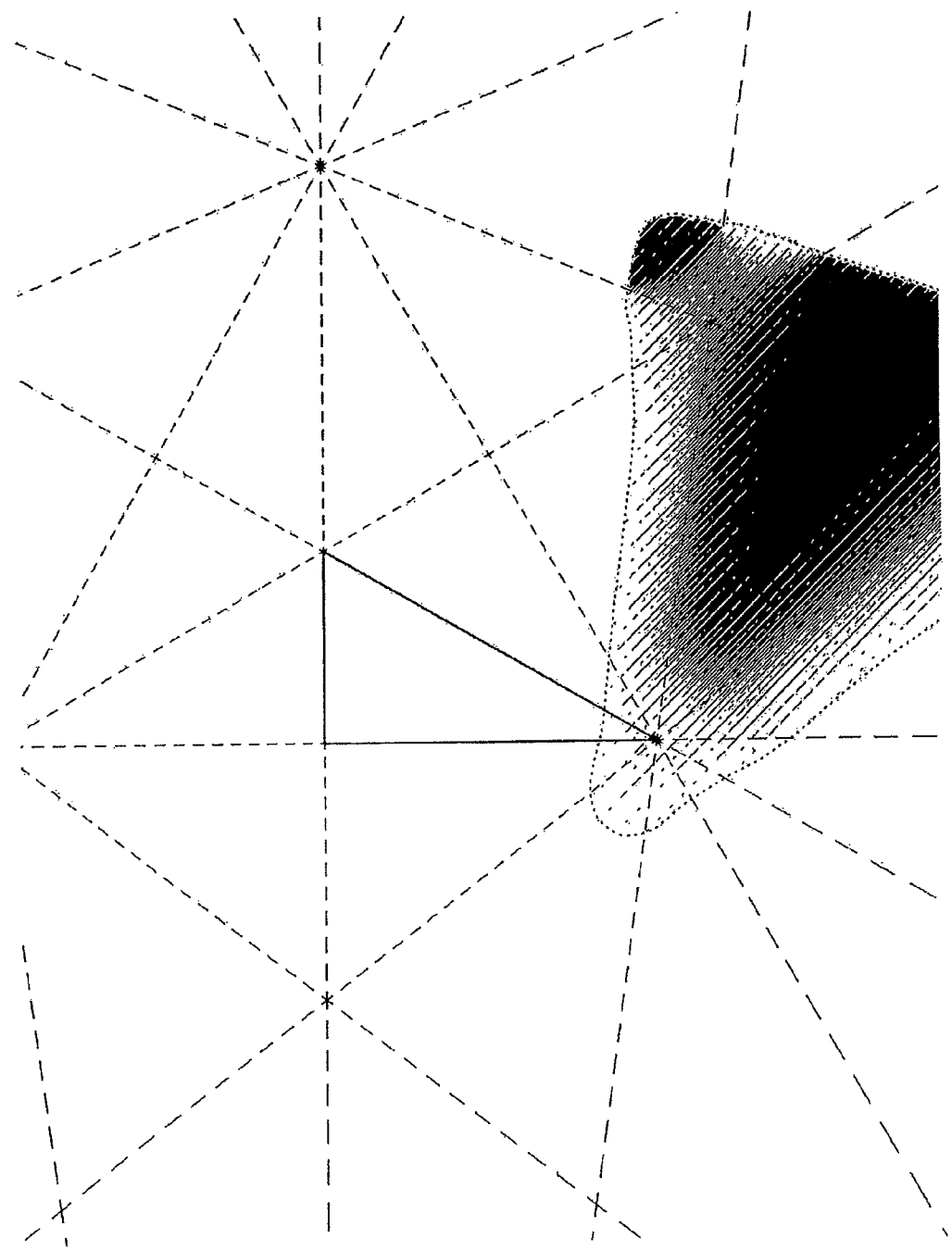
Figure 104:
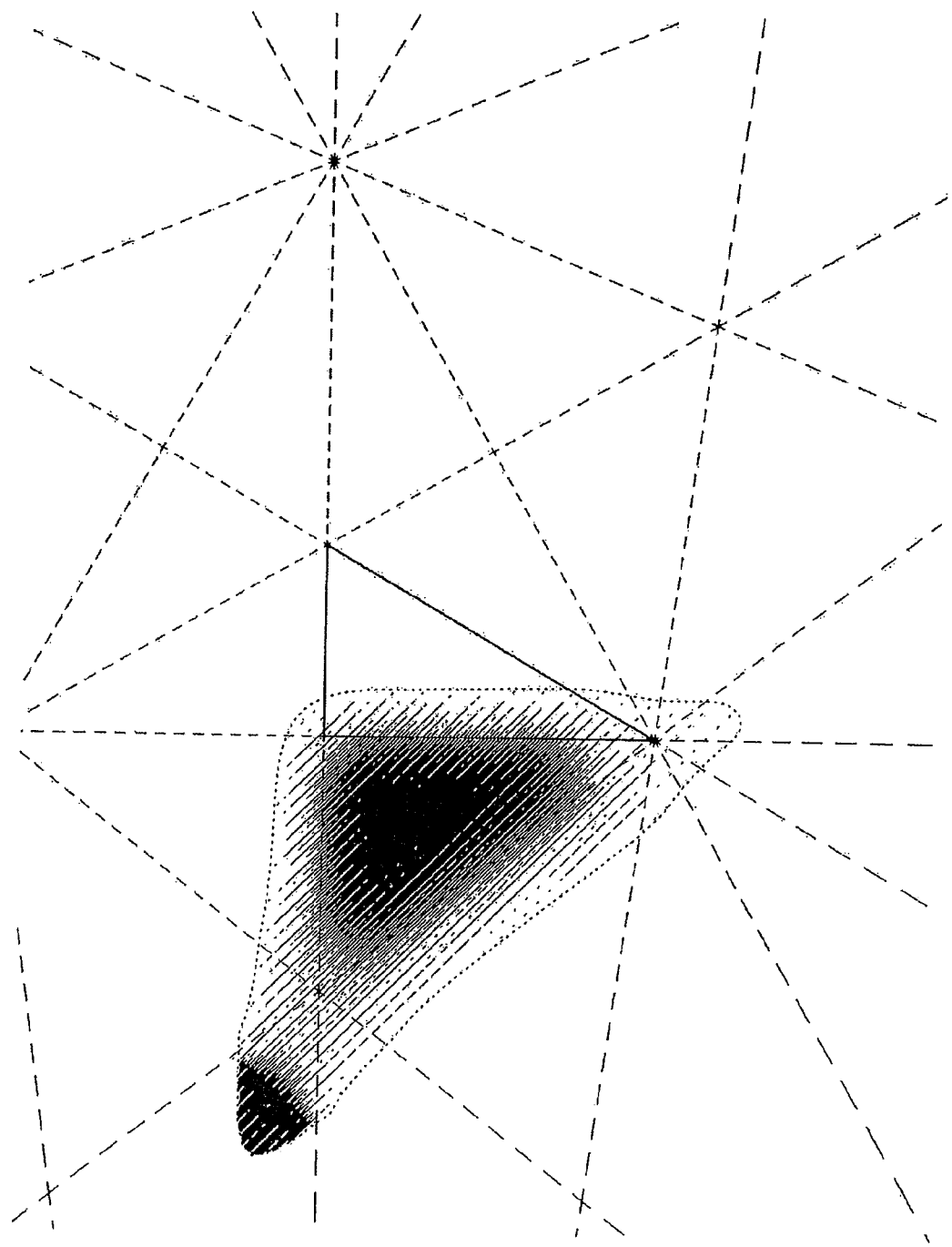
Figure 105:
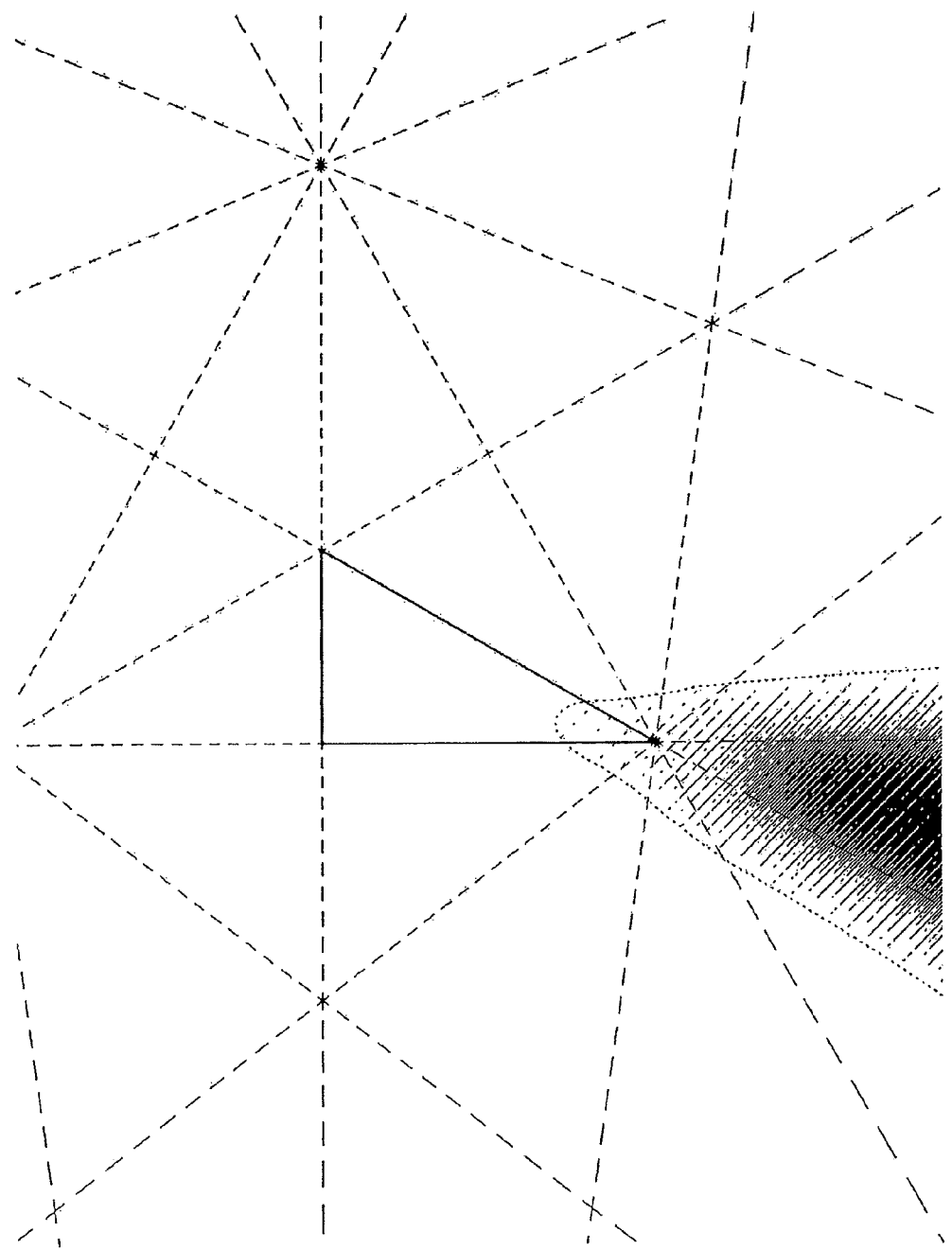
Figure 106:
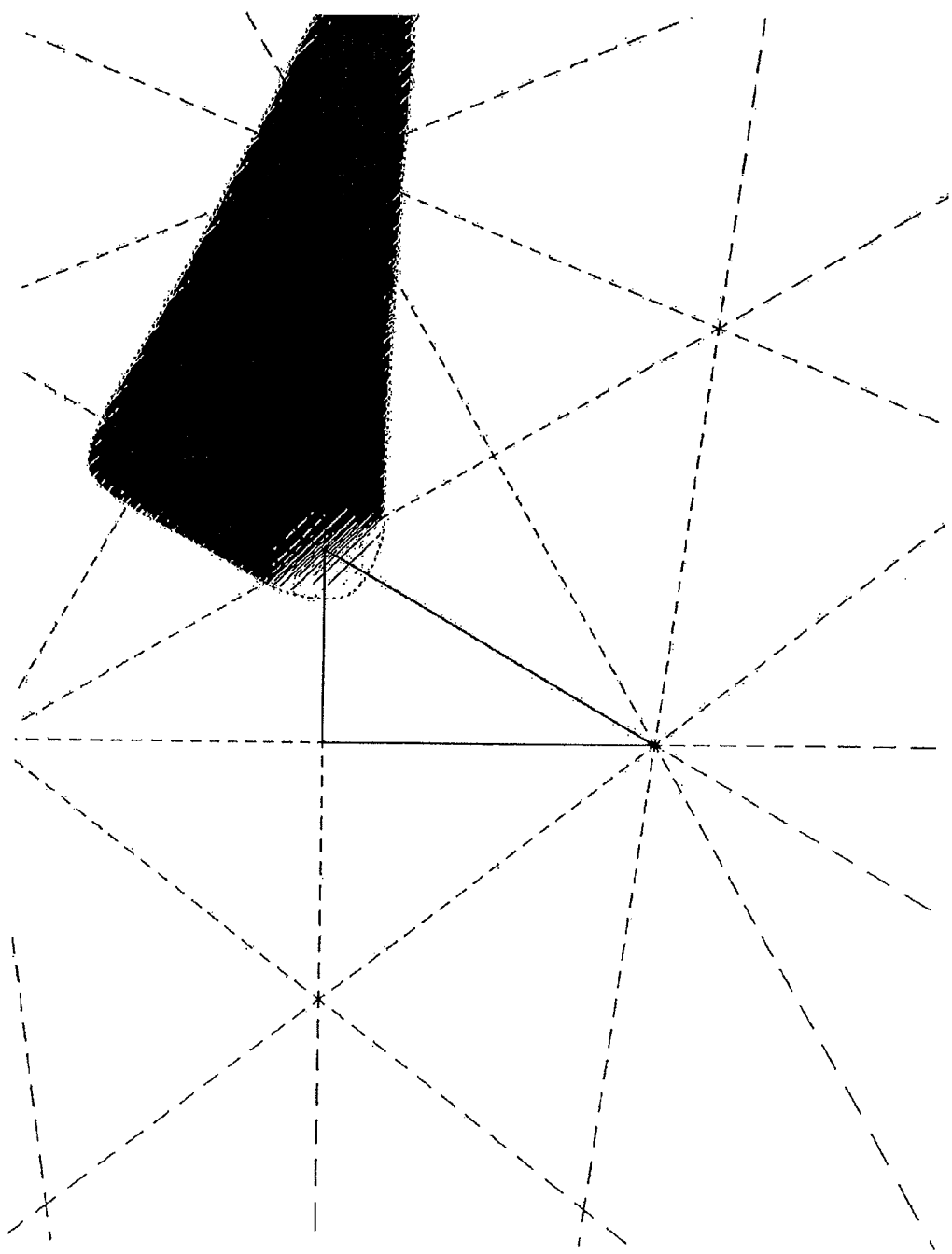
Figure 107:
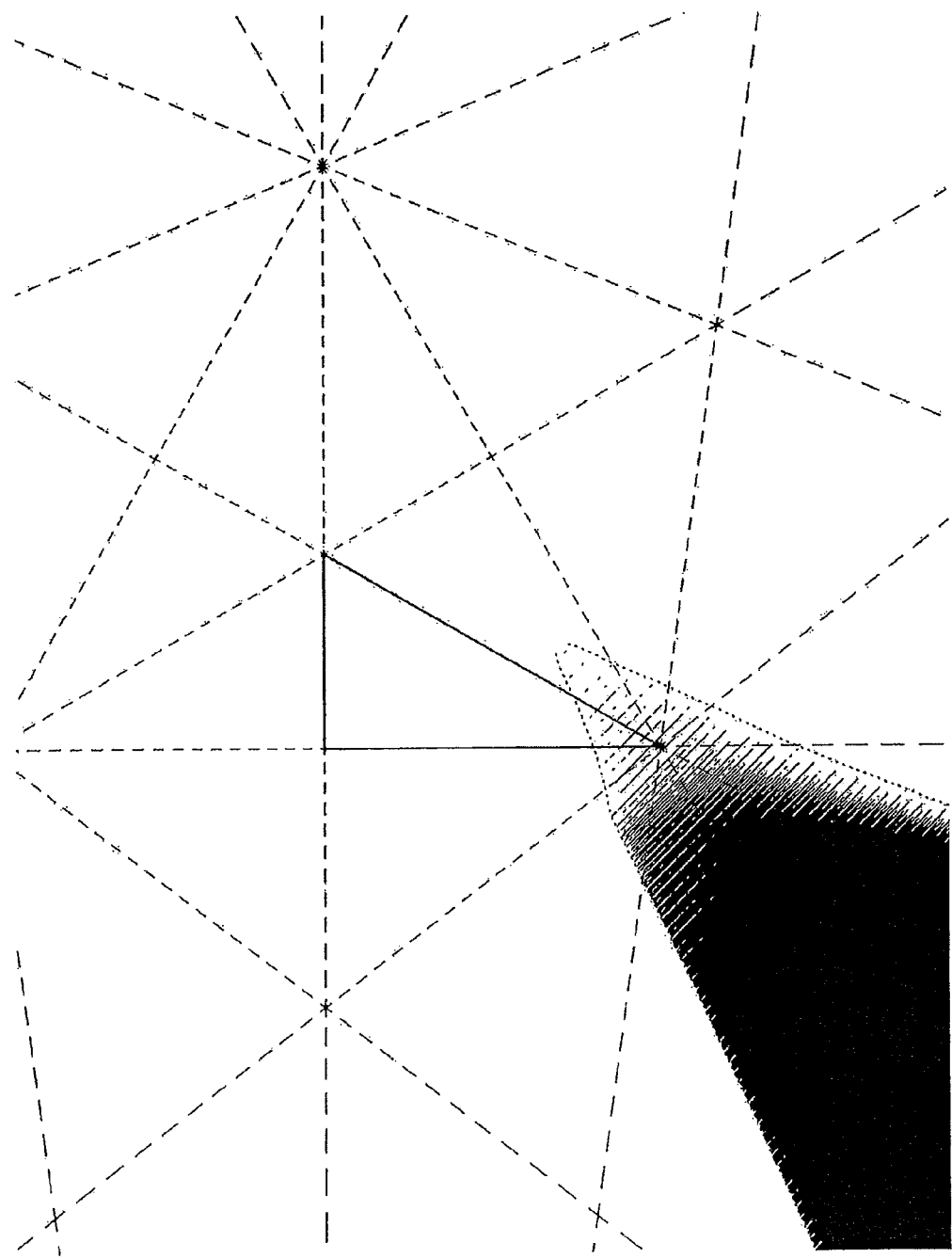
Figure 108:
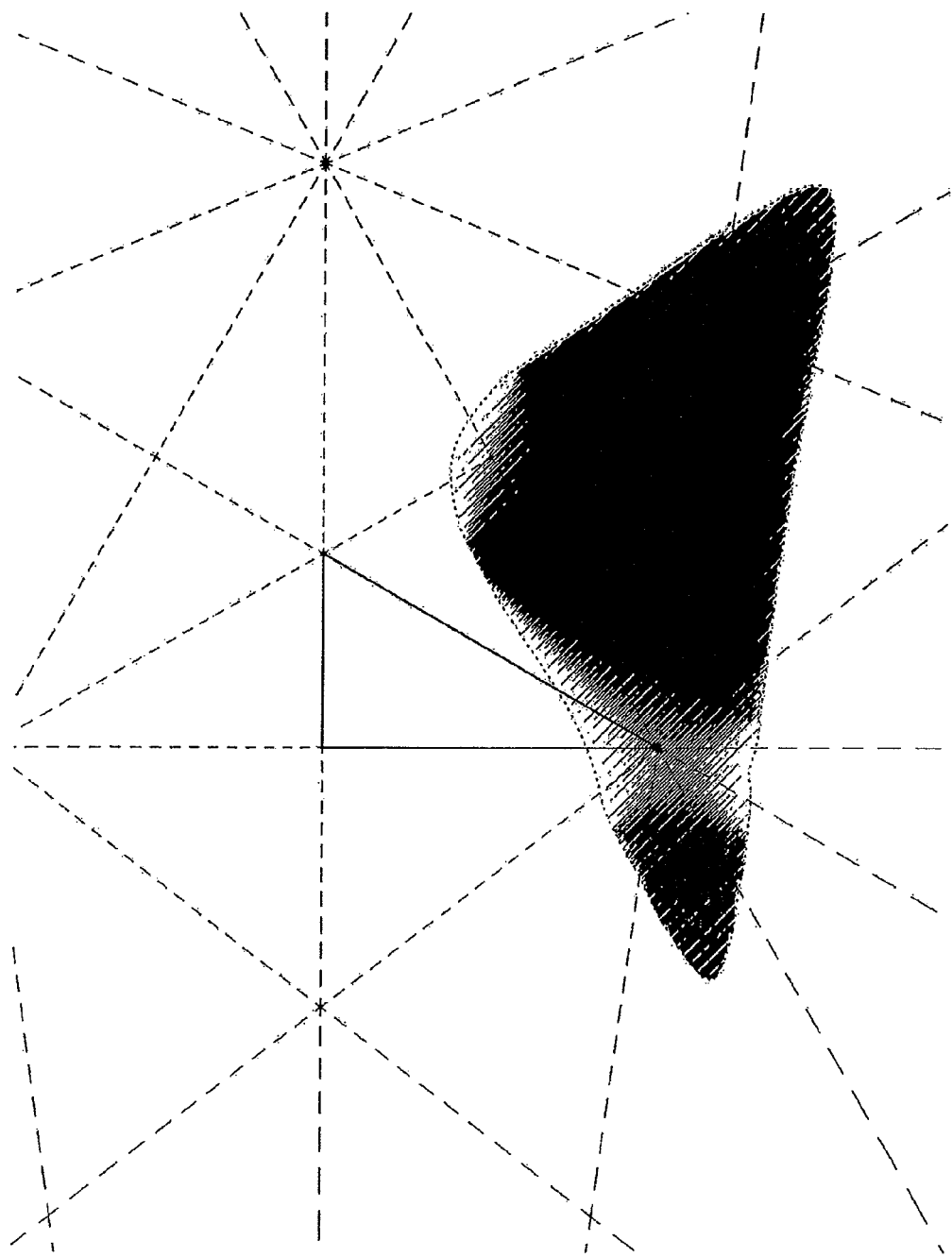
Figure 109:
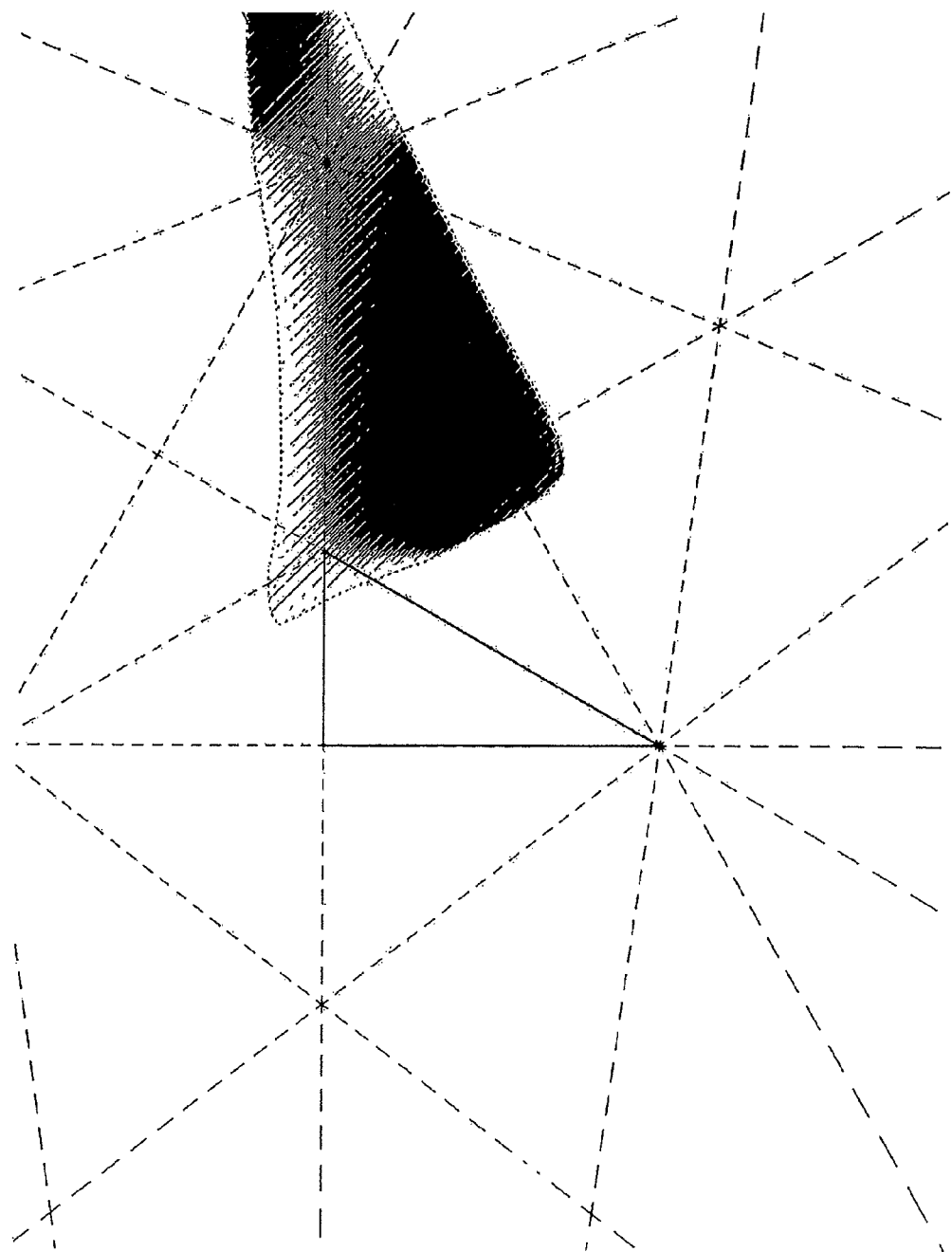
Figure 110:
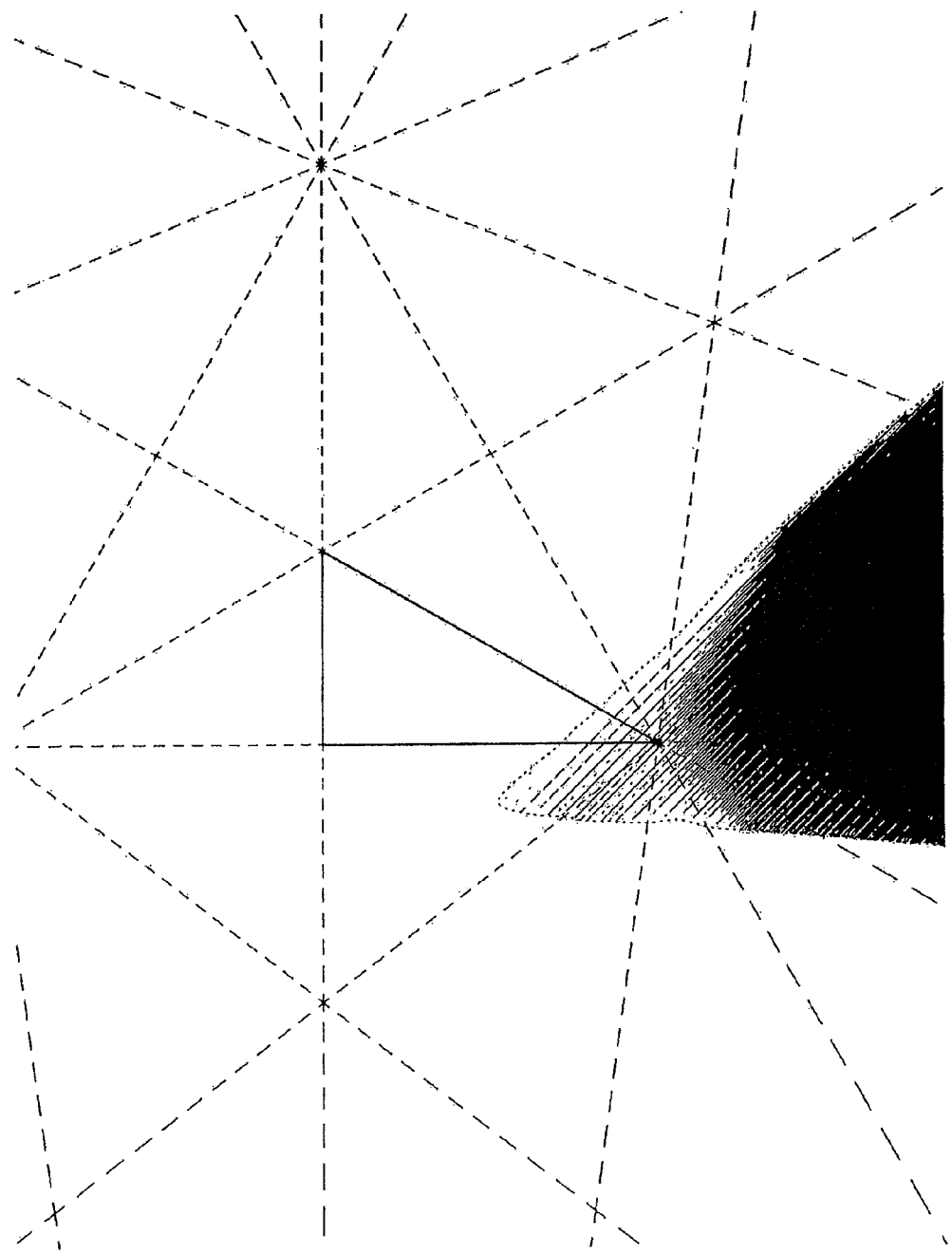
Figure 111:
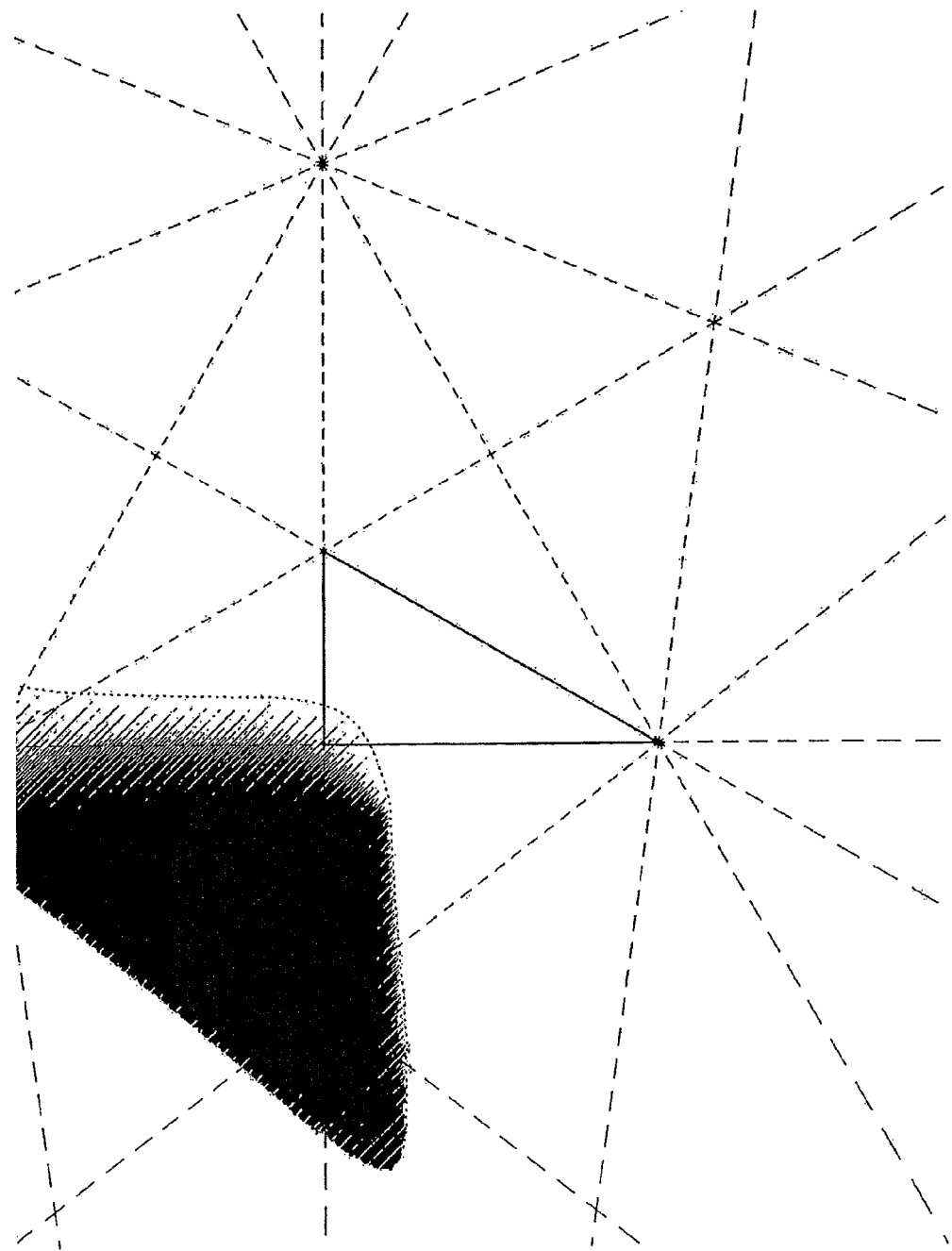
Figure 112:
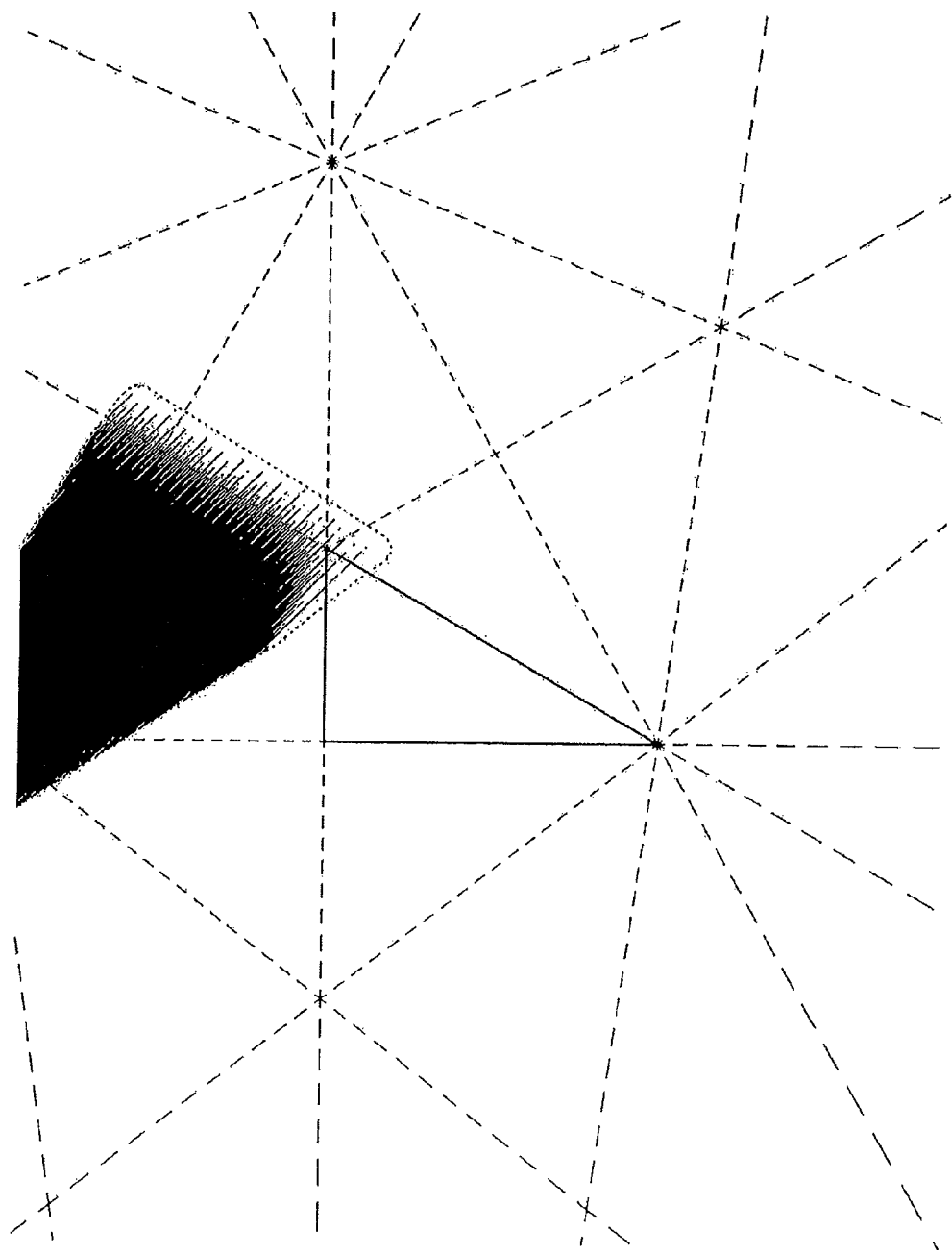
Figure 113:
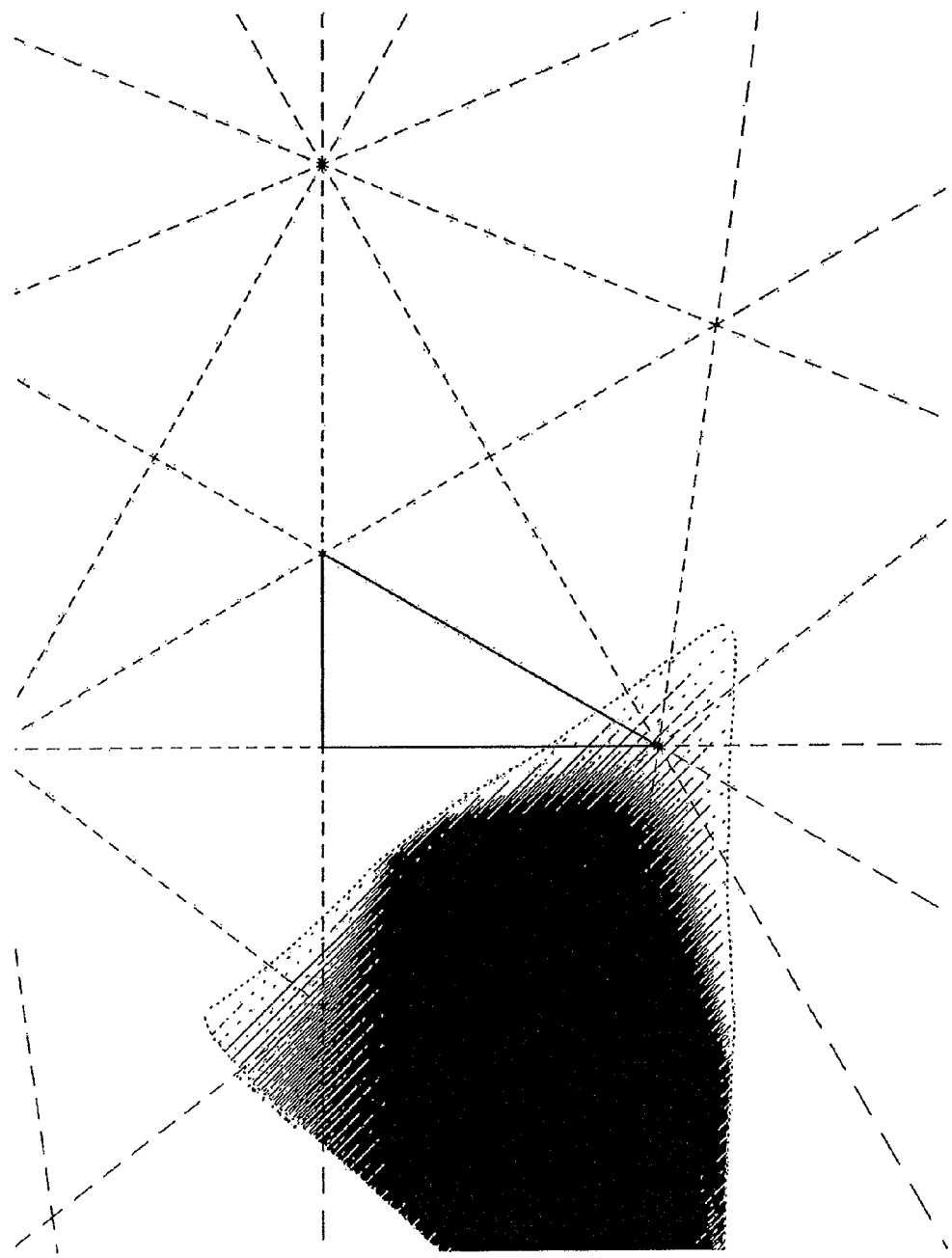
Figure 114:
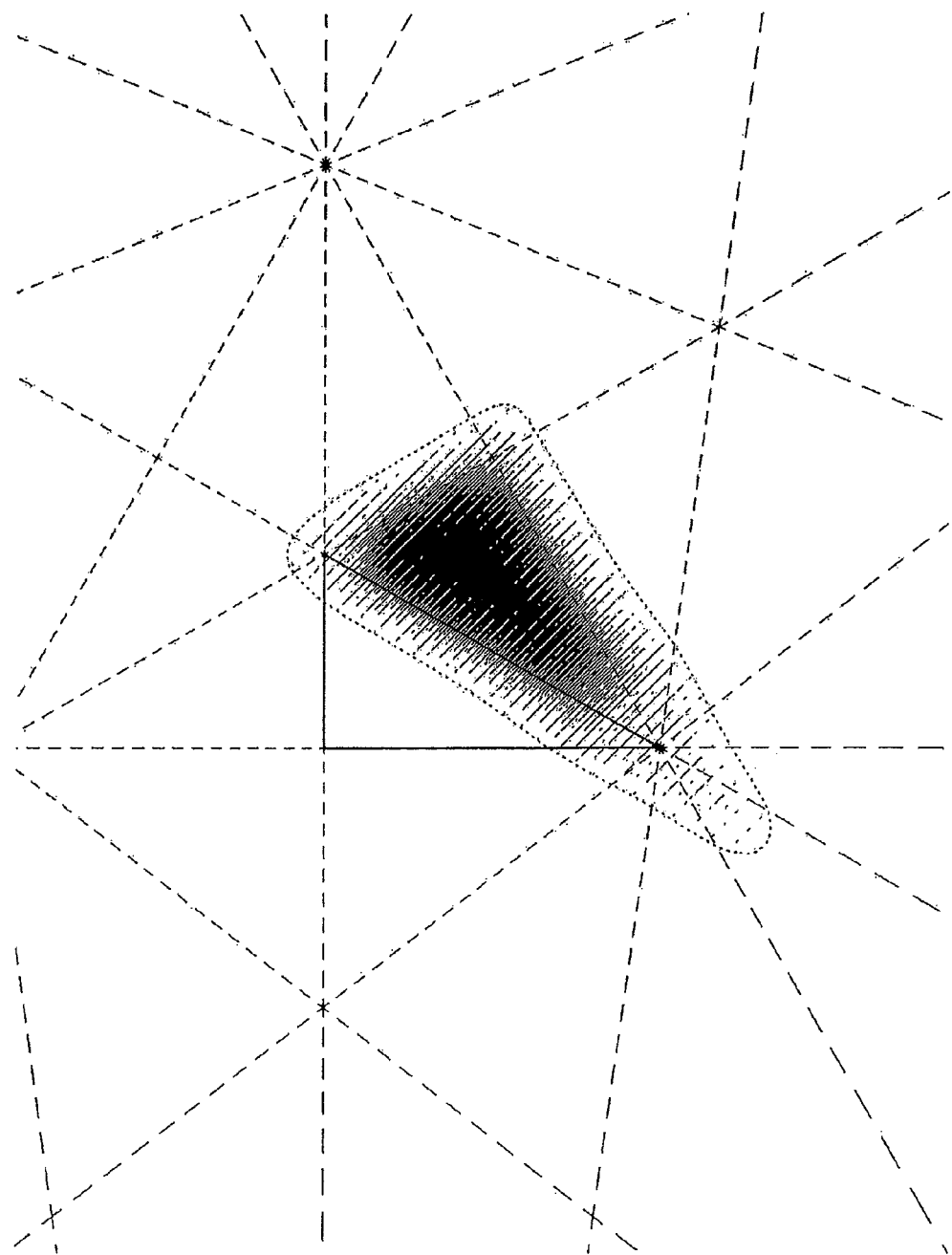

Referring to FIG. 82, the triangle representing the fundamental domain 113 is shown together with a graduated image. This represents a primary fundamental domain 128 shown in FIG. 85. The graduated image is then transposed and rotated to define secondary fundamental domains 129 to 141 adjacent to the primary fundamental domain 128 as shown in FIGS. 85 to 98. The portions 129a to 141a of the image enclosed by the extended triangles of the secondary fundamental domains 129 to 141 that extends relative to the primary fundamental domain 128 then represent layers which are superimposed on a layer formed by the image of the primary fundamental domain 128, as shown in FIGS. 99 and 100.

The layers represented by the portions 129a to 141a of the image enclosed by the extended triangles of the secondary fundamental domains 129 to 141 are then composited with the layer of the primary fundamental domain 128 such that each layer contributes equally to a final image formed within the fundamental domain 128.

The transparency for each point is adjusted to display part of a source image in which all the layers contribute equally to preserve the new symmetries, but proportionally to their particular transparency value defined for each particular point position. This is dependent on the composition mode and in one embodiment an alpha blending composition mode is utilised. Herein, a transparency level for each point in each layer is calculated from the current transparency level, the colour of previous layers for the same point, and the total number of layers.

As we are combining layers with an alpha which depends on the specific point, and even combining layers which do not participate in some points, it is necessary to make something with the alpha for each point to show them as a "normal" mix. This is a mix in which all layers contribute to the luminance magnitude for each final source image point.

For example, in order to distribute these layers equally in the final image, at a point where the only layer is the layer formed by the primary fundamental domain 128, then this is the only part which contributes. However, at a point wherein there is an additional layer, then the first layer is fully opaque and the second layer is 50% translucent such that there is a homogenous mix between the two layers and an equal composition therebetween. Further, at a point wherein there are two additional layers, then the first layer is fully opaque, the second layer is 50% translucent and the third layer is 33% translucent such that there is an equal composition between all three layers.

The composition of the layers in the above manner, by use of alpha blending, ensures that each point within the fundamental domain appears to have the same illuminence independent of the number of layers at that point.

The effect of alpha blending on the portions 129a to 141a of the image enclosed by the extended triangles of the secondary fundamental domains 129 to 141 is shown in FIGS. 101 to 114. These Figures show the final alpha marks of each secondary fundamental domain onto the primary fundamental domain to give the final proportionally distributed result.

Figure 115:
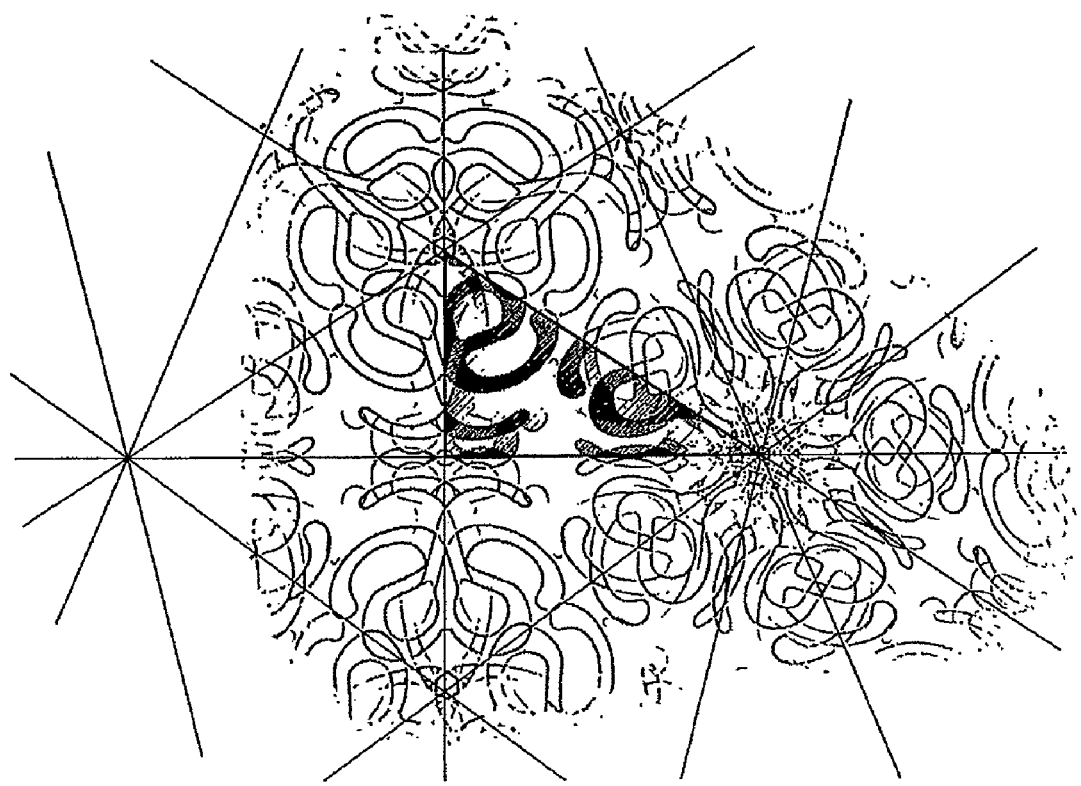
FIG. 115 shows the final image generated by the image producing method.
Figure 116:
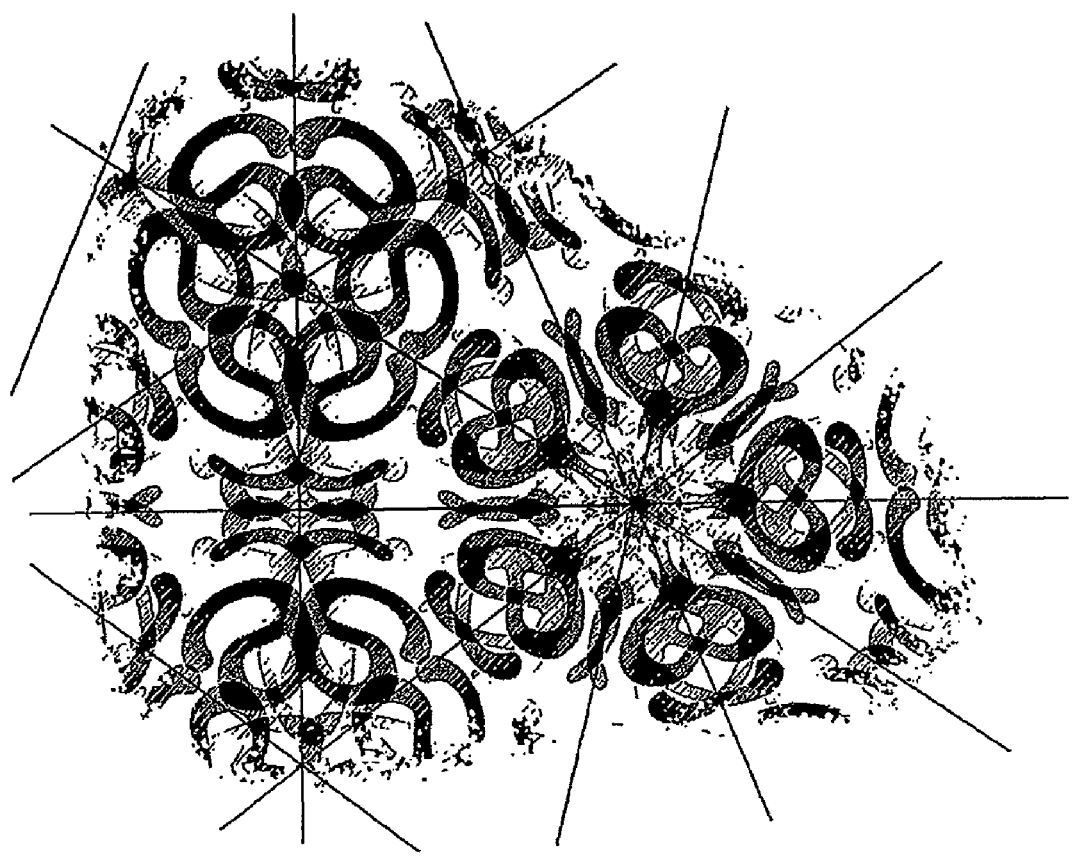
FIG. 116 shows the image of FIG. 115 rotated and reflected.
Figure 117:
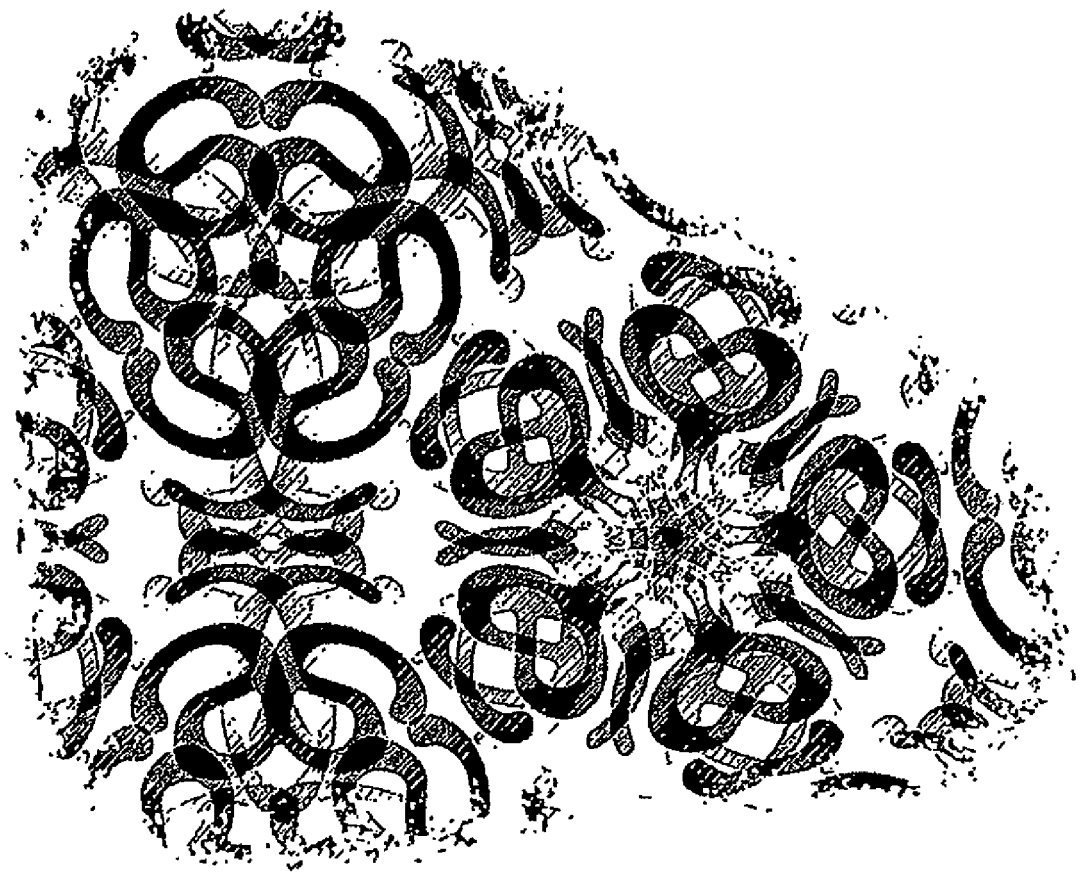
FIG. 117 show the image of FIG. 116 without the gridlines.
Figure 118:
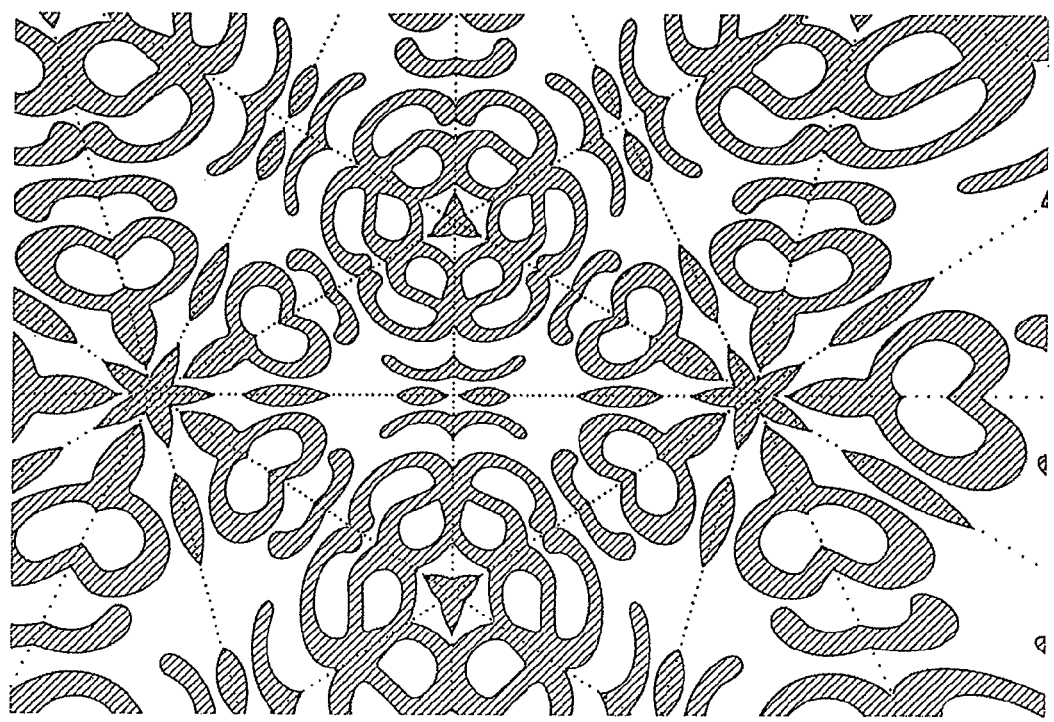
FIG. 118 shows a fundamental domain rotated and reflected without a blending method applied to produce an extended image.
Figure 119:
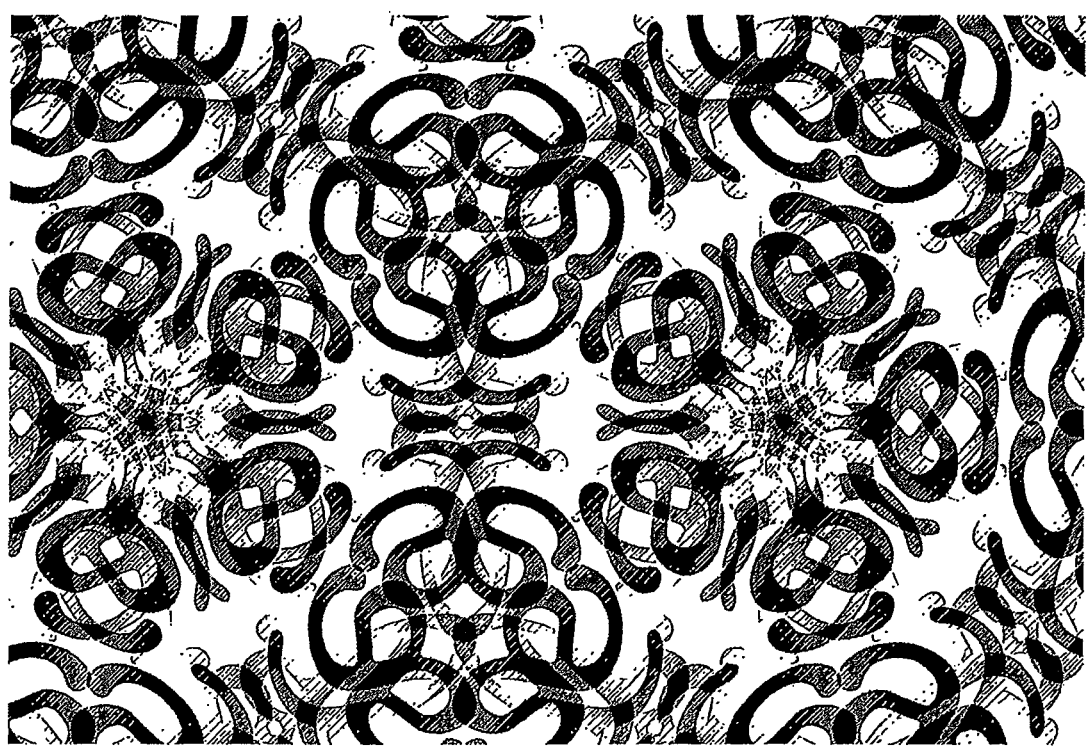
FIG. 119 shows FIG. 118 with a blending method applied.
Figure 120:
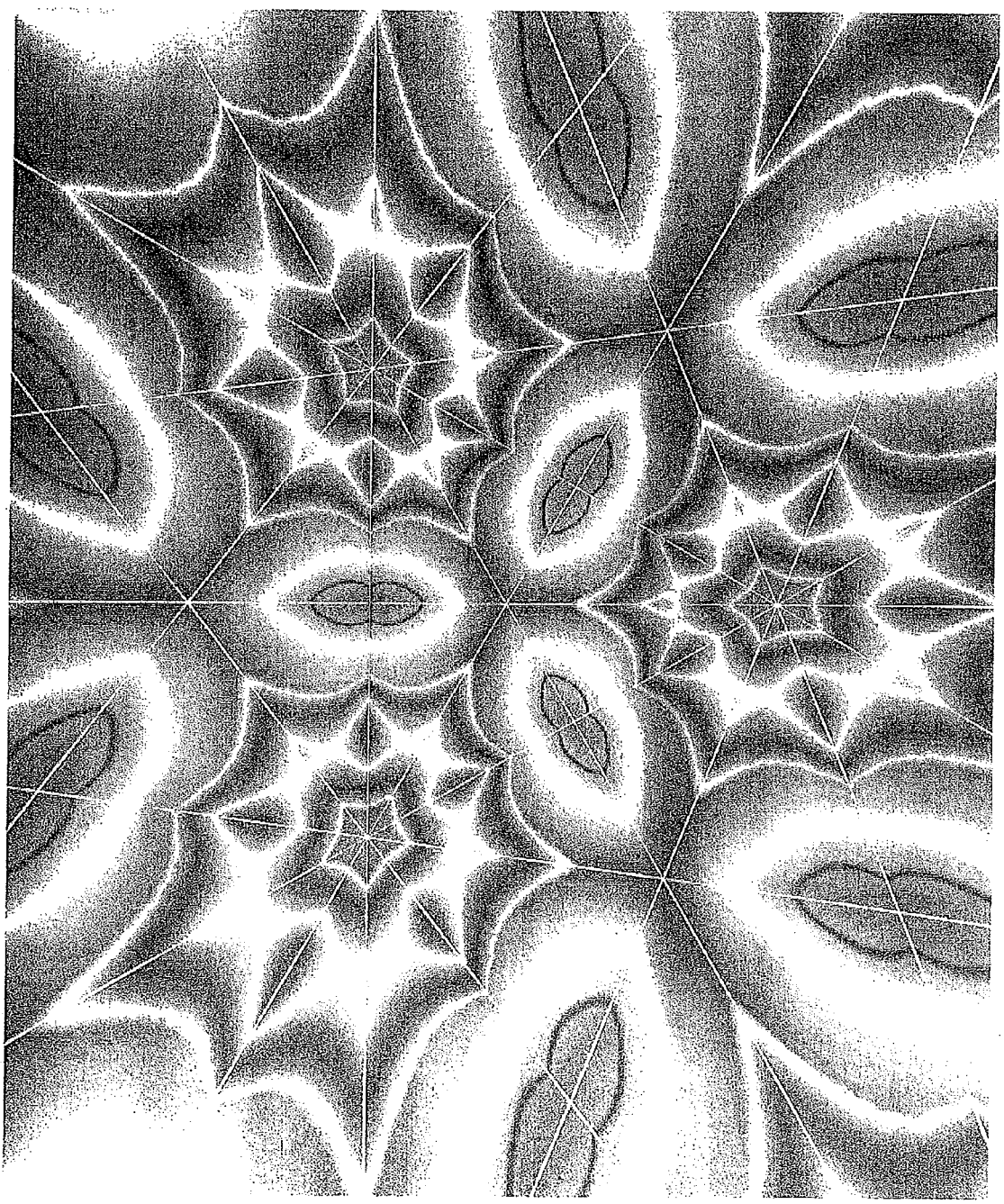
FIG. 120 shows another fundamental domain rotated and reflected without a blending method applied to produce an extended image as shown in FIG. 118
Figure 121:
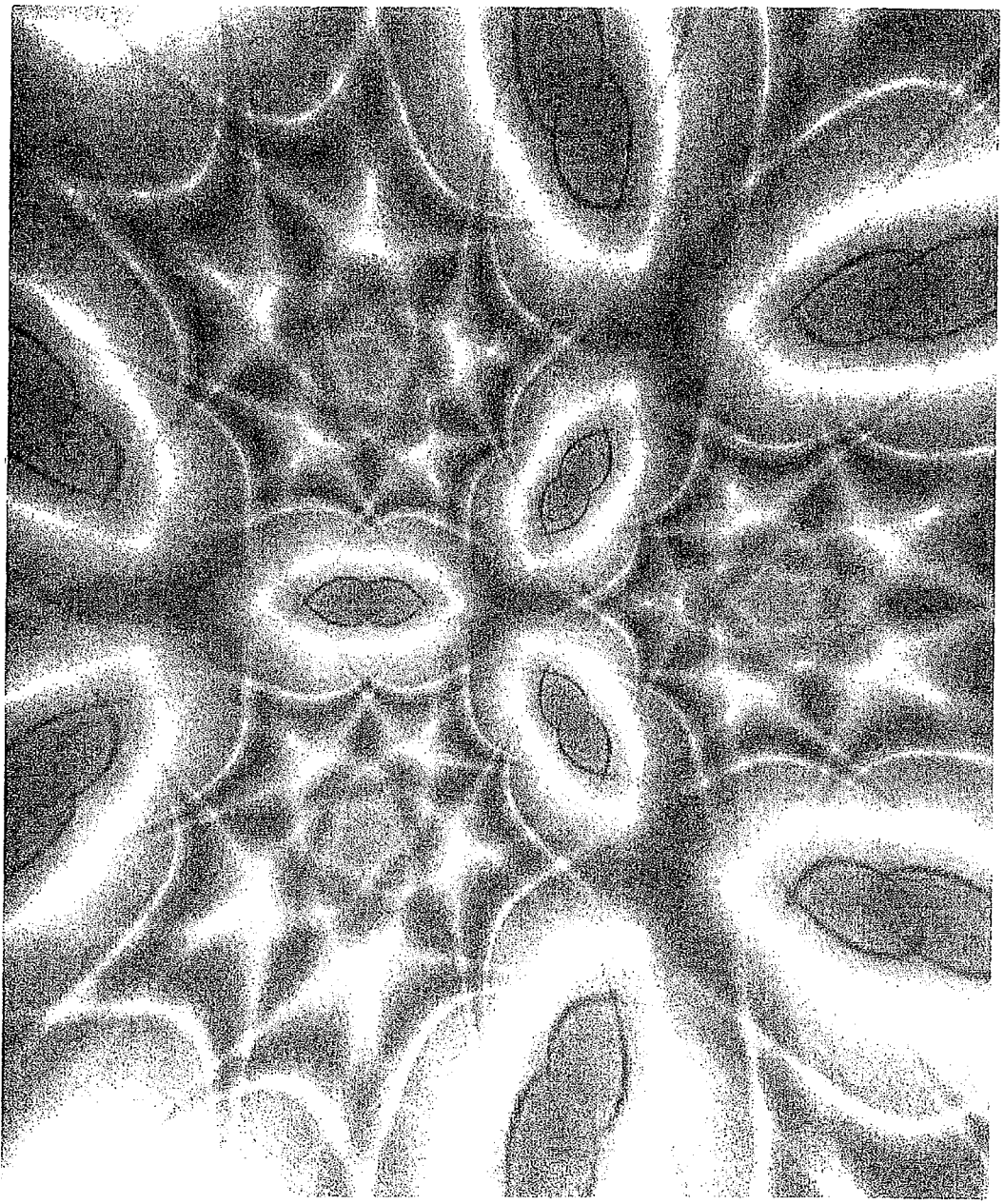
FIG. 121 shows FIG. 120 with a blending method applied.

Referring to FIG. 115, a final image of the primary fundamental domain 128 generated by the above method is shown. The primary fundamental domain 128 is then reflected and rotated as shown in FIG. 116 to produce the images shown in FIG. 117, which then form the source image to be projected on the screen 3. FIGS. 118 and 120 show fundamental domains formed from different images and FIGS. 119 and 121 respectively show the effect of applying the above method thereto. In embodiments of the invention, the source image may consist of six fundamental domains inside a triangle for an icosahedral embodiment and of ten fundamental domains inside a pentagon for the dodecahedral embodiment.

Figure 122:
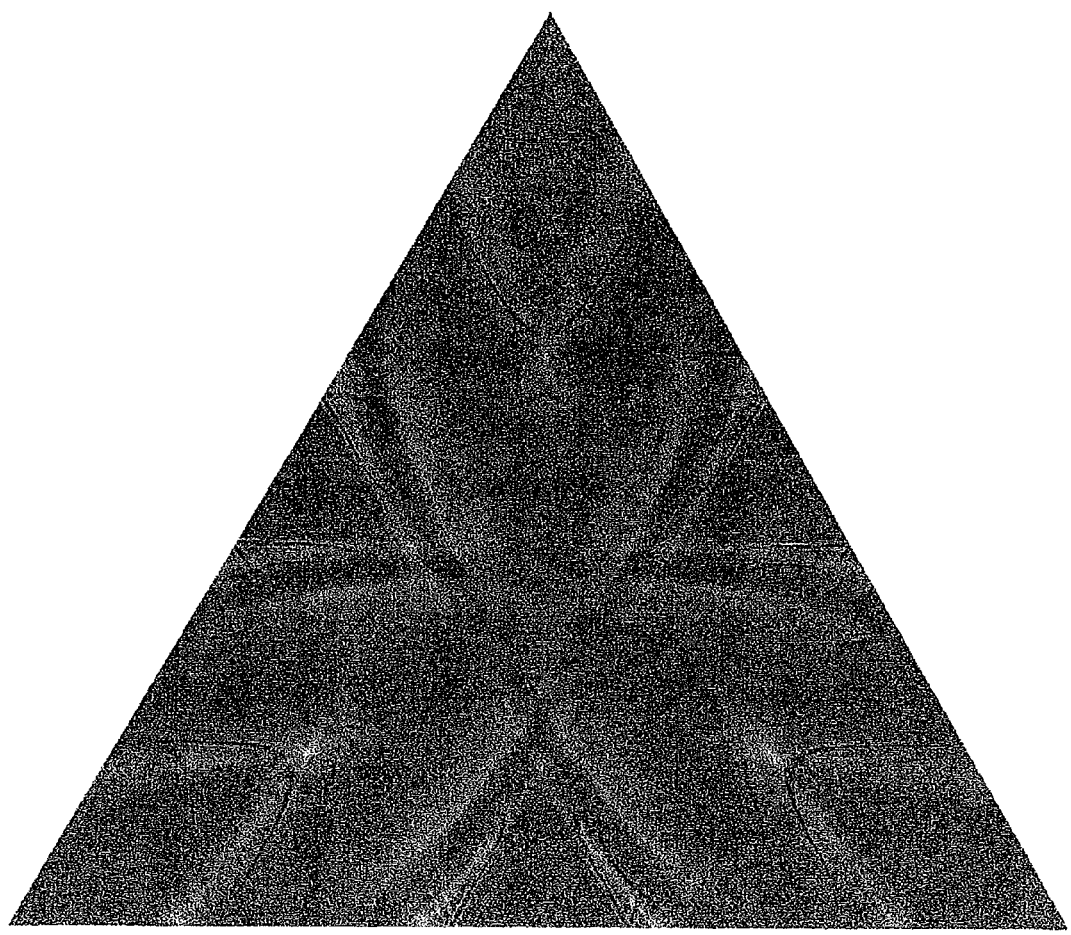
FIG. 122 shows the source image of FIG. 69 which has had the method applied to disguise the joins between fundamental domains.
Figure 123:
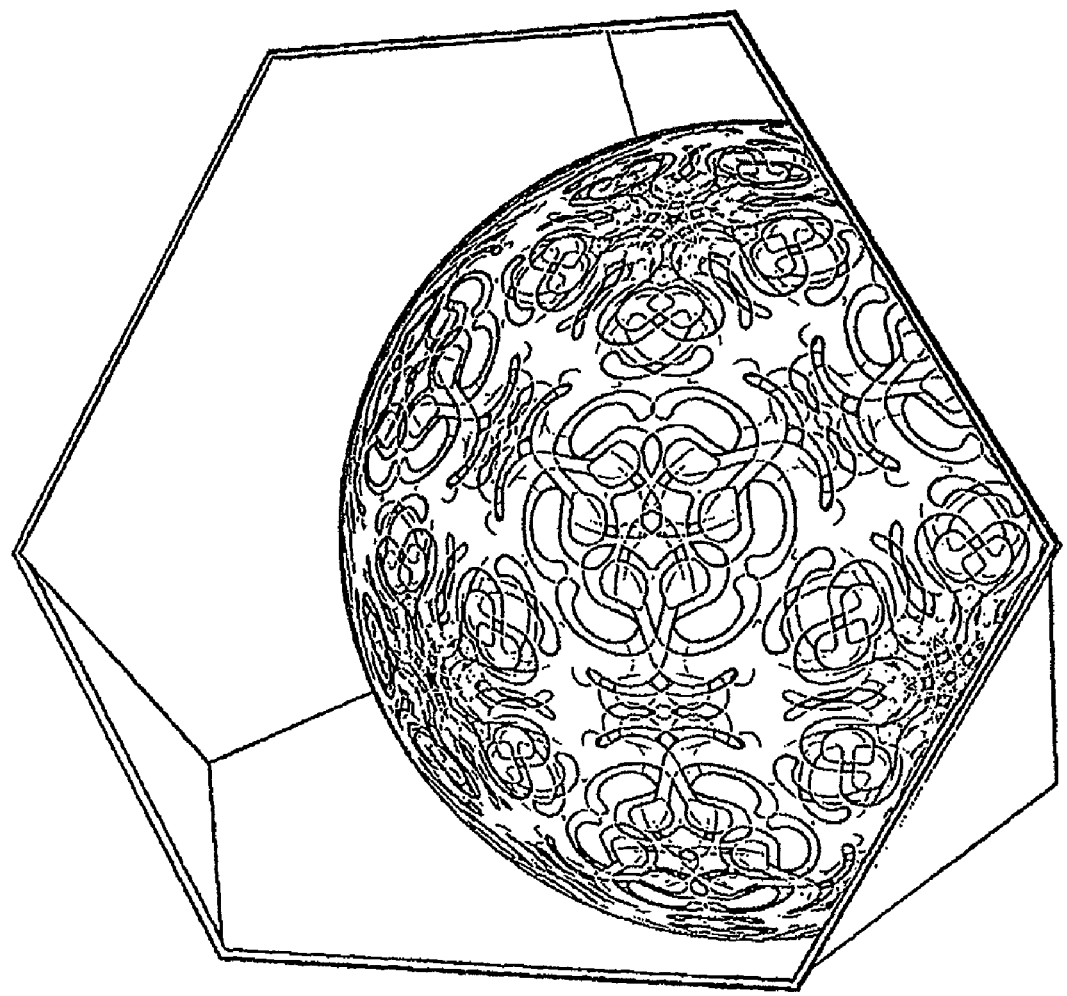
FIGS. 123-125 show an apparatus of FIG. 2 with the source image of FIG. 122 creating an illusion of a 3D sphere.
Figure 124:
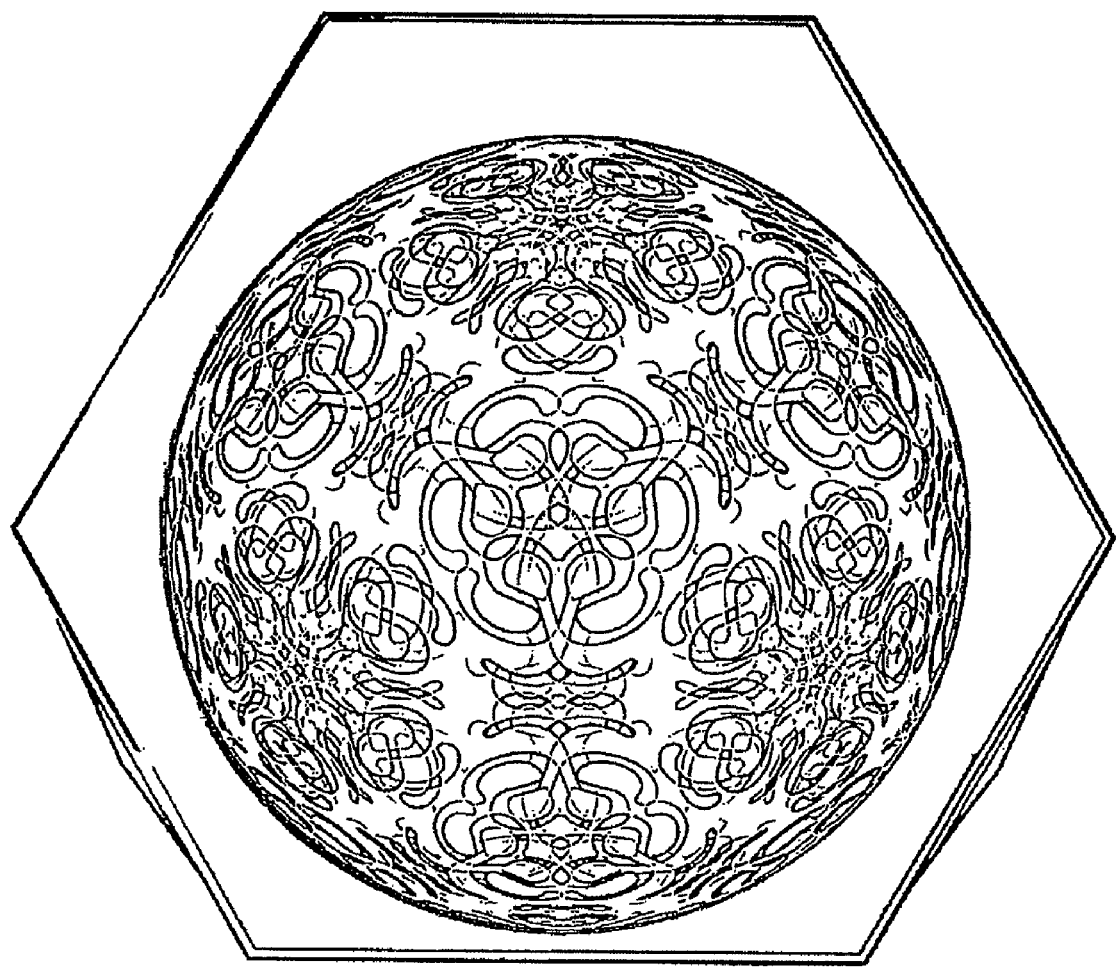
Figure 125:
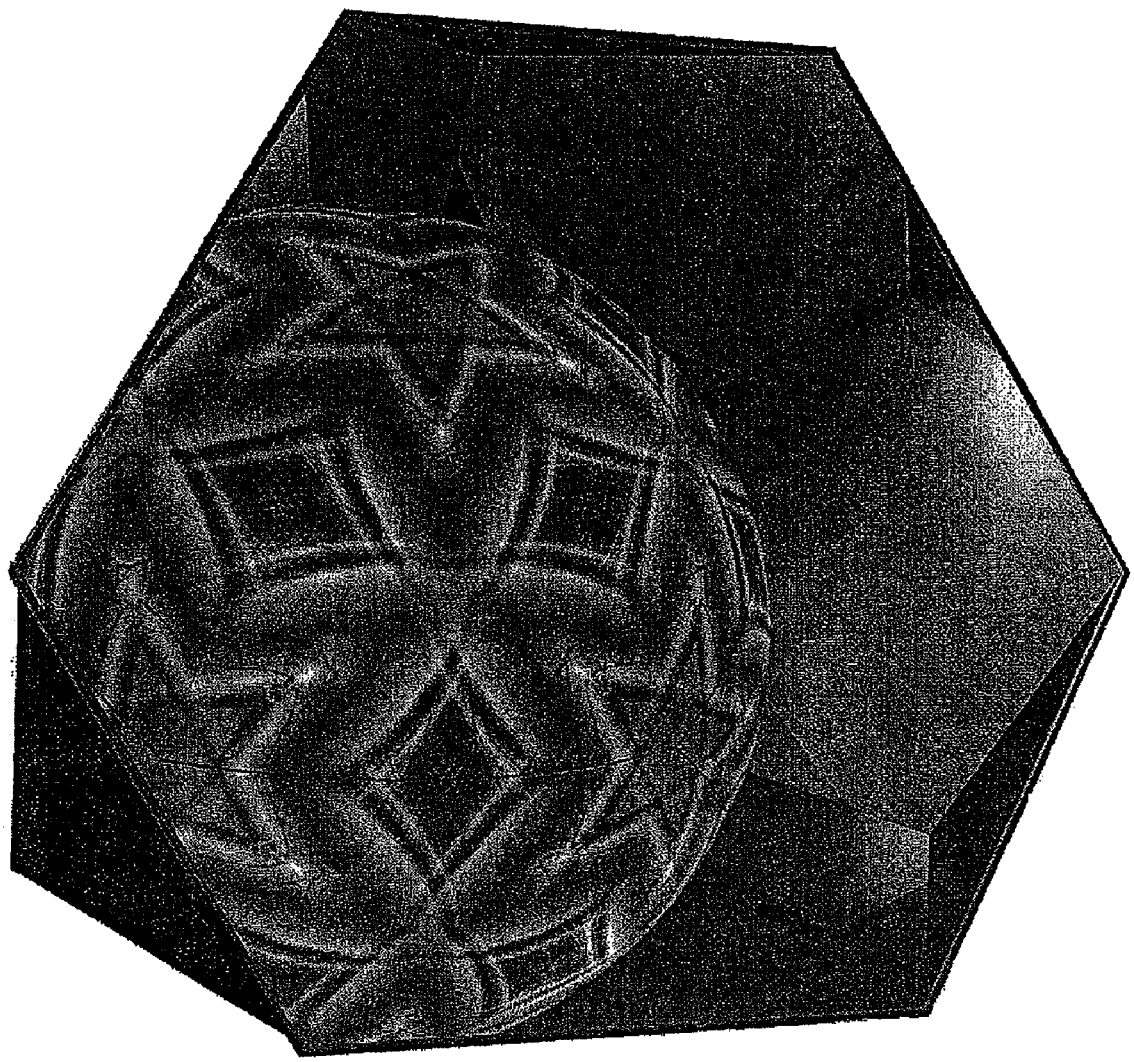
Figure 126:
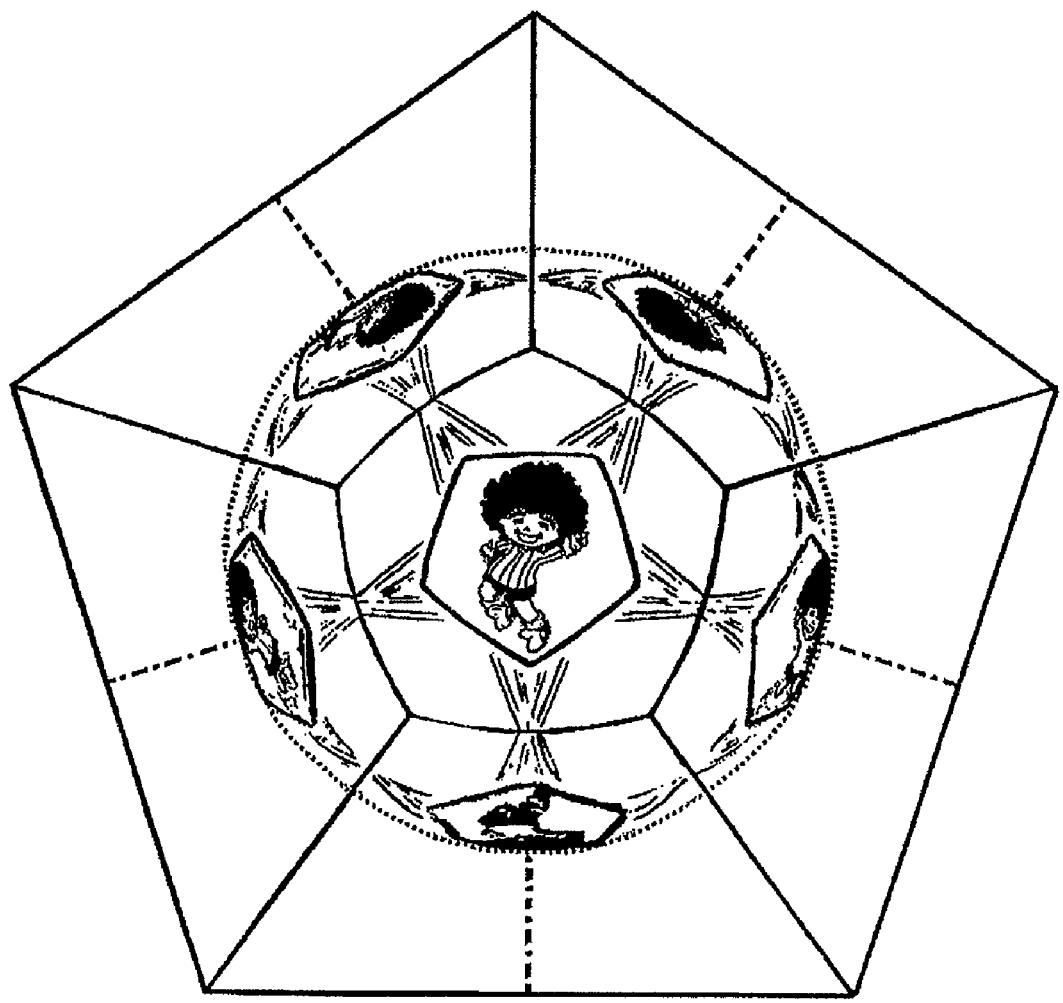
FIGS. 126-130 show examples of the apparatus including non-symmetrical images in the central region of the screen with minimal reflected distortion.
Figure 127:
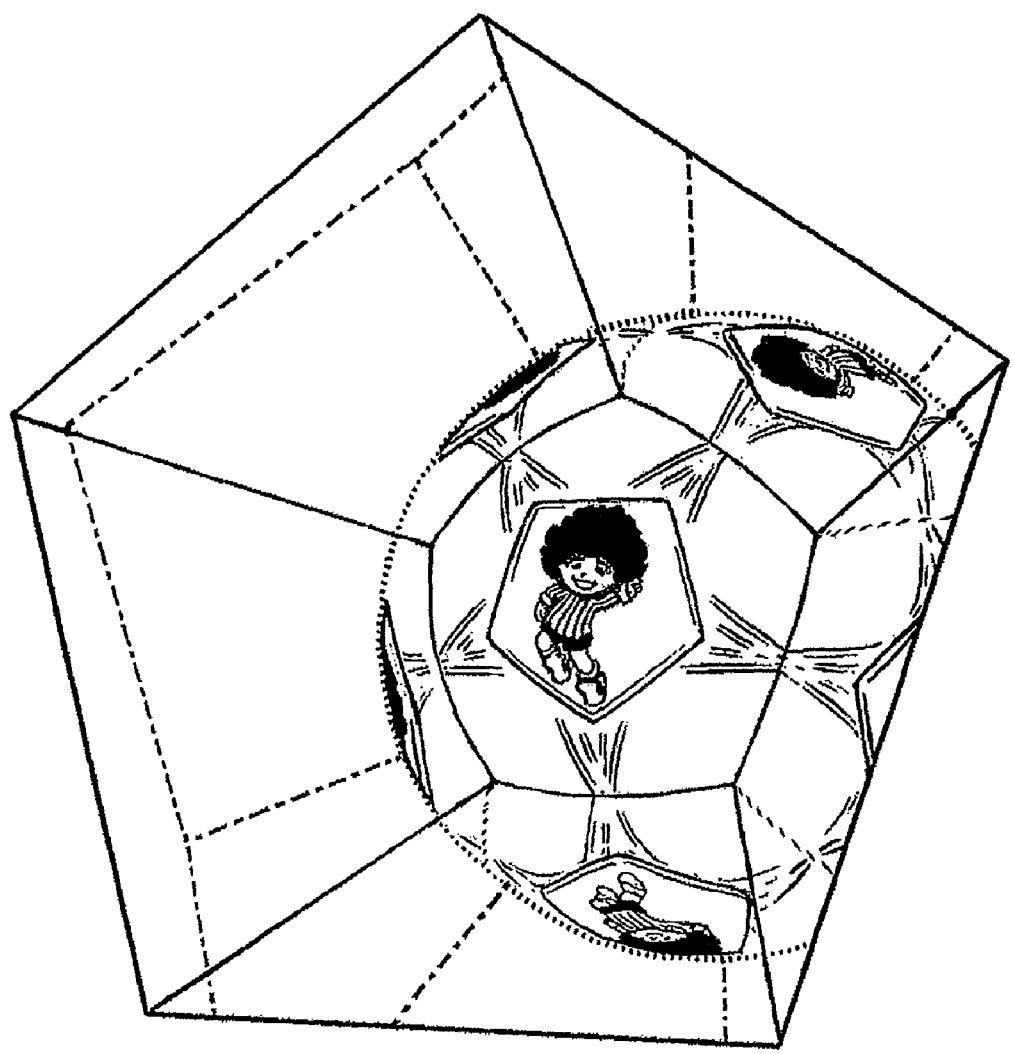
Figure 128:
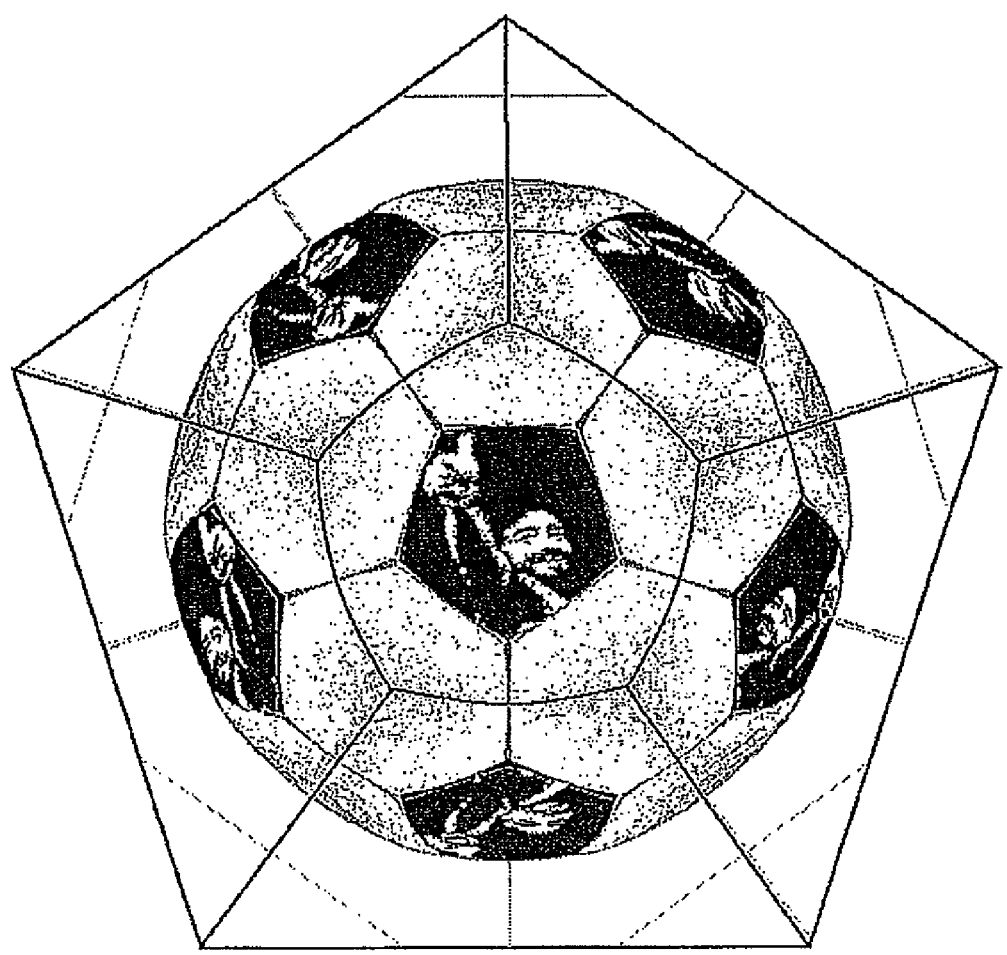
Figure 129:
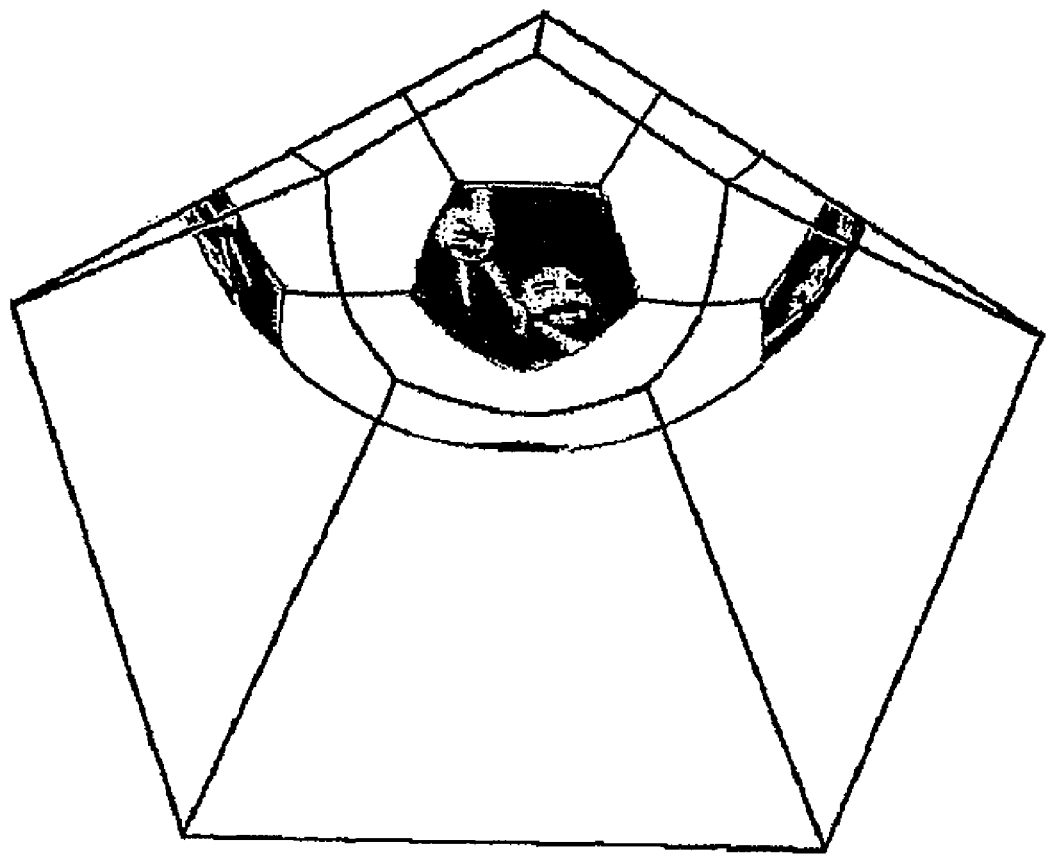
Figure 130:
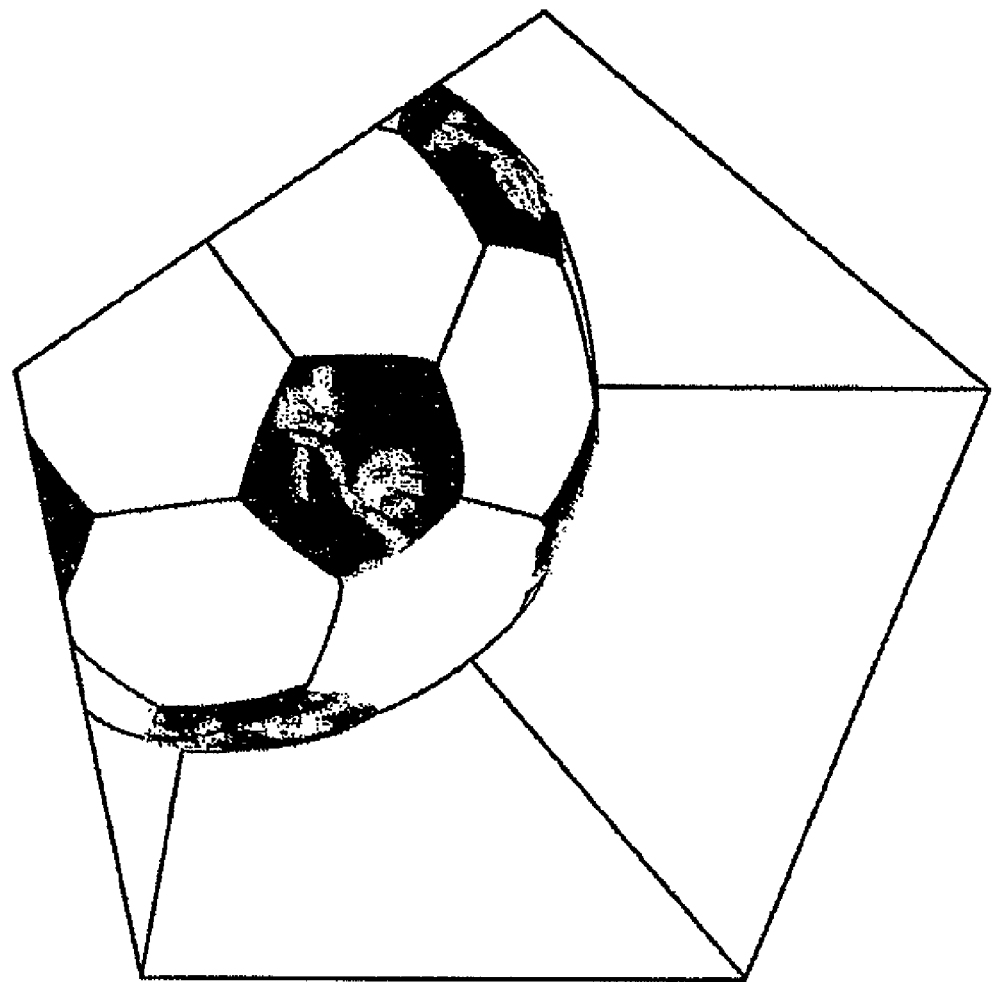

FIG. 122 shows a source image based on the source image shown in FIG. 69 on which the above method has been applied to disguise the joints between fundamental domains and so, referring to FIGS. 123 to 125 the effect of the above method can be seen when the source image shown in FIG. 122 is projected onto the apparatus 3.

A further description of the above method is given in Annex 1, attached to this specification.

Contrasting with the problems of U.S. Pat. No. 4,475,126 (Akins), the present invention creates more than just an apparent 3D image, but generates a unique and specific polyherdral/spherical 3D image that allows the generation of an overall illusion of more than just volume, but also an illusion indistinguishable from a physically real solid icosahedral object.

In the above embodiments the surface of the panels intersects with the screen perpendicularly. This ensures that the illusion of a continuous screen surface is formed without any bends. Further, continuous lines are formed without breaks in the image pattern.

Although embodiments of the invention have been shown and described, it will be appreciated by those skilled in the art that these are preferred embodiments only and that changes may be made to these embodiments, and that alternative embodiments are included, within the scope of the invention which is defined in the claims hereafter.

Annex A

About the processing to hide the joints:

If we want to tessellate a sphere with some tile shape we need to define a grid for the tiles. There are many ways to choose the partitions, one which is particularly useful for our needs is to define our partitions as formed with tiles with sides pertaining to the sphere "great circles". In a world map we use a coordinate system with meridians and parallels, in this system each meridian divides the sphere in two equal sides sometimes called hemispheres, and only one parallel does the same thing. Any circumference in the sphere which, like the equator or a meridian, divides it in two equal parts is a great circle.

Figure 131:
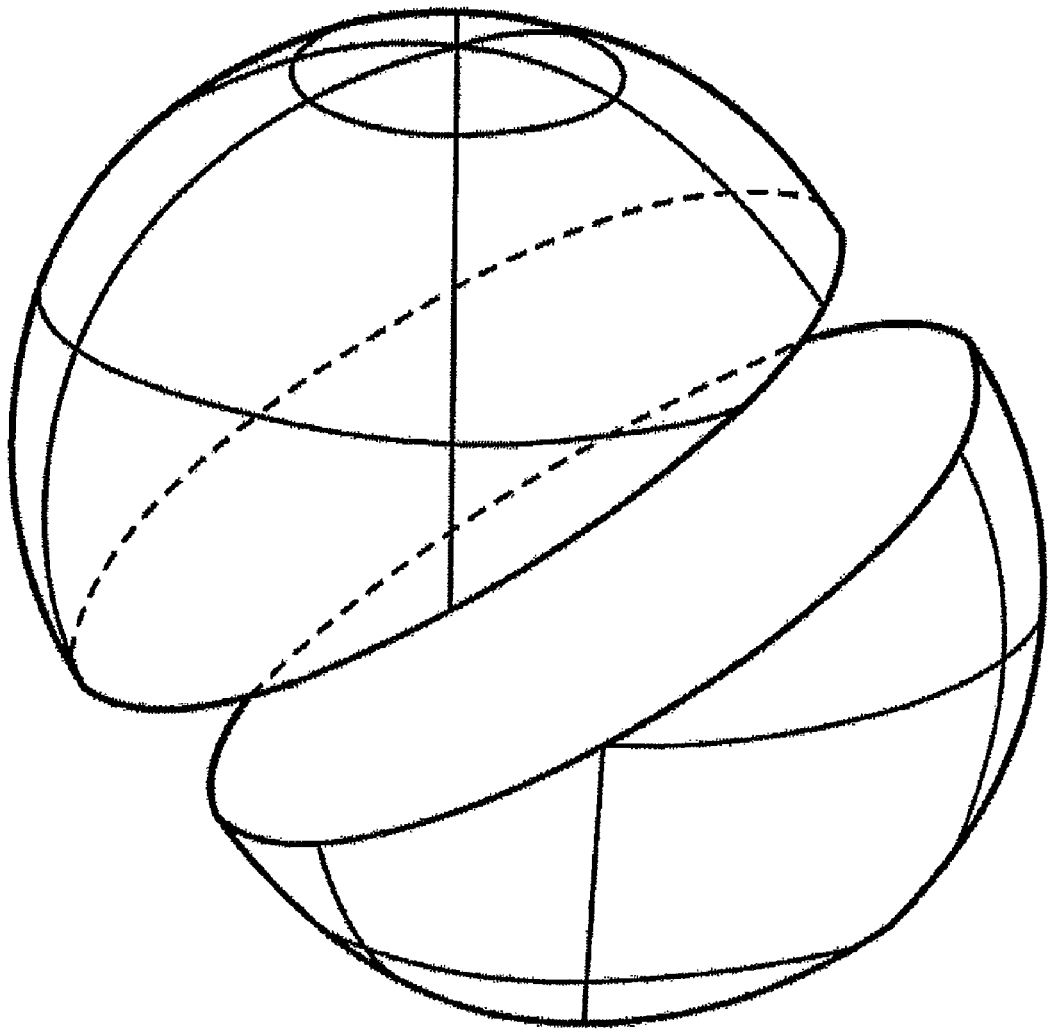
FIG. 131 shows a divided sphere.

(Refer to FIG. 131)

The interest of this "great circles" grid lays in the fact that the mapped image would rotate or get curved with the sphere, it will also maintain the horizontal and vertical alignment with the fundamental domain when projected from the center of the sphere and with the projection vector aimed to the vertex of the fundamental domain's right angle. Also, the image would maintain its vertical and horizontal alignment when viewed from the center of the sphere, as shown in some provided example renders. This is of special interest for placing images such as logos, text, etc. . . . [The related images are in the "IsoPie" folder]

Let's go now to the fundamental domain[f.d]. For this triangle there is a point inside it, which we'll call central point. The way to find this point is to bisect each vertex angle in the f.d. triangle with a great circle.

Figure 132:
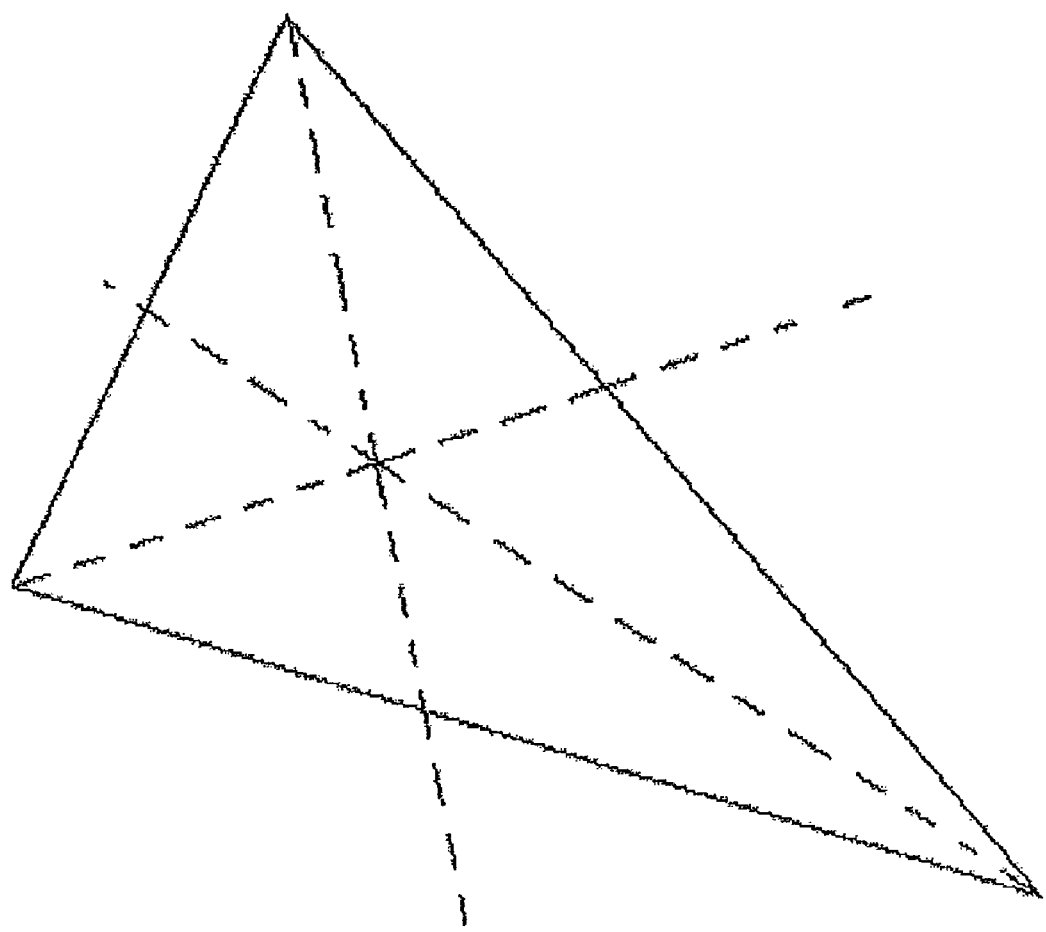
FIG. 132 shows a bisected triangle.

(Refer to FIG. 132)

This triangle is plane, in the invention it is spherical, and the angles are not accurate. [The related images are in the "wired" folder in the .zip file].

This defines a point where the three segments projected perpendicularly from each side of the f. d. would meet at equal distances.

Figure 133:
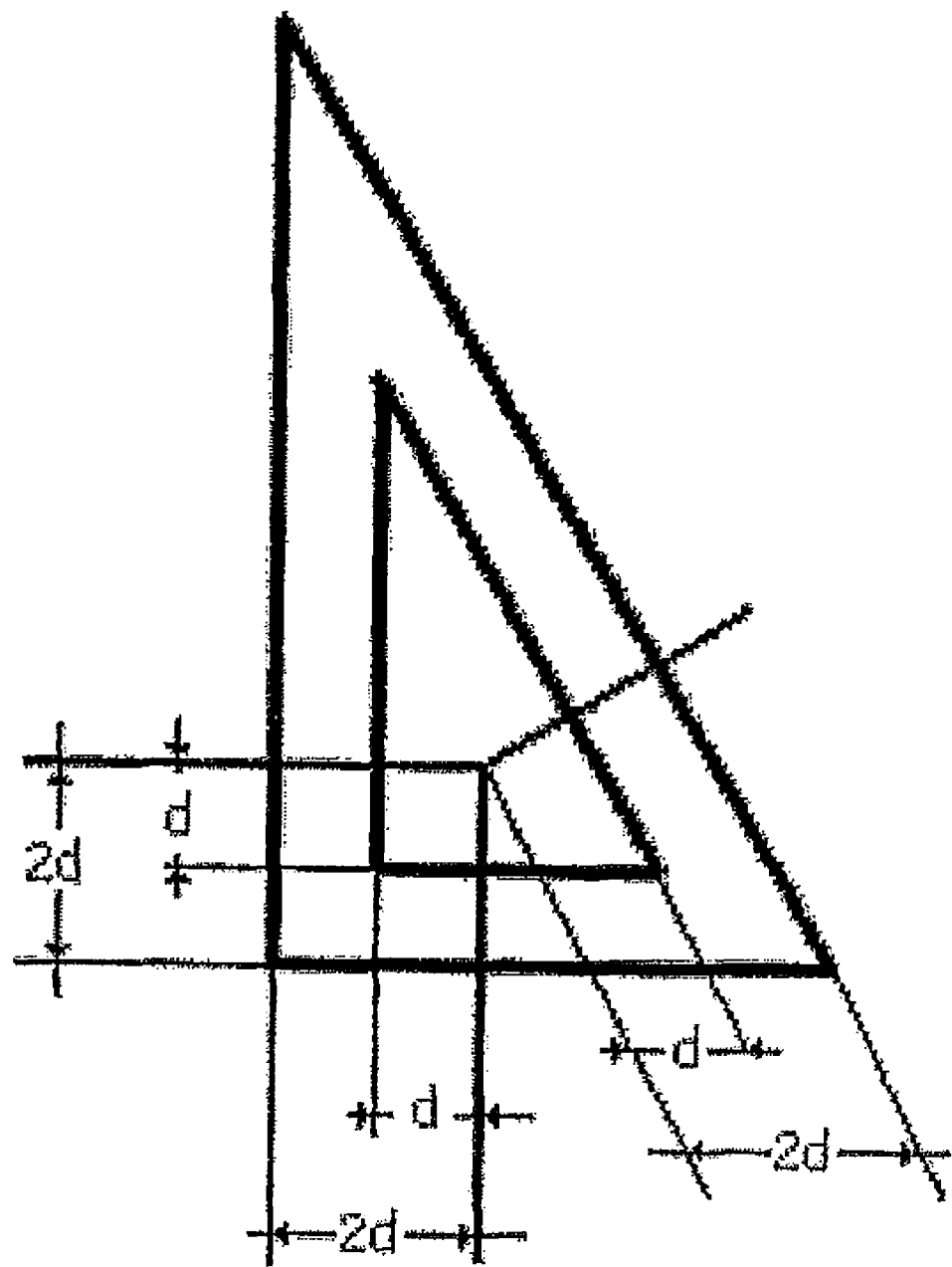
FIG. 133 shows a doubled triangle.

Using the central point and its distance to the sides we can construct a "doubled triangle"; one similar triangle in which the distances to the central points are doubled. As the distance between the circles which defines this outer traingle and the great circles which defines the inner triangle is constantly the same, the outer triangle limits are not defined by a great circle. (Refer to FIG. 133).

Figure 134:
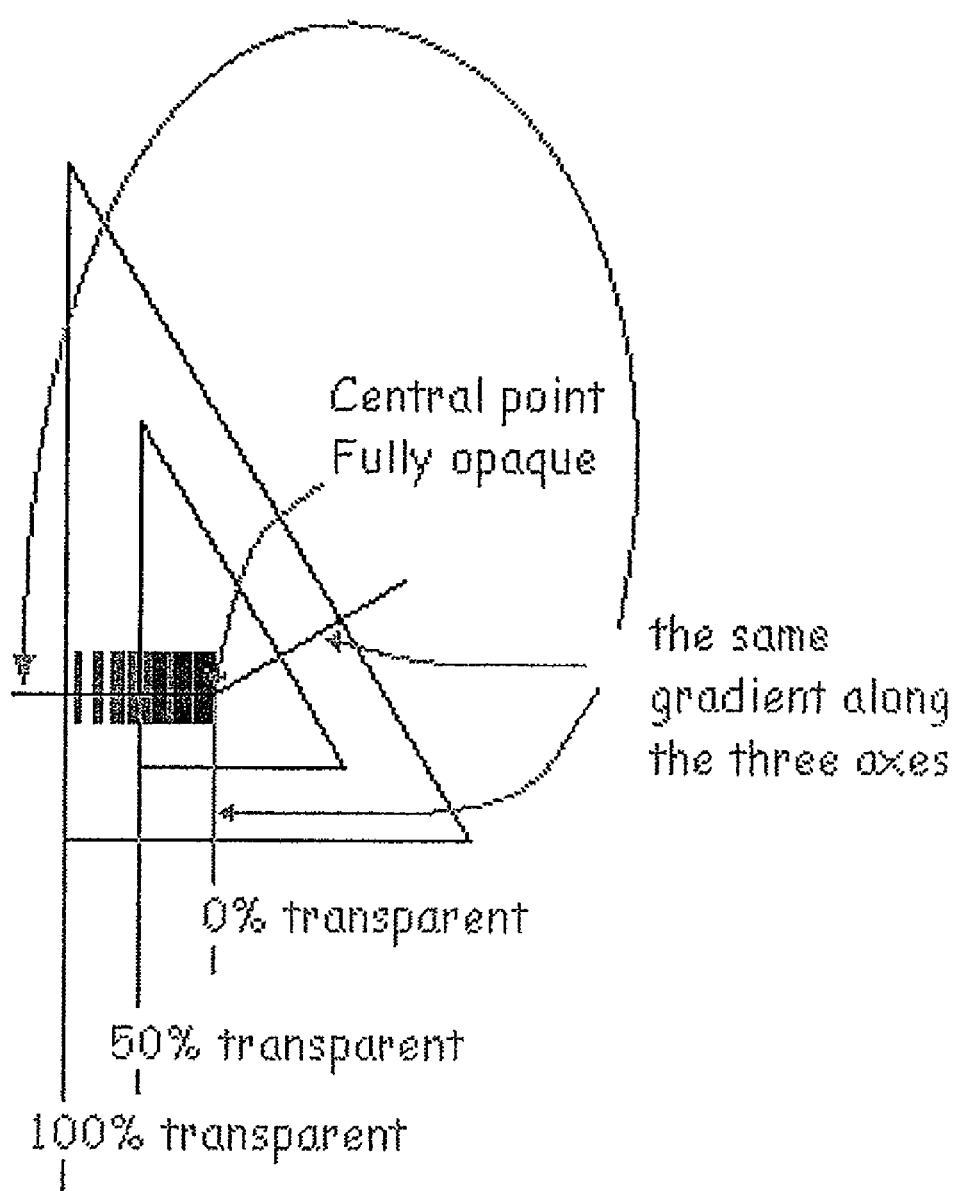
FIG. 134 shows the doubled triangle shown in FIG. 133 with the hide joints-method.

For this hide joints-method the f.d. is generated from a source image with the outer triangle size. In the center point opacity is 100%; then from the boundaries of the inner triangle. it is 50% and fades to 0% in the outer triangle limits. (Refer to FIG. 134).

Figure 135:
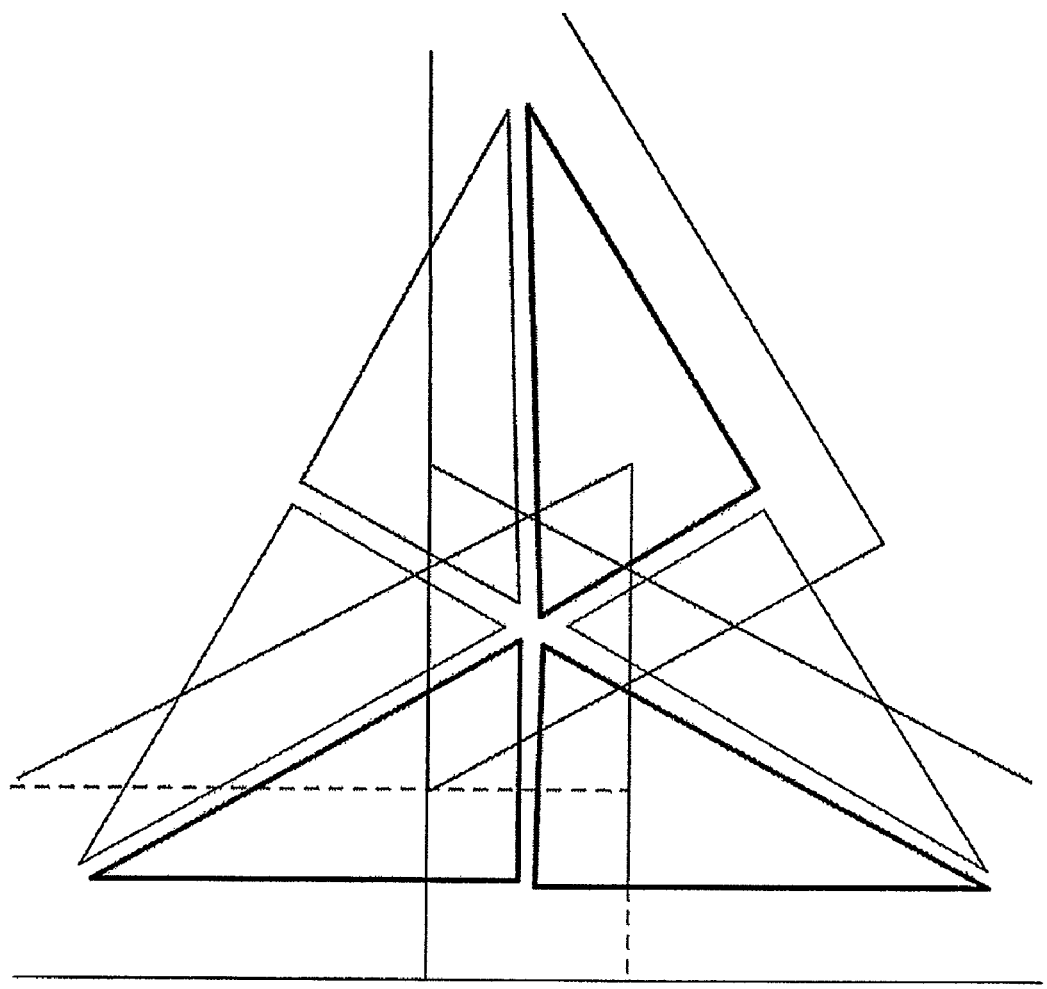
FIG. 135 shows outer triangles overlapping an inner triangle.

[This relates to images in the "TheShadesOfTransparence" folder] And then the source image is generated with the previous method [the one in the other document] but using a f.d. with the inner triangle size [and defined by great circles]. (Refer to FIG. 135)

The outer triangles overlaps with a gradient transparence. This figure is partial, only three bigger triangles are drawn and the colors are just to identify the f.d. and each outer triangle. The orange lines refers to an adjacent fd outer triangle [the mirrored one]. I think drawing all the reflections would be confusing.

The gradient must be any function which, when composed with the other gradients do not distorts the angle at which any line in the fd meets with the units. It seems there is only one; in the current embodiment we are using:

$$A = \frac{1 + \cos(d)}{2}$$

A is the transparence d is the distance on the axes and scaled to appear as 0° in the center;

90° in the inner triangle limit and 180° in the outer triangle limits

Figure 136:
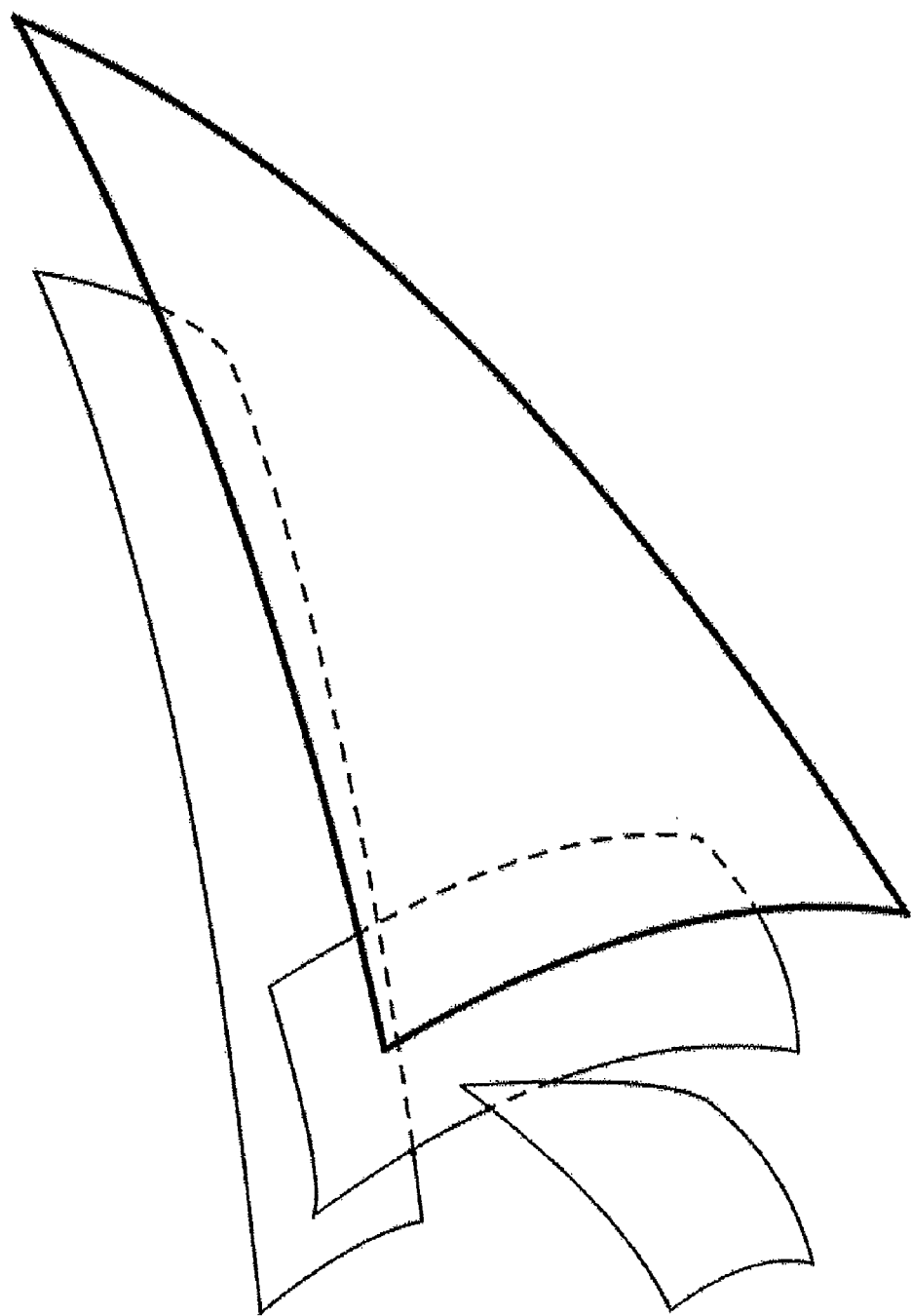
FIG. 136 shows a fundamental domain and some of its overlaps.

Now let's go to the current embodiment way to do the above. We take a fd, and its overlapping sides each overlap in a layer, and combine this using the alpha blending composition mode which is a widely known computer graphics effect. (Refer to FIG. 136)

This image is not accurate neither complete it is the red f.d. and some of its overlaps from the previous figure. [This issue relates to images in the "Blend" folder in the .zip file].

There remains the problem of adjusting the transparence for each layer to display a source image in which all layers contribute equally to preserve the new symmetries. It depends on the composition mode. In the current embodiment with the alpha blending composition mode we calculate a transparency level for each point in each layer from the current layer color, the color of previous layers for the same point, and the "total number of layers"

For each point in each layer there is a transparency value $A_n$ and an emitted luminance $I_n$.

Figure 137:
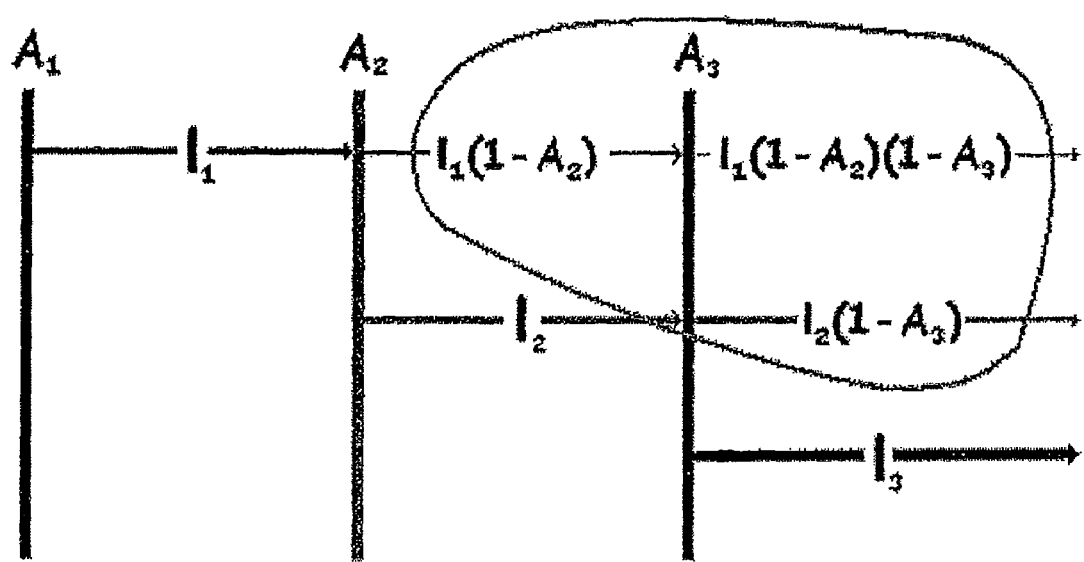
FIG. 137 shows the transparency value and emitted luminance for a point in each layer.

(Refer to FIG. 137)

Every time a light beam $I_n$ passes through a layer it fades depending on the layer transparency $A_n$ for that point.

$$A3 = \frac{l3}{n}$$

$$A2 = \frac{l2}{n - l3}$$

$$A1 = \frac{l1}{n - l2 - l3}$$

Or for a more general formula:

$$Ai = \frac{li}{n - Si}$$

Where:

$Sn=0$; $Si=li+1+li+2+ \ldots +ln$

The invention claimed is:

1. An apparatus for producing a three-dimensional kaleidoscopic image, the apparatus comprising:
   a screen for the generation of images thereon; and
   a plurality of mirrors surrounding the screen, wherein the screen is substantially shaped as a portion of an outer surface of a sphere or polyhedron having icosahedral group symmetry, wherein the plurality of mirrors are aligned with planes extending through a projected centre of said polyhedron or sphere and intersecting each edge of the screen, and wherein each mirror is aligned with an icosahedral plane of symmetry of said sphere or polyhedron having icosahedral group symmetry such that a source image generated on the screen is reflected in the mirrors to produce an apparent three-dimensional image of an outer surface of said polyhedron or sphere.

2. An apparatus according to claim 1, wherein the screen is substantially triangular and the apparatus comprises three mirrors.

3. An apparatus according to claim 2, wherein the screen is curved as a portion of the surface of a sphere, and the apparent image is a sphere.

4. An apparatus according to claim 1, wherein the screen is substantially pentagonal and the apparatus comprises five mirrors.

5. An apparatus according to claim 1, wherein the polyhedron is an icosahedron and the apparent image is that of an icosahedron.

6. An apparatus according to claim 1, wherein the polyhedron is a dodecahedron and the apparent image is that of a dodecahedron.

7. An apparatus according to claim 1, wherein the polyhedron is a disdyakis triacontahedron, and the apparent image is that of a disdyakis triacontahedron.

8. An apparatus according to claim 1, wherein the screen is translucent and the image is projected on the screen by a rear projection unit located on an opposing side of the screen to the mirrors to generate an image on the screen.

9. An apparatus according to claim 1, wherein the screen comprises an array of LEDs.

10. An apparatus according to claim 1, wherein the screen comprises an array of organic LEDs.

11. An apparatus according to claim 1, further comprising blanking portions intersecting between adjacent mirrors distal to the screen.

12. An apparatus according to claim 11, wherein the blanking portions are non-reflective.

13. An apparatus according to claim 11, wherein the blanking portions are triangular.

14. An apparatus according to claim 1, wherein ends of the mirrors, distal to the screen, define an opening in the apparatus such that the screen and mirrors are observable.

15. An apparatus according to claim 14, wherein a cover is mounted over the opening in the apparatus.

16. An apparatus according to claim 15, wherein the cover is translucent.

17. A method of forming a screen of an apparatus for producing a three-dimensional kaleidoscopic image of an outer surface of a sphere or polyhedron having icosahedral group symmetry, wherein the apparatus includes a screen for the generation of images thereon and a plurality of mirrors surrounding the screen, wherein the screen is substantially shaped as a portion of an outer surface of a sphere or polyhedron having icosahedral group symmetry, and the plurality of mirrors are aligned with planes extending through a projected centre of said polyhedron or sphere and intersecting each edge of the screen, wherein each mirror is aligned with an icosahedral plane of symmetry of said sphere or polyhedron having icosahedral group symmetry such that a source image generated on the screen is reflected in the mirrors to produce an apparent three-dimensional image of an outer surface of said polyhedron or sphere, the method comprising the steps of:
   selecting the polyhedron or sphere of which an apparent three-dimensional image is to be produced;
   selecting a defined portion of the polyhedron representing a fundamental domain; and
   rotating and reflecting said defined portion to form the screen which is composed of discrete portions thereof.

18. A method of forming a source image to be generated on a screen of on an apparatus for producing a three-dimensional kaleidoscopic image of an outer surface of a sphere or polyhedron having icosahedral group symmetry, the apparatus including a screen for the generation of images thereon and a plurality of mirrors surrounding the screen, wherein the screen is substantially shaped as a portion of a surface of a sphere or polyhedron having icosahedral group symmetry, and the plurality of mirrors are aligned with planes extending through a projected centre of said polyhedron or sphere and intersecting each edge of the screen, wherein each mirror is aligned with an icosahedral plane of symmetry of said sphere or polyhedron having icosahedral group symmetry such that a source image generated on the screen is reflected in the mirrors to produce an apparent three-dimensional image of an outer surface of said polyhedron or sphere, the method comprising the steps of:
   selecting a base image;
   cropping said base image into a defined triangular shape representing a fundamental domain; and
   rotating and reflecting said cropped image to form the source image composed of discrete cropped images, wherein the edges of the screen define the shape of the source image.

19. A method according to claim 18, further comprising the steps of:
   forming a further image about a projected centre of the source image which does not correspond to the discrete fundamental domain; and
   selecting the size of said further image so that it is not visible in the mirrors.

20. A method according to claim 19, further comprising the steps of:
   defining a fundamental domain within the base image;
   defining an enlarged triangle enclosing the fundamental domain;
   graduating the translucency of the base image from a projected centre of the fundamental domain, wherein the image is opaque, to the boundary of said enlarged triangle, wherein the image is transparent;
   rotating and reflecting the primary fundamental domain to produce adjacent secondary fundamental domains such that the portions of image defined within the enlarged triangles, defined by the secondary fundamental domains, are superimposed on the portion of image defined within the primary fundamental domain to produce the cropped image.

* * * * *